(12) United States Patent
Maim

(10) Patent No.: US 8,442,996 B2
(45) Date of Patent: May 14, 2013

(54) METHODS FOR GRANTING ACCESS TO RESOURCES MODIFIABLE BY USERS IN A COMPUTER ENVIRONMENT, AND RESOURCES STRUCTURED THEREFORE

(76) Inventor: Enrico Maim, Paris (FR)

( * ) Notice: Subject to any disclaimer, the term of this patent is extended or adjusted under 35 U.S.C. 154(b) by 787 days.

(21) Appl. No.: 11/911,340

(22) PCT Filed: Apr. 12, 2006

(86) PCT No.: PCT/EP2006/061567
§ 371 (c)(1),
(2), (4) Date: Oct. 13, 2009

(87) PCT Pub. No.: WO2006/108865
PCT Pub. Date: Oct. 19, 2006

(65) Prior Publication Data
US 2011/0106795 A1  May 5, 2011

(30) Foreign Application Priority Data

| Apr. 12, 2005 | (FR) | 05 03612 |
| Jul. 1, 2005 | (FR) | 05 07016 |
| Sep. 2, 2005 | (FR) | 05 09001 |
| Jan. 10, 2006 | (FR) | 06 00213 |

(51) Int. Cl.
*G06F 7/00* (2006.01)
*G06F 17/30* (2006.01)

(52) U.S. Cl.
USPC .................................................. 707/791

(58) Field of Classification Search ........... 707/694, 707/791
See application file for complete search history.

(56) References Cited

U.S. PATENT DOCUMENTS

| 5,295,256 A * | 3/1994 | Bapat | 717/137 |
| 5,878,427 A * | 3/1999 | Waheed et al. | 1/1 |
| 5,920,867 A * | 7/1999 | Van Huben et al. | 1/1 |

(Continued)

FOREIGN PATENT DOCUMENTS

| FR | 2 806 184 | 9/2001 |
| WO | WO-01/95146 A2 | 12/2001 |

OTHER PUBLICATIONS

Pétard X et al.: "Éléments de spécifications pour une application de rédaction coopérative reposant sur une plateforme orientée connaissance" IC' 2004, [Online] May 5, 2004,-May 7, 2004, XP002427102 Lyon , URL: http://www.limsi.fr/Individu/xpetard/artixcles/IC2004_petard,PDF>.

Pam A: "Fine-Grained Transclusion in the Hypertext Language" Internet Citation, [Online] Mar. 2, 1997, XP002191173 , URL: http://xanadu.com.au/archive/draft-pam -html-fine-trans-00.txt>.

(Continued)

*Primary Examiner* — Jorge A Casanova
(74) *Attorney, Agent, or Firm* — Blakely, Sokoloff, Taylor & Zafman

(57) ABSTRACT

The invention concerns a method for accessing a resource in a computer environment, the resource comprising a set of objects. The invention is characterized in that the computer environment is adapted to store in association with at least one object of said resource at least one modified object, in that said computer environment comprises means for storing in association with such an object information concerning degree of elaboration, and in that it includes the following steps: identifying, for each object of the resource to which corresponds at least one modified object, based on data concerning degree of elaboration, at least one most elaborated version of said object; assembling the objects thus identified for display in the resource. The invention also concerns other methods for accessing to resources as well as resources structured therefor.

31 Claims, 80 Drawing Sheets

U.S. PATENT DOCUMENTS

Figure 9:
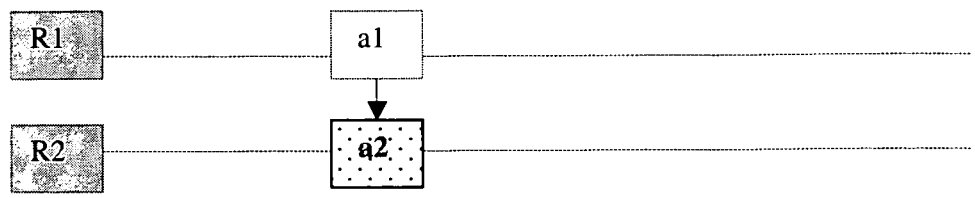
Figure 10:
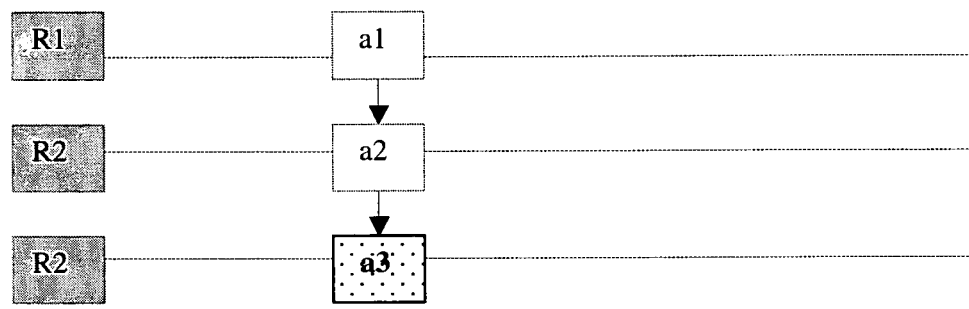
Figure 11:
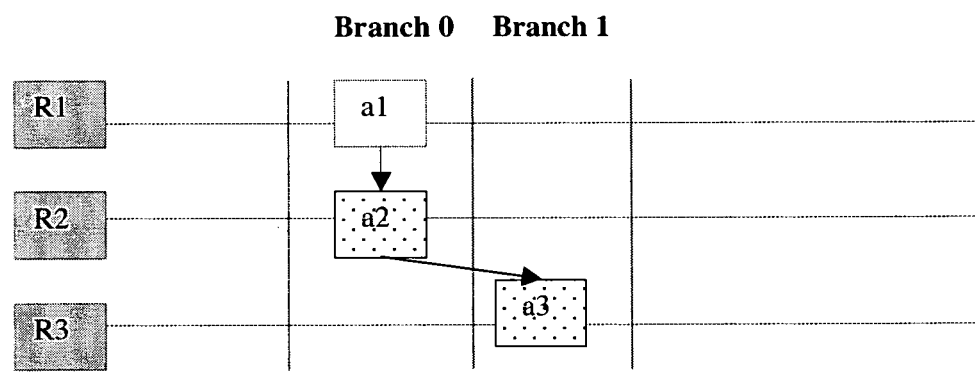

| | | | |
|---|---|---|---|
| 6,202,066 B1* | 3/2001 | Barkley et al. | 707/785 |
| 6,230,159 B1* | 5/2001 | Golde | 1/1 |
| 6,631,497 B1* | 10/2003 | Jamshidi et al. | 715/205 |
| 2002/0002567 A1 | 1/2002 | Kanie et al. | |
| 2002/0007380 A1* | 1/2002 | Bauchot et al. | 707/530 |
| 2003/0177122 A1* | 9/2003 | Makansi et al. | 707/10 |
| 2006/0106894 A1* | 5/2006 | Richardson | 707/204 |

OTHER PUBLICATIONS

Ohst De, et al.: "Differences between versions of UML diagrams" Foundations of Software Engineering. Proceedings of the ACM SIGSOFT Symposium on Foundations of Software Engineering, Sep. 1, 2003, pp. 227-236, XP002301791.

* cited by examiner

Fig. 1-a — Start
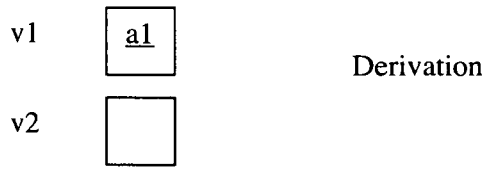
Fig. 1-b — Derivation
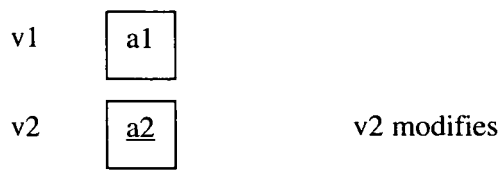
Fig. 1-c — v2 modifies
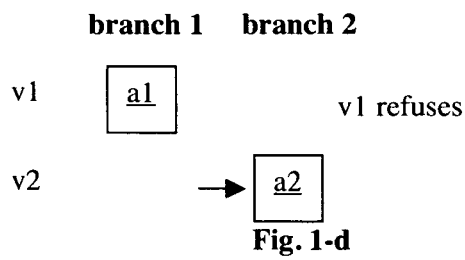
Fig. 1-d — v1 refuses
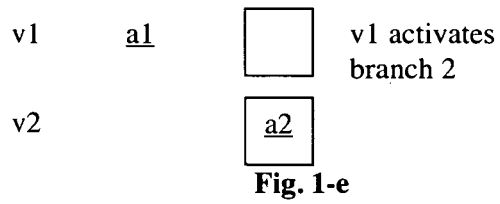
Fig. 1-e — v1 activates branch 2
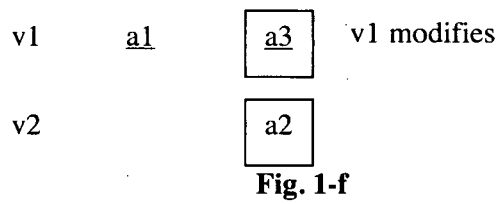
Fig. 1-f — v1 modifies
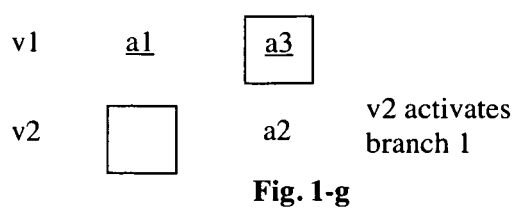
Fig. 1-g — v2 activates branch 1

Fig. 2-a
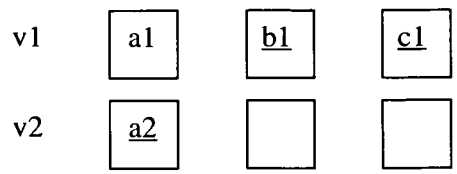
Fig. 2-b
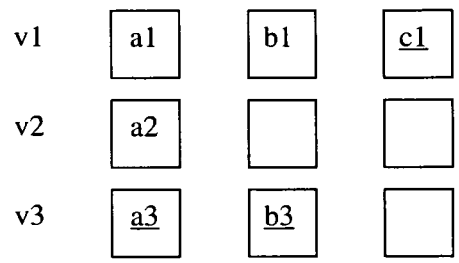
Fig. 2-c
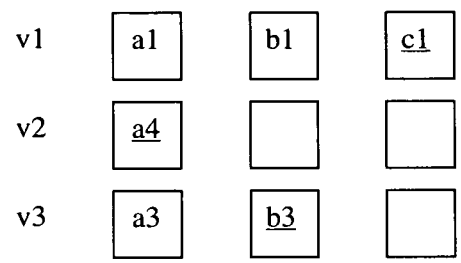
Fig. 2-d

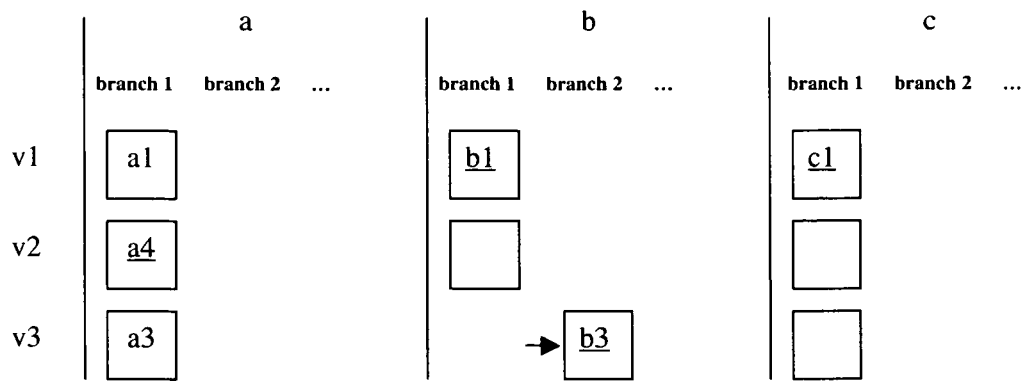
Fig. 3-a
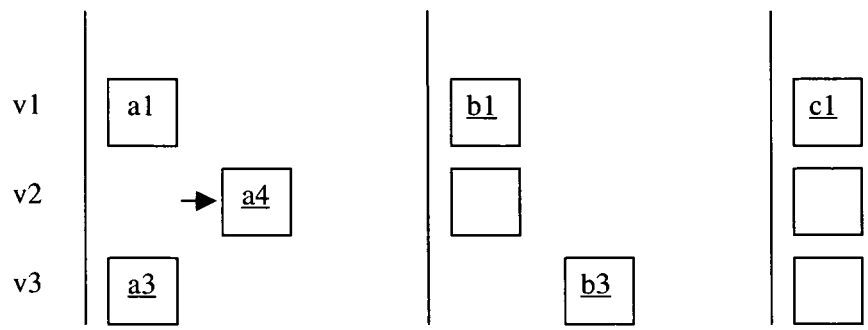
Fig. 3-b
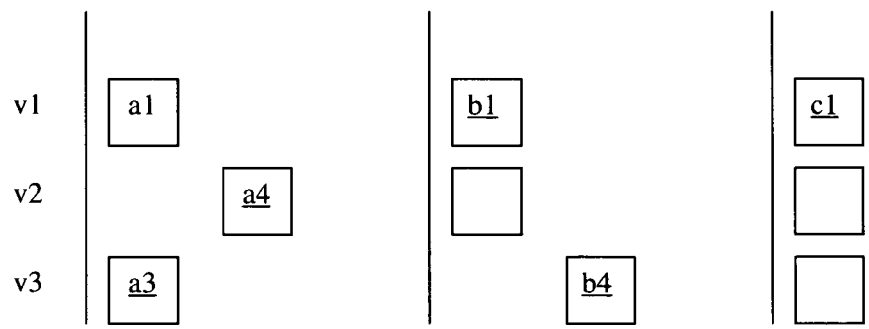
Fig. 3-c
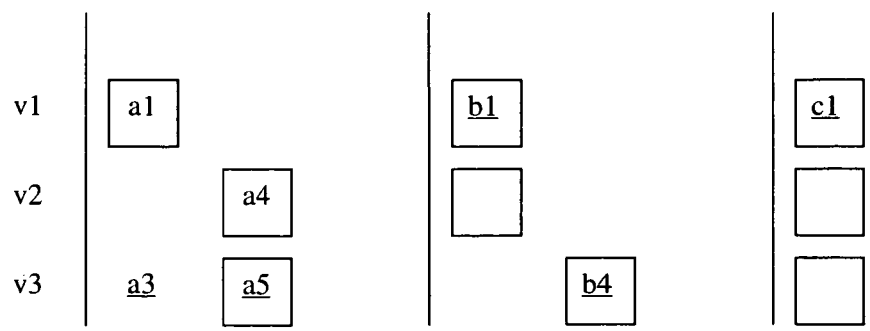
Fig. 3-d

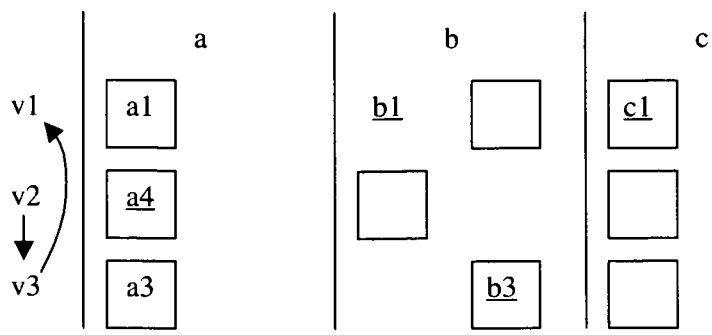
Fig. 4-a
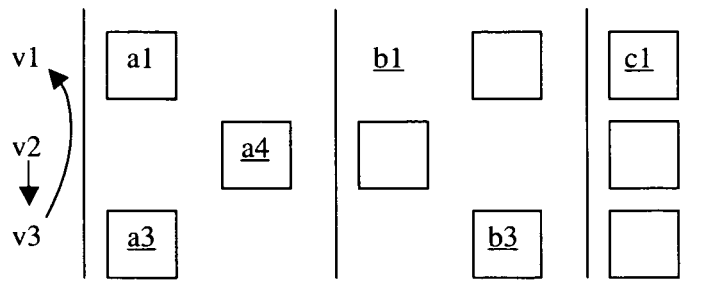
Fig. 4-b
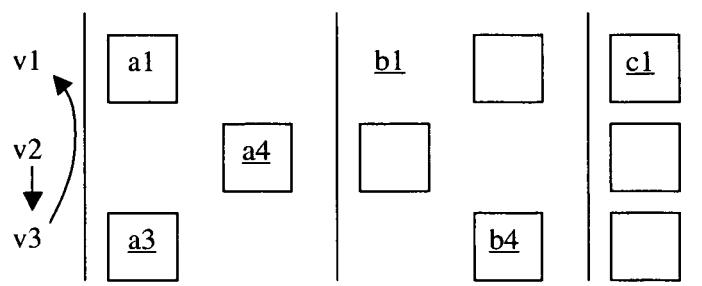
Fig. 4-c
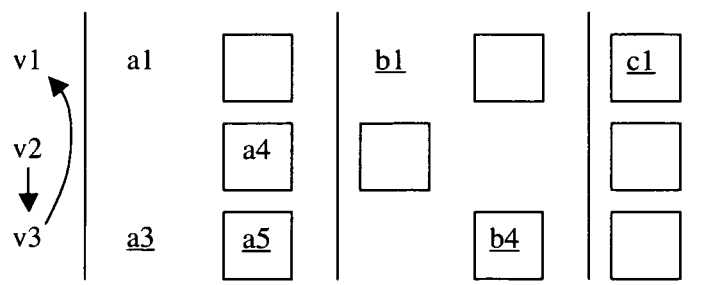
Fig. 4-d

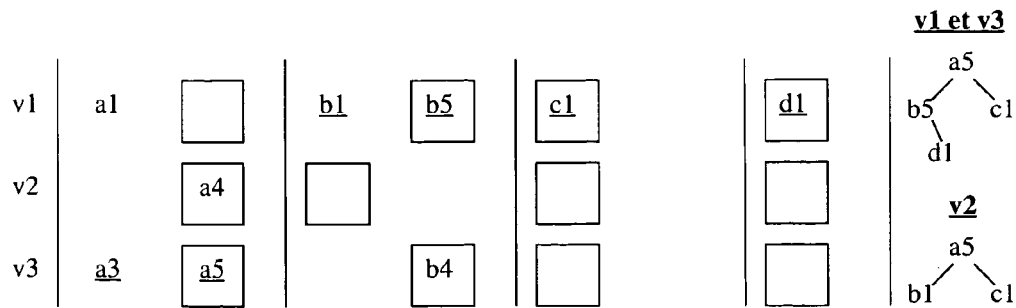
Fig. 5-a
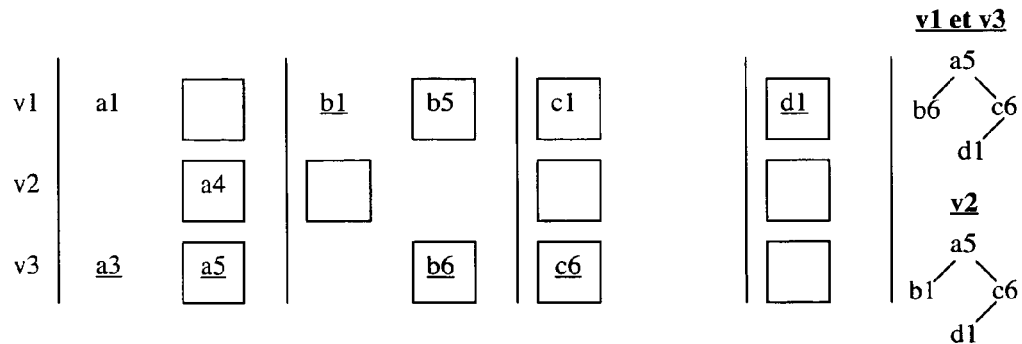
Fig. 5-b
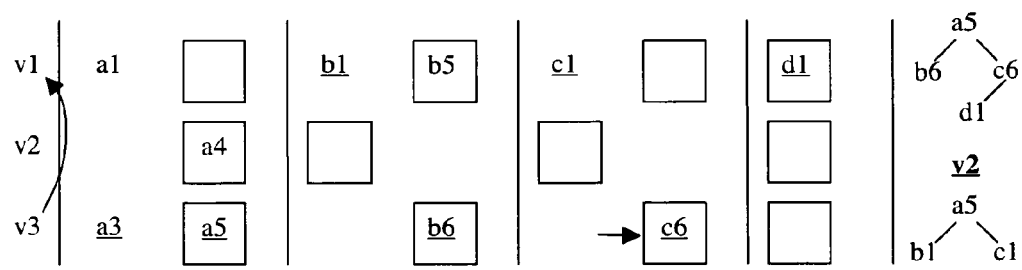
Fig. 5-c
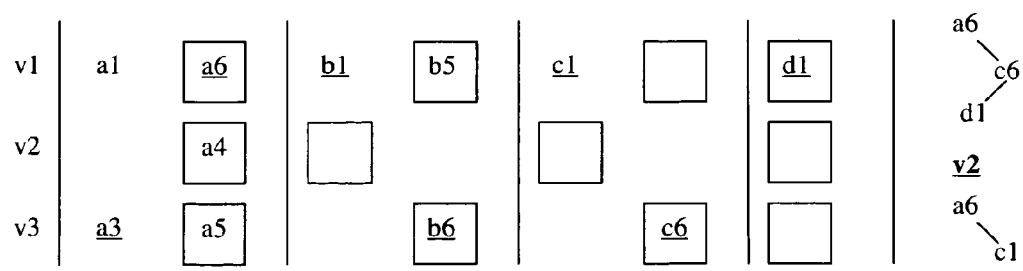
Fig. 5-d

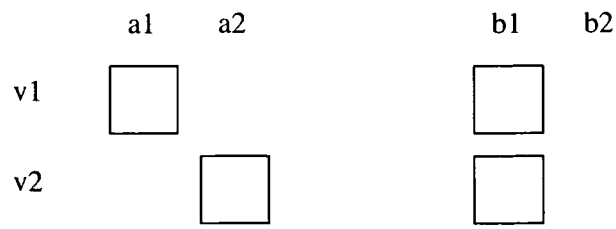
Fig. 6-a
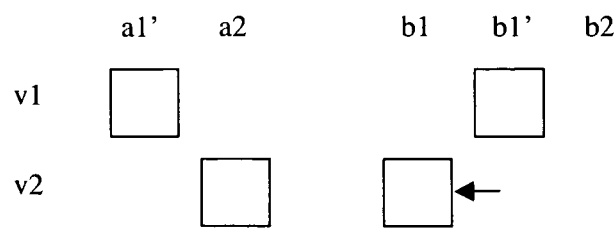
Fig. 6-b
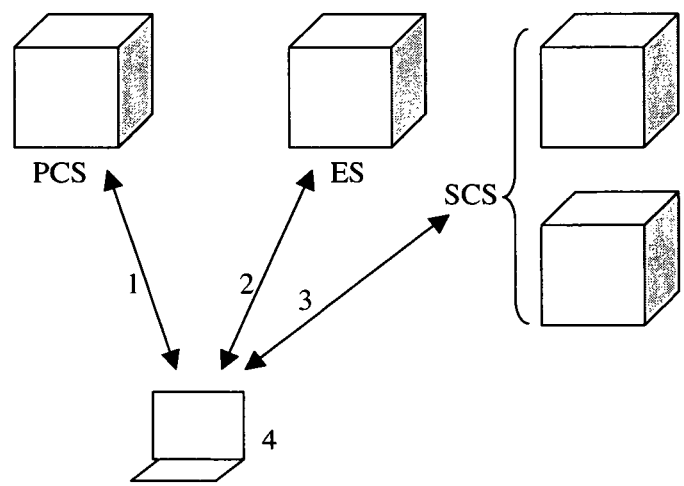
Fig. 7
Figure 8

Branch 0    Branch 1

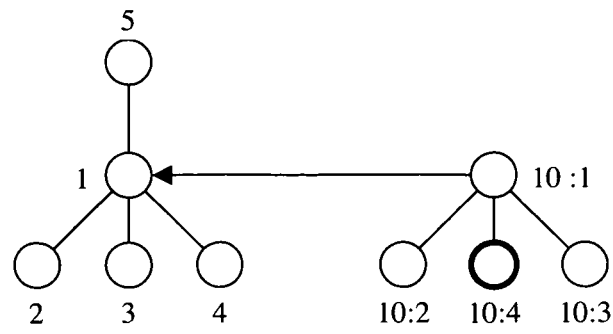
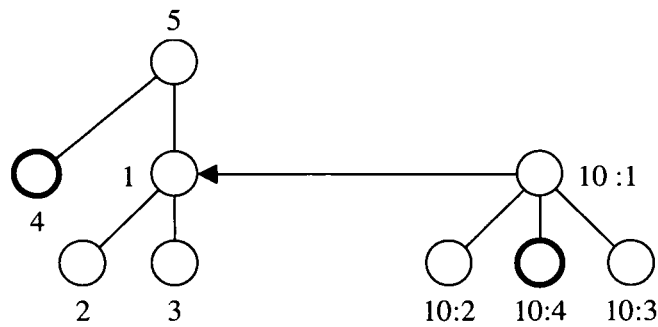
Figure 53
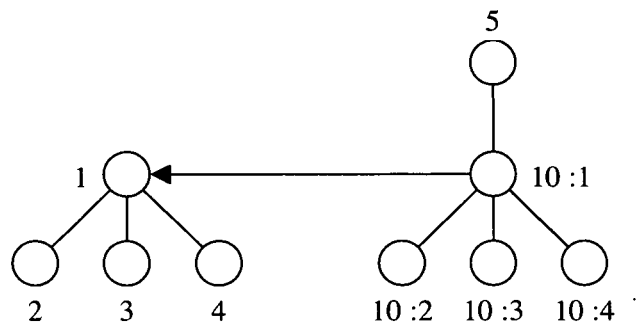
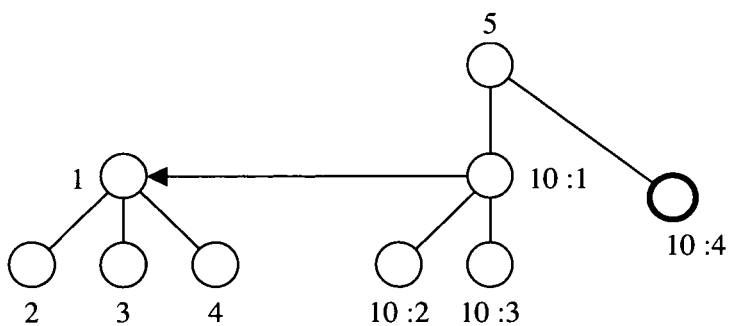
Figure 54

R

Source and Destination for Transclusion

Choosing the ' Transclude Here' Option from the drag and drop contextual menu

After Transclusion the 'Transclusion Result' is displayed with red asterisk icon overlay Selecting the 'Transclusion Source' column from the available columns Transclusion Source column being displayed View of Source directory before any modification Updates: Modifying the source side Updates: After modification of source, view at source side Updates: After modification of source, view at result side Contributions: modifying the result side Contributions: After modification of result, view at result side
Black tick icon overlay representing that result is being modified and also the entry in the
Transclusion column displaying 'Locally Modified' status Contributions: After modification of result, view at source side
The blue plus icon overlay representing that B has got contributions

Contributions: After modification of result, view at source side
The right click contextual menu shows the 'View Contribution' menu item

Contributions: After modification of result, view at source side
Selecting the view contributions item Contributions: After modification of result, view at source side
After selection of the 'View Contributions' the contributions are being displayed Contributions: After modification of result, view at source side
The 'Accept Contribution' and 'Reject Contribution' contextual menu items are being
Displayed on right click Contributions: After modification of result, view at source side
Selecting the 'Accept Contributions' item Contributions: After modification of result, view at source side
After selection of Accept Contributions 'B' has changed to 'Bprime'

Doing Second Transclusion: Transclusion of the Transclusion result

Second Transclusion: after the transclusion

Second Transclusion: modifying the result

Second Transclusion : After modification of result, view at source
The red circle representing the state 'Transclusion Result modified and having contribution'

Second Transclusion : After modification of result view at source
The right click contextual menu shows the 'View Contribution' menu item

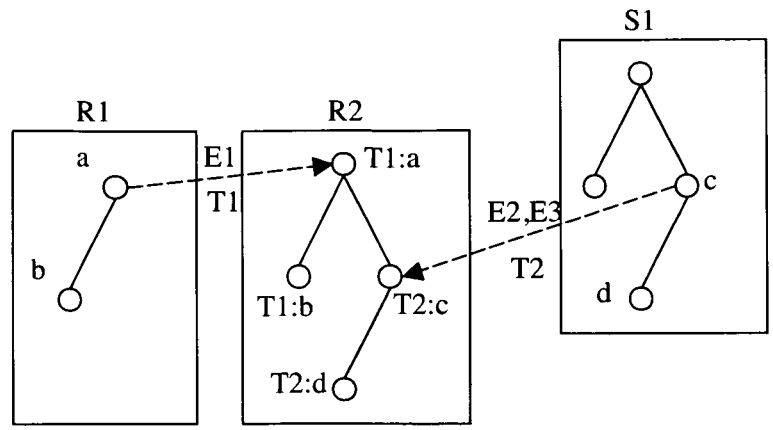
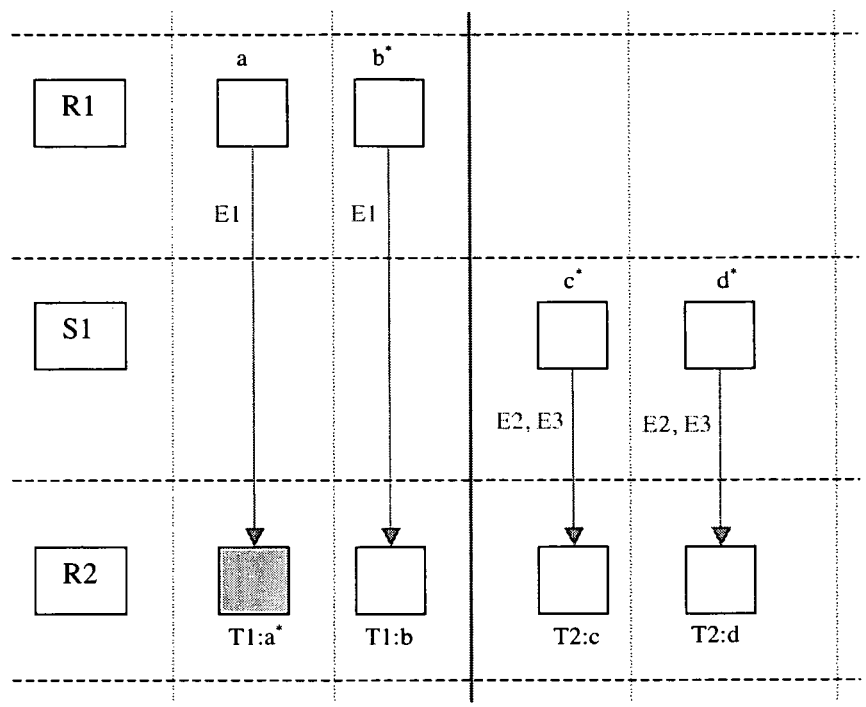
Figure 97 : R2 derives from R1 in E1 and transcludes from S1 in E2 and E3

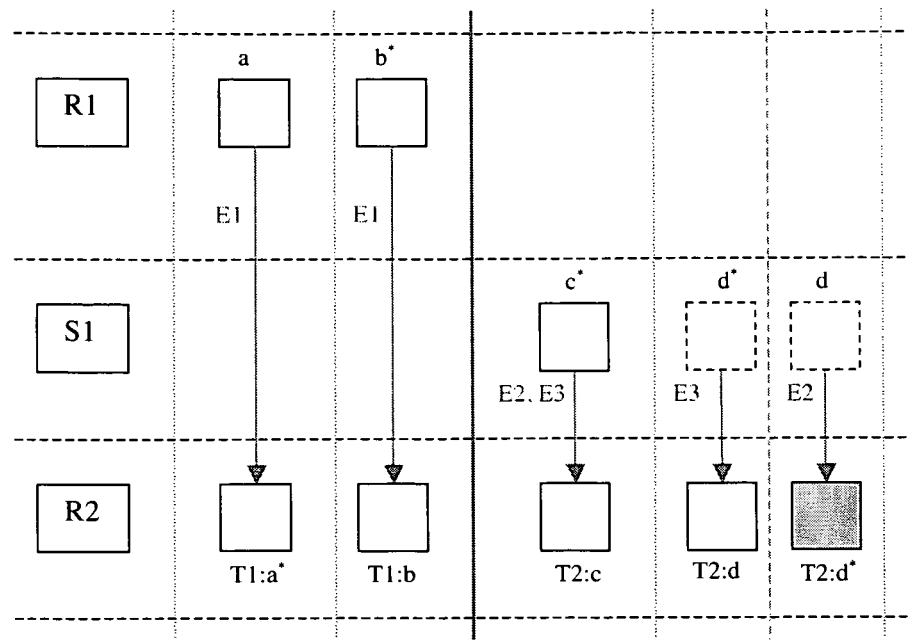
Figure 98: R2 opened with E3 in secret mode; T2:d is modified
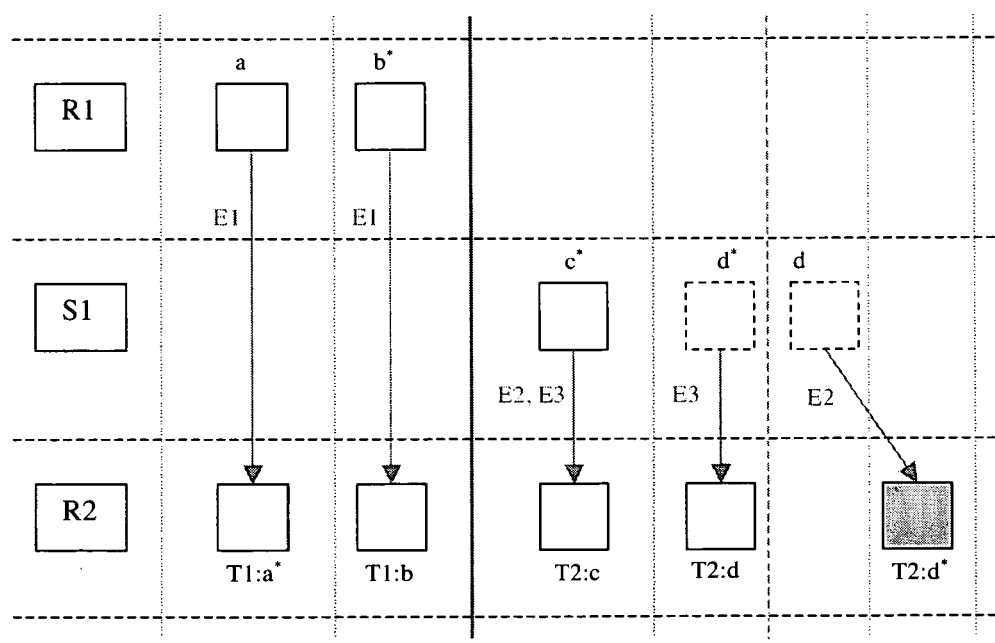
Figure 99: S1 refuses T2:d in E2

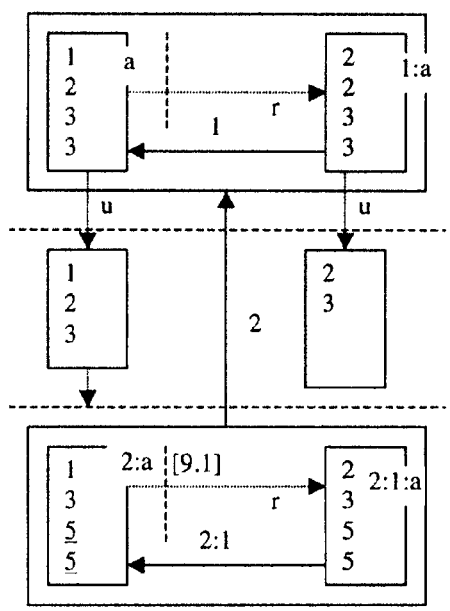
Figure 113bis
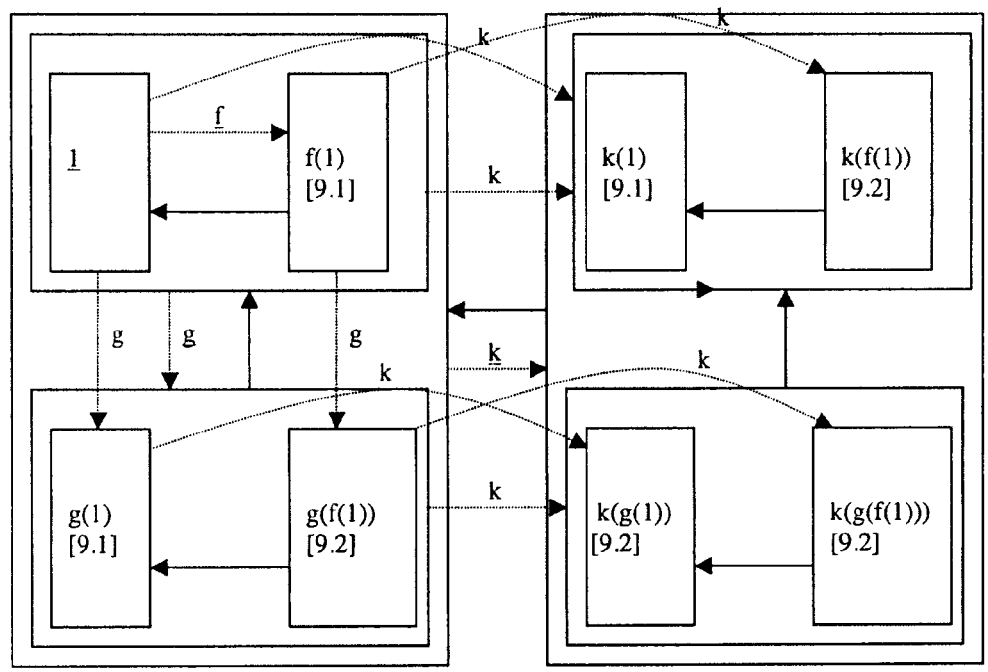
Figure 114

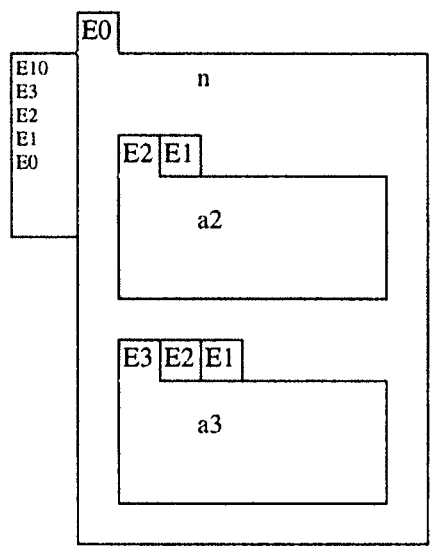
Figure 127
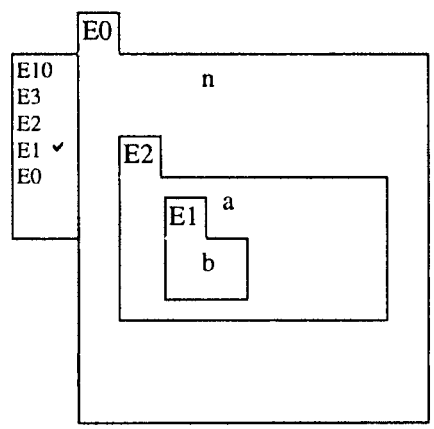
Figure 128
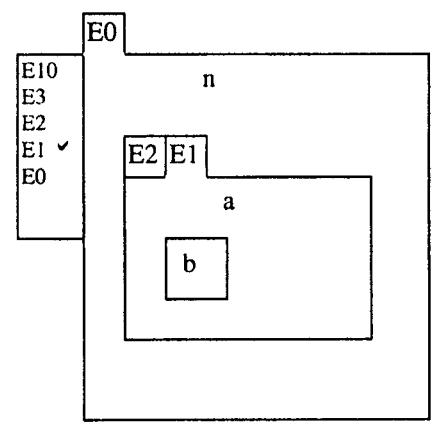
Figure 128bis

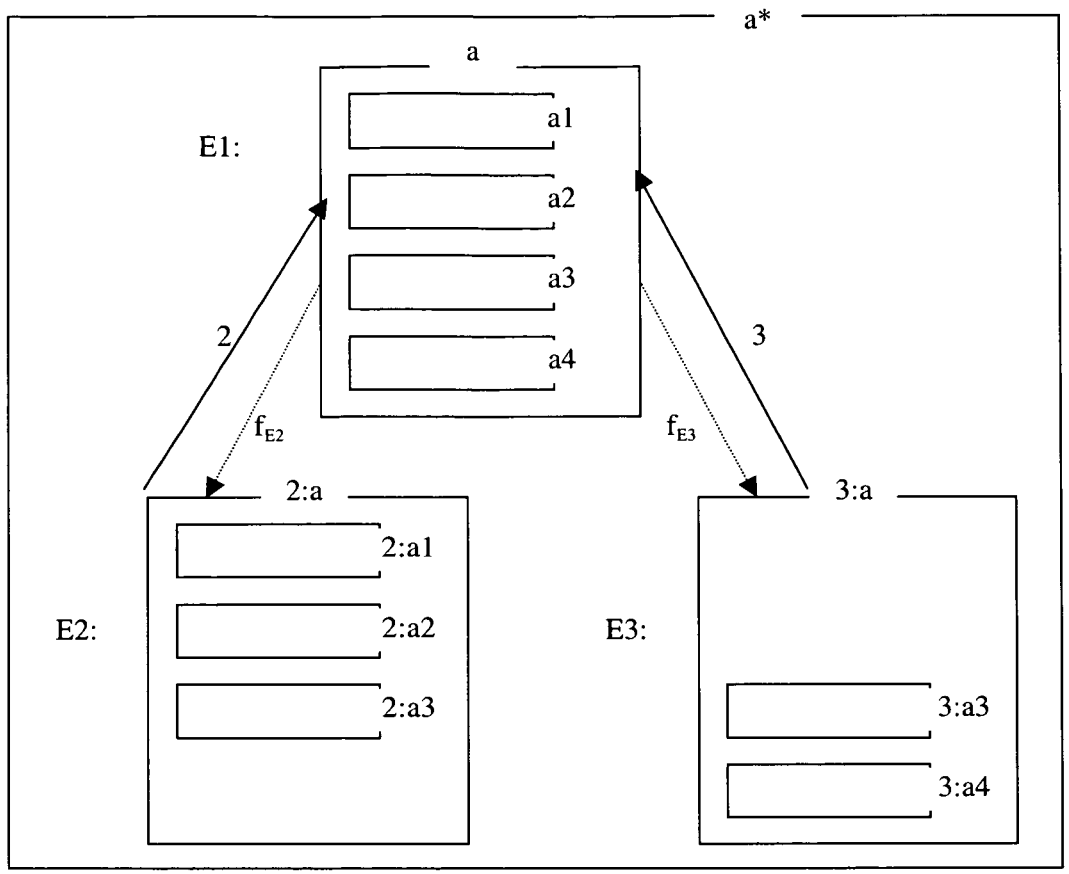
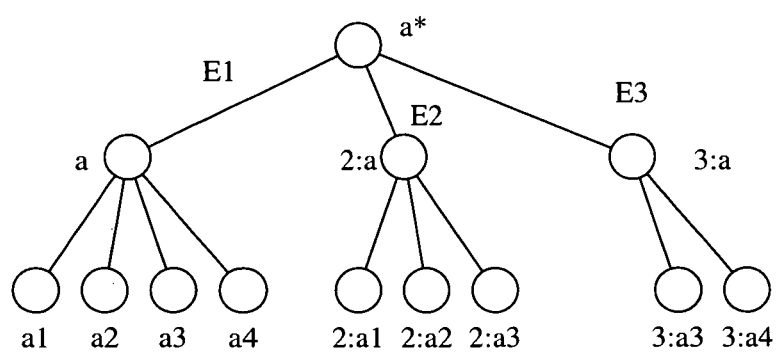
Figure 130

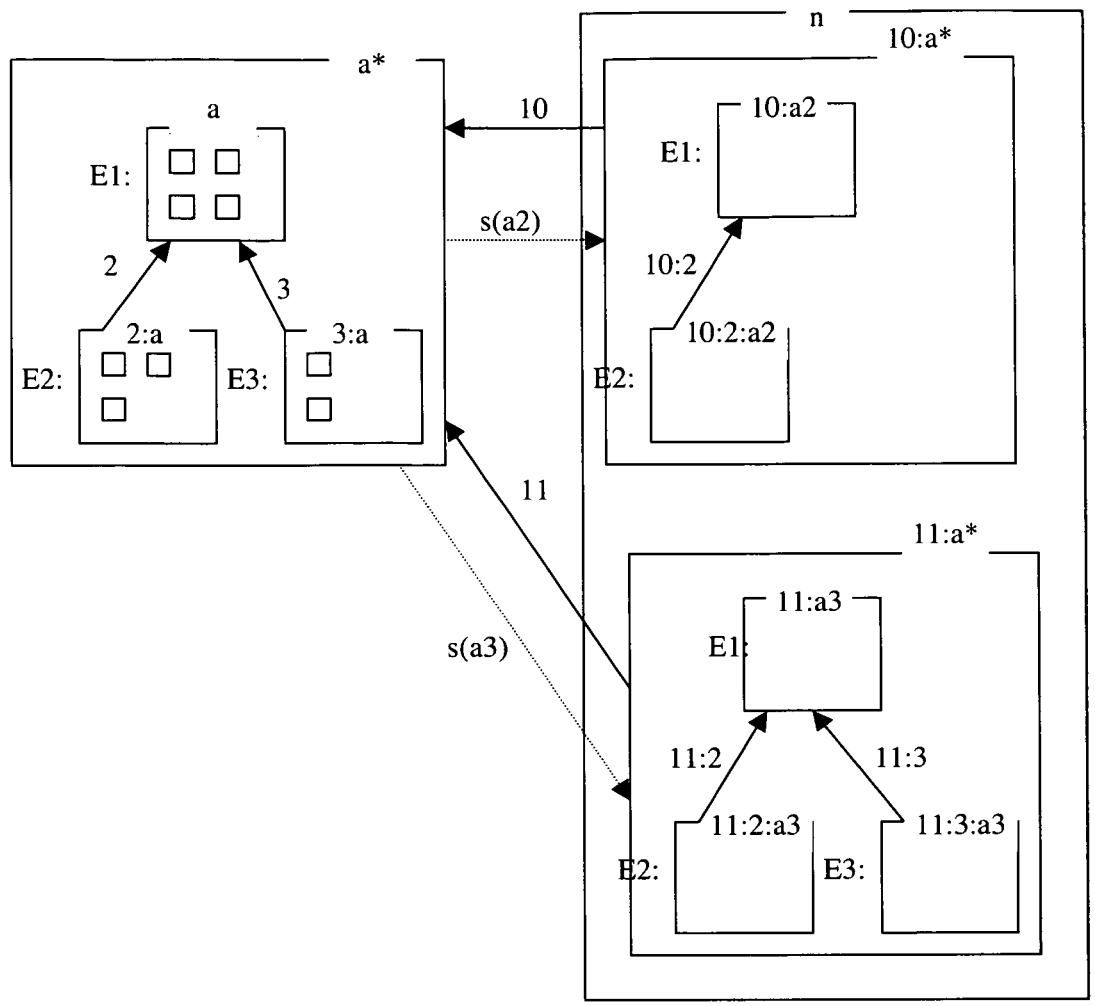
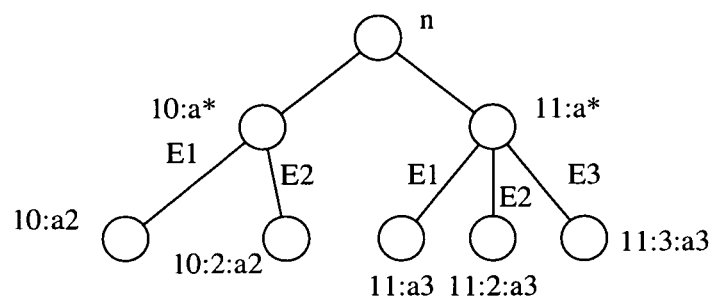
Figure 131

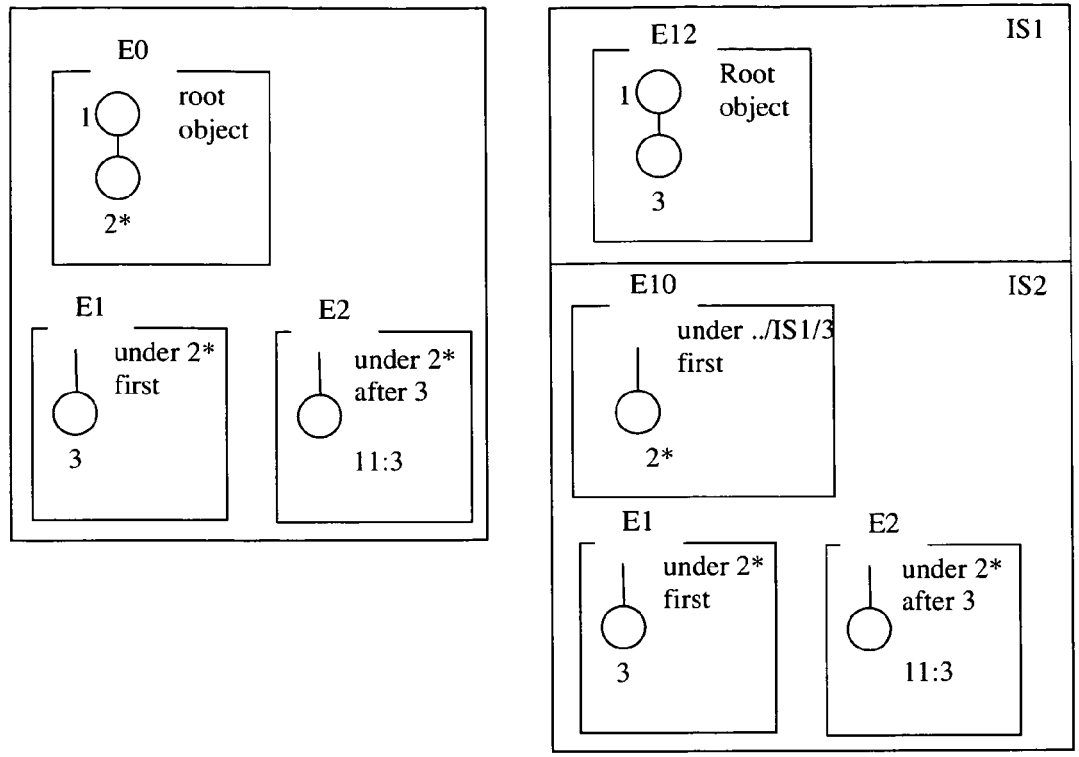
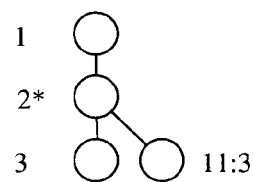
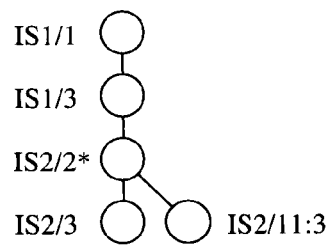
Figure 136

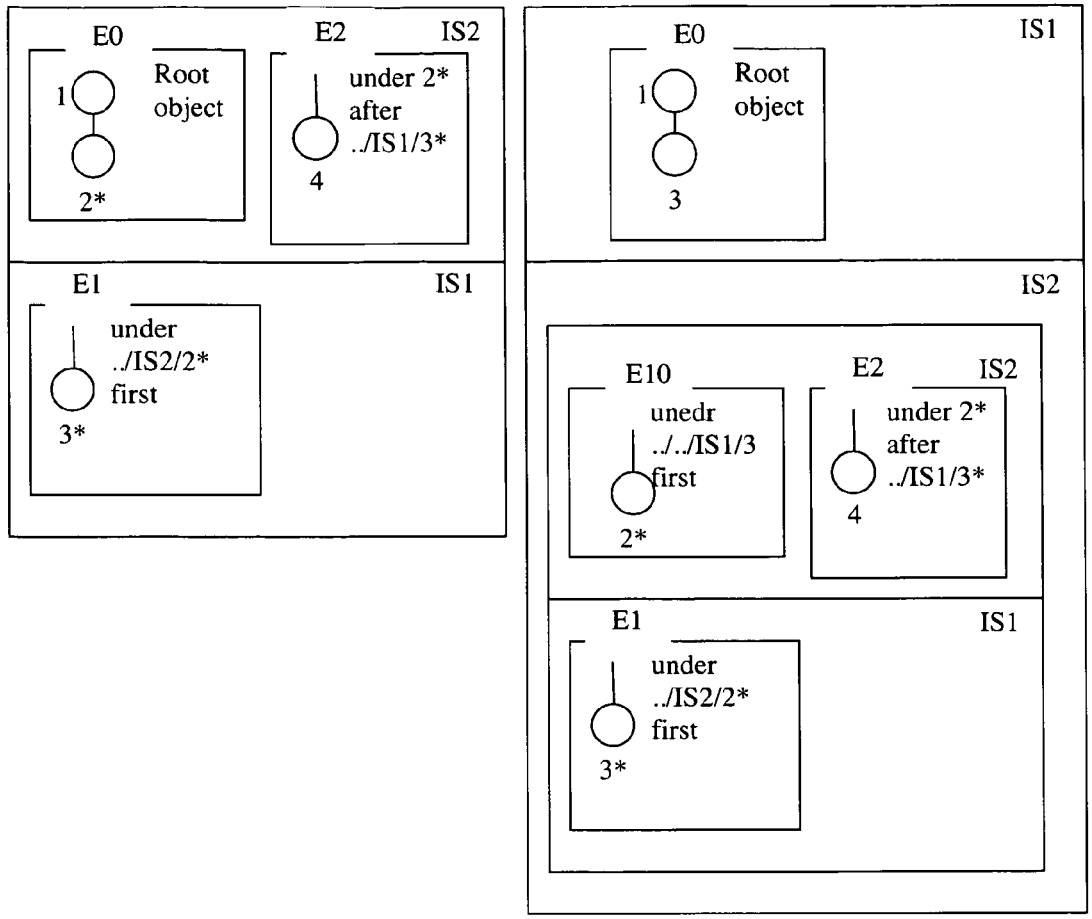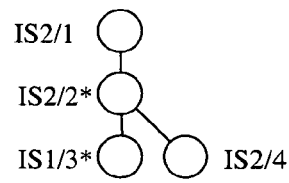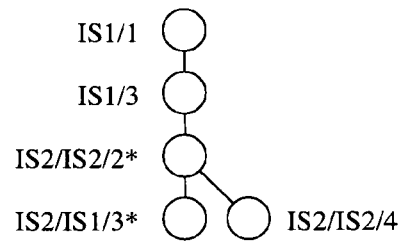
Figure 137

METHODS FOR GRANTING ACCESS TO RESOURCES MODIFIABLE BY USERS IN A COMPUTER ENVIRONMENT, AND RESOURCES STRUCTURED THEREFORE

The present patent application is a utility application of International Application No. PCT/EP2006/061567, filed Apr. 12, 2006.

The present invention generally relates to the field of collaboration between users in a data-processing environment in which resources, obtained by assembling objects, can be accessed, derived, supplemented, modified, etc by these users.

A typical example of resource is a Web page accessible via the Internet, but the present invention is by no means limited to this type of resource.

One already knows, in particular by previous patents publications in the name of the Applicant, techniques allowing to access resources, to modify them, etc., so as to allow the users to gradually enrich the contents of these resources, and to build personal versions of these, to which other information can be added.

The Applicant has also proposed techniques allowing to determine the relevance of resources according to their environment in terms of citing resources and cited resources.

The present invention has as an main object to propose methods for accessing resources, for transforming or personalizing resources according to the user, and for creating new resources, in which one can integrate information about the degree of elaboration of the resources, so as to propose in priority to the users information which is a priori the most elaborate, in contrast to other less elaborate information.

Another object of the invention is to determine consequently which objects of information must be replaced or enriched (by alternative objects) when a resource is presented to the user. The invention thus proposes new information synchronization and enrichment means covering all formats, as well text and images as multi-media, and in particular RSS streams and "podcasts" (audio, video).

Another corollary object of this invention is to propose methods for accessing resources, for transforming or personalizing resources depending on the user, and creating new resources, in which the owners of the original resources can have an influence, in particular in terms of right of modification and diffusion, on the resources which are derived therefrom.

Thus the present invention provides according to a first aspect a method for accessing a resource in a data-processing environment, the resource comprising a set of objects, characterized in that the data-processing environment is capable of storing in association with at least one object of said resource at least one modified object, in that said data-processing environment comprises means capable of storing in association with such an object information of degree of elaboration, and in that the method comprises the following steps:

identifying, for each object of the resource to which corresponds at least a modified object, by using the information of degree of elaboration, at least a most elaborate version of said object, assembling the objects thus identified for them to be displayed in the resource.

Certain preferred but non-limiting aspects of this method are as follows:

the information of degree of elaboration of an object derive from the chronology of the modifications of the object, it is provided during the modification of an object by a user, a step allowing other users to refuse the modified object, and the assembly step is carried out with a version of the object selected depending on the existence or not of refusals.

the method comprises, when a modified version of an object is refused, the creation of two branches containing two alternative versions of the object, namely the modified version and the unmodified version.

the step of assembling a resource including a certain version of the object in question is carried out with a signalling the existence of a version or alternative versions of said object.

the method further comprises a step of selection, by a user accessing a version of the resource, of a certain alternative version of the object.

more elaborate versions of the objects are formed independently for the various alternative objects in each of the branches.

the method further comprises the implementation of means for computing scores of relevance of the various alternative versions of the objects to selectively present the most relevant versions.

that several versions of a resource can be generated by users, and in the assembling step, the version of the object which is proposed is by default depending on the version of the resource.

it is provided a step of inhibition of the use of an object in the assembling of a resource if a given condition relative to this object or to another object of the resource to be assembled is not met.

the contents of an object which use can be inhibited are encrypted, and the inhibition step comprises the inaccessibility to a decryption key.

the given condition is a condition of presence of at least one object of another resource.

the given condition is a condition that the present object is unmodified.

the method it is implemented in a data-processing environment comprising:

at least a content server capable of providing object contents which can be assembled to form resources, a collaboration manager capable of managing the versions of the resources and the versions of the objects which they contain, in at least one user station, an extension (plug-in) of an object an resource manipulation tool, capable of communicating with the collaboration manager, and in the method comprises a step of checking of the authenticity of the extension by the collaboration manager.

the information of degree of elaboration is capable of taking one among two values, namely "most elaborate" or not.

the identification step comprises the search for objects (OR; OA) whose degree of elaboration has the value "most elaborate" among the downstream objects successively modified starting from the object in question of the accessed resource.

the identification step comprises the search for objects having a degree of elaboration higher than a limit among the downstream objects successively modified starting from the object in question of the accessed resource.

the search includes the search for objects of highest degree(s) of elaboration by parsing the upstream objects by modification of which the object in question was obtained.

in the case where the identification step has permitted to identify several most elaborate objects, then the object assembling step comprises a sub-step of addition to the resource of information signalling the existence of such several objects (OA).

the object selected for the assemblage in the resource is the most elaborate downstream object which is the nearest in the succession.

responsive to instructions of object change received from the user, the assembling step is capable of successively for the assemblage most elaborate objects sorted according to another criterion such as a notation.

the method it is capable, in response to a selection instruction by a user, to use for the assemblage an object designated by said instruction.

the method further comprises a step of adjustment of the notation of the object according to an instruction of selection of this object by the user.

the assembling step is capable of using for the assemblage an object selected according to another criterion such as a notation among all the most elaborate objects.

the method is implemented in combination with a server of preexisting contents provided with means of chronological management of versions of the objects, and the step of identification of the most elaborate version of an object is implemented from version information provided by said means of chronological management and from information of contribution by a user accessing the various versions of the resource, and the method further comprises a step of presentation of the current version of the object in the content server.

According to a second aspect, it is provided a method implemented in association with storage means accessible in a data-processing environment to maintain up to date graphs of objects likely to be assembled to form resources accessible in the environment, characterized in that the storage means are capable of storing in association with these objects information of degree of elaboration, and in that the method comprises the following steps:

detecting the modification of an object by a user, identifying owners of resources containing upstream corresponding objects, directing towards these owners a proposal of acceptance or refusal of this modification, waiting for an answer from the owners, depending on the contents of at least the first answer, adjusting information of degree of elaboration of the objects.

Certain preferred but non-limiting aspects of this method are as follows:

the information of degree of elaboration can take one among two values, namely "most elaborate" or not.

the method further comprises a step consisting, in response to the detection of the modification of an object, in temporarily adjusting the information of degree of elaboration of the objects, wherein this adjustment can be opposed or confirmed after at least the first answer by the owners.

when a first answer of acceptance is received from an owner, the modification is applied in the resource of said owner.

when a first answer of refusal is received from an owner, then the adjustment step gives to the object immediately upstream of the modified object the highest degree of elaboration.

the method further comprises, when a refusal answer is received, the addition to the graph of a branch containing an alternative version of the object, made of the object including the modification.

the method further comprises, when receiving an answer of refusal of a modification carried out on an object which is not most elaborate and in the event of incompatibility of the modification with at least one more elaborate object, the addition to the graph of a branch containing an alternative version of the object made of the object including the modification or containing the incompatible object(s) and the objects modified from them.

According to a third aspect of the invention, it is provided a method for generating a new resource from an existing resource which has been accessed in a data-processing environment, characterized in that it comprises the following steps:

detecting the modification of an object of the existing resource by a user, in response to this detection, generating a new resource presenting the same contents as the existing resource, applying the modifications to the object of said other resource which corresponds to the object of the existing resource for which the modification has been detected.

Certain preferred but non-limiting aspects of this method are as follows:

the step of generating a new resource is carried out by transclusion from information associated to the existing resource.

the method is implemented in association with storage means accessible in a data-processing environment to maintain up to date graphs of objects likely to be assembled to form resources accessible in the environment, the storage means are capable of storing in association with each one of these objects information of degree of elaboration, and the method comprises the following steps:

detecting the modification of an object by a user, in response to this detection, generating a new resource presenting the same contents as the existing resource, applying the modifications to the object of said other resource which corresponds to the object of the existing resource for which the modification has been detected, identifying owners of resources containing corresponding upstream objects, directing towards these owners a proposal of acceptance or refusal of this modification, waiting for an answer from the owners, depending on the contents of at least the first answer, to adjust information of degree of elaboration of the objects.

According to a fourth aspect, it is provided a method for propagating standard object description information between various objects likely to be assembled to form resources displayable in a user interface within a data-processing environment, characterized in that with each object are associated description meta-data, and in that the method comprises the following steps:

entering in a propagation mode under the initiative of the user, selecting an object which description meta-data are desired to be borrowed, selecting at least one other object to allocate thereto the same description meta-data.

Certain preferred but non-limiting aspects of this method are as follows:

the user interface is adapted to hide mask for the user the description meta-data.

According to a fifth aspect, it is provided a method for making accessible to third parties within a data-processing environment a resource containing at least one object derived from another resource, characterized in that it comprises the following steps:

detecting a request by a user for modifying the object,
   in response to this detection, generating in the data-processing environment a request near an owner of the aforASEid the other resource in order to authorize the accessibility of the modified object,
   depending on the answer received from the owner, selectively authorizing or not accessibility.

Certain preferred but non-limiting aspects of this method are as follows:

a common request is generated for a plurality of objects derived from resources belonging to the same owner.

It is proposed according to a sixth aspect a computer resource for the implementation of the method according to the above-mentioned fifth aspect, comprising a set of objects and accessible through a data-processing environment, characterized in that an object content publishing constraint meta-data is stored in association with at least some of the objects, allowing to selectively control its modification and/or its accessibility by third parties within derived resources.

Certain preferred but non-limiting aspects of this resource are as follows:

the publishing constraint meta-data comprise at least a meta-data selected in the group comprising meta-data of authorization/prohibition of modification, meta-data of authorization/prohibition of access by third parties to unmodified or modified objects, and meta-data for contacting an decision authority.
   the resource is structured in the form of a tree structure of objects, a publishing constraint meta-data is stored in association with at least certain nodes of the tree structure, and a publishing constraint meta-data at a node applies to the child nodes of the node in question.

According to a seventh aspect of the invention, it is provided a method for making accessible to third parties within a data-processing environment a resource containing at least an object derived from another resource, characterized in that publishing constraint meta-data may be associated to the objects and stored in the data processing environment, these meta-data being likely to contain an identification of an owner of an object from which the above-mentioned object must be derived, and in that the method comprises the following steps:

detecting that an object contained in a resource which a user wishes to access is derived from another resource,
   detection of the existence in the data-processing environment of meta-data of constraint of publishing of the object in question,
   in the affirmative, reading said meta-data,
   detecting the presence in said meta-data of an identification of an decision authority,
   in the affirmative, sending to said authority thus identified a request for authorization of accessibility by third parties, and
   if an acceptance of said request is received, providing the resource to said third parties.

Certain preferred but non-limiting aspects of this method are as follows:

the provision of the resource is a publication.
   the method comprises the intermediate step consisting, between sending the request and receiving an authorization or a refusal, a step of provisionally assembling the resource with an object formed by an extract of the object which is sought to be derived.
   when the object is a text object, said extract is made according to quotation right legal criteria.

According to an eighth aspect, it is provided according to the invention a method for quantitatively estimating the activity of objects in a data-processing environment, this environment giving access to resources made by assembling objects, at least some of the objects being capable of being generated by derivation of preexisting objects and modification of the objects thus derived, method characterized in that it comprises the following steps:

identifying the most upstream objects intended to be derived, so that this identification propagates to the objects derived therefrom,
   counting the numbers of derivations of the most upstream objects and the objects which have been derived therefrom.

Certain preferred but non-limiting aspects of this method are as follows:

the method further comprises a step of grouped counting of consultations of the most upstream objects and of the objects which have been derived therefrom.
   the most upstream objects are objects for advertising purposes.
   the most upstream objects are capable of being derived without being capable of being modified.

A ninth aspect of the invention consists in a data-processing environment for implementing a method as defined above, characterized in that it comprises a plurality of servers connected in an array, capable of containing information of derivation between objects and of degree of elaboration markings, each server being capable of receiving a request in order to indicate object identifiers on the basis of said information, and being capable of redirecting such request towards another server in the case where it is not capable of responding to said request.

According to a first embodiment of a tenth aspect if the invention, it is provided a method for managing variable content resources in a data-processing environment, each resource comprising a set of objects and at least some of these objects being presented in a resource as forming an object transcluded individually or as a part of a larger transcluded object from a source object, possibly via one or more intermediate transcluded objects, so that a modification made to the source object can be propagated up to said transcluded object, the method being characterized:

in that the data-processing environment is capable of storing transclusion information based on object identifiers, information from which source objects can be presented in transcluded objects, and
   in that the method comprises the step consisting, during the modification of an object, in generating or updating, for each object transcluded from said object, a source object identifier to be taken into account for this transcluded object, depending on information of distance between the modified object and said transcluded object.

A second embodiment of this tenth aspect consists in a method for managing variable content resources in a data-processing environment, each resource comprising a set of objects and at least some of these objects being presented in a resource as forming an object transcluded individually or as a part of a larger transcluded object from a source object, possibly via one or more intermediate transcluded objects, so that a modification made to the source object can be propagated up to the transcluded object, the method being characterized:

in that the data-processing environment is capable of storing transclusion information based on identifiers of objects, information from which source objects can be presented in transcluded objects, and in that the method comprises the step consisting, when an object is presented, in determining, for each object transcluded from said object, a source object identifier to be taken into account for this transcluded object, depending on information of distance between the modified object and said transcluded object.

Certain preferred but non-limiting aspects of these methods are as follows:

said step, during the modification of an object, identifies this object as its own source, with a null distance.

the resources comprise tree structures of objects, and the method further comprises a step consisting, for a transclusion of an including descendant objects of which one is transcluded from another, in defining for the transclusion between descendant objects of the transcluded object including them, a shorter distance value between these objects.

said modifications can relate to different attributes various of said objects, and the step of generating or updating a source object is carried out separately for each attribute, whereby an object can have different source objects depending on the considered attribute.

the different attributes comprise at least two attributes among content attributes, meta-data attributes, position attributes and transformation attributes.

According to an eleventh aspect of the invention, it is provided a method for managing variable content resources in a data-processing environment, each resource comprising a set of objects and at least some of these objects being presented in a resource as forming an object transcluded individually or as a part of a larger transcluded object from a source object, possibly via one or more intermediate transcluded objects, so that a modification made to the source object can propagate up to said transcluded object, characterized in that it comprises, depending on the frequency of the modifications brought to the objects and of the presentations of objects, the implementation either of the method according to the first embodiment of the tenth aspect, or of the method according to the second embodiment of the tenth aspect.

Certain preferred but non-limiting aspects of this method are as follows:

the method according to the first embodiment of the tenth aspect is automatically selected when the environment of the source object is not capable of generating said source object identifier.

the selection of the implemented method is carried out transclusion by transclusion.

the method is implemented in centralized server means capable of providing the source object identifiers.

the method is implemented in cascade processing means capable of providing the source object identifiers by server-to-server parsing depending on the transclusions.

at least with certain transclusions are associated with object transformation information, the pieces of information each designating a predetermined transformation function to be applied to the object as an initial step of the transclusion.

a transformation is capable of being applied to object attributes such as contents attributes, position attributes, meta-data attributes and transformation attributes relating to transclusions internal to the objects.

the resources are spreadsheets and the objects are cells or groups of cells of the sheet.

formulas associated with the cells on a transcluded cell group are regarded as transclusions internal to the group.

obtaining an internal transclusion in a transcluded cell group comprises applying to the spreadsheet program copy/paste instructions from a given internal transclusion of the source cell group.

A twelfth aspect of the invention provides a method for managing a set of objects of information in a data-processing environment, certain objects being container objects capable of contain other objects, and the data-processing environment comprising a first structure of objects and a second structure of objects transcluded from the first, characterized in that:

at least certain objects of the first structure have properties;

at least certain container objects of the second structure have constraints, and in that the method comprises the step consisting, during the operation of transclusion from the first structure to the second structure, in presenting the objects of the first structure in the container objects of the second structure as a function of the adequacy of the properties of the objects of the first structure with the constraints of the container objects of the second structure.

Certain preferred but non-limiting aspects of this method are as follows:

the method further comprises the step consisting, when a property of an object of the first structure is modified, in checking the adequacy of the modified property with the constraints of the container objects of the second structure, and to displace if necessary the corresponding object presented in the second structure.

the method further comprises the step consisting, when a constraint of a container object of the second structure is modified, in checking the adequacy of the properties of the objects presented in this container object with the modified constraint thereof, and to displace if necessary the considered object(s).

According to a thirteenth aspect of the invention, it is provided a method for modifying contents consisting in tagged data flows which are accessed according to a syndication protocol, each contents being accessible in the form of a channel which comprises several data elements each having a unique identifier, characterized in that it comprises the following steps:

delimitating a data element or element part to be modified, applying the modification to the data element or to the element part, forming a contents containing on the one hand the modified data element or element part, delimited by specific tags, and on the other hand the original data element, delimited by its original tags, so as to avoid a loss of information when the flow is processed according to a protocol which does not manage said specific tags.

Certain preferred but non-limiting aspects of this method are as follows:

to the modified data element or element part is associated an information indicating whether it replaces the original data element or element part or whether it constitutes an alternative to the original data element or element part, and the method comprises in the latter case a step of signalling the existence of the alternative.

the method further comprises a step consisting, in response to the modification of a data element or element part, to signal this modification to a server from which the data flow comes.

the resources are tagged data flows to which are accessed according to a syndication protocol, and the objects of said resources are data elements of said resources or parts of said data elements.

According to a fourteenth aspect of the invention, it is provided a method for transforming a first resource comprising a tree structure of objects into a second resource comprising a tree structure of objects, on the basis of transformations which can be carried out on objects located at different levels of the tree structure, characterized in that, when there is a first transformation on a certain object including at least a descendant object and a second transformation on said descendant object, the second transformation is carried out with priority relative to the first transformation.

According to a fifteenth aspect of the invention, it is provided a method for access by a user to objects of information generated by a collaborative system where different user groups can contribute to form respectively different versions of objects from common starting objects, characterized in that the user may belong simultaneously to various groups, and in that it comprises the steps consisting:
  depending on an identifier of one of the groups under which the user carries out the access, in presenting the corresponding versions of the objects from the starting objects,
  depending on information of contributive/non-contributive access mode by the user, in taking into account or not in the collaborative system, in the considered group, the subsequent modifying actions by the user on the versions of objects which she has accessed.

Certain preferred but non-limiting aspects of this method are as follows:
  when accessing under a given group in a non-contributive access mode, the modifying actions can be taken into account by default in other groups.

According to a sixteenth aspect of the invention, a method for access by users to objects of information generated by a collaborative system where different users can contribute to form respectively different versions of objects, and where the users can selectively accept or refuse versions, is characterized in that it comprises means for accounting the contributions of the users and of the acceptances/refusals by other users of the versions of objects containing these contributions.

A seventeenth aspect of the invention provides a method for making accessible to a user group within a data-processing environment a resource containing a plurality of objects which can be modified by the users to obtain different versions of said objects, characterized in that it comprises:
  for at least certain objects, assigning to the various versions of said objects different ciphering/deciphering keys,
  providing versions of said objects ciphered with the respective keys,
  when the resource is accessed by a user, carrying out the deciphering of the ciphered object versions belonging to the resource by means of the respective deciphering keys,
  when the resource is modified by a user, generating a new version of the object, to which a new key is assigned.

Certain preferred but non-limiting aspects of this method are as follows:
  the method comprises a step of selectively providing the keys for deciphering the objects to the users depending on authorization information for said users.
  the authorizations are managed user group by user group, with two users of the same group having the same rights.
  the versions of an object are made of successive updates of said object in client stations of the data-processing environment, and the step of generating a new key when a new version of the object is generated is carried out in the client station, wherein a subsequent step of transmission of the new key to a key server is provided.
  the versions of an object are made of versions with different contents of said object, simultaneously coexisting and reserved for different user groups, and a communication of such an object by a user of a first group to a user of a second group comprises:
    providing to the user of the second group, by any appropriate channel, of a multi-version object containing the contents of the object reserved for the second group, in a ciphered state, and
    independently providing to the user of the second group, from a key server, a deciphering key allowing to decipher said contents of the object reserved for the second group.
  the method comprises a step consisting in separating the multi-versions object in parts which are homogeneous from the standpoint of access rights, each part containing positioning information allowing its replacement in the structure, whereby manipulations can be handling can be made on the multi-version object even in the absence of access rights for the entirety of its versions.

Finally according to an eighteenth aspect of the invention, it is provided a method for making accessible to various user groups (SCR) within a data-processing environment a resource containing a plurality of objects which can be modified by the users to obtain different versions of said objects, characterized in that each object may exist in different versions corresponding to different user groups and as descendants of multi-version object including them, and in that it comprises, when an object is accessed by a user, the presentation to her of the versions of the object corresponding to the groups to which she belongs, each object version being obtained by transformation from another version of said object.

Certain preferred but non-limiting aspects of this method are as follows:
  the method is implemented using a management method according to claim 62, wherein specific predetermined transformations allow to obtain each of the object versions.
  an action of transclusion by a user of an object belonging to a multi-version object causes a transclusion of the whole of the multi-version object.
  each object is may also exist within one same user group in different versions corresponding to different users, wherein these versions are also presented when the object is accessed by the users of said group.
  the method further comprises the implementation of means of relevance score calculation for the different versions corresponding to the different groups and/or to the different users to selectively present the most relevant versions.

PRELIMINARY DEFINITIONS

Object, Resource

Any accessible information which is uniquely identified is an object. For example a uniquely identified XML element is an object. A paragraph contained in a document in Word format is not an object insofar as it does not have a usable identifier. The means needed for reifying it (i.e. making an object of it) will be implemented. A reified object is typically selectionable with a click[1], deletable or copiable (or "transcluable"—"transclusion" is defined further), in particular by drag and drop.

[1](by clicking on the object itself, or on a graphic handle which appears in the vicinity of the object when the resource containing the object is visualized in a special mode, or by selecting the object and by actuating a button, etc)

A resource is an object managed by a software at the system level such as an operating system or an Internet server. Typical resources are Web pages, files and folders.[2]

[2]The notion of "system level" is subjective. Resources contain objects which in general are not resources themselves, but there are many examples where this is not the case, in particular the folders (which contain resources themselves) and emails (which are resources and the attachments they "contain" are also resources).

It should be noted that the owner of a resource is not necessarily the person who holds intellectual property rights on the contents, but rather the creator of this resource (which can present for example the same contents as a resource belonging to someone else, these contents having been obtained by transclusion or copy).

For sake of concision we will sometimes use the term "resource" in place of "owner of resource". For example, we will say "R3 accepts b4" to express that "the owner of the R3 resource accepts the modification made on the object b and who resulted in the b4 object".

SCR, Collaboration Server

A Set of Collaborative Resources (SCR; called ERC in the figures) is a set of resources identifiable by a type of particular server (described further) than we call collaboration server[3], or by a similar device.[4] All the resources of a SRC are accessible by a defined set of users. So we will use the term SCR to indicate both the SCR and the user group which can access to its resources. (We will say that user U1 "belongs" to SCR E1).

[3]One will say that a resource "is identified by a given SCR" rather than "identified (i.e. recognized) as belonging to a given SCR".

[4]See the section presenting architecture in cascade. In addition, we show at the section "Extensions to the current protocols of syndication" (towards the end of the document) that a SCR can also be a set of identifiable resources in a network of syndication, even without the existence of a Collaboration Server itself. However we also describe that the availability of at least one Collaboration Server offers advantages.

A SCR is managed by at most[5] one collaboration server (or similar device), but a collaboration server can manage several SCRs.[6]

[5]The distribution of the management of a SCR on several servers is also possible.

[6]And a resource can belong to several SCR.

It is said that a resource belongs to (or is a part of) a SCR if it is identified as such by the collaboration server (or similar device) which manages this set.

It is said that accessing a resource (collaborative resource) is done through (or within the framework of) a given SCR[7] (in order to benefit from the functionalities of the SCR which are described hereafter).[8] The user can also access a resource by letting the system determine the collaboration servers likely to identify this resource.

[7]If the resource is not identified by the given SCR, this SCR is just ignored. The user can place himself in several SCR at the same time. The user can also switch from one SCR to another by using an interactive means for this purpose. The actions of the system are carried out separately for each SCR and the results can be presented separately or in combination.

[8]A Collaboration Server does not store (not necessarily) the objects which it manages but (rather) its identifiers.

User

By "user" we understand "user or program"; in particular, by "user interface" we normally understand "user interface or programmatic interface". The term "user" can also mean "(extension of) the information manipulation tool (on the client computer). Also by client we usually mean client computer (as opposed to server).

By "the user can select . . . " we normally understand that the user can choose an option either right away or by configuring/parameterizing the system in advance.

By "the user having access rights.", we normally understand the individual user or a user group, or a role of user, having the access rights in question.

Lastly, we will give examples where each user having contributed a modification to a resource has her own version of this resource, its modifications being local within this version. These examples are given to facilitate understanding it is also clear that the same version of a resource can in general be modified by several users and that a user can modify several versions of a resource.

DESCRIPTION

Introduction

A collaboration server[9] makes it possible a set of users to jointly manipulate resources similarly to a "wiki" (see http://fr.wikipedia.org/wiki/Wiki).

[9]We will present towards the end of this document another approach (of the same method) which does not require such a server (see section "Extensions to the current protocols of syndication": also see the section presenting "Architecture in Cascade").

The difference with the wikis is twofold. On the one hand the method of the invention makes it possible to modify any resource present in the Internet (the resource not necessarily being provided for this purpose) and on the other hand it can simultaneously manage alternatives for parts of these resources (expressing for example several points of view).

In case of modification of an external resource[10], the modifications are reflected in different versions seen by using the method of the invention.

[10](for example a public Web page which was not created by using the method of the invention)

The method is used with the usual tools (e.g. a web browser) for information manipulation, these tools being extended to carry out the communication with a collaboration server.

It is similar to the wikis in the sense that as soon as a user modifies an element of a resource this modification is immediately shown to the other users of the SCR when the latter will consult this resource (if they are placed in the same point of view).

There will be one (or several) public sets of collaborative resources, and in parallel small groups can create their private SCR.[11]

[11]An extreme case is the creation of a SCR by only one person for her personal use, if she wishes to use the functions of modification of the objects without to want to share these modifications

ILLUSTRATION OF THE PRINCIPLE OF THE METHOD

The FIGS. 1-*a* to 1-*g* illustrate various steps of use of the method and make it possible to understand it intuitively, before even reading its description which will follow.

By convention, letter v followed by a number (v1) represents a version of a collaborative resource. A vowel followed by a number (a1) represents a version of an object (a): it is underlined (a1) when it represents the most recent[12] version.

[12](most elaborate)

The FIG. 1-*a* presents a first version (v1) of a resource and a first version (a1) of an object which this resource has.

It is supposed here that the user wants to modify this object; a new version (v2) is then derived from v1; it is what is shown in the FIG. 1-*b*. By convention, the figures present only the objects created or modified.

The FIG. 1-*c* shows the situation after the object a was modified in v2. When the user views v1 or v2, she automatically sees the most recent version of this object, i.e. that of v2, which is thus underlined in the figure (a2).

The FIG. 1-*d* presents the case where the owner of v1 refuses the most recent version of the object a (i.e. the version a2, coming from v2). Consequently, a new "branch" is created for this object and a2 is put there. As for a1, the version of this object in v1, it then becomes alone in the first branch and thus becomes again most recent (for this branch).

Branches of an object, others than the currently activated branch, are presented to the user like alternative versions of this object. [13]

[13] The most recent versions of objects of these other branches are presented to her The FIG. 1-*e* presents the case where the user visualizing v1 selects, for the object a, the second branch (of which the most recent version a2 is presented to her as an alternative version, i.e. as a selectionable option). We say that the user "activates" the second branch (it does that simply by selecting the alternative version in question). In the figure, one represents this by a movement of the rectangle towards the branch of right-hand side whereas the object created initially remains in the branch of left-hand side.

The FIG. 1-*f* presents the case where the user modifies in v1 the object a which is in the second branch. It thus creates the version a3 which then becomes most recent in the second branch. Consequently, when a user views v2 while having activated the second branch, she sees the most recent version, therefore that of v1 (i.e. a3).

The FIG. 1-*g* presents the case where the user visualizing v2 activates the first branch. She thus sees the version (a1) of v1 which is most recent for the first branch of object A.

We will now take again the description in detail.

Versions of a Collaborative Resource, Branches

To facilitate the understanding, in the examples and explanations that follow, each user having contributed a modification to a collaborative resource has an own version of this collaborative resource. We will say that these modifications are local within this version of the collaborative resource.

In the absence of "branches" (described hereafter), when the user views a collaborative resource she sees for each object the most recent version of this object. This means that all the versions of the collaborative resource are presented in an identical way[14].

[14] One can however consider that the system offers to the users to have "secret" objects or modifications in their versions of the collaborative resource.

The user however has the possibility, when she views a version of a collaborative resource, of requesting to see, when they exist, the local modifications within this version.

In what follows, initially we will only consider non-structural modifications, i.e which only modify the values ("innertext"[15]) of the objects without creating, moving or deleting objects.

[15] (within the meaning of XML)

In the FIGS. 2-*a* to 6-*b*, we use tables where the rows are different versions of the collaborative resource (as in the FIGS. 1-*a* with 1-*g*) and the columns are different objects contained in the collaborative resource. The values inside the table give the local versions of these objects—an empty box indicates an absence of local version. Each column contains an underlined value which indicates the most recent version in this column.

In the FIG. 2-*a* to 2-*d*, we consider a collaborative resource which contains three objects A, B and C. First of all there exists only one version v1, where the values of the objects are respectively a1, b1 and c1 (FIG. 2-*a*).

Then (FIG. 2-*b*) a user modifies the object and writes a2 in the place there. This causes the creation of the version v2 of the collaborative resource, the first content at remaining unchanged in the version v1. However should a user views v1 or v2 she will see a2 as content of the first object because this is the most recent value.

Then (FIG. 2-*c*) another user modifies the objects A and B, and writes a3 and b3 there, respectively. This creates a third version of the collaborative resource, v3.

Then (FIG. 2-*d*) the owner of v2 modifies the object to the value a4. Since she works in his own version, she replaces the old local value a2. If a user views any version of the collaborative resource she will see the values a4, b3 and c1, respectively, for the three objects.

The method makes it possible to refuse versions of object (i.e. modifications of object carried out by another user). The consequence of this refusal is for the system to create a branch for each object whose version of the other user was refused, and to move these versions refused in the new branches. Among the other versions available in the same branch, it will be most recent which will be displayed after the refusal.

Each object of a collaborative resource can thus be partitioned in several branches, and each user has then the possibility of choosing (for each object) which branch she prefers (this is presented in the form of "alternative versions", as described to the following section). Thus, each version of the collaborative resource specifies for each object which (there is exactly one of them) branch is activated there.

A modification taking place in a branch of an object will not be reflected in the versions where this branch is not activated (except if the user asks to make visible the other branches, of the following section).

The different branches of an object are treated independently with regard to the modifications, as if they were different objects.

In summary:
  each collaborative resource contains a certain number of objects
  each object has a certain number of branches
  each collaborative resource has a certain number of versions
  each version of a collaborative resource determines for each object which branch is active.

When a user views a version of the collaborative resource, for each object its most recent version in the active branch is presented.

Optionally, for each branch of each object, each version of collaborative resource can provide a local version of it.

The example of the FIGS. 3-*a* to 3-*d* continue the case presented at the FIG. 2-*d*. We represent the various branches of an object by as many adjacent columns. A framed box (rectangle) indicates that the branch corresponding to the column is active in the version of the collaborative resource corresponding to the row.

FIG. 3-*a*: The owner of v2 refuses the modification b3 (of v3). This creates a new branch (branch 2) in which is sent b3, and b1 becomes again the most recent version in the old branch. Only v2 activates the new branch. At this time, the versions v1 and v2 display a4, b1 and c1 as values for the three objects and v3 display a4, b3 and c1.

FIG. 3-*b*: The owner of v3 refused the value a4 of object a, which is in its turn sent in a new branch. The most recent version in the first branch of a becomes a3 again. The values displayed for the three versions are thus respectively: a3 b1 c1, a4 b1 c1, a3 b3 c1.

FIG. 3-*c*: v3 modifies its version of b, in its branch, and writes b4 there. However it is the only one to see it because it is the only one to have this active branch.

FIG. 3*d*: v3 selects the second branch of a. This causes that v3 shows a4, b4 and c1 as values. Then it modifies a to write a5 there. At this time v3 has two local versions of a (for each branch), of which the second is visible. The values displayed for the three versions are now a3 b1 c1, a5 b1 c1, a5 b4 c1.

Viewing the Alternative Versions of a Collaborative Resource

The method makes it possible for the user to view (and activate) the different branches[16] existing for each object. When a branch of an object is shown, it is the most recent version being in this branch which is displayed by default.

[16](i.e. various alternative versions)

With this intention it offers to the user various methods.

Firstly the user can make display, in relation[17] with each object, the list of the alternative versions of this object.[18]

[17](for example beside each object)

[18](for example directly in the collaborative resource or via a window into pop-up)

Secondly the user can ask to see the various versions of the collaborative resource (which differ from each other by the active branches)—this makes it possible for the user to see the correlations between the various branches of the various objects of the collaborative resource.

The user can also use a mixed method: when there exists a great number of versions of the collaborative resource the user can "filter" among them by first of all choosing a branch for a particular object (or several), then by viewing the various versions[19] of the collaborative resource having activated the same branch for this object. The system moreover will avoid distinguishing two versions having the same combination of branches inside the considered resource (in order to filter even more the user can even require to have the alternatives of a part of the resource).

[19](or rather by viewing the configurations of branches for these various versions)

Lastly, in a version of a collaborative resource, the user can ratify the most recent version of an object (such as it was presented to him) of a branch, so as to make it his local version of the object for this branch (and to replace the one which appeared in it). Alternatively she can refuse the most recent version of the object in question (as well as the other less recent versions which are presented to her in order), until finally ratifying one of them (which can be its own version or another version). Insofar as she thus ratified several objects, she communicates (in particular at the time of the recording of the version of collaborative resource in question) a set of local versions of objects which appears coherent to him.

During the use of the mixed method described above, filtering can then be done by considering sets of ratified versions of objects. One thus exploits the contributions of the users to ensure the consistency of the activated branches.

Derivation

Several ways of avoiding to do the work of selecting the preferred branches "object by object" are offered to the user.

On the one hand by viewing a different version from the collaborative resource, it can ask to copy in her version these different choices of branches.

Another way is to make possible a version of the collaborative resource (the downstream collaborative resource) "to derive" from another (the upstream one) so that when the version upstream changes the branch for one of its objects, the downstream version automatically will adopt this new branch, except if its owner explicitly declared which branch she preferred for this object.

By default, each version of collaborative resource derives from the version whose modification gave it birth.

In addition to this, another method consists to search for the user which version is close (in its choices of branches—this can be measured by looking to the proportion of the choice of branches which fit, compared to the full number of objects) to that of the user, and propose her to make her version derived from this other version.

Such a "a posteriori derivation" can also be done by other methods of search for affinity, or even manually by the user (in particular in the case of a pupil who derives her version from that of her master or of a manager who derives from her secretary).

The example of the FIGS. 4-a to 4-d takes again the same operations exactly as the example of the FIGS. 3-a to 3d but by assuming that the derivation relations were placed as follows: v3 derives from v2 then v1 derives from v3. This implies that the changes of branch taking place in v2 will be reflected in v3 and the changes taking place in the latter will be reflected in v1, except explicit selections of branches.

FIG. 4-a: The owner of v2 refuses the modification b3 (of v3). This creates a new branch in which b3 is sent. v2 thus explicitly will choose the first branch and v3 explicitly will choose the second. But v1 does not carry out a choice explicitly and thus follows the choice of v3 (i.e the second branch). At this time, only the version v2 displays a4, b1 and c1 as values for the three objects, whereas v1 and v3 display a4, b3 and c1.

FIG. 4-b: The owner of v3 refuses the value a4 of object a, which is in its turn sent in a new branch. v3 thus will explicitly choose the first branch and v2 explicitly will choose the second. v1 is derived from v3, and thus does not follow v2 in its change of branch. The values displayed for the three versions are thus respectively: a3 b1 c1, a4 b1 c1, a3 b3 c1.

FIG. 4-c: v3 modifies its version of b, in its branch, and writes b4 in there. Contrary to the previous example, it is not the only one to see it because v1 derives from it and also (implicitly) activated this branch (v1 and v3 will thus see this new value whereas v2 continues to see the old value b1).

FIG. 4-d: v3 selects the second branch of a. Just as at the stage 4-a, v1 will implicitly activate this second branch. The three versions have thus activated the second branch of a and see the value a4 there. Then v3 modifies the object a to write a5 there. The values displayed for the three versions are now a5 b4 c1, a5 b1 c1, a5 b4 c1.

Categorization of the Versions of Collaborative Resources

One describes here an improvement allowing to qualify the modifications carried out by the users using key words or categories.

As already described, the various branches of an object can represent several viewpoints. One thus allows the users to attach to the branches of objects the "categories" describing the nature of this viewpoint. Each user having the possibility of changing the contents of an object also has the possibility of changing to which category its version of the object belongs.

In order to ensure that all the users use a common vocabulary, the system maintains a hierarchy of categories (taxonomy), from where the users can select the qualifiers for their modifications. The scope of this hierarchy is the SCR, but one can authorize the users to modify it, in particular by adding or identifying categories.[20]

[20](or within the meaning of the folksonomies)

Once the users thus labelled their modifications, this information can be exploited to allow the other users to filter the versions available according to the categories. This provides a fourth method to navigate in the various versions of a collaborative resource, in addition to those proposed with the section "To select branches automatically" above. Now we will see how this functions.

Since the categorization of a modification is an option and not an obligation the system proceeds by elimination of the branches having been categorized differently:

1. A user consults a resource and declares to be interested in one or more categories in particular.
2. The system eliminates (of the set of the possible choices) the versions having chosen at least a branch whose most recent contents are categorized in a contradictory way to the required categories.
3. Then the user can explore the versions which remain valid according to the last method described with the section "To select branches automatically".

Structural Modifications, Slots

We now will describe how to generalize this mechanism with any type of modification, including creation, movement and deletion of objects.

Convention here is taken that the parent-child relation of two objects is not stored in the child but in the parent. This information is represented in the form of slots being in the "innertext" indicating which child must be there.

Thus the movement of an object from a point to another without changing parent consists in only changing the parent; a movement of object resulting in changing which is its parent (without changing collaborative resource) consists of the modification of each parent. It should be noted that in these two cases the moved object is not modified, only its parents source and destination are.

The removal of an object simply consists in removing the reference in its parent. Here still one considers that only the parent is modified, not the object itself. These considerations are important when it is considered that for example an object can be removed in a branch (of the parent) but not in another[21].

[21]In order to avoid having objects thus becoming inaccessible (all their references having been removed) but occupying the memory, a garbage collector which will destroy the objects being referred nowhere could be necessary.

The creation of object is done (from the point of view of the system) in two stages: first of all a new object is created at the level of the collaborative resource (because an object is a concept of a collaborative resource, and not specific to a version of a collaborative resource). Then the object where the user asked to create a child is modified to contain a reference to this new object. Thus if for example a version wishes to refuse this creation it only will refuse the modification of the parent, which will cause to make the new object invisible.

The example of the FIG. 5-*a* to 5-*d* continues the case of the FIG. 4-*d*, by making the additional assumption that b and c are children of a, i.e. all the versions of a contain two slots, for b and for c. For example one could say that a3 has as a value "<b> lives at <c>", that b4 has as a value "Arthur" and c1 has as a value "Amsterdam", and so on.

FIG. 5-*a*: The owner of v1 request to the system to create a new child for b. With this intention it places a slot in its branch of b (it selected the second branch, therefore will add a slot to b4. The version of b4 extended with a new slot is thus local to v1. It is called b5). The system will create a new empty object d, and this initial empty value is called d1. The d1 object is created and activated in all the versions, but as it is only referred from b5, only v1 and v3 will see object d.

FIG. 5-*b*: The owner of v3 now moves the object d as child of c1. This means that it deletes the reference in b5 and adds a reference in c1. She thus creates new versions of these two objects, b6 and c6. A consequence of this is that now d is made visible in v2 also, because it was introduced into a branch of object which was active in its version. d was not modified in the operation, there is still only a version d1, belonging to v1.

FIG. 5-*c*: The owner of v2 refuses this object. To do this she does not refuse d1 itself (because a refusal means in fact the refusal of the contents of the object, and not the object itself), but the new version c6 of c. This causes to create a new branch of c, the old branch taking again the old value c1 without a reference to d. It should be noted that since v1 derives from v3, it will follow v3 in the new branch, and the new object will be refused only in v2.

FIG. 5-*d*: The owner of v1 deletes the object b. To do this she modifies the object a to remove the slot pointing towards b from it. This will create a new version a6 of object a. As all the versions activated the second branch of a, this causes to make b disappear from all the versions. However b is not really removed because it is always referred by a1, a3, a4 and a5. Thus if for example any of the three versions activates the first branch of a, a3 is then made visible, with its reference towards b. In addition if either v2 or v3 request to see its local version of the collaborative resource then once again b will be made visible. If on the other hand each one of these five versions of the object a then removes the reference towards the object b nobody will have the possibility of accessing it, and it could thus be removed in a transparent way (by garbage collection).

It should be noted that in certain case, several references towards the same object are made visible simultaneously. For example if just after the stage of the FIG. 5-*a* a user moves b as child of c then a user having activated the first branch of a will see b at the same time as child of a and c.

Managing the Inconsistencies

When a user moves an object, it can happen that in other versions of the collaborative resource (according to the selected branches) this operation is seen like a suppression, a creation of object, and in certain cases that the same object appears at several places.

There exists applications in which this type of phenomena is not problematic, but the user can wish to place a certain number of constraints, for example that a certain object have to appear at most once.

In order to guarantee this kind of constraints, while continuing to authorize any change on the objects, if this operation would be seen by another user in a way not-authorized, it is a question of creating new branches for the origin and/or the destination of the movement, in which the value is the one before movement, and then automatically activating this or these new branches for the users in violation of the constraints.

To note that these constraints, in particular those of unicity of position of an object, will prohibit certain combinations of branches. If a user tries to activate a nonvalid combination, the system will adapt the other branches automatically in order to arrive to an authorized combination.

In the example which follows (see the FIGS. 6-*a* and 6-*b*) we assume the existence of the constraint that an unspecified object should not be visible at two places simultaneously.

FIG. 6-*a*: Two objects a and b, which have each one two branches (a1,a2 and b1,b2). An object x (whose contents and the possible branches do not interest us for this example) is present at this time in each branch of a. The constraint is satisfied whatever are the choices of branches because in all combinations x is child of a and only a.

FIG. 6-*b*: Let us suppose now that a user moves x from a1 towards b1 (in the version v1). (Thus making the values a1' and b1'). At this time there exist three authorized combinations, a1'-b1', a1'-b2, and a2-b2. In the second of these combinations, x is not visible but it is not in violation of the constraint (but one can remake the same example where the constraint would be that x must be visible exactly once and thus this second combination would be then prohibited). If there exists at least one version of the collaborative resource which had activated a2-b1 as combination (v2), it should be made so that the movement does not have an effect visible in this version. This is done by creating a new branch which contains the original state of b1 before it receives object x. The system then, just before carrying out the movement, activates in all the versions concerned (v2) the new branch b1. If the user asks to reactivate the branch b1' in one of these versions (v2) the system will enforce it with also activating the branch a1' object has in order to avoid the combination a2-b1', and, symmetrically, if a user asks to activate the branch a2 in a version (v1) where the branch b1' is active, the system will enforce the user with either activating b1 or b2 for the object b.

Merging Branches

We previously described a mechanism (the refusal) allowing to create new branches for an object. As described this operation was irreversible because there is not means to remove or merge branches. This is what this section proposes.

A user can express her opinion that two branches of an object must be merged, in particular by copying the most recent content of one of the branches as content for another branch. Consequently, if a user activates one or the other of these two branches, she will see the same contents.

When this occurs the system will merge the two branches of this object. It will thus have to determine for each version which contents to place in the branch resulting from merging (or if it is necessary not to put of any content at all).

When a version of the collaborative resource has a local version in at most one of the two branches in question, merging is trivial.

But if a version has local contents for each of the two branches, the system must choose one of the two contents. For example if one of the two branches is active, its contents will be preferred, if not the system will take the one the most recent.

In order to avoid destroying the other one, it can be created for this object an "inactive" branch (i.e. which is never presented to the user as such but who is used to store the contents thus "disabled"). When the owner of this version accesses the collaborative resource the system informs her of the situation and proposes various actions to her: the user can destroy one or the other of these contents or she can ask to recreate a branch to give her contents there (and other "disabled" contents).

Case of the Single Collaborative Resource

One can consider a simplification of the method, where there exists in fact for each "SCR" only one "collaborative resource" which includes all the objects known by the system.

Then, contrary to the method described elsewhere in this document, when the user consults or modifies a resource she always does it through this same collaborative resource and must say to the system which particular object she wishes to treat (with its descendants).

This implies also (of section "Implementation" below) that a resource does not indicate any more which object is its "root", i.e it is not any more related to a particular object.

This is interesting if resources can contain other resources, for example a folder containing documents or other folders.

She can for example modify the organization of the files and folders, and her modifications will have a consistent effect whatever the folder that another user views. If different collaborative resources were used for each folder it would not be the case—the changes would be visible only on the condition of consulting the structure from the same point as during the modification.

Transclusions

We will further describe the mechanism of "transclusion" in this document, which makes it possible to build objects which are modified versions of other objects.

Briefly, a transclusion is similar to a version of resource with the difference that objects seen through a transclusion can cohabit with objects not seen through a transclusion, or seen through another transclusion.

It is possible to look at any object through a transclusion, and to place the result of it as child of another object. The parent will then contain a reference (in the form of slot) identifying the transclusion on the one hand and the source on the other hand.

When the user modifies the result of a transclusion, since this result does not have a proper existence, the modifications are stored "in" the transclusion itself (in terms of differences).

A transclusion is indeed treated, from the point of view of the implementation of the method presented here, as an object in the sense that it can be modified in the different versions and these modifications can be refused by other users, with the result that the transclusion can have several branches. The content of a transclusion describes the differences applied to the sources. A transclusion differs from an object by the fact that a transclusion cannot itself be placed as child of an object, and cannot be directly displayed to the user (the user can only see the image of objects obtained by this transclusion).

Implementation

Architecture

The resources identifiable by a given SCR contain objects which can possibly be defined as being "replaceable"[22] within the framework of this SCR.

[22] All the objects of all the resources are regarded as replaceable (however one will regard as object only those which are reified), but other methods can be implemented to selectively decide those which are replaceable. In particular, constraints of non-modifiability of certain objects (which for example are advertisements) will be implemented as explained further.

By the method described here, the users of a same SCR can modify and thus contribute new versions of some their replaceable objects. Those will replace[23] those presented to the users of this SCR, or will enrich them by bringing (optionally) alternative versions representing the "different points of view". It is the collaboration server (or a similar device) which determines which are these objects.

[23] (to replace either their contents, or their position, or both, or to remove some or add).

Below a simple architecture to implement this method (among other possible architectures) is taken as base of description for the method of the invention. It is presented, very schematically, on FIG. 7 and includes the following elements:

Information manipulation tool (represented by the icon of a laptop): Means of presentation and/or manipulation of resource. Can in particular be a browser such as Internet Explorer, or a tool such as Microsoft Word, or the file explorer of the operating system. In practice one will extend this tool with an "extension" (plug-in) implementing the method.

Primary Content Server (PCS): Server providing the resource version required (in the information manipulation tool) by the user.

Collaboration server (ES): Server providing, for a version of accessed resource, the identifiers of the versions of objects.

Secondary Content servers (SCS): Servers providing the contents of the versions of objects.

As FIG. 7 illustrates it schematically, the user having required a version of resource giving its identifier (URL, URI, . . . ) by traditional means, and for each identifier of SCR given by the user[24], the information manipulation tool carries out the following stages:

[24]The user can activate zero, one or more SCR at the time of his request. These can also be configured by default in the information manipulation tool.

1. obtains the required version of resource from a primary content server;
2. (in parallel with stage 1.) obtains from collaboration server the identifiers of the versions of objects to be presented;
3. (following stage 2.) obtains from secondary content servers the said versions of objects;
4. and assembles the said versions of objects in the said version of required resource.

We now will describe the operation of a collaboration server. Hereafter the term "the system" indicates the collaboration server.

Data Structures

There are primarily four types of data structures handled by the system, which represent:

1. A collaborative resource
2. An object (of a collaborative resource)—this doesn't represent a particular version of this object but the class of all its branches and versions (the examples use the letters a, b, c, etc. to represent an object). As told above it can be question of a transclusion and not of an object.
3. A version (of a collaborative resource)
4. A reference to a content (i.e of a particular version of a branch of an object) which is in a content server.

We will now describe the data stored and maintained in these data structures.

An object has
a unique identifier for the collaborative resource,
a list of branches and for each one an identifier (it is not necessary that the identifiers of objects or branches are unique in different collaborative resources).
In order to avoid having to seek the most recent version constantly, it is advantageous to store for each branch a reference towards the most recent version (structure of version of collaborative resource) of its contents. (It is also possible to do without this information and at each request to traverse the table of the versions and to consult the dates of the modifications of the local versions).
A reference to contents indicates
the identifier and the server from which the effective data can be obtained
which are the objects that the contents reference via slots
the date on which these contents were modified the last time
eventually, categories corresponding to these contents.
A version specifies
the client who is the owner
eventually, from which other version of the collaborative resource it derives
for any object (given by its identifier) it can indicate which branch is activated (and nothing for the objects for which it is necessary to recover the choice of branch given by the collaborative resource from which it derives)
for any branch of each object for which it provided a local version, a reference to the contents of this local version.
Lastly, a collaborative resource gathers all this, while storing
the set of the objects which it contains
the identifier of the root object of the collaborative resource (which is thus common to all the versions)
the set of the versions of the collaborative resource.

Constraints

Thus, the algorithms described hereafter question the constraints (that all the objects must be unique, for example) by asking whether a certain combination of branches of a collaborative resource must be authorized or not. This way of doing makes it possible to leave open the types of constraints being able to be applied.

In order to help with the satisfaction of the constraints, instead of simply refusing in block a certain combination of branches, the implementation of the constraint can provide a list of the branches posing problem. For example for a constraint of unicity, it is about the list of the branches containing the multiplied object.

Algorithms

The following sections will describe the various operations which a collaboration server offers to its environment, which are:

Access in "reading" (construction of the structure to be presented for a version of a collaborative resource)
Change of active branch in a version of the collaborative resource.
Modification of an object
Creation of an object
Refusal (rejection) of an object.

Construction of the Structure to be Presented for a Version of the Collaborative Resource Starting from the identifiers of a collaborative resource and a particular version of this collaborative resource, the system gives the references to the contents of the objects having to be provided the client so that this one can build the collaborative resource such as it must be presented to the customer. (One recalls that the collaboration server does not access the contents themselves but only their identifiers, which is the reason for which it cannot itself build the page).

Starting from the root of the collaborative resource, the system determines which one is the active branch in the requested version. If it is an object seen through transclusion it is necessary at this time to apply the differences of the transclusion (as described in the part of this document on the transclusions).

Then this operation is repeated starting from the children of these contents.

Change of Active Branch

The client asks for a change of an active branch while indicating which object of which version of collaborative resource is affected, as well as the identifier of the new selected branch.

The system checks first of all if the combination of choice of branches resulting for this version is in violation of a constraint. If it is the case it automatically changes the active branches in the other objects to satisfy the constraints.

Once found a valid combination, the system simply stores the new value in the structure.

Reaction to a Modification

This section describes how the system is informed of a modification, and how it maintains its data structures to take account of this modification.

The description of a modification contains an identifier of collaborative resource, an identifier of version (of the resource), the identifier of the object modified and the description of the contents of the object after the modification (all attributes enumerated in the description of the data structure for "reference to contents").

It should be noted that in practice one will group a set of modifications in only one request, and will treat these modifications in parallel. In particular it is necessary to check the constraints only after having carried out all the modifications and not between each one of them.

Since a modification can change the effect of the constraints, it may be that other versions are found in violation of a constraint. If this occurs the method will carry out a refusal of the branches posing problem (this amounts simulating the user which refuses). This will cause that the versions having activated these branches will preserve the old values of the objects.

It can happen that a modification is by itself in violation of a constraint (for example if the user tries to twice place in the same object the same child subjected to constraint of unicity. At this time any combination of branches having chosen this branch will be in violation of the constraint. It can be preferable in these cases that simply the modification fails, rather than it is accepted and then that the system refuses to display it.

After having created these new branches if required, it is enough to place new information (contents and lists of children) in the original branch.

Also in the collaborative resource the pointer towards the most recent version in this branch is updated.

Treatment of a Creation of Object

As already explained previously, a creation of object is carried out in two stages. First of all creation itself, then modification of the parent object to contain a reference towards this object. The first stage is described hereafter, and the second stage will be requested by the client to the system as if it were about a "normal" modification.

A request for creation of object indicates in which collaborative resource this object is created, which must be the initial contents (in the form of an identifier) and which version of the collaborative resource carried out the creation. To this request the identifier of the new object will be returned.

The treatment of this request consists with:
choosing new identifiers of object and branch
creating a new structure of contents with the given identifier, whose date is now and who does not have children
creating a new structure of object with the new selected identifier and only one branch whose most recent version is the one which carried out creation
adding the new object to the list of the objects of the collaborative resource
inserting the identifier which gives the initial contents given in the version.

We assume here that the initial contents of the object are empty or neutral from the point of view of the constraints and thus that there is nothing to check (in the contrary case one could for example imagine a constraint fixing a maximum at the total size, for example of many characters, collaborative resource. In this case the creation of an initialized object of non empty contents could have violated the constraint).

Indeed, if the user creates a nonempty object, this must be sent to the system in two stages, initially the creation of an empty object then its modification towards a nonempty object.

Treatment of a Refusal

To notify a refusal, the customer informs the system about which version of collaborative resource refuses which objects. We assume that the refused versions are those which are for the moment displayed at the places of the objects for the given version.

It can happen that a refusal fails, for example if the user seeks to refuse the unique version of an object in a branch. At this time the error is communicated to the user and the system does not do anything.

First of all the system determines which versions of the collaborative resource provided the refused contents. With this intention it looks for each refused branch which one is the most recent version of the object for this branch.

In the case the refusal would cause a violation of constraint, the system will try to solve the problem by also refusing another branch posing problem. This can occur when a user wants to refuse a displacement. In the event of constraint of not-multiplicity (i.e there must be only one instance of a given object), if the user refuses the disappearance of the object at the source of movement, the system obliges also refusing the appearance of the object to the destination. If this second refusal fails, the first must also fail.

One creates a new identifier of branch for the refused object. One moves the contents refused in the new branch, for the version of the collaborative resource which had provided these contents. This operation also has as effect to remove the contents in question for the old branch in this version.

Since the removed version was the most recent it is now necessary to recompute which one is the most recent version in this branch.

If the refused contents were active in the version providing these contents it makes the new branch active in this version.

Finally, if the given version derived from the refused version, it activates (explicitly) the old branch in the latter (in order to prevent that it follows the refused version in the new branch).

Management of the Concurrent Operations

The system described until now supposes that the modifications carried out by the users are atomic, i.e. on the one hand that they are based on the most recent state of the collaborative resource and on the other hand that two users do not try to modify the same object simultaneously. This cannot actually be guaranteed, for example if a user wants to modify an object and that another wants simultaneously to refuse it.

In particular, the actions carried out by the user are likely to be made on the basis of obsolete version of a collaborative resource, this one having been modified since the last time that it downloaded it on his customer.

Here two methods to solve this problem.

Using a system of locks, where a user wishing to modify an object must first of all lock it and take the exclusive rights the time of her modification, time interval during which nobody is authorized to modify the object.

If a user seeks to carry out an operation which is thus in conflict, the system will ask her to carry out herself the merging of the two conflicting operations.

For example if two users download a collaborative resource, each one modifies a part there, and each one tries to send her version, at the moment when the system receives the second request of modification it will return to the user the more recent version of the collaborative resource and ask her to apply its modifications again onto it.

The system can provide to the user tools to carry out this merge quickly: if the system detects the nature of the modifications made by the users it can try to merge the actions of the two users automatically, and ask the assistance of the user only when it is a question of making decisions, e.g if the same part of a paragraph were modified by each user.

Restrictions of Propagation

We can offer a function to ask, object by object, variations to the normal behavior of the collaborative resources.

Protection in Reading

A user can ask to have for an object a "secret" branch to which she is the only one to have access. Such a branch behaves in any point like another with the difference that it is not made visible to the other users (and they do not have the possibility of selecting it). If a user creates an object as child of such a secret branch, the new object will be also made secret.

One can of course consider finer adjustments where a group nonreduced to the user alone is to authorize to access this branch.

Protection in Writing

The user can require to always see his local version for a particular object, even if a more recent version exists in the same branch. A way of implementing this is that as soon as a modification takes place in a branch, such an object protected in writing is sent in its own branch (as if it were refused). If the user modifies this object again, it is again sent in the branch where it was previously, so that this new version is made visible to the other users.

When the object is thus moved in its own branch the user always has the possibility of consulting the other branches in order to see the last version there.

The versions deriving from a version which is write protected will continue to see the protected contents in question, as they inherit its active branches (except of course if they explicitly activated another branch).

One-Way Propagations

As another type of restriction we can have an object or a resource for which the modifications are propagated only in only one direction, for example from upstream towards downstream as it is the case of the transclusion.

Alternative: Versions of Resources Like Transclusions

The transclusion can be used to collaborate (by propagating the most recent or most elaborate modifications) if this mechanism is extended for also propagating the modifications in direction of the source (upstream). One now will describe this generalization of the transclusion (to be used as mechanism of collaboration such as defined up to now).

Instead of having different versions of the same collaborative resource one now will consider that each such version is in fact a separate (downstream) resource (having a distinct identifier of resource) which transcludes all the contents of the (upstream) resource that it is to modify. It is said that the resource downstream derives from the resource upstream.

In the same way, instead of having versions of objects we will now consider separate objects (having identifiers of distinct objects) which result from a transclusion starting from the corresponding objects of the upstream resource[25]. The process thus primarily consists to determine which objects must be replaced (by a replacement object) or enriched (by alternative objects) at the time of the presentation of one resource to the user.

[25]And consequently we will adapt the implementation of the concept of "branch".

As the source (upstream) and the destination (downstream) have identifiers of distinct objects now, it is possible to consider them in parallel. For example to have in a website a page which is transcluded of another or to have in a folder a resource transcluded of another being in the same folder.

The new processes of collaboration which one now will describe were conceived to be integrated (and be complementary) with the process of transclusion. The essential difference is that the directions upstream-downstream and downstream-upstream of collaboration will not be now symmetrical any more. One thus will describe here the "most elaborate" objects instead of the "most recent" versions of object.

Illustration of the Principle of the Method

FIGS. 8 to 21 illustrate various stages of use of the method and make it possible to intuitively understand it, before even reading its description which will follow.

These figures illustrate examples of derivation of resource: a R1 resource is derived in a R2 resource in order to be more elaborate, then R2 is itself derived to incorporate yet other modifications in it, and so on. However an object thus modified in a resource can be refused by one of the owners of the resources from which it is resulting, and then gives place to the creation of another branch. The branches represent thus the different points of view. In each branch, the object which is more downstream is "most elaborate".

Initial situation (FIG. 8): The R1 resource has at object. Thus a1 is the most elaborate.

R2 derives from R1 and modifies a1 in a2 (FIG. 9): Thus a2 is the most elaborate.

R3 derives from R2 and modifies a2 in a3 (FIG. 10): Thus a3 is the most elaborate.

R2 refuses a3 (FIG. 11): In result of this refusal, a new branch is created (Branch 1) whereas the original flow is in Branch 0. a2 is the most elaborate in Branch 0 and a3 is most elaborate in Branch 1.

Figure 12:
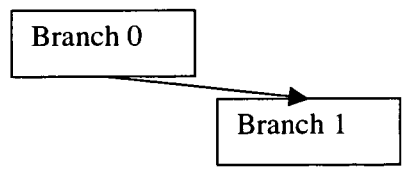

The resulting diagram of branches is presented in FIG. 12.

Figure 13:
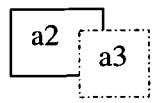

When the user visits R1 or R2 she sees what is shown on FIG. 13.

Figure 14:
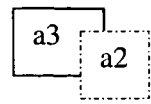

On the other hand, when she visits R3, she sees what is presented on the FIG. 14.

R4 derives from R2 and modifies a2 in a4 (FIG. 15): Thus a4 is the most elaborate in Branch 0.

Figure 16:
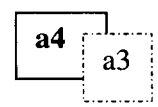

When the user visits R1 or R2 or R4, she sees what is presented on FIG. 16.

Figure 17:
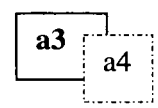
Figure 18:
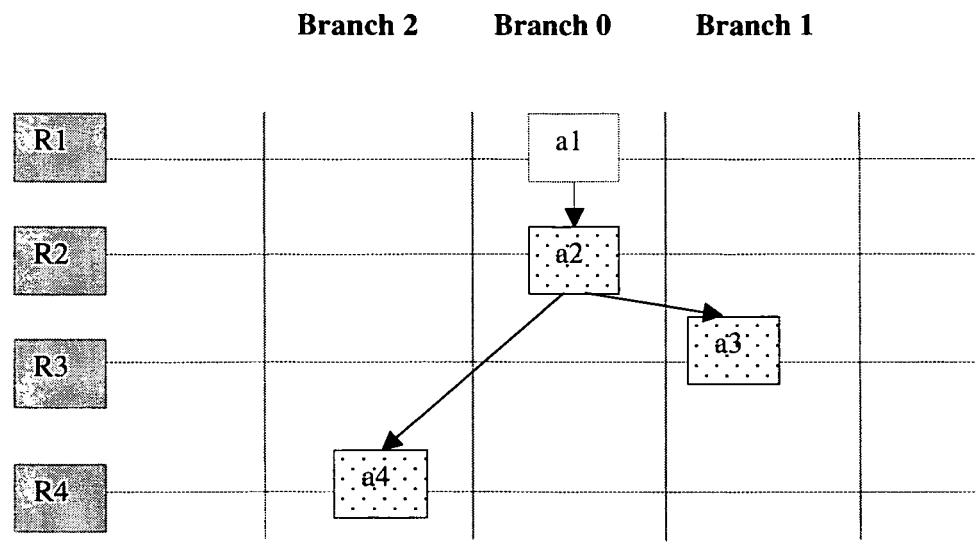

On the other hand, when the user visits R3, she sees what is presented on FIG. 17.

R2 refuses a4 (FIG. 18): A new branch is created (Branch 2) with a4 as the most elaborate object.

Figure 19:
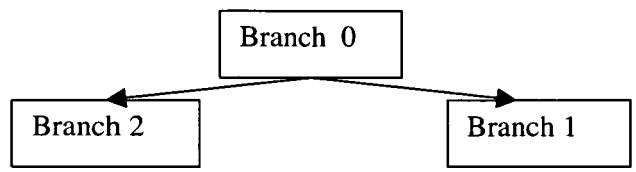
Figure 20:
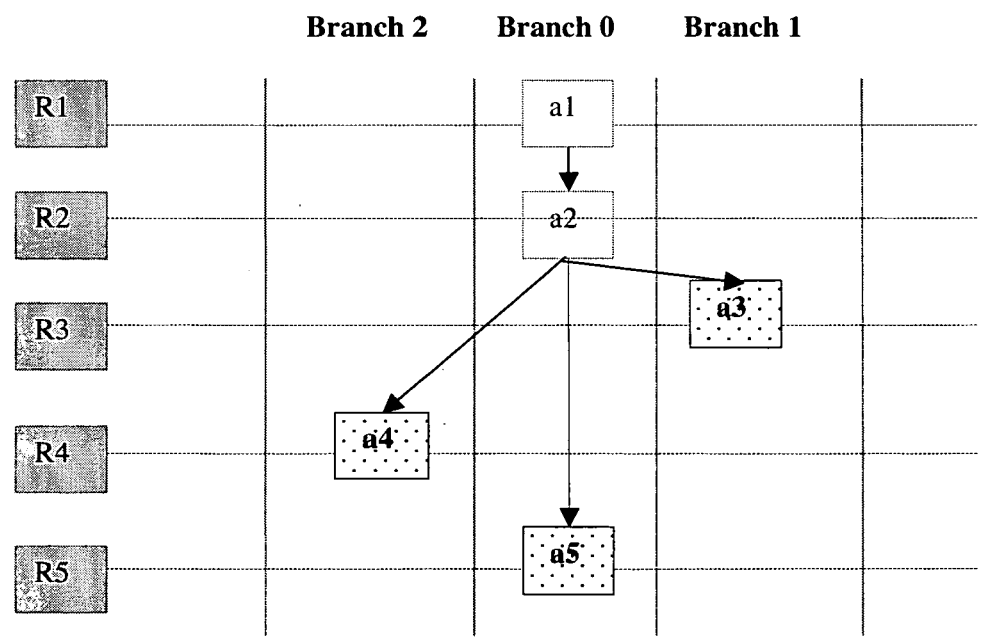
Figure 21:
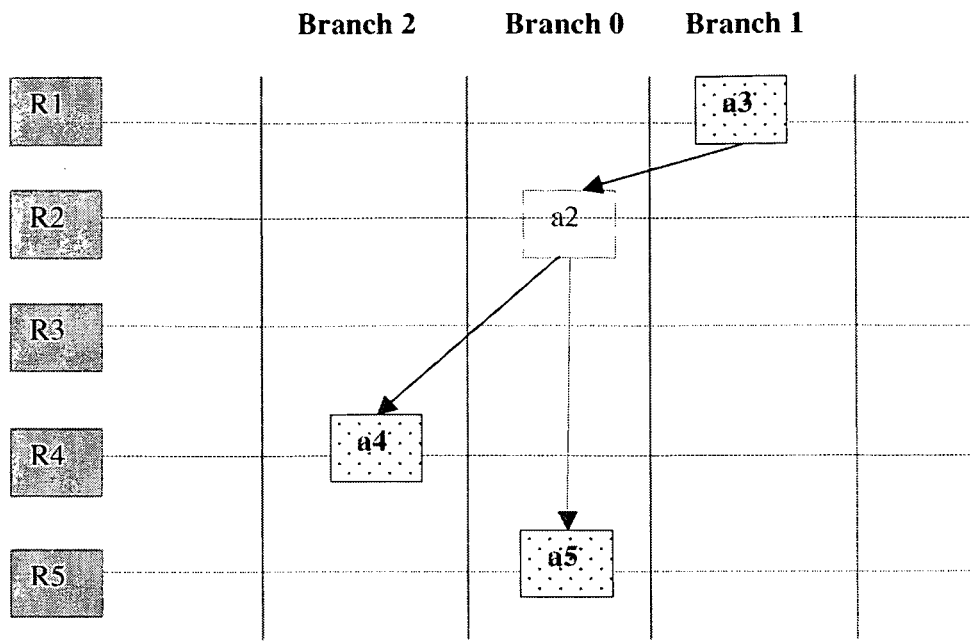

The diagram of branches is now as in FIG. 19.

One notices that when the user sees an object in Branch 2, for example in the R4 resource, the alternative objects are not all on an equal footing, Branch 0 is more relevant than Branch 1. One could limit the visibility of a branch to the ancestors and descendent branches, or sort the alternative objects according to the proximity of their branch.

R5 derives from R2 by modifying a2 in a5 (FIG. 20): [26] Thus a5 is the most elaborate object in Branch 0.

[26](or derives from R1, or from R 3, R 4 or R5 but chooses the alternative a2 then modifies it)

R1 accepts a3 (FIG. 21): In result of this acceptance, a1 is replaced by a3 and put in Branch 1.

Process of Creation of the Most Elaborate Objects

We describe a process of modification of resource including the following two main stages:

1. derivation of the resource whose at least one object is to be modified, and modification of this (or these) object in the derived resource,
2. proposal for this modification to upstream and determining the position of the "most elaborate" objects according to the response (or non-response) to this proposal.

These two main stages are respectively described in the two following sections. We will then describe how we determine the replacement objects (OR) and the alternative objects (OA).

Creation of Derived Resource

Rule 0: When the user accesses within the framework of a SCR a resource by means of an information manipulation tool, in order to modify it, and cannot or does not want to modify it directly[27], the information manipulation tool automatically creates a derived resource which has the same content[28] and presents it to the user, and the user modifies the said derived resource in place of the said accessed resource.

[27](either because it is in read only, or the user wants to modify a resource that she has the right to modify but she does not want to modify it directly because she rather prefers to modify a resource derived from it)

[28]This is described with the section "Method of Derivation by Transclusion". It should be noted that the contents of the derived resource then remain synchronized with the resource from which it derives.

The derived resource is stored in a server[29] available to the user (and thus not necessarily in the server of the said accessed resource).

[29](chosen by the user)

The Modifications are Proposed Upstream

It is said that the resource accessed to be modified is at the upstream of the said derived resource (and that the latter is thus at the downstream of the said accessed resource). Indeed, a resource can be derived from a derived resource itself, thus forming a chain (or a cascade) upstream-downstream.

The initial situation is governed by the following rule.

Rule ½: The objects contained in a resource which is not derived from another resource and from which there does not exist any derived resource are (implicitly) regarded as "most elaborate".

There are then the following rules:

Rule 1: Each object modified[30] in a derived resource, as long as it was not further modified downstream, is most elaborate (and the upstream nearest object, if any, ceases being the most elaborate).

[30]It can in particular be a question of the addition of an object, deletion of an object, or of the modification of the content or position of an object. Alternatively, one can adopt the approach of the "slots" described further.

Rule 2: The said modification is spontaneously proposed to the respective owners[31] of the resources corresponding to the upstream.

[31]The modifications can be proposed only if the owner is accessible, for example when its email address is known. When the said accessed resource is itself a derived resource (within the framework of a SCR), the problem does not arise since its owner is already known and accessible. In fact, the process of replacement enrichment of object could itself be used as means of proposal for an acceptance or not of the modification (of the object which precisely is used of replacement or enrichment).

Each one of those can accept, refuse or be unaware of (ignore) the said proposal. Here are the consequences:

Rule 3: If the modification of an object is accepted, the result of this modification is propagated to the accepting object.

Rule 4: If the modification of an object is refused at upstream, whatever is the position of the refusing object, the first object which is at upstream (of the refused modified object) becomes the most elaborate[32]

[32](without the objects which were most elaborate before this refusal ceases being it)

and starting with this refused object a distinct branch is created (in the tree of the modifications of objects) to place there the identifier of the said refused modified object[33] as well its descendants. There can thus be several objects marked "most elaborate" in a tree of modifications concerning the same object; it is said that they are alternative objects[34].

[33](so as to be able thereafter to prolong the "trunk", without following this branch)

[34]Indeed, there is a different more elaborate object in each different branch.

Example

We will now explain and illustrate (see FIG. 22) these rules by considering two successive derivations (and associated modifications) starting from a R1 resource.

Note that these derivations can be carried out by different users.[35]

[35](different between them and/or different from the owner from R1)

Initial Situation of the Example

The resources are identified by a capital letter followed by a number (indice) which indicates their version number; the objects are identified by a non-capital letter and have the same indice that the resource in which they were created or modified.[36]

[36]For more clarity, we use boldfaces for the objects created or modified.

Figure 22:
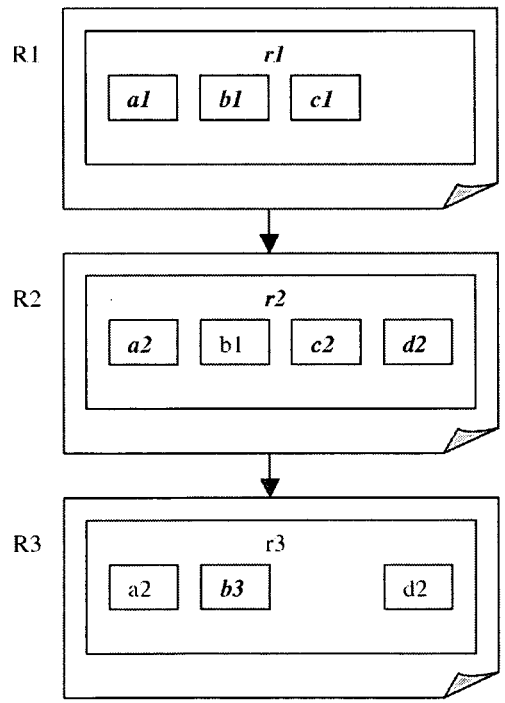

FIG. 22 illustrates that:

The contents of the R1 resource are the r1 object. r1 contains itself three objects: a1, b1 and c1 (actually, the user who sees the contents of the R1 resource sees the object R which contains the objects a, b, c; here the indices will be used for us to see more easily which is the resource which contained the object in question initially)

R1 is derived (in R2) to modify the specific content[37] or the position[38] of the objects r, a and c (r1 is modified in r2, a1 is modified in a2 and c1 is modified in c2) and to insert a new object d (d2).

[37]For example, if they are elements in XML notation, the contents of r1 and a1 are their "innertext".

[38]The position can be specified by the parent object and a sibling object (on the left or on the right, according to convention taken). We will further describe an alternative to this approach at the section "Slots" (to be noted that the approach of the slots was that adopted in the previous chapter).

R2 in its turn is derived (in R3) to modify b (b2 is modified in b3) and to delete c (to delete c2).

In the implementation of the collaboration server that we will now describe, advantageously the data structure managed in the collaboration server does not contain the resources or the objects themselves, but only their respective identifiers. One introduces here in a schematic way a structure of pointers and markers, the pointers allowing to reconstitute derivations and modifications and the markers being used to distinguish the most elaborate objects (as well as the deletion of object). This structure includes:

Trees of derivation of resources (such as R1→R2→R3)

Trees of modification of objects[39] (such as: r1→2; a1→a2; b1→b3; c1→c2→c3; d2) from which the nodes are accessible starting from the corresponding nodes from the trees of derivation of resources.[40]

[39](or "trees of derivations of objects"—further we consider composite objects called "grains" and we then handle "trees of modification of grains")

[40]Each node of the tree of derivation of resources points on the corresponding nodes of the trees of modification of objects (as one sees it in the figures). In practice, one can implement a data structure different but equivalent, in particular by using tables of relational data base.

Advantageously, the nodes forming the trees of modification of objects actually include only the modified objects. The missing nodes represent unmodified objects, i.e. they reflect[41] the position and the contents of their correspondents at upstream.[42]

[41](thanks to the process of transclusion, described further)

[42]Precision: According to method used, although in theory, in the trees of modification of objects, only the identifiers of the objects are represented whose contents or position are modified (or removal of object), one can also put at it the nodes representing the unmodified objects but which nevertheless are marked as being most elaborate. There exist indeed several possible implementations of a mechanism of management of the most elaborate objects and the method presented here is one only of those.

The schematically presented figures show a tree of derivation of resources and trees of modification of objects. They show, in the form of black rectangle in the trees of modification of objects, the nodes marked as being most elaborate.

Figure 23:
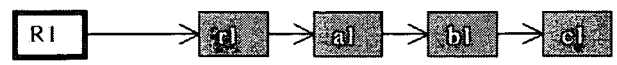

FIG. 23 presents the data structure before derivations (i.e. before that neither R2 nor R3 exists). The objects r1, a1, b1 and c1 are marked since under the terms of the Rule ½ they are most elaborate.[43]

[43]In an optimized implementation, one can avoid representing the unmodified objects. We presents them here for reasons of clarity.

Figure 24:
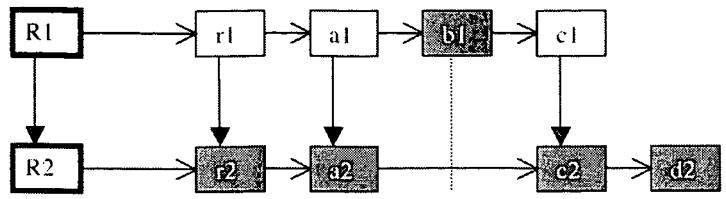

FIG. 24 has the data structure after the modifications in R2 and before derivation of R3. It shows the nodes marked as being most elaborate (i.e black rectangles) by supposing that no modification yet was accepted or refused. One sees in the figure that under the terms of Rule 1, the objects r2, a2, c2 and d2 become most elaborate, while b1 remains most elaborate, since b2[44] was not modified.

[44]b2 is not in the tree of modification of the objects since this tree includes only the identifiers of the modified objects (except those not modified but being most elaborate) like already mentioned.

Figure 25:
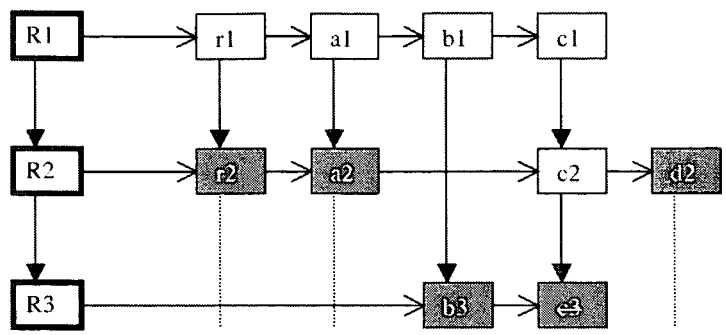

FIG. 25 presents the data structure after the modifications in R3. Here too the nodes marked as being most elaborate presuppose that no modification yet was accepted or refused. Let us recall that one of the modifications carried out with consisted in removing c. One notices thus that the object c2 is no more most elaborate but only (the absence of the object c) which is (always under the terms of Rule 1).

Let us recall again that in R2 there is well the b2 object (which reflects the contents and position of b1) and that in R3 there are well the objects r3, a3 and d3 (which reflect the content and positions of r2, a2 and d2 respectively), but that they do not appear in the trees of modification of these objects since are stores only the nodes representing the modified objects.

FIG. 25 represents the initial situation for which the examples that are based on follow. Thus, we will consider that before the derivation (then modification) of R2 in R3, there was neither acceptance nor refusal of any object.

Determining the Replacement Object and the Alternative Objects

Rule 5: Each current object being presented to the user, if itself is not the most elaborate, is replaced (within the said presentation) by its most elaborate correspondent at downstream in the same branch.

Obviously, the user can always activate and disable this functionality of replacement of objects.

Rule 6: The "most elaborate" objects, except the object which is used as replacement object pursuant to Rule 5, are regarded as being alternative objects and are presented to the user as options. Each alternative object has a priority depending on the proximity of the branch in which it is (the closer branches having a stronger priority). [45]

[45]An additional approach of prioritisation of the alternative objects is described further at the section "Proceeded from sorting of alternate objects by notation (rating)".

When the user selects an alternative object, this replaces the displayed current object (which can be the object contained in the resource, a replacement object or another alternative object selected previously).

It is advantageous for the user to present all the alternative objects coming from the same resource together to him, this for reasons of coherence. When the user views a resource, the system groups the alternative objects according to the resources where they are part of.

Obviously, the user can always activate and disable this functionality of presentation of alternative objects.

The implementation can simply be done in the following way. To determine the replacement and alternative objects the collaboration server finds, in the set of the trees of derivation of resources, the node representing the derived resource in question. From there it finds for each object for which there exists a tree of modification of objects, by traversing this tree, the replacement object—the most elaborate object in the same branch at downstream—and the alternative objects (the other most elaborate objects in the other branches) according to Rules 5 and 6.

Examples

Ignorance or Acceptance

FIG. 26

Figure 26:
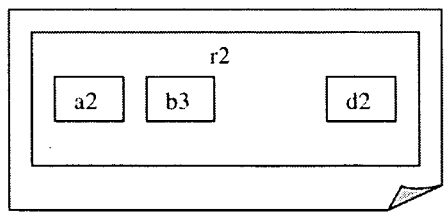
Figure 27:
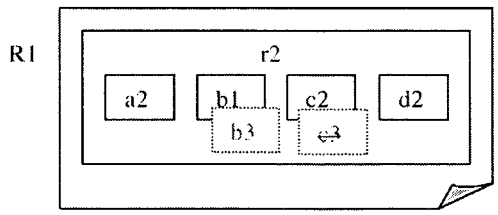
Figure 28:
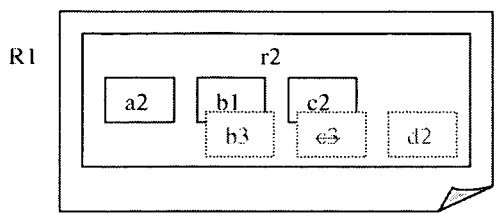
Figure 29:
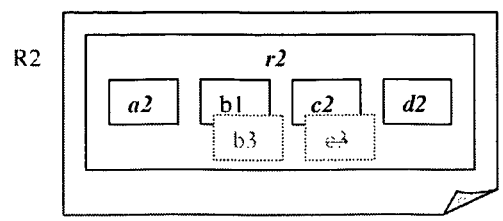
Figure 30:
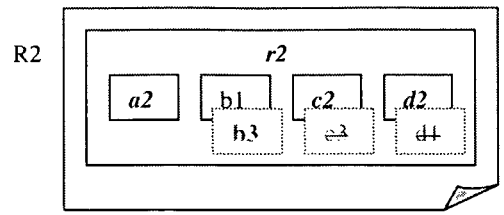
Figure 31:
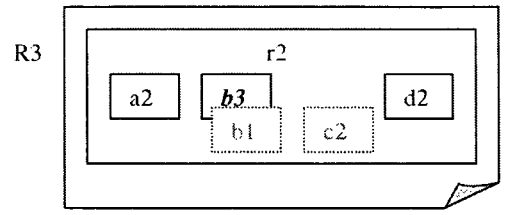
Figure 32:
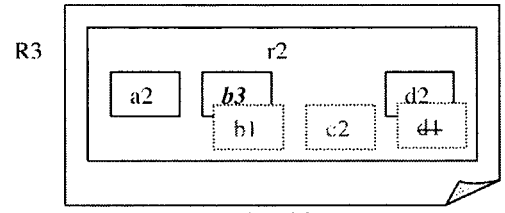

Let us suppose that the user visits R1 before any acceptance or refusal. At the time of the presentation of R1 to the user (FIG. 26), under the terms of the Rule 5, r2, a2, b3, the absence of c, and d2 will replace the corresponding objects of R1. As for Rule 6, there is no alternative object to present since there is each time only one more elaborate object and this one is already used as replacement object within the meaning of Rule 5.

As a consequence of the stated rules, as long as there was no refusal, the resource and its derivatives are presented in the same way including after acceptances (except if there were modifications at upstream after modifications at downstream, in which case we must refer to rule 7 stated further).

Refusal (FIGS. 27 to 32)

Let us suppose that the user visits R1 after "R2 refuses". At the time of the presentation of R1 to the user, under the terms of the Rule 5, r2, a2, b2, c2 and d2 will replace the corresponding objects of R1. Moreover, by application of Rule 6, the b3 objects and the absence of c are presented as option compared to the corresponding objects which are presented in the R1 resource (see FIG. 27).

Let us suppose that the user visits R1 after "R1 refuses R3 and d2". At the time of the presentation of R1 to the user, under the terms of the Rule 5, r 2, a2, b2 and c2 will come to replace r1, a1, b1 and c1. Moreover, by application of Rule 6, the objects b3, the absence of c, and d2 will be presented as options compared to their corresponding objects (or absence of object) which are presented in the R1 resource (see FIG. 28).

Let us suppose that the user visits R2 after "R2 refuses". There is no replacement within the meaning of Rule 5 since these objects are themselves most elaborate. However, within the meaning of Rule 6 there are the alternative objects: b3 and the absence of c (see FIG. 29).

Let us suppose that the user visits R2 after "R1 refuses R3 and d2". There is no replacement within the meaning of Rule 5 since the objects of R2 (or reflected in R2) are themselves most elaborate. There are the alternative objects b3, the absence of c in R3, and the absence of d in R1, within the meaning of Rule 6 (see FIG. 30).

Let us suppose that the user visits R3 after "R2 refuses". She sees the objects of R3 which reflect in fact the objects of R2, except for b3 and c3 which were re-modified in R3. There is no replacement since all these objects are already most elaborate. However, under the terms of Rule 6, b2 and c2 represent alternative objects with respect to respectively with b3 and the absence of c (see FIG. 31).

Figure 15:
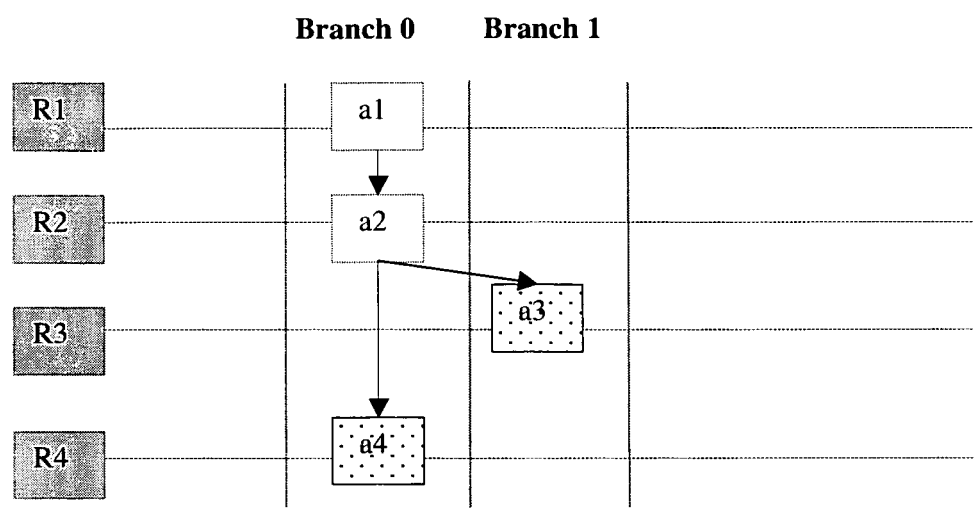

Let us suppose that the user visits R3 after "R1 refuses R3 and d2" (see FIG. 15). She sees the objects of R3 which reflect in fact the objects of R2, except for b3 and the absence of c which are modifications made in R3. There is no replacement since all these objects are already most elaborate. However, compared to Rule 6, b2, c2 and the absence of d represent alternative objects (see FIG. 22).

Multiple Derivations of the Same Resource (FIGS. 33 to 44)

Figure 33:
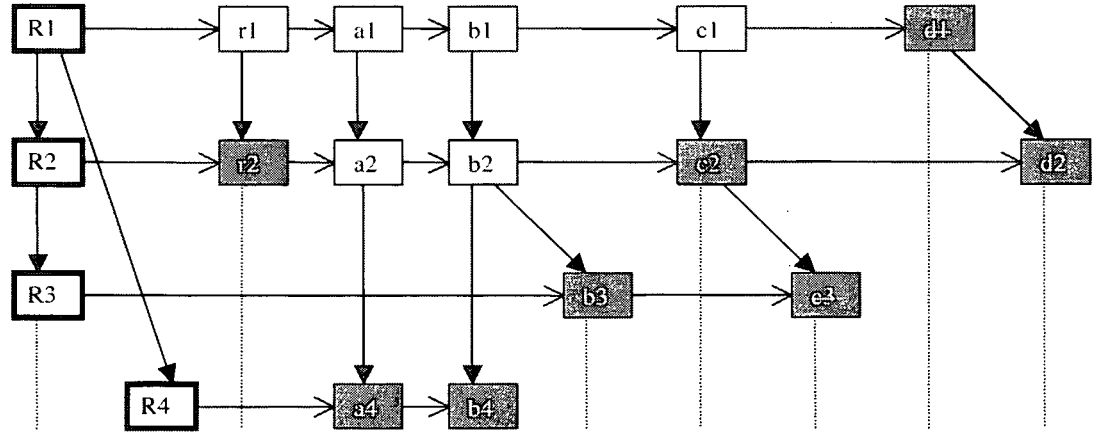

Let us suppose that the user accesses the resource R1 just after "R1 refuses R3 and d2" then wants to modify objects a2 and b2 (of replacement) which are presented to him. Under the terms of the Rule 0 resource R4 derived from R1 is created automatically and these modifications generate objects a4 and b4. FIG. 33 illustrates the fact that a4 succeeds a2 and not a1, because a2 is the replacement object of a1 (it is thus a2 which is modified in a4). In addition, b4 extends the "trunk" in which b2 is and takes the marking of the most elaborate object from him. [46]

[46]Since it is b2 (object of replacement presented of office instead of b1) which was modified in b4, it is well the "trunk" (container b2) which is prolonged and not the branch which was created for the refused object b3.

Figure 34:
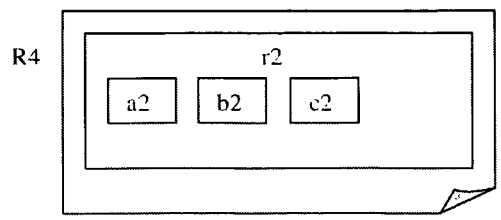

Before modification, the user sees the resource R4 as when the user visits R1 just after "R1 refuses R3 and d2", except that, advantageously, there is neither b3, neither, nor d2, since R4 does not have them like ancestors.[47] This is presented on FIG. 34.

[47]They are thus not priority alternative objects and by default they are then not presented. But the user can reveal them as nonpriority alternative objects.

Figure 35:
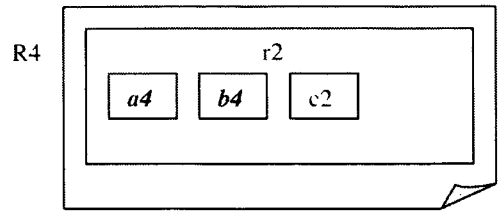

After modifications, the user sees the resource R4 like FIG. 35 presents it. a2 is modified in a4 and b2 in b4. The alternative objects are b2, (the absence of c) and d2. It should be noted that b3 is not presented because it is neither ancestor nor descendant of b4.[48]

[48]Alternatively, the placement of the Collaboration Server can as present b3 as a priority alternative object, by considering as it is at the downstream of b1 (because the R4 resource derives from R1).

Figure 36:
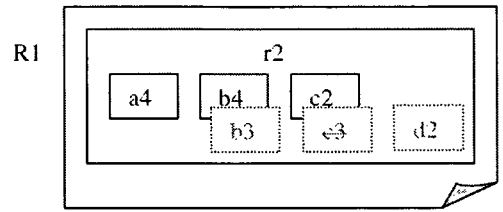
Figure 37:
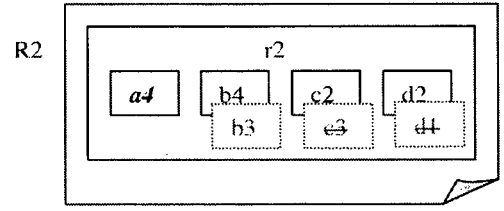
Figure 38:
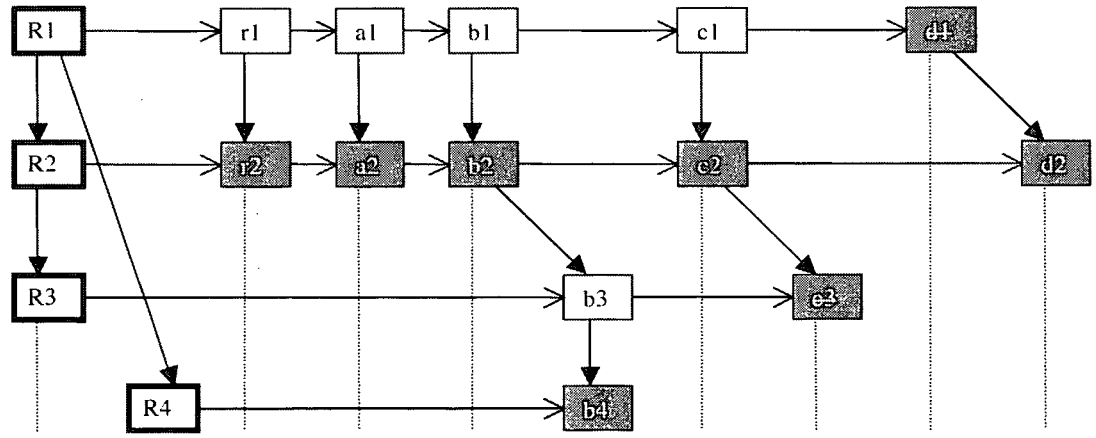

The user sees the resource R1 now as FIG. 36 presents it, and the R2 resource as FIG. 37 presents it.

The user can prefer an alternative object to a replacement object which is presented to him. Let us suppose that the user accesses the R1 resource after "R1 refuses R3 and d2" then selects the alternative object b3 and wants to modify it in b4. By the Rule 0 the derived resource R4 is created and one obtains the structure of FIG. 38 in which the branch in which b3 is extended by b4 (which takes b3 the marking of the most elaborate object.

Figure 39:
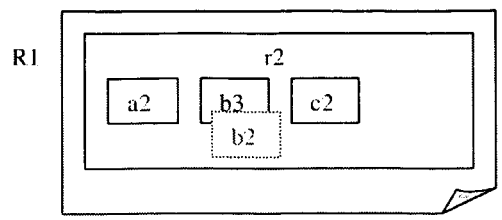
Figure 40:
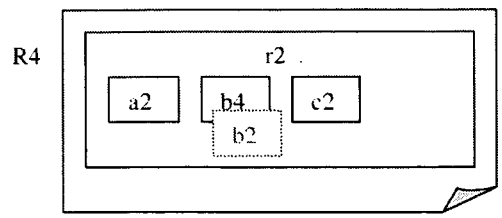
Figure 41:
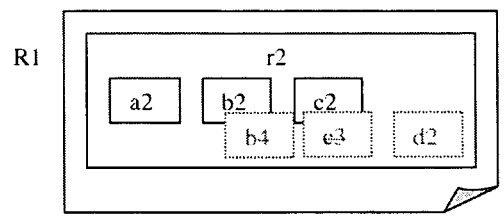
Figure 42:
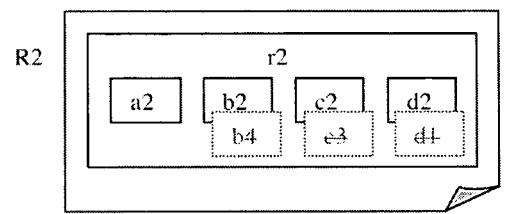
Figure 43:
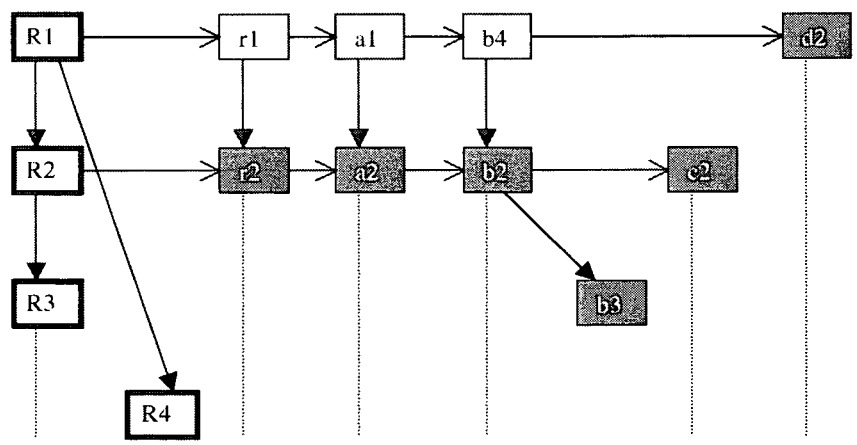
Figure 44:
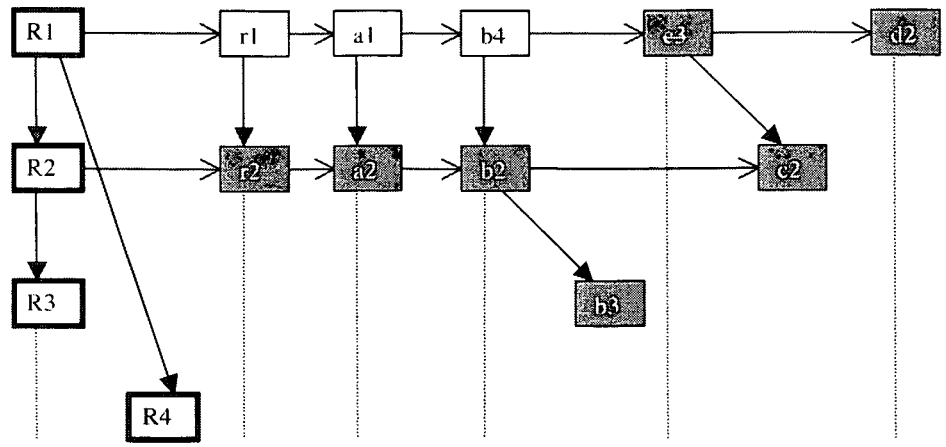

After selection of the alternative object b3 but before its modification (R4 is not yet necessarily created), the user sees the R1 resource as FIG. 39 presents it.[49] After modification (generating the R4 resource), the user sees the R4 resource as FIG. 40 presents it, R1 as FIG. 41 presents it and finally R2 as FIG. 42 presents it.

[49]Alternative of implementation: After selection of the alternative object b3 but before its R4 modification is directly created, the user sees the resource R4.

Let us suppose finally that alternative objects presented in R1, namely: b4, and d2, are accepted in R1. There is then the structure of FIG. 43.

R1, R2 and R4 present the same objects to the user, namely: r2, a2, b2, c2 and d2, and finally b3 as alternative object. As for R3 it presents r2, a2, b3 (b2 being alternative), c2 and d2. As c2 will be logically refused by the user since it has just accepted the absence of c[50], as an optimization the collaboration server can refuse it and FIG. 44 thus is obtained.

[50]On the other hand, for b2 one cannot decide so easily: the owner of R1 can decide to refuse it or not. However, insofar as they are atomic objects (as opposed to composite objects—this will be described further), taking into account the fact that R1 had preferred b4 to b2, one can carry out same optimization as for c, i.e. to refuse b2.

Figure 45:
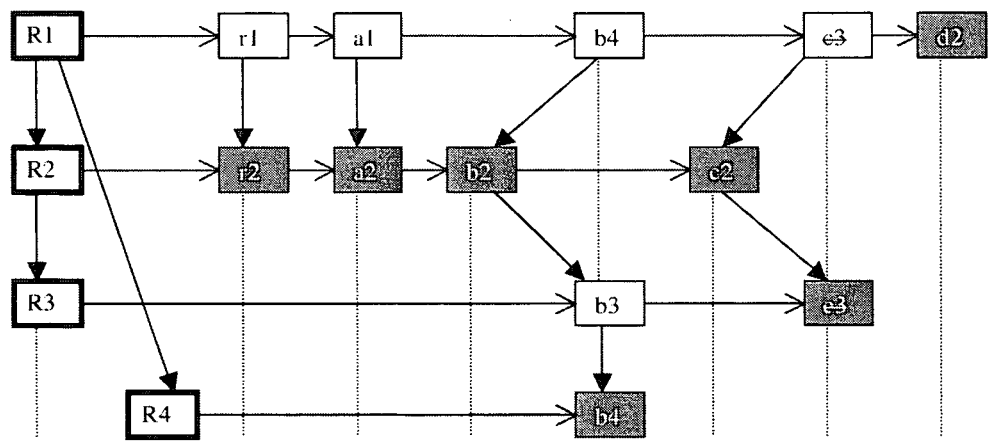

Alternative to Rule 3 (FIG. 45)

In this alternative, the following rule 3v replaces rule 3 stated previously:

Rule 3v: If the modification of an object is accepted (at upstream), this modification is propagated to the accepting object. If the accepting object and the accepted modified object are in different branches, then the accepting object and all its descendants till the first object from which a branch reaches (directly or indirectly) the branch in which the accepted modified object is, are moved to the branch where the accepted modified object is.

For the previous example where the owner of R1 accepts the alternative objects b4, and d2, the result is now on FIG. 45. At the level of R1:

b1 is replaced by b4, but b4 is moved (towards the right-hand side in the figure) to the branch where b3 is; note that b4 which is in R4 was not removed; consequently, when R1 is visited by the user, it is the replacement object b4 (and not b2) which will be presented to her;

moves (towards the right-hand side in the figure) to the branch where of R3 is; note that of R3 was not removed; consequently, when R1 is visited by the user, it is "the replacement object" (and not c2) which will be presented to her.

Replacement/Enrichment of Grains (FIGS. 46 to 49)

One now will take into account the fact that the objects are potentially composite, that the coherence between the various parts of a composite object is to be checked before deciding if a propagation must be made or not, and that with regard to the discussion with respect to Rule 3, must be taken depending on the cases, either the implementation approach presented first (Rule 3), or its alternative (the Rule 3v presented above).

It is the user who defines the "granularity" of the composite objects.

Instead of unitary objects as described up to now, the replacement objects and the alternative objects will be now "grains". One will not mark as being most elaborate (if it is the case) not only of the unitary objects but also of the grains.

Definition: A grain is a composite object whose modifications (of the objects that it contains) are propagated in "all or nothing"; i.e. they are (case 1) entirely propagated towards a corresponding object at downstream—case where there is no incompatibility of propagation;

(case 2) are not propagated at all towards a corresponding object at downstream—case where there is an incompatibility of propagation.

There is an incompatibility of propagation when the propagated modifications, starting from the grain source towards downstreams objects, are different for at least one downstream object which is already modified locally or to which a modification was already propagated starting from a closer source (this is defined further) than that of the known as grain source.

It should be noted that in the user interface, rather than (or in addition) to allow the user to specify which objects are (explicitly) grains and which are not, when she requests to the system to reify a content containing reified parts, better to allow her to un-reify the reified parts contained in the selection, or otherwise to specify if she wants that the changes of the reified parts are necessarily propagated together (when the downstream is not incompatible). If she specifies that the changes must be propagated together then this means that the object in question is a grain.

Figure 46:
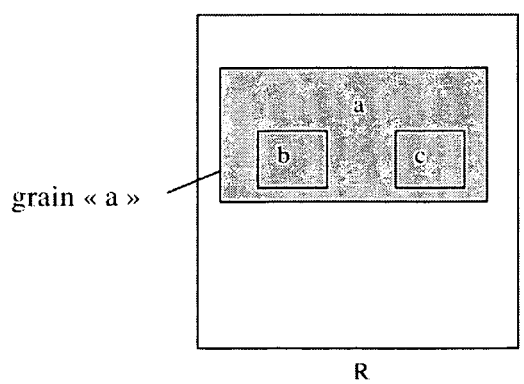

To describe the treatment of the grains, one will consider the example of a grain object "a" containing two objects: "b" and "c" (FIG. 46).

Figure 47:
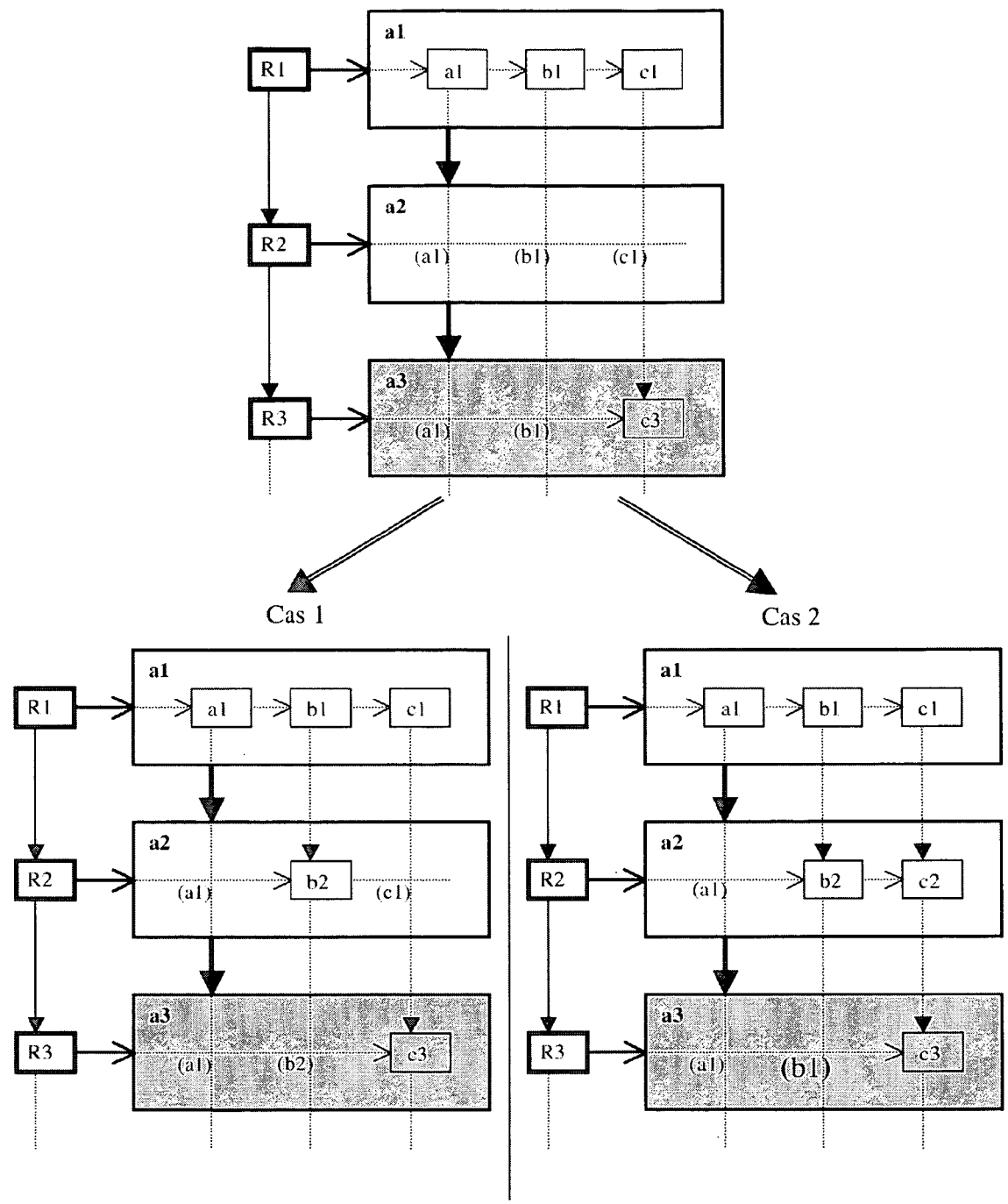

FIG. 47 presents an example in which such a grain a1 exists in a resource R1, then is derived as a2 in a resource R2 (derived from R1), then again derived as a3 in R3.

In this example, first of all, in R3, c1 is modified in c3—this is shown in the first part of FIG. 47 (in top of the figure).

The second part of FIG. 47 presents two cases for the continuation of the example:

Case 1: only b1 is modified in R2 (to give b2).
Case 2: b1 and c1 are both modified in R2 (to give b2 and c2).

Here how these modifications are propagated towards the downstream:

In the first case, the modification of the object b of the grain a2 is propagated towards the grain a3. Thus, one sees in the grain a3 the result of merging the modifications of the objects of the grains a2 and a3: the grain a3 contains the values a1, b2 and c3.

In the second case, the modification of the object b (b1 is modified in b2) in the grain a2 cannot be propagated in the grain a3.[51] Indeed, by definition of the concept of grain, b2 and c2 go hand in hand, which means that the fact of replacing, in the grain a3, b1 by b2 without also replacing c3 by c2 would be likely to provide an incoherent result, but as c3 results from a modification to which the source is closer (here the source of it is the object itself, since it is a local change) it is not question of replacing it by c2. Thus in the grain a3, one maintains the values a1, b1 and c3.[52,53]

[51] In fact, by its design even, the mechanism of transclusion (presented further) will not carry out this propagation. This is described with the section presenting the transclusion in "push".

[52] Indeed, there is still b1 because the modification in b2 thus could not be taken into account.

[53] If then the object a of R1 is modified in a2, this modification will be propagated to the grain a2 of R2 and from there to the grain a3 of R3, this although the couple of values b2-c2 of a2 (in R2) is incompatible with the value c3 of a3 (in R3). Indeed, one can imagine that a2 plays here only the role of intermediary to make forward a modification which comes from more upstream and that it would not be advantageous that it "blocks" the propagation from upstream.

The rules Rule 1 to Rule 6 stated in the previous sections apply now to the grains rather than to the objects that they contain. So we can replace the word object with the word grain in these rules and can replace rule 3 (or its alternative 3v) by the following one:

Rule 3g: If the modification of a grain is accepted (by upstream), this modification is propagated to the accepting grain. Then, each grain at the downstream of the accepted grain can be removed (and become thus an implicit grain) in the tree of modification of the grains, if it already reflects the contents of the grain which is immediately at its upstream. If a grain thus (marked as being) removed was the most elaborate, the nearest grain at upstream (in the same branch) becomes the most elaborate instead of it.

If the accepted modified object is not removed and if it is in a branch different than the one of the accepting object[54], then the accepting object and all its descendants till the first object from which a branch reaches (directly or indirectly) the branch in which the accepted modified object is, are moved to the branch where the accepted modified object is.

[54] (consequently owing to the fact that one of the objects which are at upstream of the accepted modified object and at downstream of the accepting object, refused the accepted modified object)

So we have the following rule:

Rule 7: When a modification of an object in a grain makes incompatible the corresponding grain at downstream, the corresponding grain at downstream is refused.[55] (This rule will be further illustrated with the section "Algorithms in Push").

[55] This rule 7 unifies the concepts of "object most recently modified" and of "the most elaborate object". Indeed, any modification which is not propagated to the objects which are at downstream (because being incompatible) refuses the latter, and the modification in question is thus carried out thus on the object more at downstream of the active branch. The modified object is thus inevitably as well the "most elaborate" object as the object "most recently modified" of the active branch (since all the others which are more at downstream are driven out in another branch!).

Figure 48:
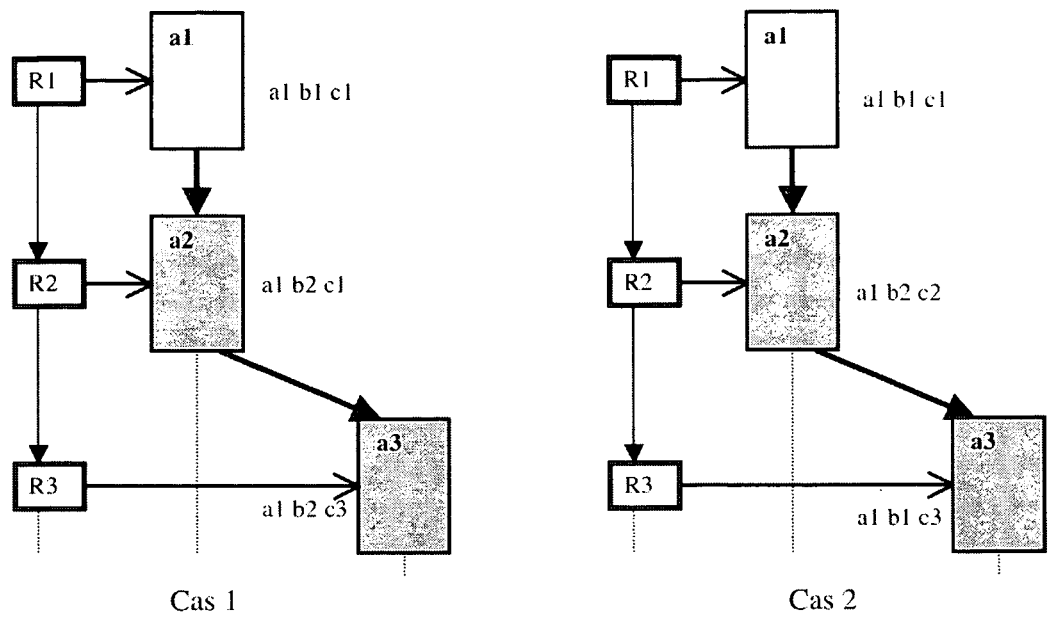

FIG. 48 shows that, if the grain a3 is refused by R1 or R2, starting from a2, a new branch is created starting from the branch where the grains a1 and a2 are, to contain a3.

Figure 49:
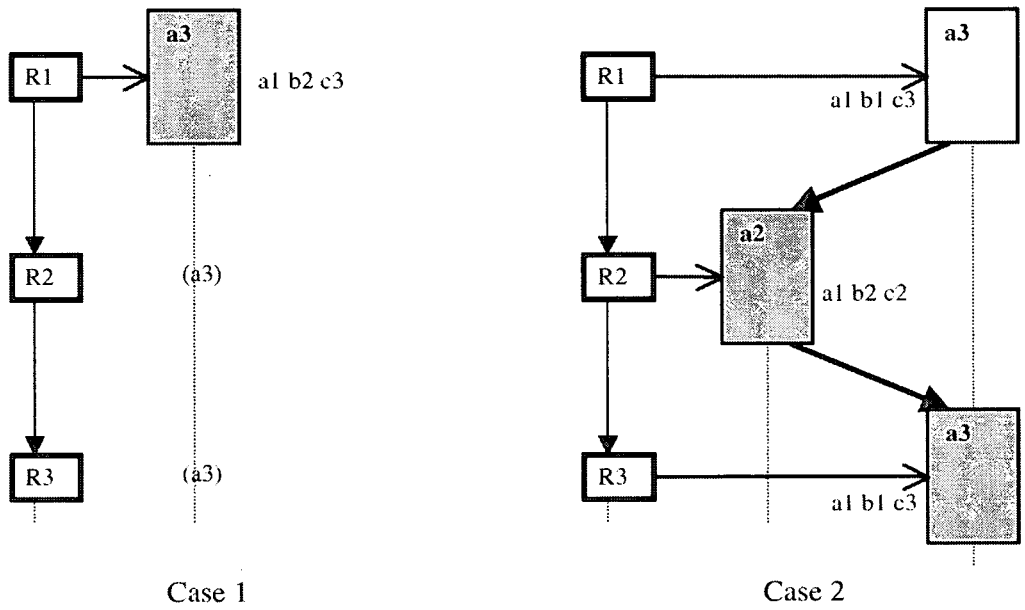

As shown in the FIG. 49, if the grain a3 is accepted by R1 (pursuant to the Rule 3g):

In the first case, the grains a of R2 and R3 can be removed since they inherit the grain a of R1 made up of objects a1, b2 and c3.[56]

[56] (thanks to the fact that there is not incompatibility between the b2 objects and c3 which belongs to the grain a of R1 and neither the modification which resulted in the b2 object in R2, nor the modification which resulted in the c3 object in R3)

On the other hand, in the second case, since the contents of the new grain a of R1 (composed of objects a1, b1 and c3) cannot be propagated towards the grain a of R2 (compound of a1, b2 and c2) because of its local modifications (b2 and c2), the grain a of R2 does not reflect the new grain a of R1 and cannot thus be removed and as grain a of R3 is in branch different (due to the fact that it had been refused), the new grain a of R1 is moved to the branch where the grain a of R3 that it accepted;

the grain a of R3 (a1 b1 c3) cannot be removed either since it does not reflect the contents of the grain a of R2 (a1 b2 c2).

The following section illustrates this process with a concrete example.

Figure 50:
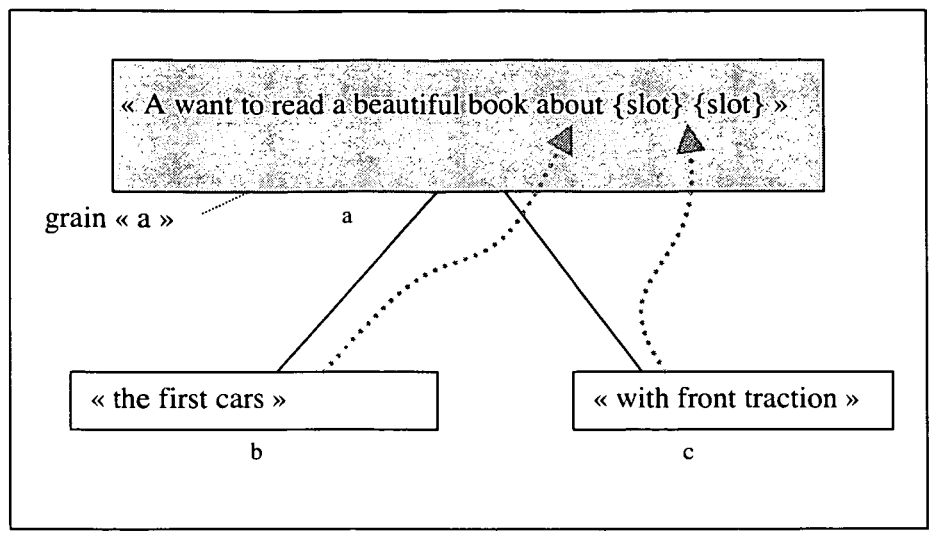

Slots (FIG. 50)

One can adopt a structure of "slots" for the values ("innertext") of the parents objects, each slot being a sort of landmark to include there the contents of the child object which corresponds to it. The essential advantage of this approach is that it makes it possible to see any movement or removal of a child object as a simple modification concerning the slot(s) corresponding to its (their) parent(s)[57].

[57] (the parent before movement can be different from the parent after movement—it is the case of the movement of a child object of a first parent to place within an other object which will be the new parent of the child object)

FIG. 50 presents thus a resource R containing an object (a) which itself contains two objects (b and c). Example in which, the respective innertexts are as follows:

a: "I would like to read one beautiful book on {b} {c}"
b: "the first cars"
C: "with front traction", what makes it possible to present in R the text "I would like to read one beautiful book on the first cars with front traction".

One now will again illustrate the advantage of specifying that a (with its children objects b and c) form a grain. Let us rebuild the two cases of the example of the previous section.

Let us call R1 the initial version of R (with objects a1, b1 and c1 corresponding to a, b and c).

R1 is derived in R2, then R2 is derived in R3, and then in R3, "with traction before" (c1) is modified in "with propulsion" (c3), which results in the sentence "I would like to read one beautiful book on the first cars with propulsion".

Then in R2, in the first case, only "the first cars" (b1) is modified in "the old cars" (b2), which results in "I would like to read one beautiful book on the old cars with front traction" (a1 b2 c1)

in the second case, "the first cars" (b1) is b2 modified in "the hats" (b2), and "with front traction" (c1) is modified in "bowler" (c2), which results in "I would like to read one beautiful book on the hats bowler" (a1 b2 c2).

Then, in R3, in the first case one has "I would like to read one beautiful book on the old cars with propulsion" (a1 b2 c3)[58]

[58]Because since "with propulsion" can replace "with front traction" (in the context of "the first cars"), a priori it must also go with "the old cars" which according to the user even goes even better with "with front traction".

in the second case, due to the fact that has is a grain, the propagation cannot be made and one always has "I would like to read one beautiful book on the first cars with propulsion" (a1 b1 c3). Indeed, the contents of the grain of R2 could not be propagated towards R3, considering that:

"with propulsion" cannot be replaced since it results from a local modification a grain solidarizes a1, b2 and c3, which means that one cannot propagate b2 without modifying c3 in c2—indeed, one sees well that to combine b2 ("hats") with c3 ("with propulsion"), to form "I would like to read one beautiful book on the hats with propulsion", would be inconsistent—but the source of c3 is closer (the source of it is the object itself since it is about a local change).

When an object has a parcelled out "innertext" because intersected with children objects, the approach of the slots is advantageous because it regards the innertext as being overall atomic. On the other hand, when they are not case (i.e. when there are no parts of innertext to manage), the approach which consists in regarding movements or removals of objects as modifications by themselves and not of their parent is much more advantageous because it makes it possible to operate with a finer granularity (the advantage is that the parent object is not overall "frozen" when a child object of the parent is moved or removed).

Thus depending on the case, the method will implement the slots or not. The activation of the slot (respectively not-slot) option can be automatic depending the case as explained above.

In the continuation we will use the terms "object" and "grain" in an interchangeable way except when the distinction between them is explicitated.

Process of Sorting of Alternative Objects by Rating

When the user selects an alternative object rather than another object which is presented to her[59], the rating of the owner of the resource containing the selected object is increased[60] and the rating of the owners of the resources containing the not selected objects are decreased.

[59](i.e rather than the object initially contained in the resource, or than the replacement object or another alternative object presented)

[60]In the same way, when the user derives a resource in which is a replacement object (the replacement object persists by default in the derived page) and that the user does not replace it, the owner of the resource from which this object comes from sees his rating increased.

To implement this, the rating of the owner of the resource containing each object selected by the user is maintained in the data-processing environment[61]. These ratings are relative to the user.[62]

[61]These ratings will for example be memorized and maintained in a rating server.

[62]A rating aggregated for a user group is also possible.

Thus the alternative objects can be prioritized automatically.[63]

[63]They can be sorted at the time of their presentation to the user and that which is best rated can be selected to be presented for example all alone.

For reasons of coherence, it is preferable that when an alternative object is presented, the alternative objects coming from the same owner are selected and that those are even selected among the alternative objects corresponding to the other objects which are in the same resource presented to the user.

Process of Sorting Alternative Objects by Contextual Relevance

History of the access to objects (or grains)[64] by the user (that one calls navigation) can be modelled using a "stack of context", where in theory with each object (being able to be presented to the user) is associated a score of relevance (whatever the method used to calculate the relevance) for the user at each level of navigation, and when an object is non-existent in the stack of context it is assimilated to an object whose score is equal to zero.

[64]Alternatively, this method will be used for the granutarity of the resources rather than to the granularity of the grains.

When the user navigates to access a new object, the system adds a level onto the stack of context.[65]

[65]On the other hand, when for example she clicks on the order "Back" of his Web browser the system pops a level.

For a given object, the contextual score is the average of the noncontextual scores at each level of the stack of context, weighted as a function of the depth. In order not to have to recompute all the scores each time, an exponential weighting is used, with the result that the contextual score on a certain level is the weighted average of the noncontextual score at this level and of the contextual score at the previous level.

In other words, for a given object, s being the noncontextual score at the last level and r the contextual score at the previous level, the contextual score at the last level is: lambda.r+(1−lambda).s (lambda being the weighting constant between 0 and 1, in theory lower than ½: the larger lambda is, the more the past has importance).

Insofar for each alternative object the noncontextual score of each other object is known in the collaboration server, one can select the alternative object for which the not-contextual scores of the other objects compared to it are closest to the context of navigation (i.e. closest to the contextual scores at the last level of the stack of context).

It should be noted that in place of considering all the other objects one can be satisfied of a (more restricted) set of representative objects, for example categories, and select the alternative object nearest to the objects representative of the context.[66]

[66]By selecting we also mean sorting using the aforementioned selection criteria.

Process of Replacement by Co-Identification

The resources which constitute a SCR can be shared by a set of users (at least in read-only, for example these resources can be the Web pages constituting an Intranet of company), or not to be shared (for example files and not shared folders of a personal computer) and are then not accessible by all the users from the SCR.

A not shared resource must be imported, for example received by email, to benefit from the automatic functionality of replacement. In this case, if it contains an object more recent than—and co-identified[67] with an existing object, then it replaces it. Indeed, the Co-identified imported object is placed in the tree of modification of the objects and becomes most elaborate within the meaning of Rule 5.

[67]By co-identified objects one includes the objects having the same discriminating description, within the meaning of the articles of Guha, obtained by semantic negotiation.

A newly created object plays the same role as an imported object, with regard to its Co-identified objects.

To be Co-identifiable, an object must at least be characterized, in other words: the meta-data which characterize it must be indicated. One proposes here an original process similar to the "brush of style" (to reproduce the style) of a tool like Microsoft Word, to propagate standard information of description of object between various objects, characterized in that with each object are associated the meta-data of description, and in which the method includes the following stages:

entry in a mode of propagation on the initiative of the user, selection of an object which one wishes to borrow the description meta-data, selection of at least another object to affect the same meta-data of description to him.

The user interface is adapted to mask to the user the description meta-data.

The same process makes it possible to propagate meta-data of constraint of publication, as described further with the section "Meta-data of constraint from diffusion".

Method of Transclusion

In the implementation described here, the content of each derived resource according to Rule 0 (see above the section "Creation of derived resource") is transcluded.

First of all let us recall that classical transclusion is inclusion by reference. A traditional example of transclusion is the application of the HTML tag "img" which makes it possible to include an image by reference. Transclusion consists in creating an image ("the result") of at least one object ("source") and to place this image within another object ("the container").68[69]

[68]For sake of convenience, we write "transclusion" instead of "result of transclusion". In addition, by "transcluded object" we understand "object resulting from transclusion" (as opposed to source object) except when the context makes understand the opposite.

[69]The sources objects can be distant. They either are identified directly, or implicitly as a result of a request of research. For example, one can include in a Word document the result of a request to a database. In the continuation by "the source (of a transclusion)" we mean "the source object or the set of the sources objects (of the transclusion)". When the container is viewed thereafter, a presentation of the source will be visible at the location of the transclusion. In other words, each time the containing object is opened or refreshed manually or automatically, the current (i.e. most recent) version of the source will be presented at this location.

The technology of transclusion described here differs from classical transclusion in that it makes it possible to modify the result of the transclusion. Indeed, the user must be able to modify the contents of a derived page (as described up to now).

The user can define the modifications to be carried out while acting directly on the result of the transclusion, by using a common tool for manipulating the content, for example the tool enabling her to manipulate the container (and its local content) or the tool which she would use if she wanted to modify the source. When the user thus directly modifies the result of a transclusion, the results of the actions she carries out (such element is removed, the contents of such other element is modified, another element is moved and modified . . . ) are recorded in order to be able to find these modifications automatically the next time that the object is updated. For example if the user swaps two parts of a transcluded object, when the content of this object changes at the source, after refreshing the result the two parts preserve their new position but their contents still correspond to (reflect) that of the source.

To be able to modify the result of the transclusion in the same way as if one modified a local copy of the source[70], but without loss of the link with the source, represents the primary characteristic of the technology of transclusion described here.

[70](the result remaining nevertheless held up to date with respect to the source, but modifications made on the result having higher priority over the modifications that appeared at the source)

Now we will describe some concepts which will be necessary to understand the implementation of the method, then we will give the algorithms which will make it possible to refresh each transclusion (i.e. to update the derived resource).

Identifier

Each object has an identifier. The locally created objects have an atomic identifier, which is an integer unique in the system.

In the same way, each transclusion has an atomic, also unique identifier.

The objects seen through a transclusion have a composite identifier, noted A:B, where A (the head of this identifier) is the identifier of the transclusion, and B (the tail of this identifier) is the identifier of the object at the source of the transclusion.

We use brackets for clearly delimiting the head and the tail where necessary. In the absence of brackets, the sub-identifiers extend as much on the right as possible. For example, 1:2:3:4 must be read 1:(2:(3:4)). Another example, if A=1:2 and B=3:4 then A:B=(1:2):3:4.

Transclusion

In the following sections presenting the algorithms, a transclusion A is regarded as on the one hand a set of objects "seen through" A, and on the other hand as a set of modifications (Differences) regarding these objects.

The specification of a transclusion consists of the two following parts:

1. the stored result, called "current version"[71], of the transclusion, built according to the last accessed version of the source;

[71](in the context of resource derivation, this term means "content of the derived resource")

2. the specification of the modifications (called "differences"[72]) applied to the result of the transclusion.

[72](or "changes")

The current version of the result of a transclusion is the result of the transclusion such as it was presented the last time that the page was posted. This current version is preserved, and is typically updated by the system each time the user accesses it.

It can be interesting to store in the current version only the parts created locally, and for the remainder to keep only the references from where it can be obtained.

The differences indicate the sources of the transclusion and the modifications to be applied to them. In the approach described here, the differences are related to the current version[73] and thus do not need to contain "in extenso" the content and the position of the objects to be modified.

[73]The differences refer to the objects of the current version (i.e. to their respective identifiers) to define the transformations that are applied.

Typically, once the modifications made by the user (in the derived page) to the content of the result of a transclusion are detected and recorded in the differences, the next time that the said derived page is accessed (or simply refreshed), these modifications are applied again to an updated version of the source, while making use of the content of the derived page (current version) to get the content and position of the modified objects.

These modifications include modification or removal of an object seen through A (thus whose identifier starts with "A:")

movement of an object seen through A, whose parent before and after movement is also an object seen through A.

creation of an object (created locally or seen through a transclusion different than A) as child of an object seen through A.

movement of an object seen through A in order to place it as child of an object created or seen through a transclusion different than A. A particular case is the following: when the user carries out a transclusion, the algorithm, to execute this operation, initially will create the transclusion but at this moment the transclusion is not yet accessible (because no object seen through this transclusion is yet placed as child of an accessible object.) The second stage is then nothing else then a movement of one of these inaccessible objects in order to place it as child of an accessible object.

It should be noted that in case of movement of an object of a transclusion to another transclusion or of creation of a transclusion in another transclusion, this modification will be "shared" by two transclusions.

Also note that when a descendant of result of transclusion is moved out of this result, it is necessary to create (in addition to the information of movement in the differences of the transclusion) a second object "result of transclusion". In terminology XML described below, that means that there will be two nodes "Transclude" with the same identifier of transclusion (attribute "id").

By convention, we say that an implicit transclusion does not contain any modification. Indeed, it will be said that such modifications will be treated by the transclusion by which this implicit transclusion came. For example if an object ((1:2): 3):4 is modified, this modification will be associated with transclusion 1.

The differences can be represented in XML like illustrated for the following example:

```
<Differences id= " 8 " >
    <FirstSentences id= " 8 " count= " 3 " keepChildren= "true"/>
    <Modify id= " 8: 2 "/>
    <Move id= " 8: 3 "/>
    <Modify id= " 8: 6: 4: 3 "/>
    <Move id= " 8: 6: 4: 3 "/>
    <Create id= " 9 "/>
    <Delete id= " 8: 5"/>
    <Transclude id= " 10 " ref=" document7#7"/>
</Differences>
```

In this example, the Differences node indicates the identifier of the transclusion, which is then referred by a Transclude node where the result of the transclusion have been placed.

Then all the nodes which are children of this Differences node indicate the changes to be applied to the source of the transclusion to build the result. The identifiers "id" refer to the current version of the transclusion.

In the above example, FirstSentences is an operator who selects the first sentences of the content of an object (see further the section "Transclusions with transformations").

In the case of objects created (Create), modified (Modify) or moved[74] (Move), the new content and/or position are obtained in the current version and thus are not specified in the differences.

[74]In the approach of the "slots" described above, there is no operation of movement of object as such since a movement of child object amounts modifying (the innertext) of its parent object.

Transclude indicates a new transclusion within the transclusion in question and thus refers to another differences object (the attribute id="10" being the identifier of the transclusion, with which another Differences object is associated, and ref being the source of the transclusion. In this example, the identifier of the result of this transclusion will be 10:7. It should be noted that the source can be identified by a reference or a request.).[75]

[75]We saw that the content of each derived resource is transcluded from the content of the source resource. But the process of transclusion can also be used for transcluding, in a derived page, an unspecified object being in an unspecified page. Thus a derived page can be used to assemble objects located in external pages. Thus, the "differences" associated with the result of transclusion constituting the contents in a derived resource, can themselves include transclusions. These can then themselves benefit from the replacements and enrichments coming from the replacements and enrichments from the source. Each object of the result of a manual transclusion benefits from the advantages described here (namely the replacements and enrichments), provided that its source is in a resource managed within the framework of the same SCR. The said object thus automatically will be replaced by an object of replacement according to Rule 5 and will be enriched by alternate objects according to Rule 6. However, if for a given object several objects of replacement are given, the additional objects obtained from downstream (apart the one from derivation) are regarded as alternative objects.

This example also shows that to move and modify a same object (8:6:4:3) two operators are placed in the Differences.

All these operators can be implemented in modules so that new types of operators can be added to the system in order to extend its possibilities. In this example, FirstSentences could be selected by the user in a (extensible) list of operators at the time of the transclusion or thereafter in associating with it.

Let us recall that the changes Move, Modify and Create were created by the user while acting directly on the objects, the same way as if she modified a local version.

The user can ask that the contents of the source of a transclusion not be included at all, but that a simple hypertext link is placed as result, pointing towards the sources. The Differences object, in this case, would resemble this:

```
<Differences id= " 18 " >
    <HyperLink text= " click here "/>
</Differences>
```

This Differences object could in general be omitted since the presentation of the result does not depend any more of the content on the source and does not have to be updated any more. In fact one differently does not treat a hypertext link placed directly and a transclusion presented in the form of link.

In the same way, a reference or a (unilateral) relation of an object with another is a transclusion whose result neither is built nor is presented (nor even includes a simple hypertext link).

If information is in XML notation, an object is an XML element and the content of the object is the "innertext" of the XML element. The attributes and the children are both regarded as children objects, however the attributes of same name coming from different sources must be merged.

Implicit Transclusion, Internal Transclusion

When the result (3:2 in FIG. 51) of a transclusion (3) is visible through a transclusion (4), we say that the image of this result (4:3:2) is the result of an implicit transclusion (4:3) of the image (4:2) of the source (2) of the first transclusion (3), and this first transclusion (3) is called internal transclusion (internal to the second transclusion (4)).

Figure 51:
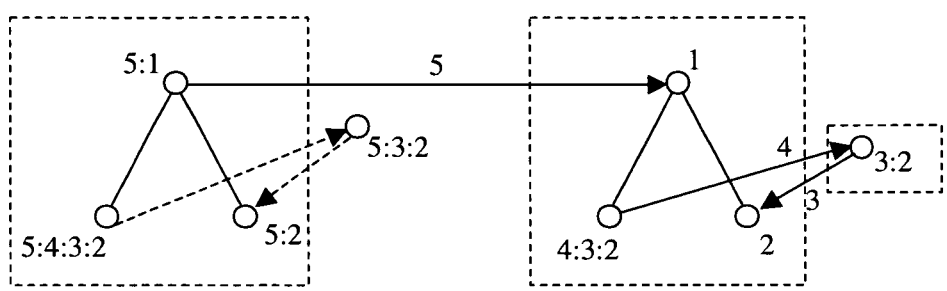

In this example, the image (4:2) of the source (2) of the internal transclusion is also visible through the transclusion (4), but this is not always the case. In the contrary case, the source of the internal transclusion will simply be invisible. The example of FIG. 51 gives a concrete consequence of it. In this example, we can say that 4:3:2 is an indirect transclusion of 2, because the modifications applied to 2 will be indirectly transmitted to 4:3:2.

When this structure is seen through transclusion 5, the indirect transclusion is maintained, although it transits by an invisible object (5:3:2). Thus, modifications applied to 5:2 will be reflected on 5:4:3:2.

Equivalence of Identifiers

Figure 52:
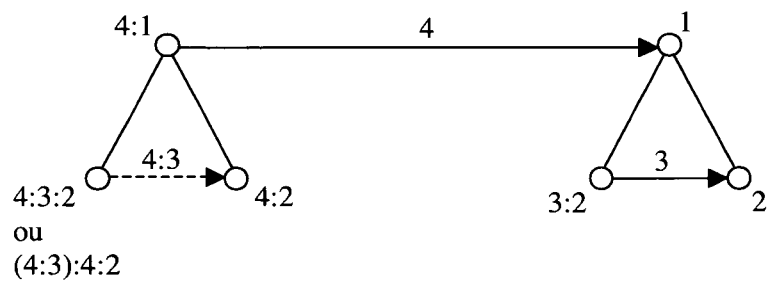

The existence of an object can sometimes be obtained by several ways, in the presence of implicit transclusions. In the example of the FIG. 52, 4:3:2 is at the same time the 3:2 object seen through transclusion 4, and the 4:2 object seen through the transclusion 4:3 (3:2 and 4:2 are the two sources of the 4:3:2 object). By considering the second way, one obtains the identifier (4:3):4:2 (we place brackets in order to clearly identify the head of this identifier).

In practice, one will regard these two identifiers as equivalents, and more generally, for all A, B, C, (A:B):A:C is equivalent to A:B:C.[76]

[76] The concept of density, described below, will in particular serve to determine equivalence between identifiers.

Calculation of the Sources of an Object

Each object having a composite identifier has a set of sources represented by various (equivalent) forms Ti:Si of its identifier, where Si is the source and Ti the transclusion by where it transited. For example, sources of 4:3:2 are represented by 4:(3:2) and (4:3):(4:2).

The calculation of this set is carried out as follows:

We begin with a form T0:S0 of the identifier.

Ti':Si' being the pairs transclusion-source of S0, the set of the sources is represented by (T0: Ti'):(T0:Si') for each i, in addition to T0:S0.

Origin of Information

While calculating a structure two types of information are associated which are its position and its content (except its children—the fact that an object A is child of an object B is memorized as a position of A). For the position as well as for the content we associate with it an origin of the form P!O (i.e. Path!Origin).

Distance of Sources

Since an object can have several sources, it will be necessary to determine the importance of these sources so that, when several of them are modified, one can determine whose the object must inherit information.

The goal is that a "close" supplier has a weight stronger than a "distant" supplier. Here "distant" means through a "higher" (i.e. larger, more including) transclusion; for example, transclusion 4 is higher than the transclusion 4:3.

Rule 8 In the presence of several candidate sources for the content (or the position) of an object, the one whose distance is smallest is preferred.

First Method

A first method is based on the concept of "density" of identifier.

One notes d(X) the density of an identifier X.

A density is of the form ΣSxdx where Sx is a polynome in s and dx is the weight of the atomic identifier x. The polynome Sx is called partial density of x in X.

The density is calculated recursively as follows (s is a symbol without defined numerical value):

The density d(n) of an atom is dn.

The density d(A:B) of a composite identifier A:B is $(1-s) d(A) + s d(B)$.

As known, an algorithm of simplification of polynomes consists in replacing all the products of sums by sums of product, then for each x to gather the terms in dx.

For example:

$$d(4:3:2) = (1 - s) d(4) + s d(3:2)$$
$$= d4 - s d(4) + s((1 - s) d(3) + s d(2))$$
$$= (1 - s) d(4) + (s - s2) d(3) + s2 d(2)$$

In the same way, the density of other shape of this identifier is the following one:

$$d((4:3):4:2) = (1 - s) d(4:3) + s d(4:2)$$
$$= (1 - s) ((1 - s) d(4) + s d(3)) + s((1 - s) d(4) + s d(2))$$
$$= (1 - s) d(4) + (s - s2) d(3) + s2 d(2)$$

Calculation of the Proximity of an Object

To calculate the proximity of an object P with respect to an object R, one replaces in d(P) each dx by the partial density of x in R. This gives a polynome in S.

The algorithm to compare such polynomes $A=\Sigma a_i s^i$ and $B=\Sigma b_i s^i$ is the following[77]:

[77] s tends towards zero while remaining positive.

1. To initialize J with 0.
2. If aj<bj then A<B
3. If aj>bj then A>B
4. If not to increment J and return to step 2.

For example, 2s4<s4+s3<2s4+s3<s.

The more the value is large the more the object is close.

Second Method

While transcluding an object which itself includes a transclusion of "descendent" objects, we define for the transclusion between descendent objects a shorter distance.

Thus the "length" of a transclusion can be determined as follows. We give a length of 1 to the non-implicit transclusions (having only one term in their identifier), a length a little bit smaller 1−δ (δ tending towards 0) to the implicit transclusions having two terms, still a little bit smaller (1−2d) to the transclusions having 3 terms, and so on. Thus one gives value 1−(n−1)δ to the transclusions having n terms (by term we mean the atomic identifiers composing the transclusion).

To compare the respective distances of two sources, the distances of the transclusions through which each one transits are added, then their terms without the δ are compared and if they are the same then their terms with the δ are compared as well. The nearest source is thus that for which the distance is shortest.

For a local modification, the source is at a null distance. Thus when one compares a local modification with a modification coming from upstream, the same rule applies and the local modification thus has the priority compared to any other source of propagation of modification.

Method of Transclusion in "Pull"

We will now describe a first method (known as in "pull") to implement transclusion.

First of all we describe a "local algorithm" which makes it possible to determine the content and the position of an object, then a "global algorithm" which allows, by using the local algorithm, to build an object and all his descendants.

Then, to update a current version, the global algorithm can be called on the root of this current version.

Calculation of an Object—Local Algorithm

This algorithm will calculate the information (position+ content) of a given object and the origin of this information (separately the origin of the position and the origin of the content).[78]

[78]Alternatively, one can adopt the approach of the slots, previously described, to consider that movements are modifications of parents, and to thus avoid treating movements in a way different than the modifications.

The stage in the algorithm is noted in square brackets.

The two types of "information" are calculated, i.e. the position and the content of an object, independently but the algorithm being similar for both we prefer a generic algorithm to calculate the information (then to specialize it).

Initially the algorithm has to determine if the information is produced by the object itself. In the case of a created object, this is always true. If the object comes from a transclusion, the transclusion maintains a list of modified objects (in its Differences), which thus makes it possible to know if information were produced by the object itself or not. [local1]

If the information is produced by the object itself, its origin is !X (where X is the identifier of the object). [local2]

If information is not produced by the object (X) itself:
Ti:Si being the set of the pairs transclusion-source for this object and Pi!Oi being the set of the origins (path!origin) corresponding to these sources[79] [local3]

[79]The origin of information for the sources will be typically obtained by a recursive call to the local algorithm, on each source. The local algorithm does not risk an infinite loop because it will always end up reaching, by going up the transclusions, the objects providing their contents locally, eventually by reaching objects not being in a result of transclusion.

the proximity of each Oi to X is calculated. [local4]

Oj being the nearest, the origin of information for X is Tj:Pj!Oj [local5] and the information for X is obtained from Tj:Sj [local6].

In the case the calculated information is the content of the object, it will be simply copied from Tj:Sj.

In the case the calculated information is its position, it will not be copied but the identifiers (parent F and predecessor B of Sj) will be extended with Tj. The parent of X will be Tj:F. The information of the parent has priority over the information of the predecessor. Thus if Tj:B is not a child of Tj:F, X will be placed (by convention) as last child of Tj:F. Otherwise it will be put (by convention) just after Tj:B. [local7].

Calculation of a Structure of Objects—Global Algorithm

Each object must memorize the fact that it was already treated by the local or global algorithm, respectively, so that each algorithm does not treat any object more than once.

We call X the object on which the current pass of the global algorithm is carried out.

When X is a locally created object (and hence it has an atomic identifier), its content and the list of its children is already known, it has thus just to carry out the global algorithm on his/her children. The origin of information (for its position and its content) is of course just !X. [global1]

If on the contrary X comes from a transclusion, say Ti:Si is the set of the sources. Then the local algorithm is carried on the following objects:

X itself (to obtain its content) [global2]
For each i, for each Cij child of Si, Ti:Cij. [global3]
All the objects that the transclusion moved or created [global4].

Then, the global algorithm is carried out on the children of X.

Method of Transclusion in "Push"

The process of transclusion in "push"[80] can be implemented by means of three tables, managed in the collaboration server and in which the differences are stored[81]. These tables are the following:

[80]Note that advantageously the push approach can be used to update results of persistent requests to a database. Let us take the case of a RDF (see the recommendation of the W3C) database (containing thus triplets {object; property: object}) and of a query language such as SPARQL (see the recommendation of the W3C). One can model the space of the triplets in the form of a structure of tree where the nodes represent "abstract" triplets (each element of an abstract triplet represents the set of possible objects or properties) and where the leaves represent the existing data in the database.

Each persistent request corresponds to a subset of this space, i.e. to a set of sub-trees (represented by a set of abstract triplets). When a set of concrete triplets i.e. leaves of this tree are modified, this modification will be propagated in push, i.e. to re-execute the concerned persistent requests which are simply the ancestors of the modified concrete triplets.

[81]Each difference (be it a local change or a consequence of a change at upstream) can be characterized by the type of change, the identifier of the changed object and the identifiers of its ancestors . . . .

Table of Transclusions
Table of Local Changes
Table of the Changes (coming) from Upstream[82]

[82]Actually thanks to the Rule 8 (which envisages a null distance for local modifications) the table of the changes from upstream can be enough.

This approach makes it possible to propagate the changes of the objects of the sources of the transclusions, to the results of these transclusions, by following these transclusions thanks to the table of transclusions.

The idea is that any transclusion is indicated in the Table of Transclusions, and for any result of transclusion, if it is itself modified directly, the information of the existence of this modification is indicated in the Table of Local Changes, while if it must be updated following a modification made upstream, the information of the existence of this modification as well as the address of the modified object[83] are in the Table of the Changes from Upstream.

[83]If not the approach of the slots is taken, if it is about a movement or a removal of object, the identifiers of the parent and the predecessor (if any) will be memorized, and the algorithm will retain, separately for the contents and for the position, the source having the shortest way.

To access a resource R, normally the extension of the information manipulation tool obtains its current version from the content server which contains it. In parallel it asks the Table of Changes from Upstream if there were changes for this resource (and for which objects there were changes), in which case this table returns[84] the addresses where the objects in question are. Then, the extension of the information manipulation tool obtains these objects and assembles them, within the current version received for the resource in question, in order to obtain a new current version. [85]

[84]If not the approach of the slots is taken, and if it is about a change of position, the parent and the predecessor (if any) are returned.

[85]Advantageously the latter is then communicated to the server which hosts the resource R, so that it replaces the previous current version, and the Table of the Changes from Upstream can indicate, for the entries corresponding to these changes, that the change in question is already taken into account in the current version and that there is no need to recover it. Obviously, during a new change of the same upstream object this indication is removed in the entry in question.

When a (local) change is carried out on an object O which is in a transclusion result within a resource R, the server containing R is informed of this change, the entry (or entries) corresponding to that change is (are) inserted in the Table of Local Changes, and as any local change has precedence over updates due to changes coming from upstream, the corresponding entry(ies) are removed in the Table of Changes from Upstream. In addition, if in the Table of Transclusions, a transclusion taking as source the object O itself or one of its ancestors is indicated, the information of the change of the corresponding object resulting from this transclusion is added in the Table of the Changes from Upstream. This information contains also the identifiers of all the ancestors, so that if another transclusion indicated in the Table of Transclusions has as source the said corresponding object or one as of its ancestors, another information is added in the Table of the Changes of the Upstream, and so on until there is no more corresponding transclusion in the Table of Transclusions. Each new information of change of an object resulting from a transclusion is added with the information of distance between the source object and the result object. Thus, each time an information of change is to be added in the Table of the Changes from Upstream for the same result object, it is actually added only if the distance of the source for the considered transclusion is lower than the distance of the source for an already existing change information (if any), in which case it replaces it.

It should be noted that in this approach, it is not necessary to store in the Table of the Changes from Upstream information concerning the change of an object resulting from a new transclusion, since the change is then already taken into account in the current version and when (if) the nearest source is modified again, an entry will then be inserted in the Table of the Changes from Upstream.

However, if the objects are frequently modified it can be advantageous to insert information concerning the change of an object resulting from a transclusion only the first time, i.e. when the entry corresponding to the change has just been created in the Table of Local Changes. In this method, when a new transclusion is inserted in the Table of Transclusions, information for all the objects contained in the result of the transclusion is inserted in the Table of the Changes from Upstream with their creation date. In addition, a date of modification is memorized (and maintained) with each entry in the Table of Local Changes. With each access to a resource, the date contained in the Table of the Changes of the Upstream is compared with the date of the change of the source in the Table of Local Changes. If the modification of the source is more recent, then it is requested from its content server and the Table of the Changes from Upstream is updated with the new date.

It should be noted that during the execution of the algorithm, it is not only necessary to consult the table of transclusions but also all information of movement in the table of local changes. FIGS. 53 and 54 show why it is necessary.

In the first of the two drawings of FIG. 53, a transclusion from (the object) 1 is carried out, then 10:4 is moved in the result. Then, in the second diagram of FIG. 53, at the source, 4 is moved out of the tree of 1. However 10:4 does not disappear from the result because its position had been fixed during this movement. The contents of 10:4 must thus remain synchronized with that of 4 (for example, if children are created for 4 then corresponding objects must be visible as children of 10:4).

When 4 is modified, 4 and all its ancestors are sought in the table of the transclusions and in the set of the movements indicated in the table of local changes. Thus the entry recording the movement of 10:4 will be found, which will make it possible to propagate this modification.

FIG. 54 presents a second scenario.

Here it is about a movement of 10:4 out of the result of the transclusion. Here still it is wished that synchronization between 4 be 10:4 is ensured, and that works as in the preceding scenario if the movement of 10:4 during the propagation of modifications is also taken into account, therefore to some extent 10:4 is seen like the result of a (virtual) transclusion of 4.[86]

[86]The current version being updated or not, the entire structure of the transclusion results can be maintained (in the collaboration server) in order that the ancestors list remains always correct.

Mixed Structures

The algorithm in push is interesting when the modifications at upstream are less frequent than the access (or refresh) at downstream, in particular when the source is inside the system and thus can automatically be informed.

In certain cases it can be desirable to have mixed structures, where chains of transclusions are partially in pull and partially in push (each transclusion can be in push or pull, independently of the others).

No particular work is necessary in the "push-pull" case, i.e. the transclusion in pull of a transclusion result which itself is in push. Indeed, when the object at upstream is modified, the intermediate object is notified (i.e. an entry is placed in the table of changes coming from upstream). The object at downstream is not notified, but, functioning in pull, it will consult the intermediate object when it must be presented, and will see its new content. This configuration can for example be interesting when the object at upstream is seldom modified but the intermediate object is often.

Figure 55:
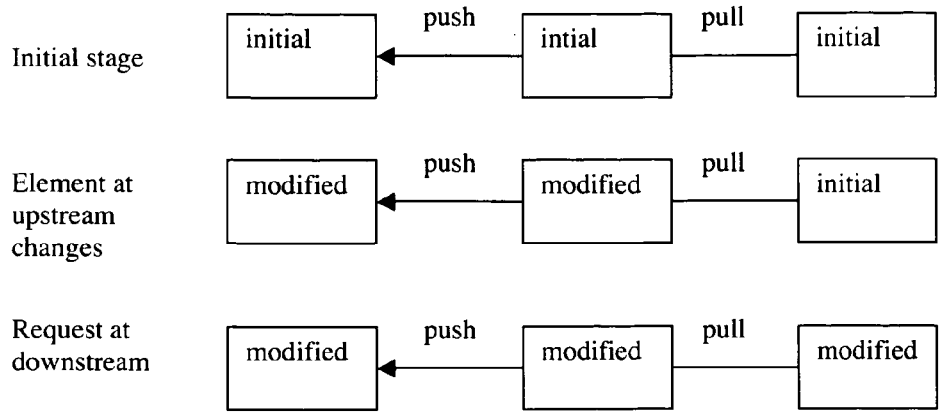

FIG. 55 shows the evolution of the current versions during a modification at upstream. The first row shows the state before modification. On the second row the upstream is modified, and the modification is reflected on the intermediate object but not on the object at downstream. The last row shows that the change is observed at the time of a request to the downstream (contents of the intermediate object being copied to the downstream).

The case "pull-push" requires a particular treatment. Indeed, a modification at upstream will not be propagated to intermediate object, because of its pull nature, and a request for the downstream object will not cause a request to intermediate object, the table of changes from upstream not having been modified.

This situation is treated in the following way:

By building the current version at downstream the objects whose content (or position) were obtained by the upstream are marked, with direct references towards this content. When the object at downstream is presented, update of the concerned parts is carried out, sending the request directly to the object at upstream (and if it is itself result of another transclusion in pull, the request will be able to continue, in cascade, according to the normal functioning of the algorithm pull).

This is interesting if the differences applied by the intermediate object do not change often and that the object at upstream is frequently modified or cannot notify the updates to the table of change (for example if it is an external object). The interest of this approach is to have the advantages of the "push" method (by avoiding the requests in cascade while the user waits), and the advantages of the pull method (that the object at upstream is questioned only when necessary).

Figure 56:
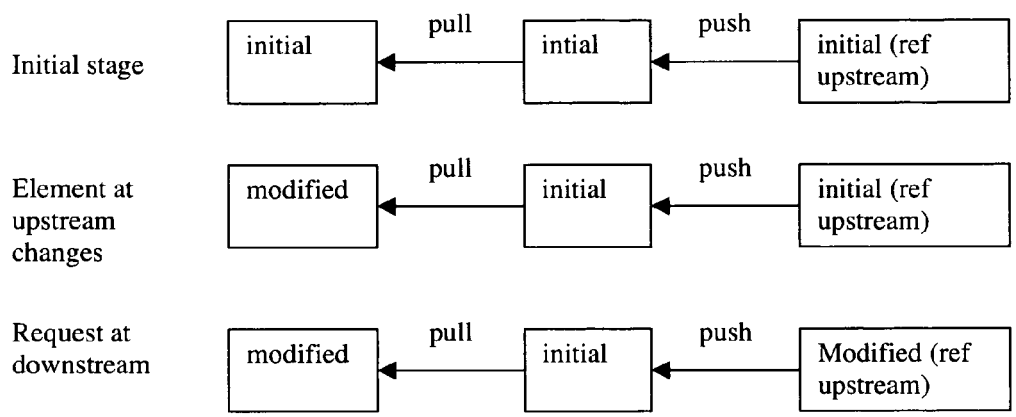

FIG. 56 shows the same scenario as the preceding figure. One sees from the first row that the object at downstream contains a reference to the object at upstream, indicating that the content will have to be refreshed (in pull) at each request.

During the modification at upstream, the upstream not being referred by a transclusion in push, no content is transferred. At the time of the request for the object at downstream, the content is updated, via the reference which is in the current version. One sees well with the last row that the reference bypasses the intermediate object which is never updated or even questioned (indeed, any modification made to the intermediate object is automatically sent to the object at downstream, by the push method).

Obviously, arbitrarily complex structures are possible, for example that an object has both transclusions in push and transclusions in pull, as well as an alternation push-pull-push . . . .

Figure 57:
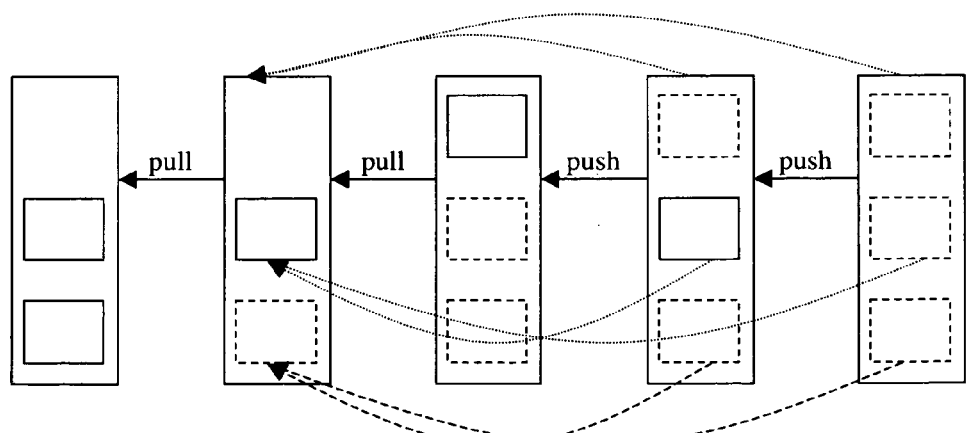

FIG. 57 shows an example a little more elaborate, of three transclusions in cascade in the situation pull-push. The objects in full lines are modified locally, not those in small contiguous lines. The arrows in small contiguous lines indicate the references to be obtained in pull, and the arrows in dotted lines indicate the references to be only consulted to know if new children appeared (the inner-text being obtained in the current version in these cases).

Centralized or in Cascade Structure

Both the pull algorithm and the push algorithm can be implemented either in a centralized architecture (with a collaboration server) or in an architecture "in cascade".

The centralized method is as follows.

The collaboration server manages the table of transclusions and the table of local changes (describing the differences objects for the transclusions).

In the case of the push method, the content servers or the extension of the information manipulation tool inform the collaboration server of a change to be brought in these tables, whereas in the case of the pull method these tables work like a cache, the collaboration server, at each request, querying the content servers.

Thus, the algorithm entirely works on the collaboration server, and the content servers don't communicate between themselves.

Whereas the method in cascade is as follows.

The content servers themselves manage the table of transclusions and table of local changes. For the transclusions in push, the tables of transclusion[87] indicate the servers to be contacted in the event of local change, whereas for the transclusions in pull, the tables indicate the servers to be queried at the time of a request. In other words a content server knows the results of the transclusions in push whose it contains the source, and the sources of the transclusions in pull whose it contains the result.

[87]The data in question (references and differences) are not inevitably stored in the form of tables but can also be in the contents themselves.

The centralized architecture offers the advantage that if a content server is inaccessible, the tables of differences stored in the collaboration server are used and the algorithm functions nevertheless, at worst with a version which is not most recent or with certain missing contents.

The advantage of architecture in cascade, on the other hand, is that the treatment is distributed and can thus be more effective in the presence of complex structures of transclusions.

One can also consider a mixed architecture, with several collaboration servers, each one responsible for a certain number of objects. At the time of transclusions of which both the source and the result are managed by the same collaboration server, the centralized method is used, and with each change of collaboration server, the method in cascade is used.

Figure 58:
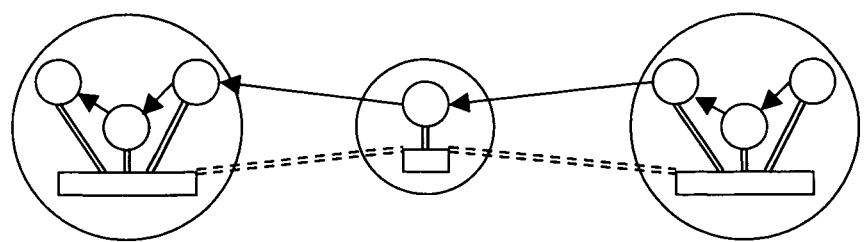

FIG. 58 shows an example with three collaboration servers. The rectangles are the collaboration servers, and the small circles are the objects. The large circles gather the collaboration servers with the objects that they treat. The arrows show transclusions.

The continuous double lines represent the parts of the algorithm which work in a centralized way, whereas the discontinued double lines correspond to the communications in cascade. The server in the middle gives an example of collaboration server degenerated to which corresponds only one object, which represents the case of an object which only works in cascade.

Propagation of the Contributions in the Branches

We will now show how to integrate the system of contributions of replacement objects and alternative objects within a structure of objects with transclusions.

For a given object we call "created source" the most remote object which is accessible via a chain of transclusions (implicit or not). An object created locally is thus its own created source.

The possible replacement objects and alternative objects will thus have all the same created source as the object in question.

We define a relation of order (of creation) for the objects having the same created source. If these objects were not created simultaneously, we take their creation order (one understands by creation the moment when the object started to be accessible, even if it had only one implicit existence).

When several objects are created simultaneously, in the case of internal transclusions, the order of the new objects will correspond to the order of their already existing sources.

Figure 59:
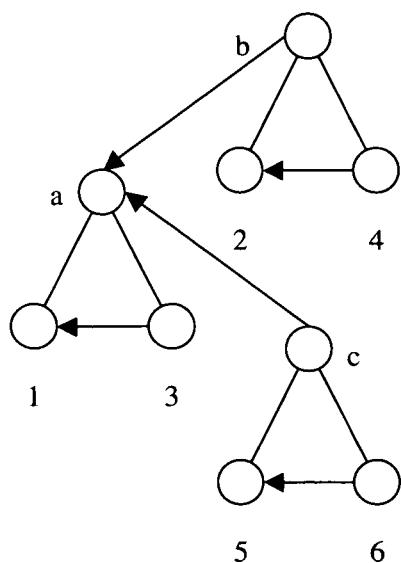

FIG. 59 gives an example. The numbers indicate the order of creation of the children. This order was obtained in the following way.

First of all only the objects a and 1 existed. Then the transclusion was carried out whose result is b. Implicitly this caused the creation of 2. Then the transclusion 3 was created whose source is 1. This caused the implicit creation of 4. 3 and 4 thus appeared simultaneously, and the rule is thus observed that child 1 existing before child 2, the correspondent of 1 is regarded as having appeared before the correspondent of 2.

Then the transclusion is carried out whose result is C. This causes 5 and 6 simultaneously. Here still, the order 5<6 is chosen to correspond to the order of their immediate sources 1<3.

This order being established, the functioning of the replacements of objects is the same as explained previously, i.e., in a set of objects having the same created source, the most elaborate object is the one which was created the latest, and which provides local contents. If an object is modified locally but at least one more elaborate object having the same created source had been created later and is incompatible with the modified content, then the first more elaborate object (and the followings in the same branch) is (are) moved in a new branch (Rule 7).[88]

[88]Another way of seeing: in the set of the objects some specify explicitly in which branch they are, whereas the others implicitly follow all movements of their predecessor. Thus, when an incompatible object must be placed in another branch the following objects follow it implicitly.

An Alternative Method

In this other method, instead of the order in which the objects have been created, the structure of transclusions determine the order of elaboration.

Firstly, object don't change branch (or create of branch) as long as there is no explicit refusal (of a replacement object).

The replacement object for a given object is the most recent content having the same created source (this with the advantage over the other method in that two users can alternatively contribute to the same object while remaining in the same branch).

When a user refuses a replacement object, two different situations can occur, depending on the way to follow in order to reach the replaced object starting from the replacement object, while following the relations of transclusion. If the way goes to upstream of the replaced object, then the replaced object moves to a new branch. If on the contrary the way goes in direction of downstream of the replaced object (thus the replacement object is a descendent of the replaced object), then it is the replacement object which is moved to a new branch.

These changes of branch do not deteriorate of course the existing relations of transclusion.

Figure 60:
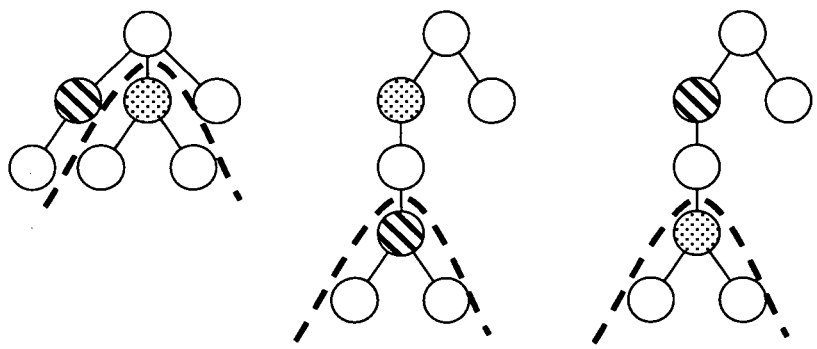

FIG. 60 illustrates three cases.

The structure of tree represents the structure of transclusion (each object is image by transclusion of the object represented above him, and all the objects, before the refusal, are in the same branch).

The hatched circles represent the object which carries out the refusal (the replaced object) and the circles dotted lines are the refused object (the replacement object). The discontinuous lines indicate the area which will be moved in a new branch.

When an object moves thus in a new branch, all his/her children who explicitly do not specify the branch in which they wish to be follow their parent in the same branch, and that continues recursively with their children.

Behavior of the Grains in the Presence of Transclusions

Let us return now to the preceding approach. To see how the transclusion is articulated with the process already described of "Replacement/Enrichment of Grains", we now will extend its data structure (trees of modification of grains), in order to also represent the transclusions. We will illustrate the fact that derivations of resources consist of transcluding all their content; we also will illustrate the case of manual transclusion carried out within a derived resource.

Figure 61:
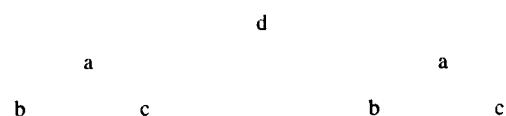
Figure 62:
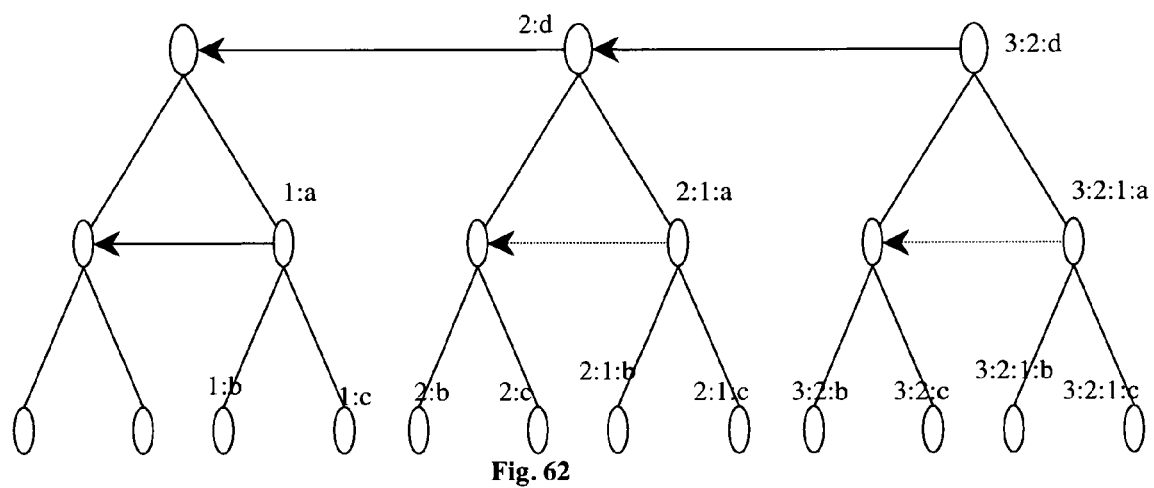
Figure 63:
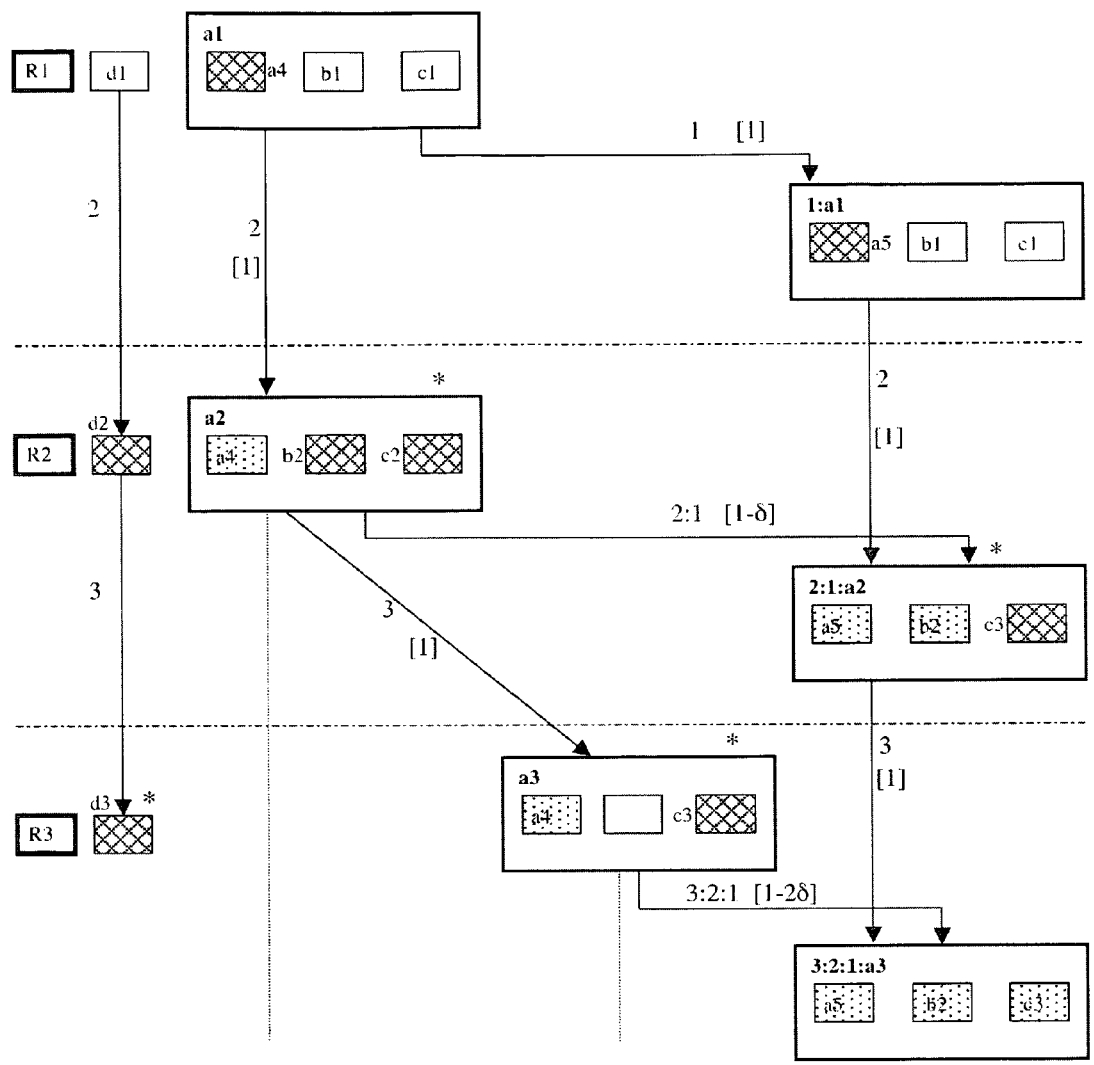
Figure 64:
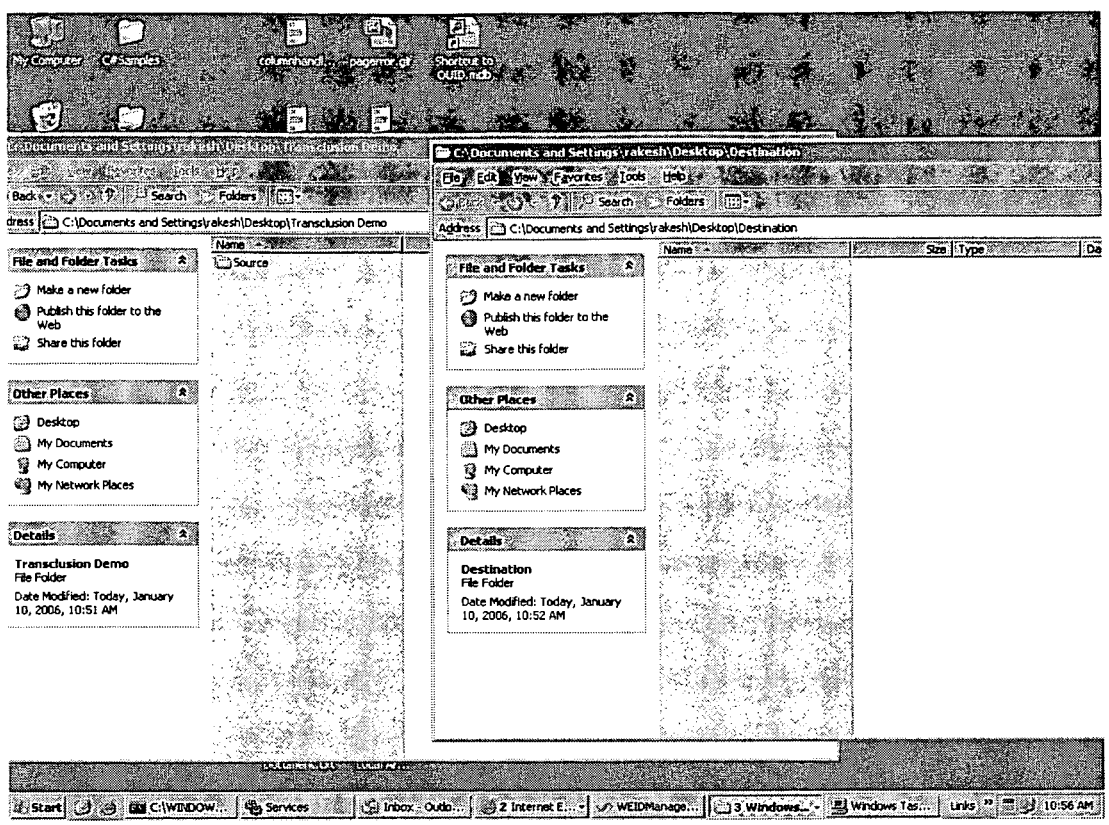
Figure 65:
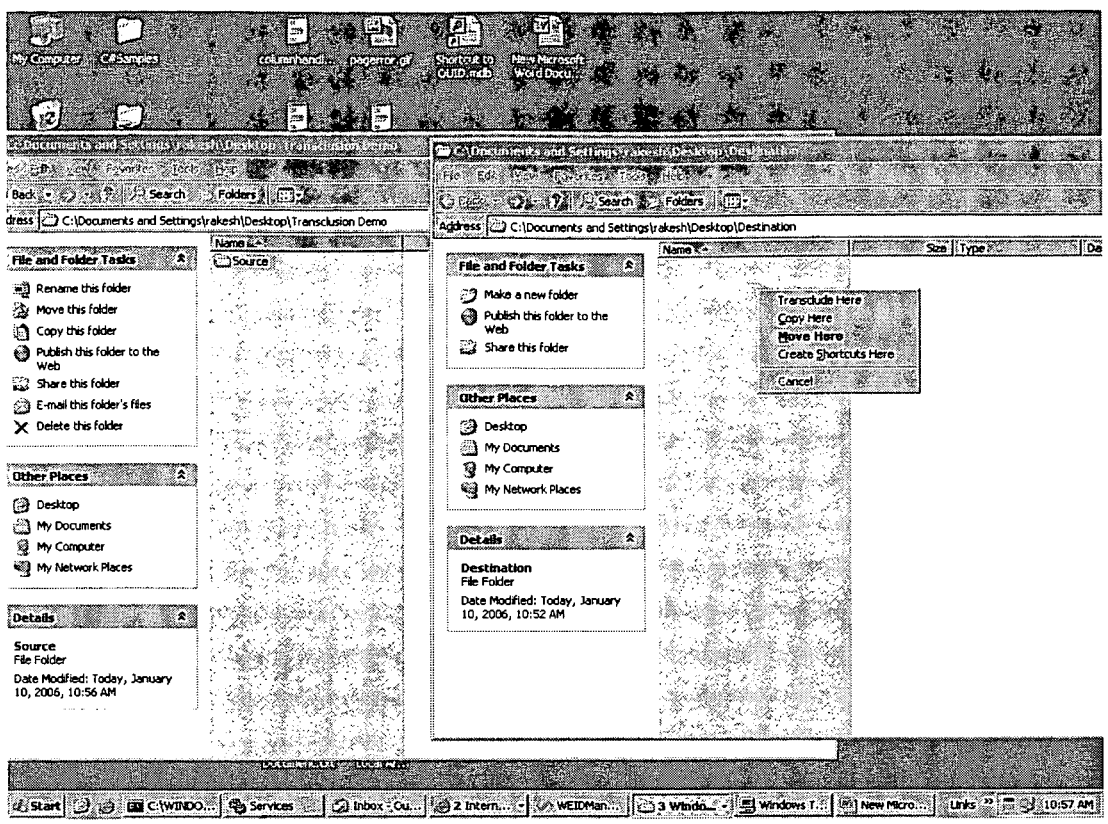
Figure 66:
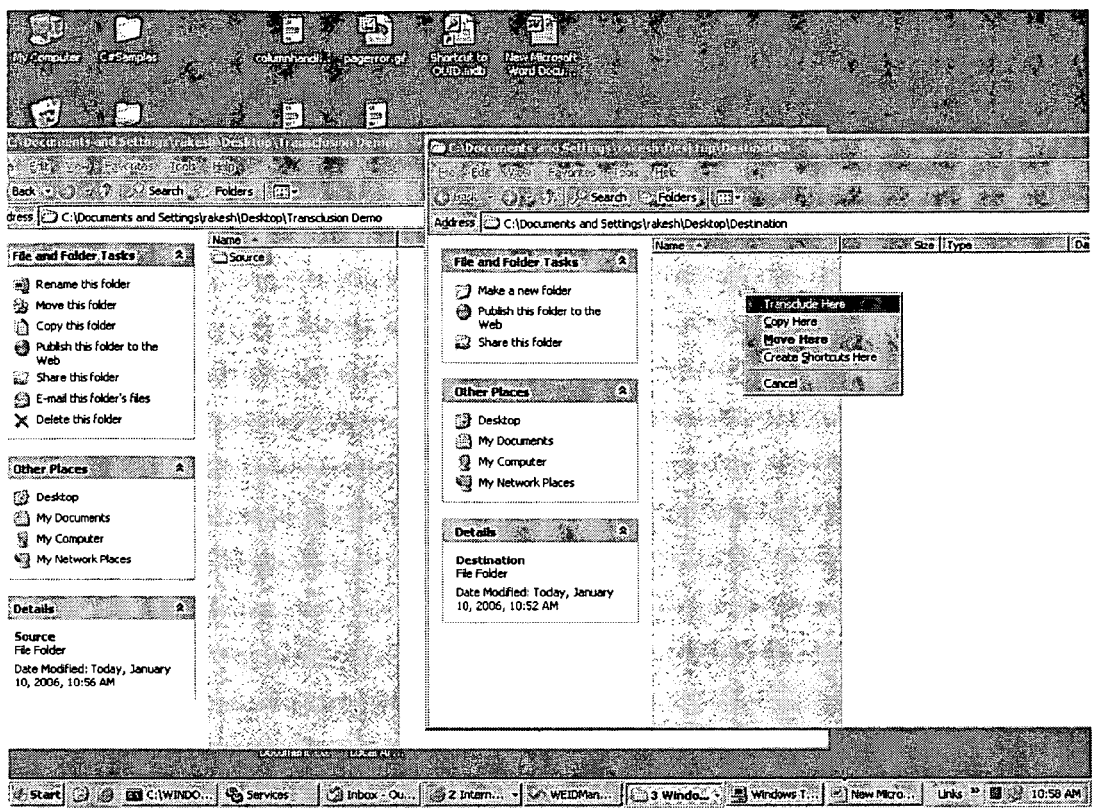
Figure 67:
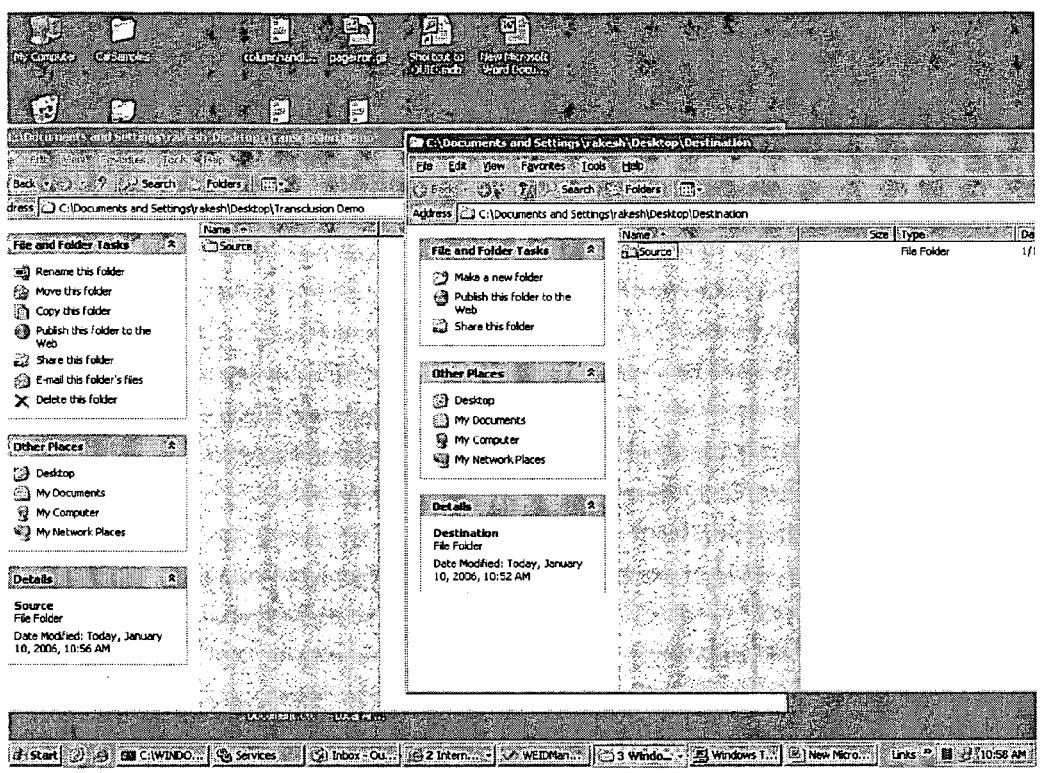
Figure 68:
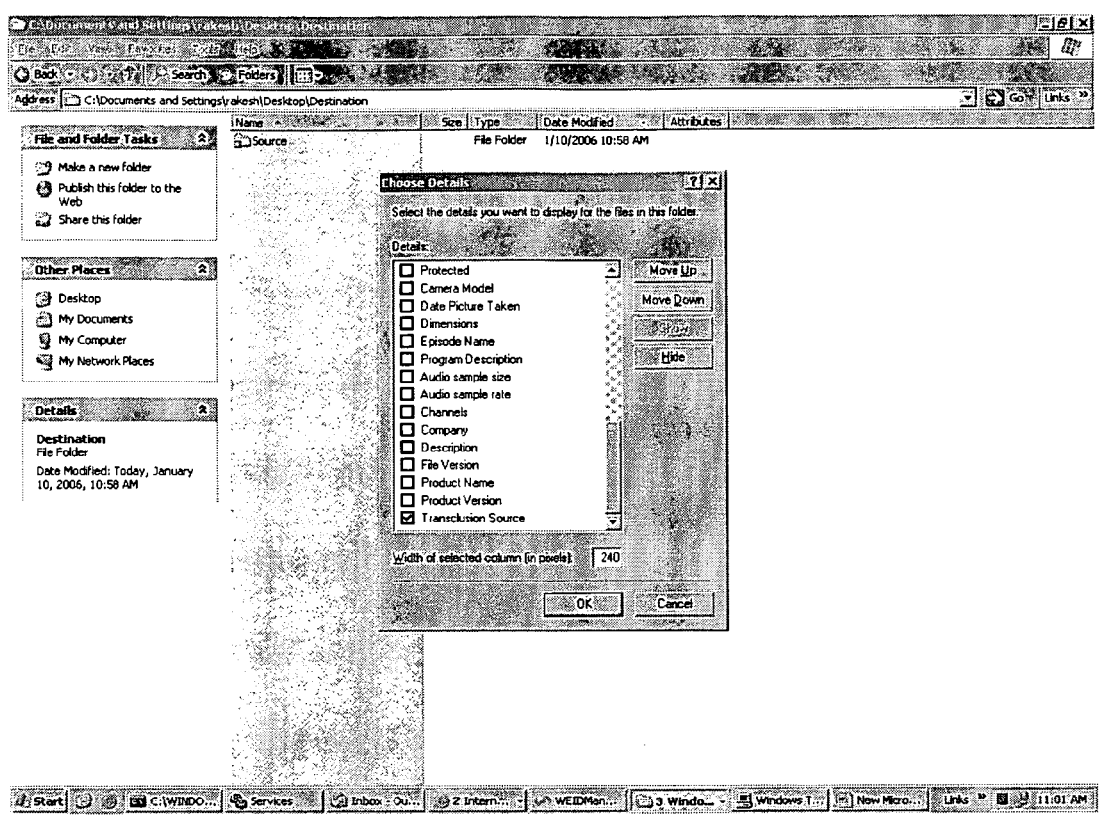
Figure 69:
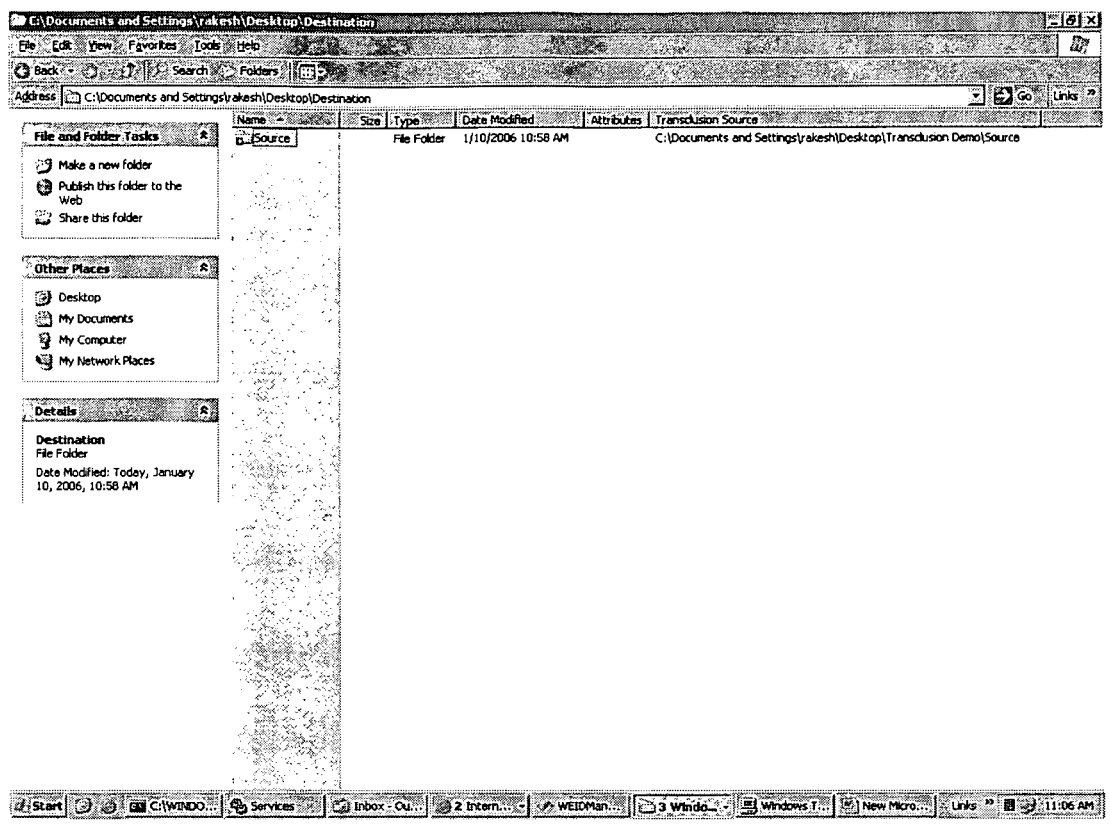
Figure 70:
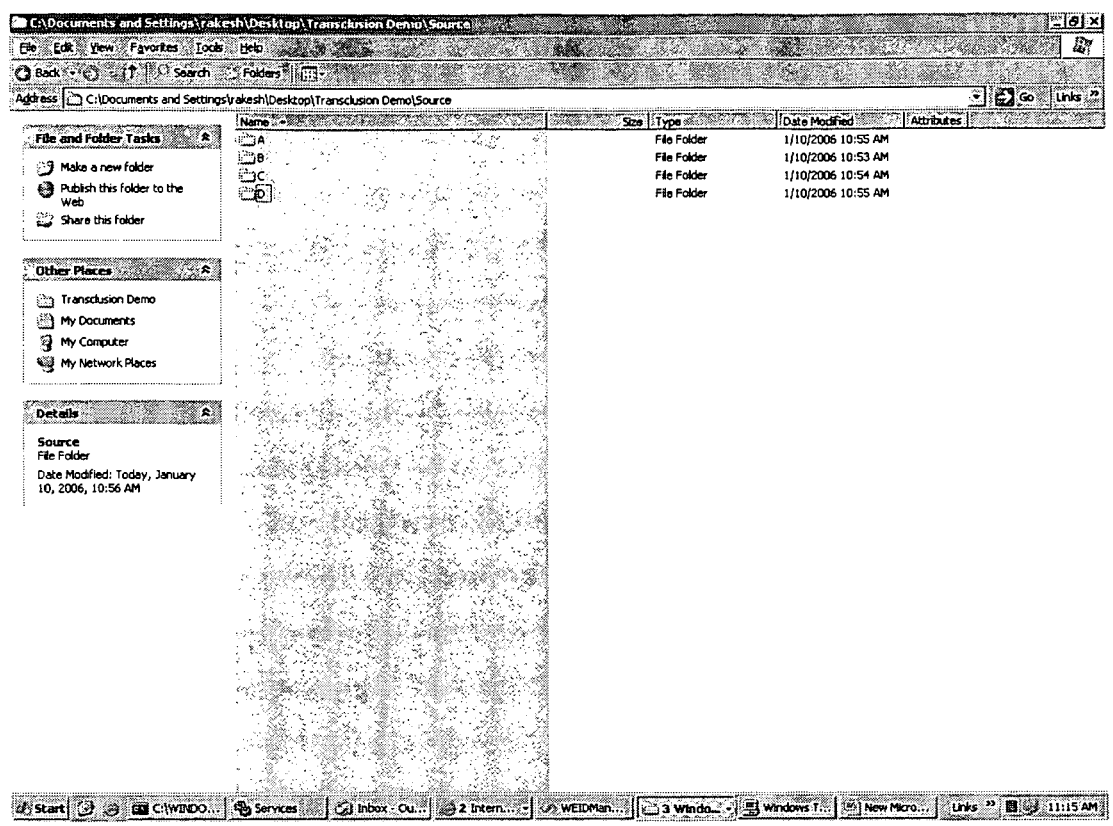
Figure 71:
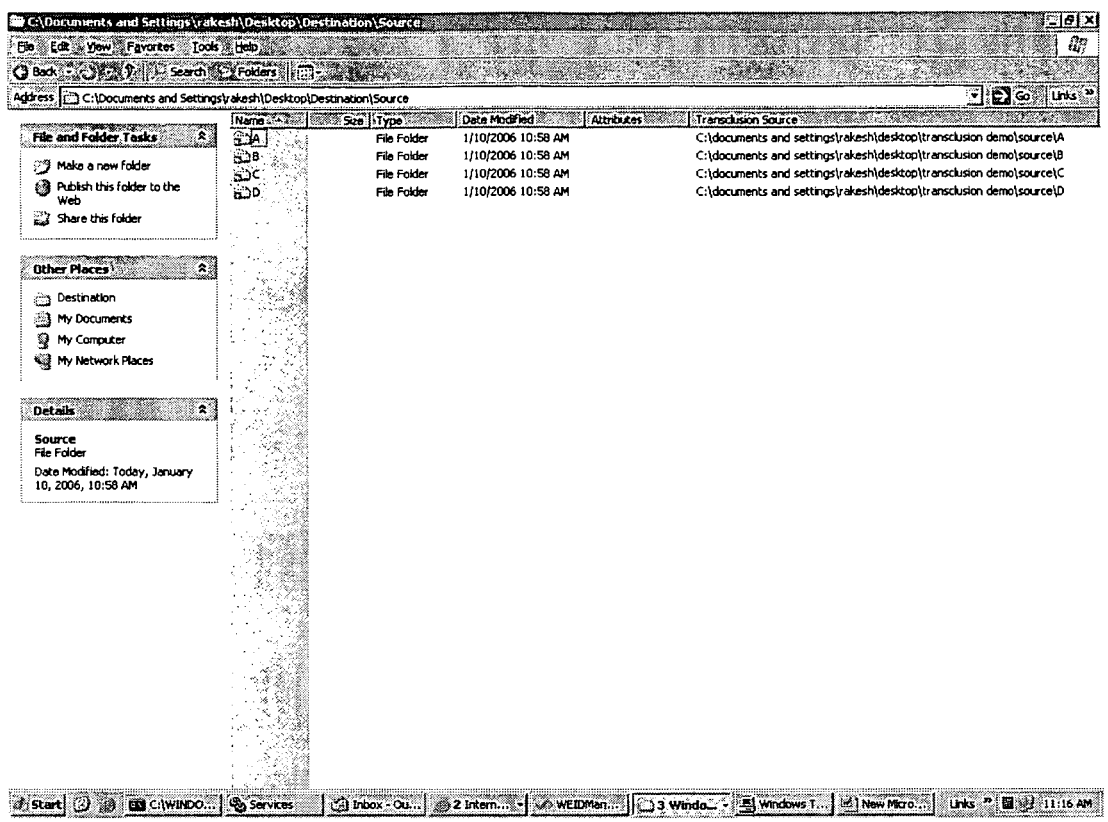
Figure 72:
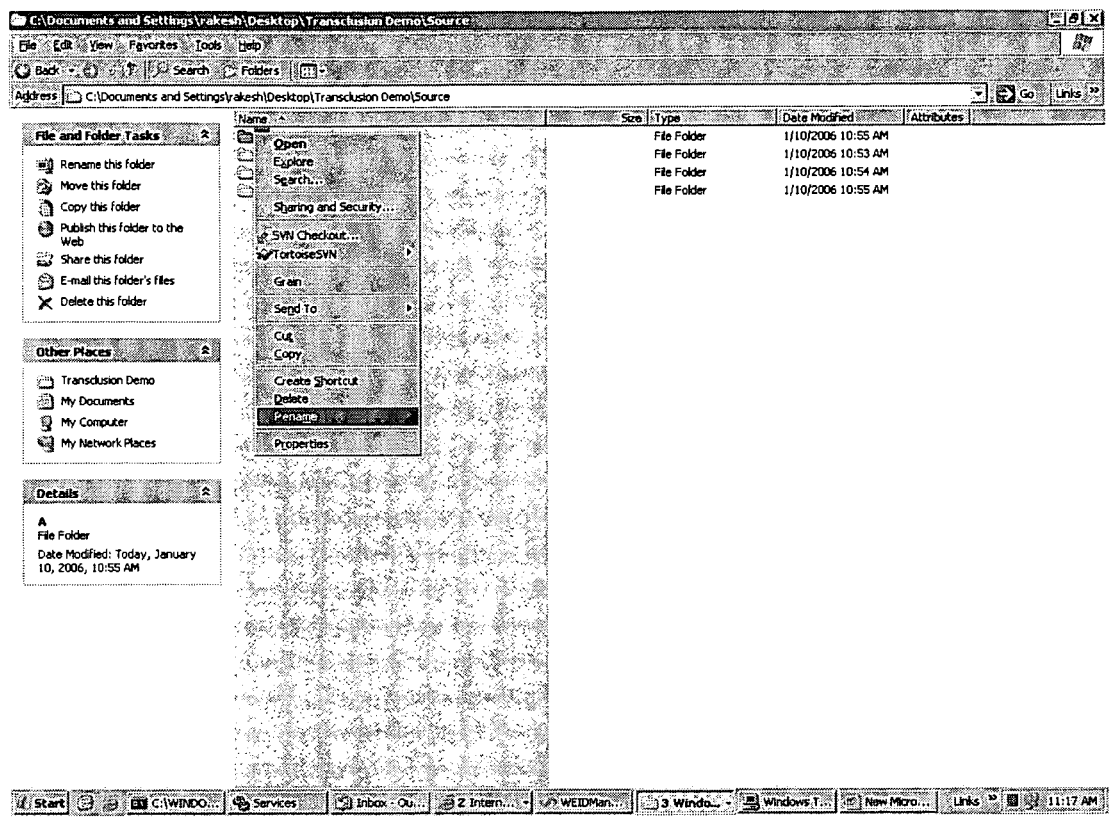
Figure 73:
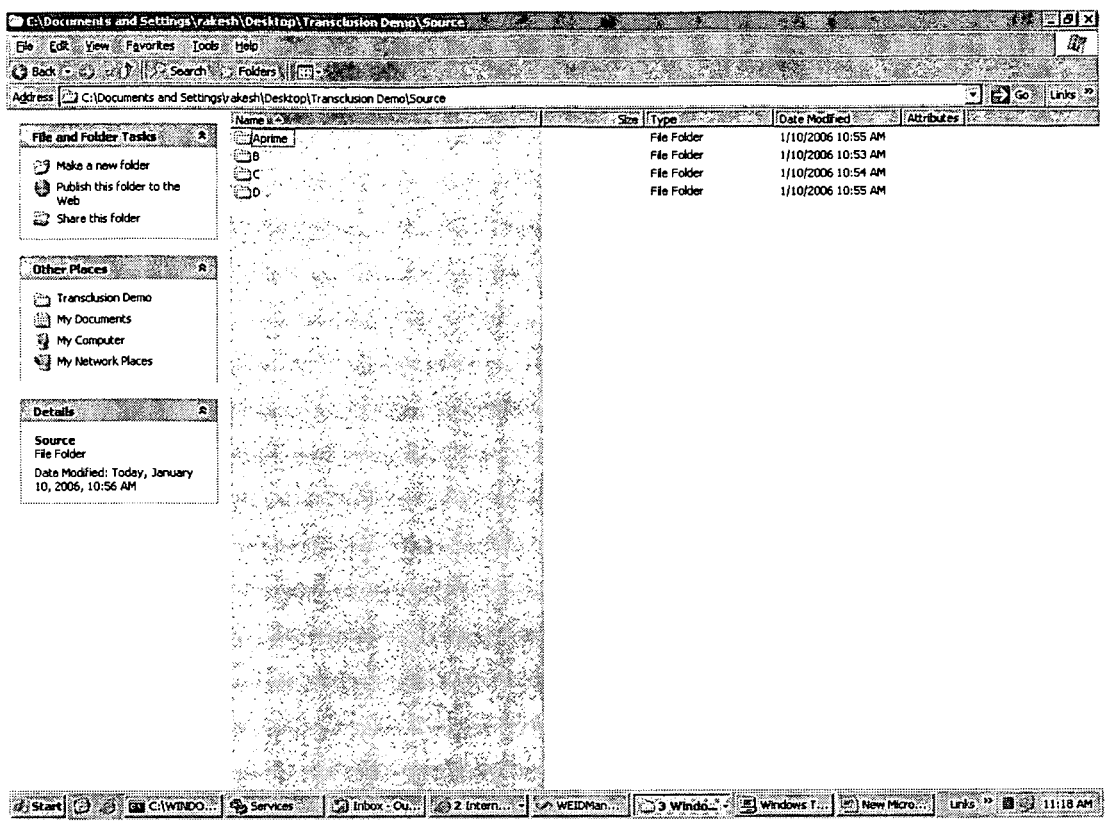
Figure 74:
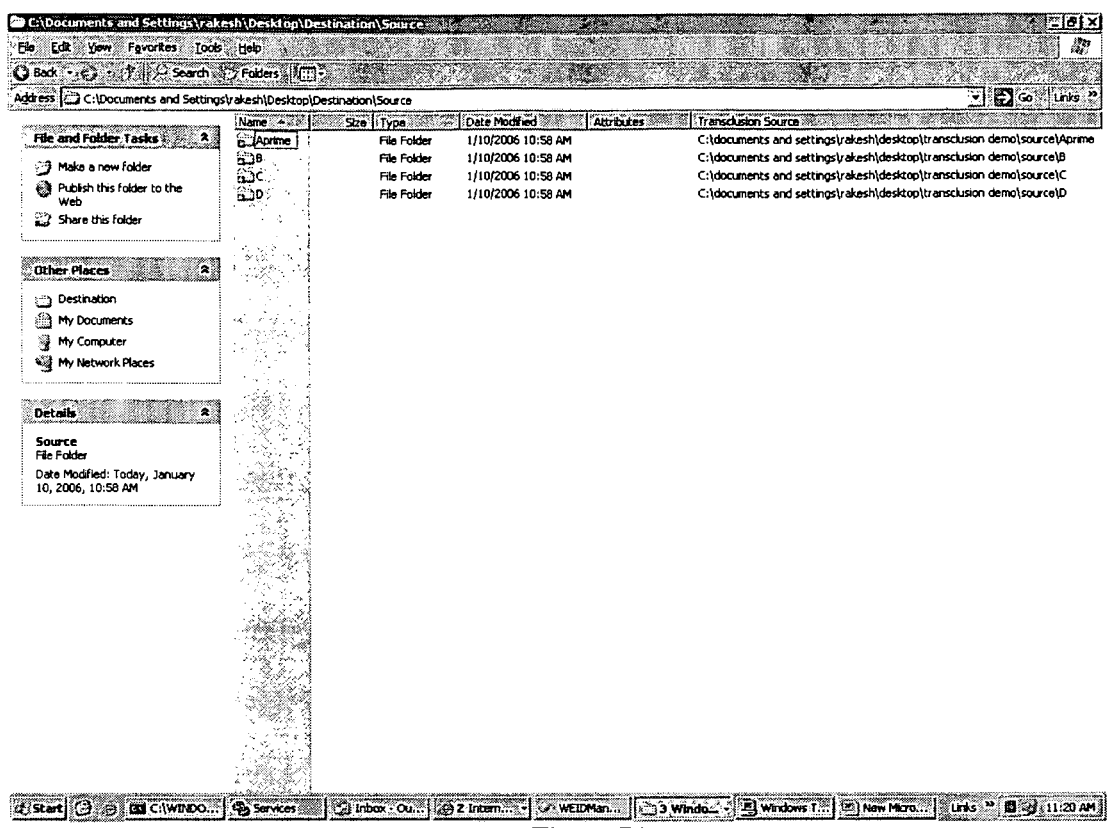
Figure 75:
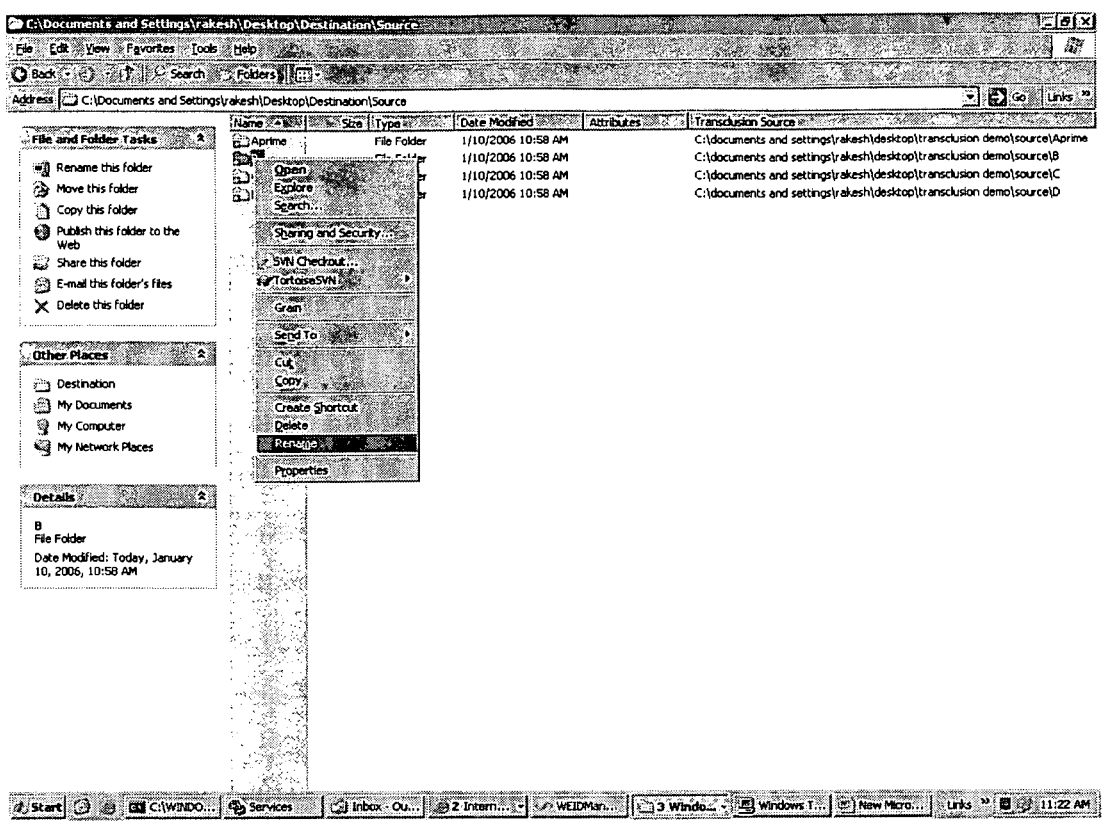
Figure 76:
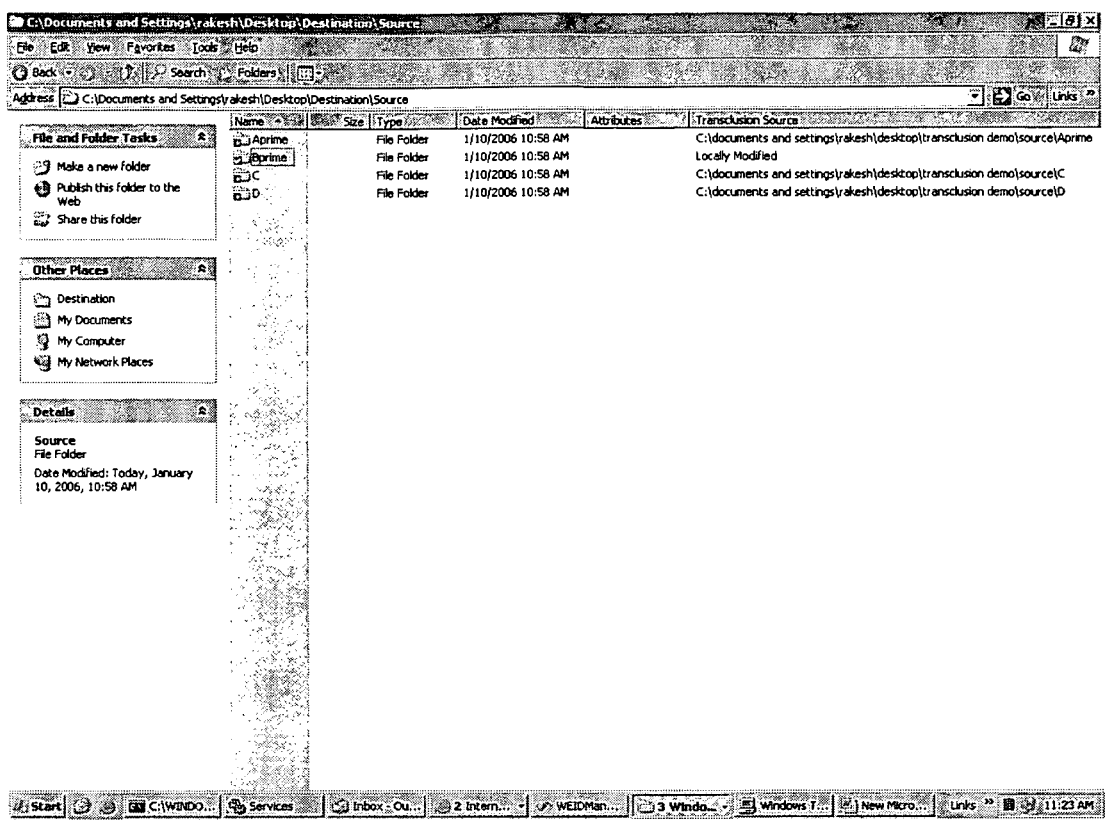
Figure 77:
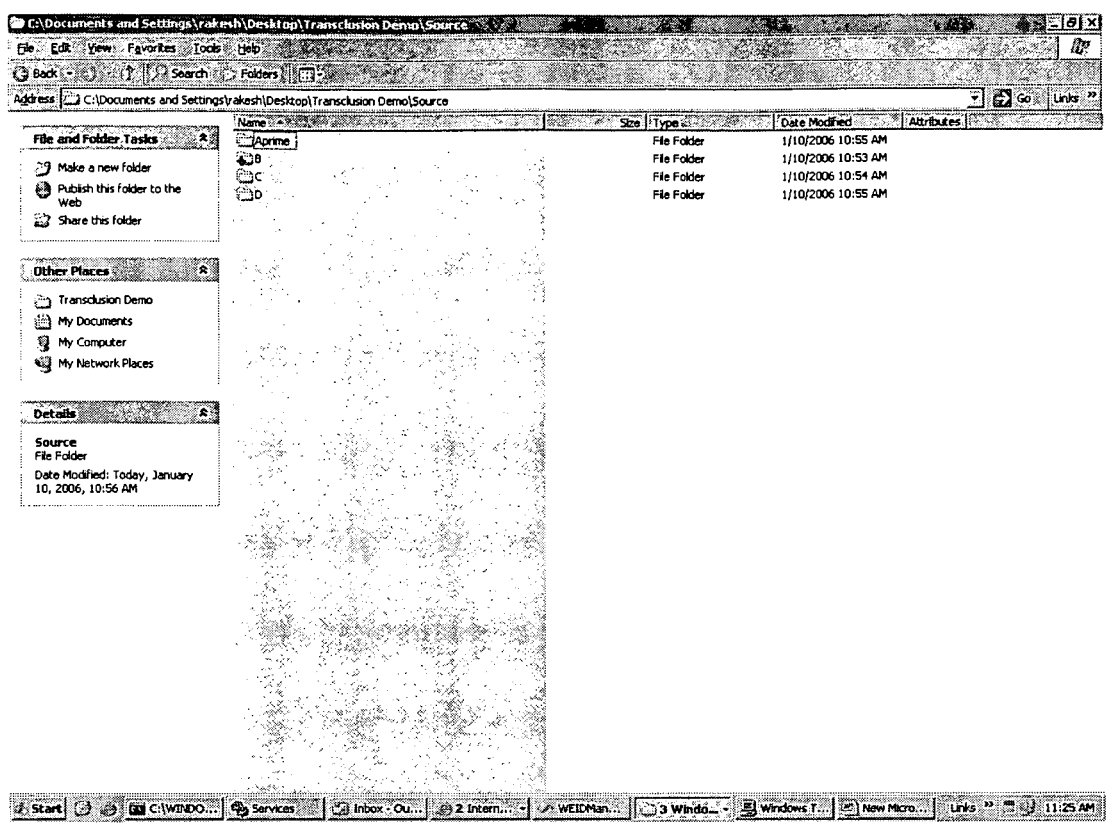
Figure 78:
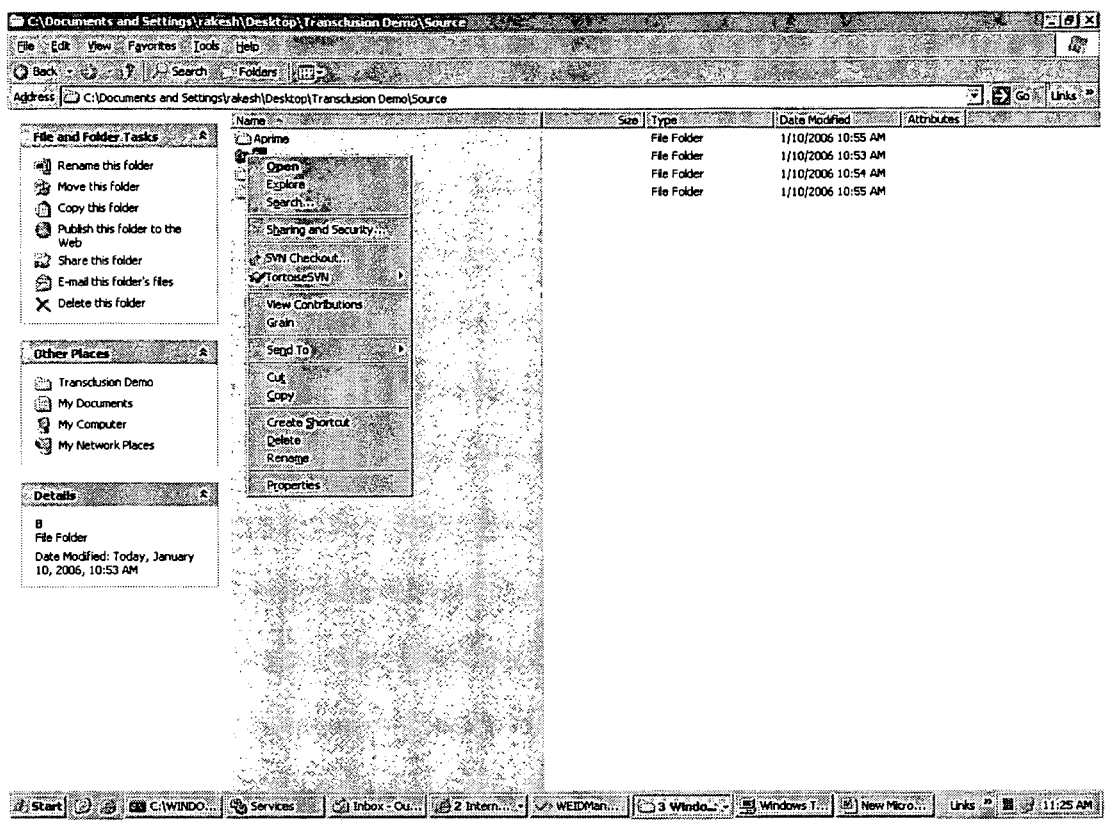
Figure 79:
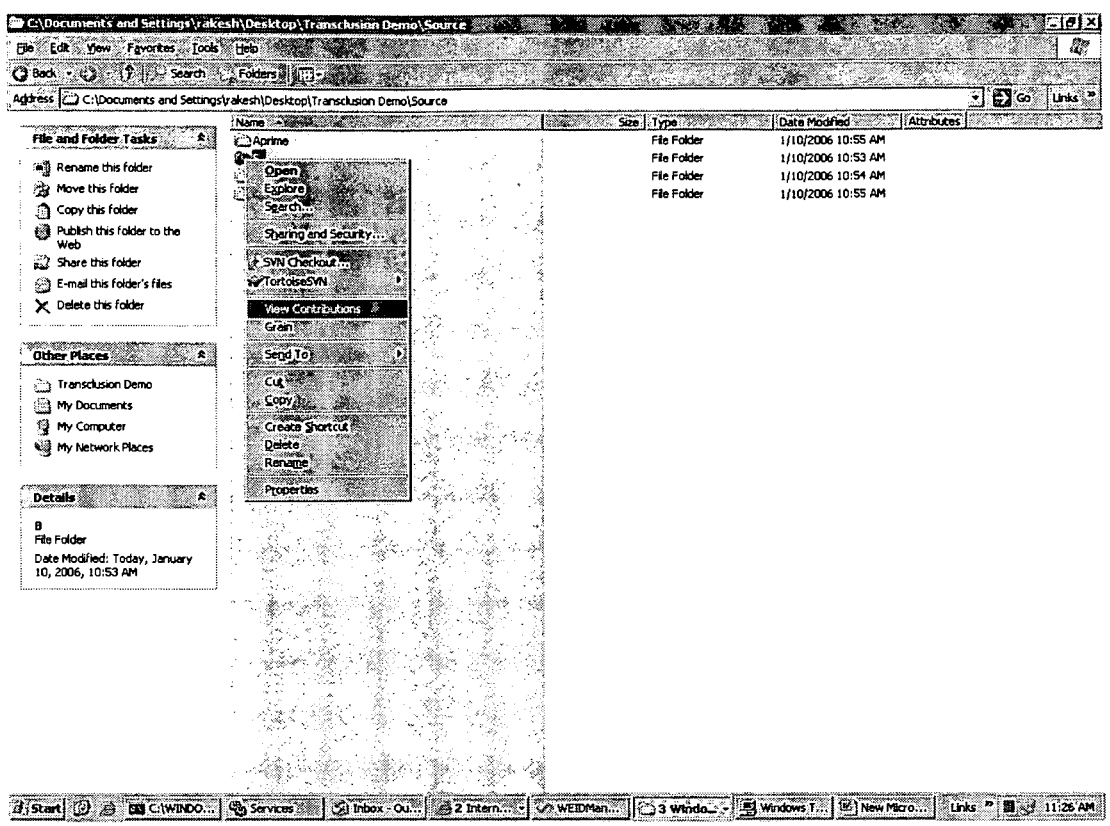
Figure 80:
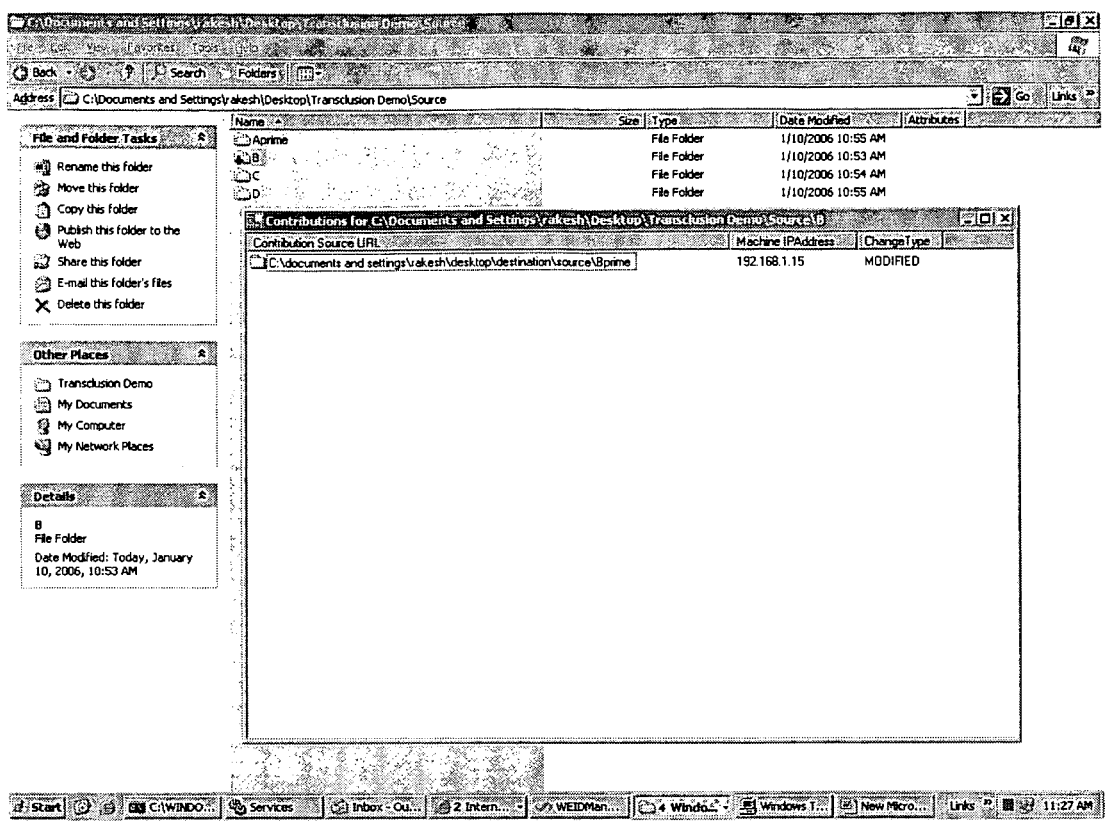
Figure 81:
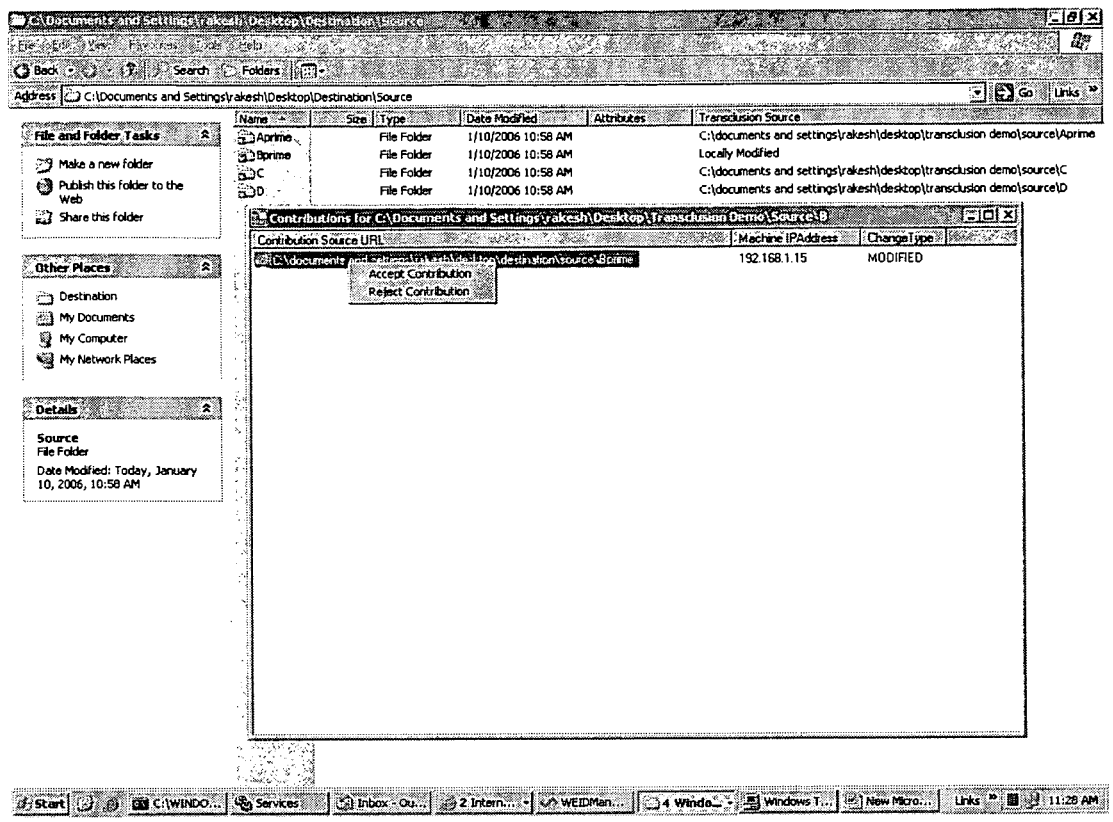
Figure 82:
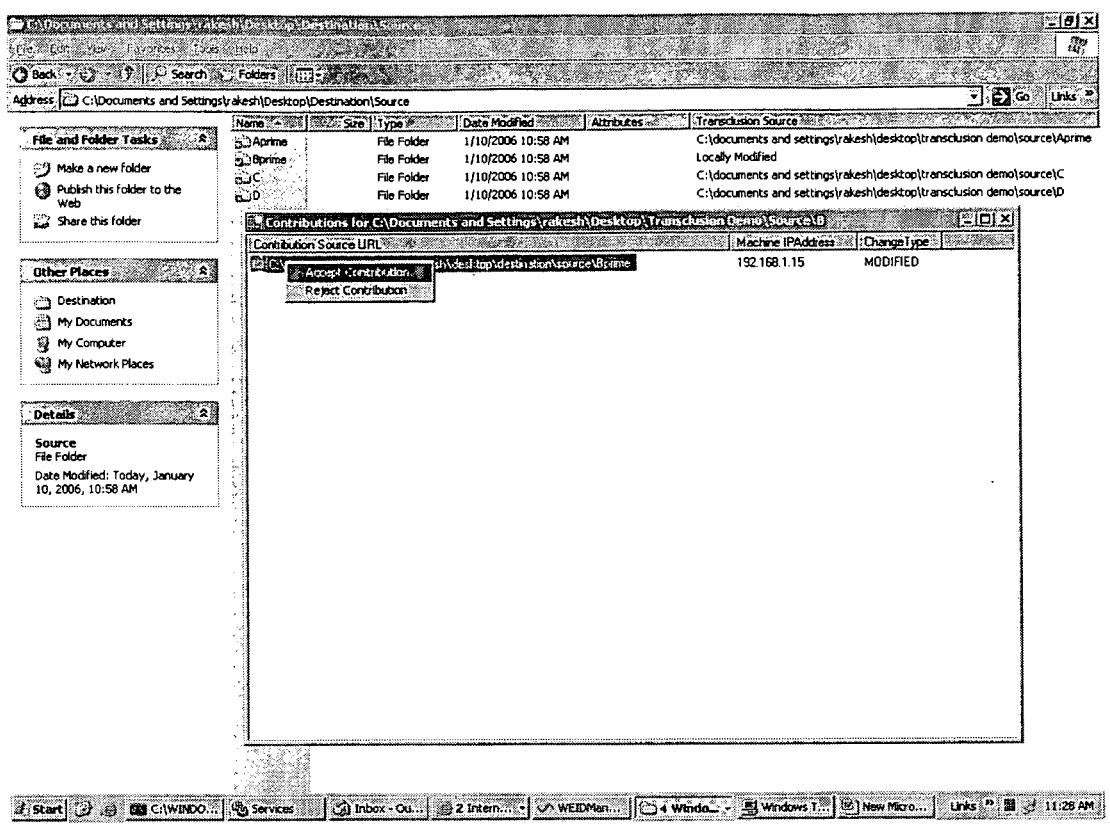
Figure 83:
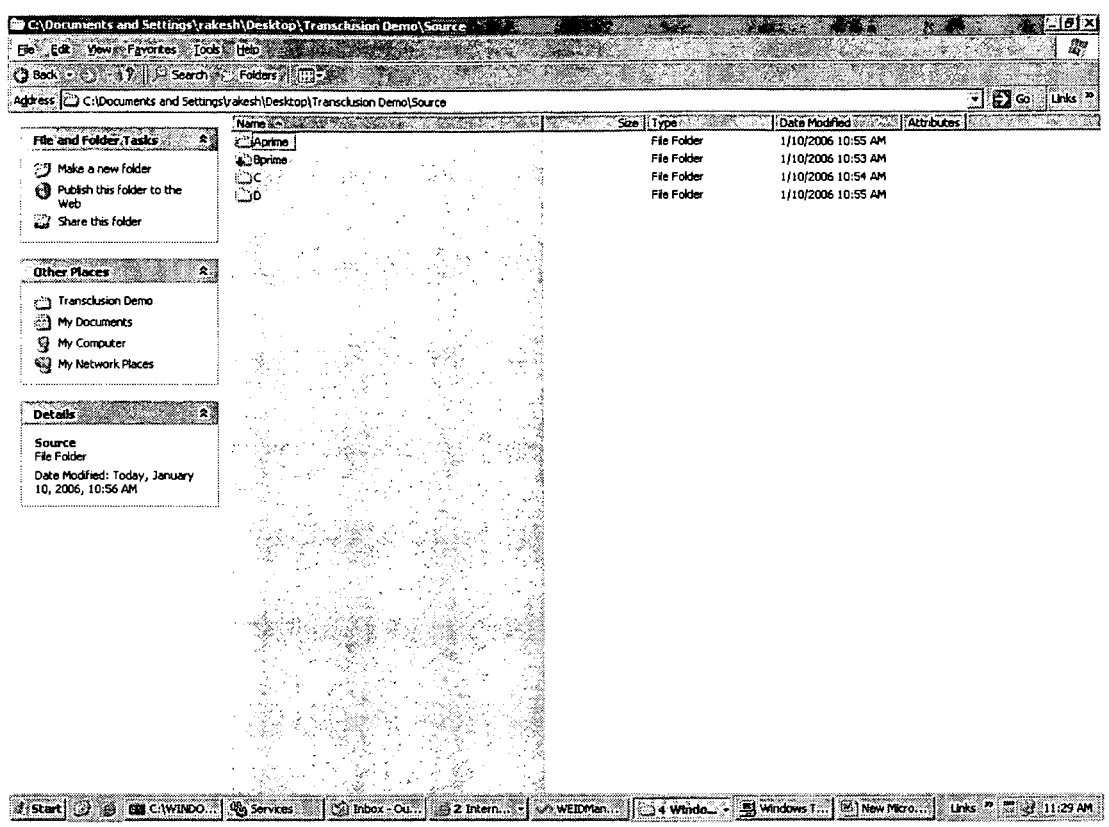
Figure 84:
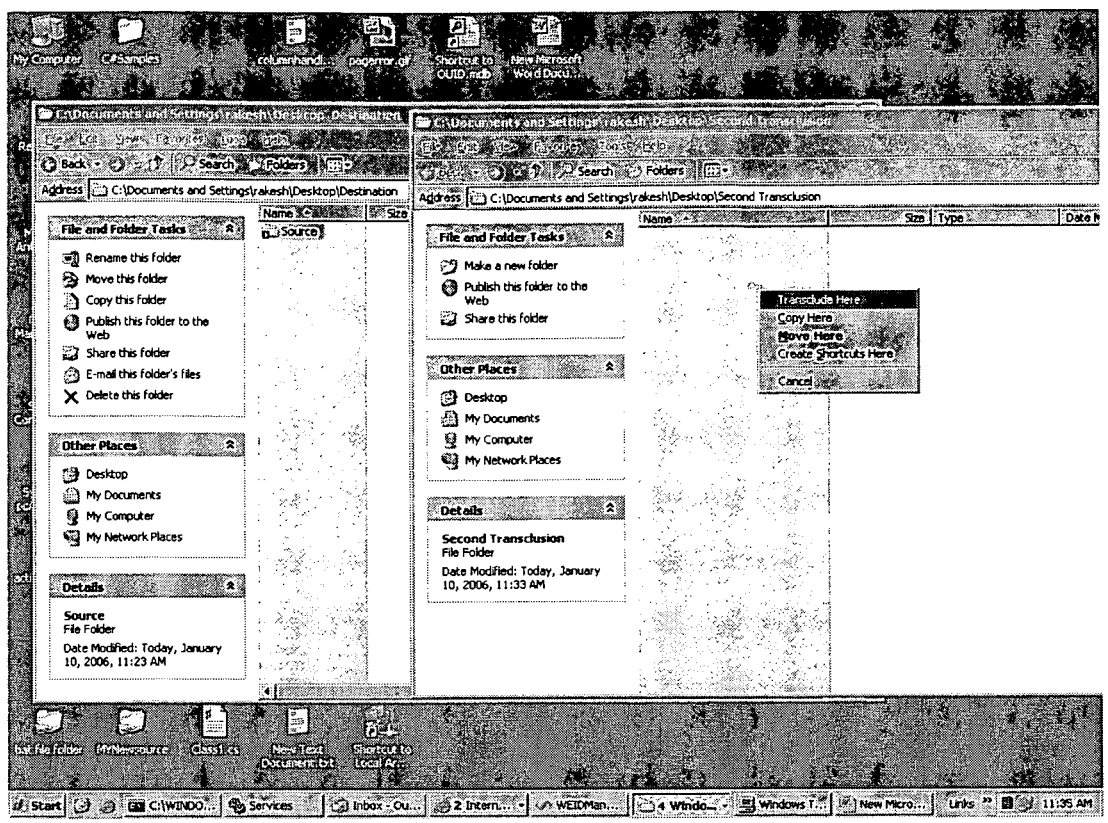
Figure 85:
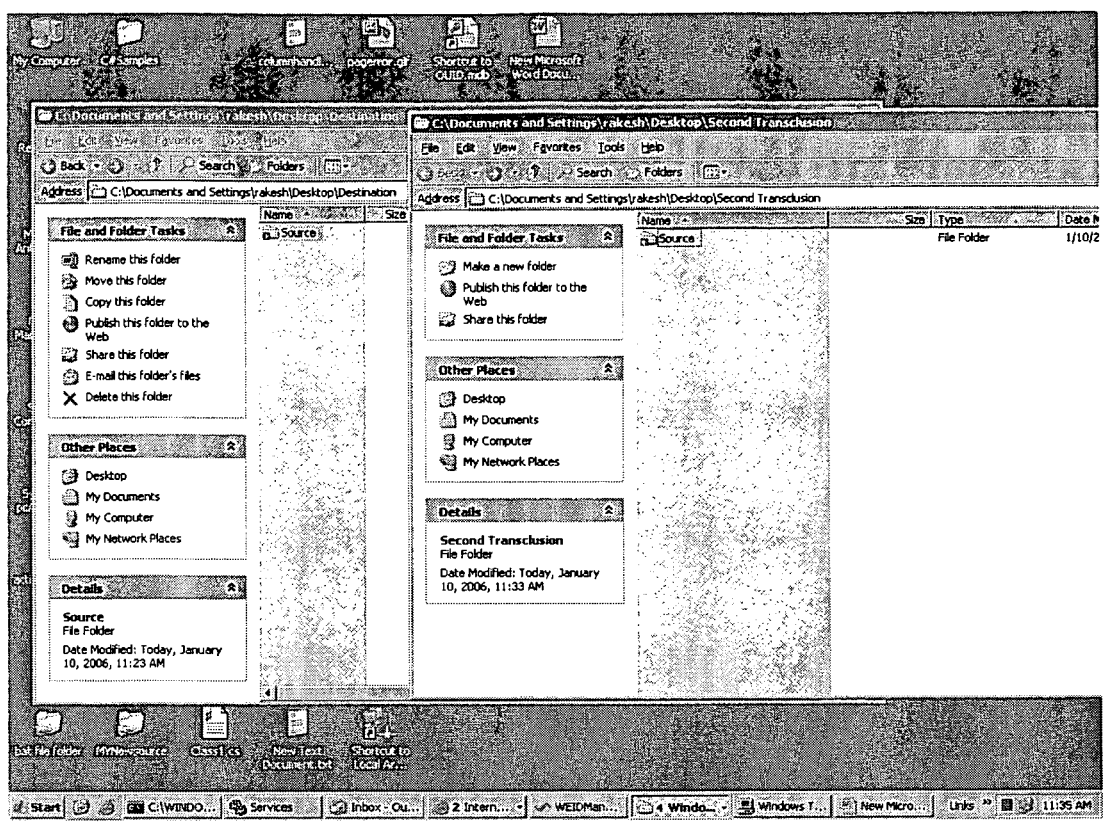
Figure 86:
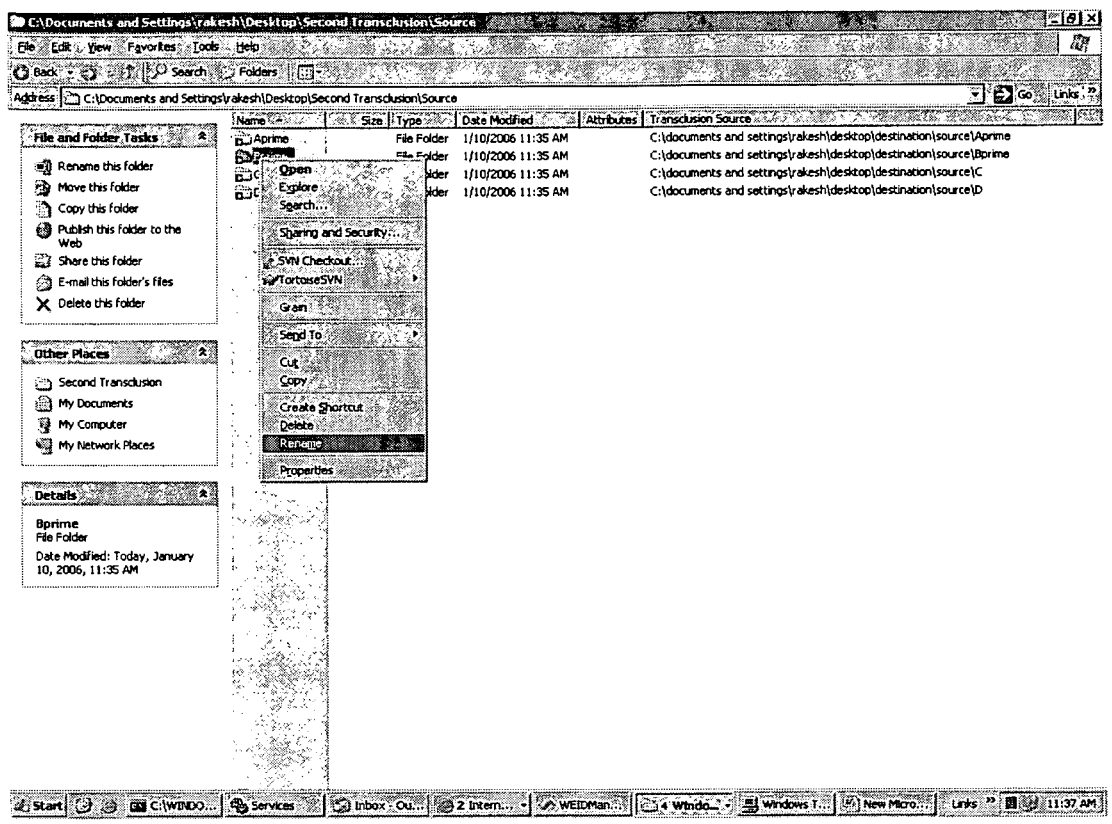
Figure 87:
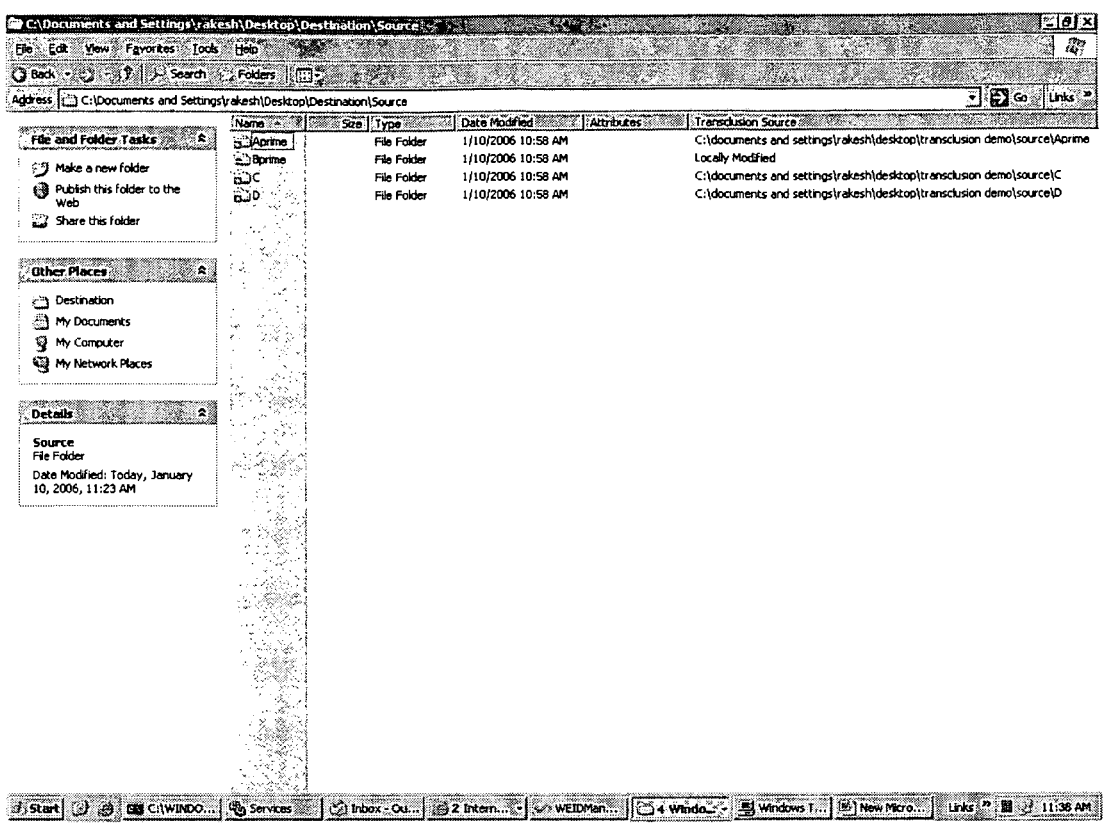
Figure 88:
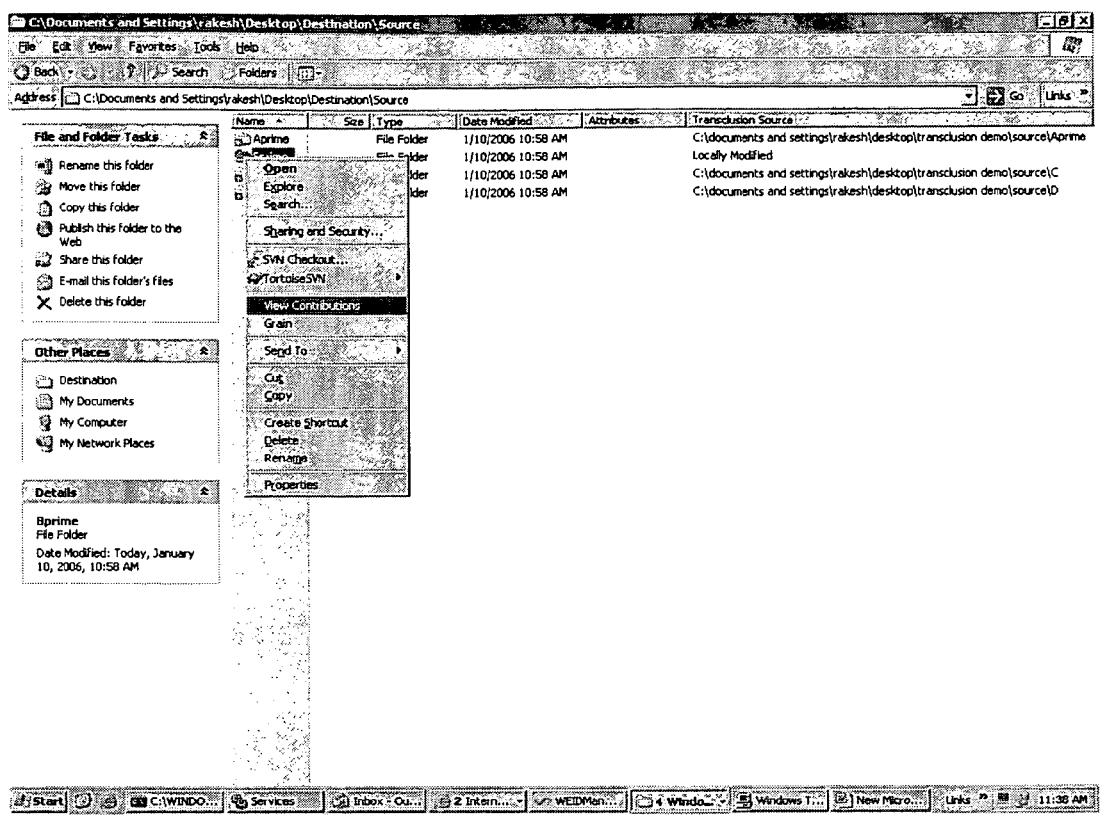

FIG. 63 extends "Case 2" of the example presented in the section "Replacement/Enrichment of Grains". The objects of this figure are introduced in FIGS. 61 and 62. FIG. 61 shows that, in the resource R, the grain a is now included in an object d and, within it, it is reproduced by transclusion (the grain a is transcluded towards the right in FIG. 43).[89]

[89]This will enable us to have implicit transclusions in the example.

FIG. 62 presents the fact that R1 (it is about the resource R of FIG. 61) is derived in R2 and that the latter is derived in R3. These two derivations respectively give place to the transclusions "2" and "3". Thus the transclusion "2" of d results into 2:d and the transclusion "3" of 2:d itself results in 3:2:d.

In addition, this same FIG. 62 presents the transclusion "1" of the grain a within the object d, which gives place to the implicit transclusions "2:1" and "3:2:1" within 2:d and 3:2:d respectively.

Identifiers of the objects contained in d, 2:d and 3:2:d are prefixed according to the transclusion which gave them birth.

As we had already described, the objects which are the result of several transclusions of which at least one is implicit have several possible sources. It is always starting from the nearest source that the changes will propagate towards them.

In FIG. 63, the hatched objects represent those which were modified locally (and which are thus identified in the table of local changes). The following stages are supposed:

1. d in R2 and C in the grain a3 (in R3) were modified in first—c takes the value c3 thus, and d takes the value d2 thus. Thus d2 and a3 become most elaborate. With this stage, c3 of the grain a3 is propagated towards the grain 3:2:1:a3. In addition, in R1, the object a1 (the innertext of the root node of the grain a1) is modified in a4 and object 1: a1 is modified in a5 in grain 1:a1 (this last is the grain transcluded of a1, always in R1). These modifications are respectively propagated towards a2 then a3 and 2:1:a2 then 3:2:1:a3.[90]

[90]These ways are taken because the propagation will follow the shortest way, as further explained the distances from each transclusion are indicated between hooks in the figure).

2. Then b1 and c1 in the grain a2 (in R2) are modified in b2 and c2, and in R3, d2 is modified in d3. Consequently changes (b2 and c2) in the grain a2, as these changes are incompatible with the already existing change c3 in the grain a3 of R3, this last (a3) is refused of office (Rule 7) and is thus found in another branch (directed towards the straight lines in FIG. 63). The grain a3 and the grain a2 are both the most elaborate (in their respective branches), which is represented in FIG. 63 by an asterisk. On the other hand, the modifications b2 and c2 of a2 are propagated well in the grain 2:1:a2, but starting from this last they cannot be propagated with 3:2:1:a3, because c3 which already exists in 3:2:1:a3 (by propagation of a3 in stage 1) has a source closer than the source to c2. In addition d3 is also most elaborate (also presented with an asterisk).

3. In R2, the grain 2:1:a2, c is modified locally to take the same value c3 as in a3. Consequently c3 of 3:2:1:a3 (and coming from a3) does not represent any more one obstacle with the propagation of b2 (which represents a closer source) grain 2:1:a2 towards the grain 3:2:1:a3. It should be noted that, from the point of view of the tree of the modifications of objects (with regard to the marking of the most elaborate objects) the grain 3:2:1:a3 is now implicit and it is the grain 3:2:1:a3 which is most elaborate (marked of an asterisk in FIG. 63).

FIG. 63 presents the situation after the last stage (i.e. after stage 3 above).

In FIG. 63, the objects covered of points represent the objects which are in the table of the changes coming from upstream (and which are thus modified in result of propagation of local changes).

In FIG. 63 the distance which each transclusion represents was indicated between brackets.

As the collaboration server does not memorize the values of the objects but only their identifiers, in the collaboration server one can associate with these identifiers a code (checksum) by the method Cyclic Redundancy Check (CRC) or a similar method. Thus, in FIG. 63, in the stage 3 of the example given here before, the value c3 in 2:1:a2 makes it possible to propagate the values of this grain towards the grain 3:2:1:a3, thanks to the fact that the checksum of c3 of 2:1:a2 is equal to that of c3 grain a3.

Counters of Activity

In order to measure the "activity" of the resources and some of the objects they contain, counters are in particular associated with each (or some) node(s)

representing an object in a tree of modification of objects,
representing a resource in a tree of derivation of resources,
associated with a resource, representing a not-modifiable object contained in this resource.

These counters are in particular used to measure the number of times a given object created or transcluded in a resource is in a resource derived from the latter and/or
the number of times that a given object created or transcluded in a resource is presented within this resource or of a resource derived from the latter and/or
the number of times that a given object is transcluded, or
the number of times that a group of objects including a given object and all its descendants (at downstream) is transcluded by derivation or simply consulted,
the number of times that a given resource is derived or is simply consulted,
etc Containers Objects, Merge-Transclusion, Automatic Placement FIGS. 64 to 88 present operations of transclusion within the framework of an explorer of files, in this case in Windows Explorer.

Let us recall that each object is potentially a container in the sense that it can contains other objects (children objects). We now will consider that a transclusion has like effect:
either the creation of a new object which will contain the result of this transclusion (as described up to now)
or the "merging" of its result with a pre-existing object, which itself may contain pre-existing containers objects;

and that with each container can be specified constraints (or preferences) for the properties of the objects it can receive.

At the time of a transclusion in merge mode of a source object towards a recipient object, the value (innertext) of the source object replaces the value of the recipient object (root node) and his children are automatically placed selectively in the containers contained in the recipient object and whose associated constraints are compatible with the properties of the said children objects. Optionally, if no container object recipient exists or cannot receive an object coming from the source, a "garbage-collector" container is created and said object coming from the source is placed directly in it.

Figure 89:
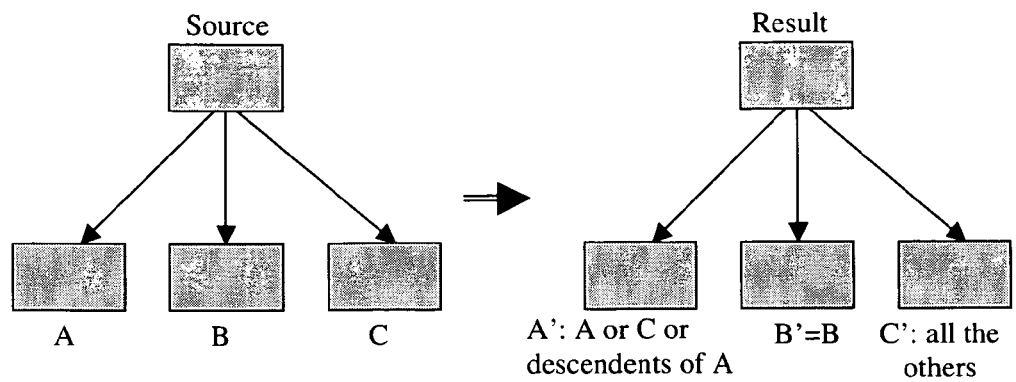

FIG. 89 illustrates merge-transclusion of folders (typical container objects) which are reorganized so that the contents of the folders A and C, as well as the contents of the folders themselves contained in A, go in the folder A', that the contents of B go in B' and that all the other objects go in C'.91

[91] Thus this figure presents an example where the names of the folders are properties (of which it is question in the constraints associated with the containers which are with the destination of the transclusion). Other properties such as the creation date or last modification can for example also represent such properties.

Figure 90:
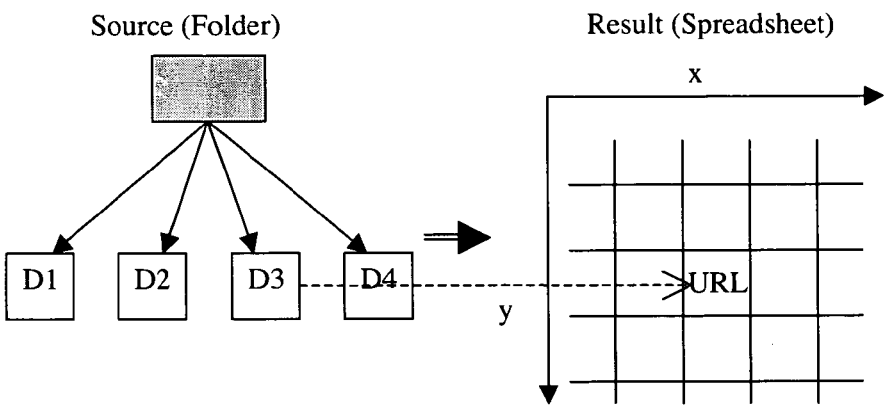

FIG. 90 presents an example where it is question of placing automatically, in a document containing the containers objects (such as the cells of a spreadsheet), links towards the documents contained in the source of a transclusion, depending on its properties.92

[92] Further this example shows a transformation which replaces each document source by a link towards him.

The advantage of such transclusion is that when a new object is added to the source it is automatically propagated to the good location at the destination; when a property of an object is changed with the source, it can be moved from one container destination to the other (according to the constraints associated with the latter); and when a constraint of a container destination is modified, its contents can be moved towards another container destination.

We call "domain" of a container, the set of all the possible objects having properties compatible with the whole of constraints associated with this container. And we calls domain of an object the set of the values compatible with its properties.

A metric is automatically associated with the size of the domain of each container, and if several containers can receive a given object, the selected container is the one whose domain is smallest.

For example, one can adopt a metric S as follows:
$S(p)=\psi$ where $0<\psi<1$, and 'p' is an atomic property
$S(\sim P)=1-S(P)$ P, P1, P2 are property sets
$S(P1\ P2)=S(P1)\ S(P2)$
$S(P1\ UP2)=S(P1)+S(P2)-S(P1)\ S(P2)$
$S(P1-P2)=S\ (P1)\ (1-S(P2))$ The children containers inherit the properties of their parents and add (by) their own properties.

At the time of a transclusion in merge mode, the process of transclusion consists with
1. to seek for each source object all the destination containers whose domain is equal or broader than that of the source object in question;
2. if there is several, to use metric (described above) to measure the size of each domain and to determine the recipient container whose domain is smallest;
3. to propagate the source object in said smallest container thus selected.

The children objects can thus be placed automatically in the recipient object of a transclusion.

Conversely, the domain of a container can be widened with the properties of the objects that the user places there "manually". This method makes it possible to give to the containers the objects properties that one inserts there, without mentioning these properties explicitly. It is thus to some extent a very simple method of machine learning. Other options: Before widening the container recipient, the user sees himself presenting the option to restrict the domain of the object placed. Lastly, if the object belongs to a "class" (with the taxonomic direction) different from the class of the container, one can return the class of the subclass object of the class of the container. The placement of object becomes thus a tool of assistance to the creation of a taxonomy.

Another manner (or a complementary manner) of proceeding is to base the training on the contents of the inserted objects (e.g by naive Bayesien training). If the training does not correspond to the desires of the user, the user can correct the training while placing an object placed elsewhere automatically. The training based on the contents is complementary to the training based on the properties of the contents insofar as the first is used when the second cannot or when the second leads to an ambiguity.

Lastly, a third process consists in back-propagating the objects, i.e. to propagate them in opposite direction of merge-transclusion. This is necessary in particular when a modification representing a replacement object or alternative object must be propagated upstream. This is carried out in the following way:

During the placement of an object, the process comprises an additional stage consisting in memorizing an association with the container source. When all the objects of a container destination come from the same container source, all new object added in the destination container will be automatically back-propagated towards the same container source. In the other cases, to select a container source which includes the domain of the destination object to backpropagate and/or with the largest intersection with the domain of the destination object to backpropagate. And if the domain of the container with the largest intersection does not include the domain of the destination object to backpropagate, to widen it so as to include it. Lastly, one can also place the object back-propagated in a garbage-collector container as mentioned above.

Conditions Associated with the Transclusions

The owner of an object (sub-objects included) can force the possible transclusions from this object. When the user tries to transclude a source object, conditions or options to be chosen such as among the following ones can be presented to him:
   The object cannot be transcluded
   The object (or one or some of its children objects) should not be modified
   The object can be transcluded but should not be republished
   The object can be transcluded and modified but an authorization of republication must be addressed to the owner before republishing it and
   It could be republished (while waiting for the answer) as long as the answer is not a refusal
   It could be republished only as soon as one answer of acceptance arrives—note that in this case the law allows in certain cases that a short quotation is published; one will implement an automatic system for such a publication and its automatic replacement by the normal publication as soon as acceptance arrives if any.
   The object can be transcluded and modified, but the contributions made to downstream must be automatically proposed to the owner and she already has the right to republish them.

When a downstream contribution is thus accepted,
  the owner and the downstream can publish it
  only the downstream can publish it
  only the upstream can publish it.
When a contribution downstream is refused,
  neither the downstream nor the owner can publish it
  only the owner can publish said contribution
  the downstream can publish said contribution.
Moreover the same conditions can or must be proposed again at downstream.

The owner at downstream of the transclusion can force the publications with the upstream. Thus, when the modification of an object (sub-objects included) goes up to be presented to the upstream, the owner upstream can see himself proposing in particular the conditions or options to be chosen among the following ones:
The object cannot be modified
The modification presented cannot be republished
Republication (without modification) authorized but only
  after emission of a request of acceptance
  and after reception of acceptance
  or while waiting for this acceptance and as long as a refusal is not received.
The contribution of the downstream can be still modified at upstream, but republished by upstream only after emission by the upstream of a request of acceptance by downstream
  and after reception of acceptance
  or while waiting for this acceptance and as long as a refusal is not received.
When a remodification by upstream is accepted by downstream,
  upstream and downstream can publish it
  only upstream can publish it
  only downstream can publish it
When a Re-modification by upstream is refused by the downstream, the downstream can nevertheless republish it.
Moreover the same conditions can (or must) be proposed upstream.

Structure of Personalization

Transformations and conditions described in the previous sections, as well as the other method and processes described up to now (transclusion, replacement of objects, presentation of alternative objects . . . ) can function within a general framework of "personalization" which we will now describe. We use the term "personalization" since these conditions and transformations can be specified as being a function of the (groups of) users to which they are addressed.

Thus we define personalization as a function which on the basis of (content and position of) object and/or of the metadata which are associated to them or other data of the environment, depending on the targeted user groups, returns content and position of same or other objects. A personalization can also take in input the result of another personalization.

A mechanism of coding (encryption) makes it possible to make sure that the conditions belonging to personalizations are satisfied. For example, if a resource can be derived it will be made sure that a certain object (such as a publicity) which it contains cannot be modified. It will as well be made sure that these conditions will be inherited from one transclusion to another.

Figure 91:
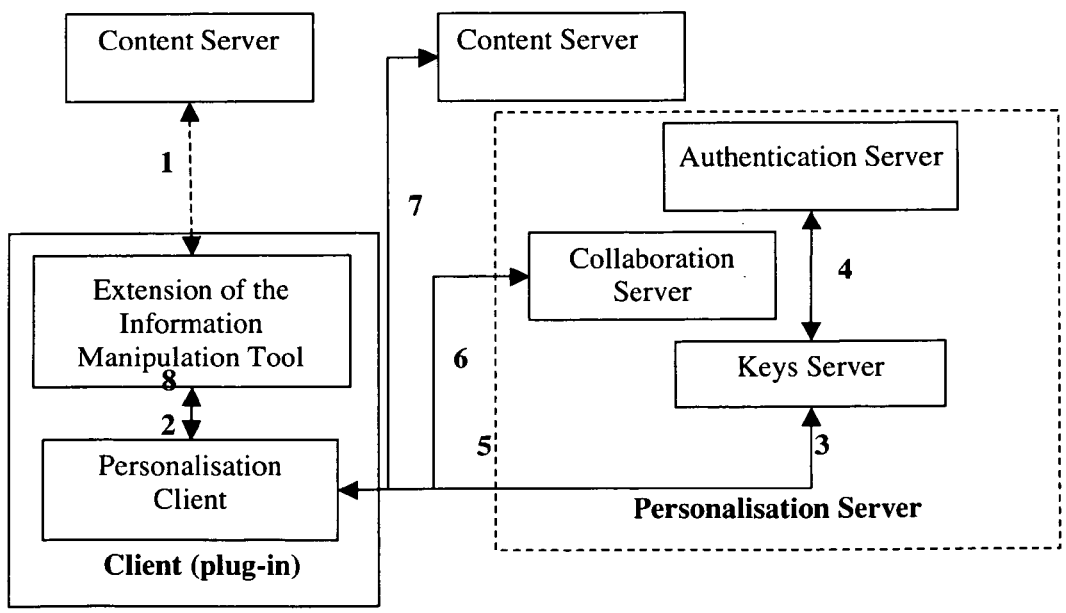

FIG. 91 shows the architecture of a system implementing this. One distinguishes there a unit named Serveur from Personalization, itself composed of the following servers:

A Collaboration server which manages in particular the transclusions and the other processes described in this document;
A Keys Server which memorizes all the keys for the encrypted contents and which is in charge of communicating with the Authentication Server to authenticate the user;
An Authentication Server (which can be for example a server such as Active Directory from Microsoft).

FIG. 91 shows also the client part (plug-in) which includes
A Personalization Client. It is component which is in particular in charge of submitting the "credentials" (login/password) to the Keys Server, to obtain from Collaboration server the personalizations and to apply them to the objects specified by the Extension of Information Manipulation Tool; to encrypt (during a publication) desired objects, and to decipher in a transparent way the encrypted objects.
Extension of Information Manipulation Tool which has in particular the responsibility of providing a user interface allowing for choice of a personalization to be applied; to take of the user his credentials and to communicate them to the Personalization Client; to obtain the contents starting from content servers; if contents are published, to transmit the contents and the credentials of the user to the Keys Server.

It should be noted that the customer part (plug-in) is authenticated by the Keys Server and the Collaboration server as condition to their operation.93

[93] With this intention, for each installation of the customer part one uses a public-private pair of keys. The public key is stored in the Keys Server and the private key is in the Personalization Client. To ensure the safety of the private key, one will be able to use a code generated starting from the specifications of the essential material components of machine (hard drive, processor, MAC if possible, etc) transformed by means of hashing (such as Blowfish). Moreover, during starting, the Personalization Server can check the checksum of the executable code of the client part.

First, the customer part obtains the information of recording (such as the owner of the software, etc) and uses the code generated (starting from the specifications of the essential material components of the machine) to read its private key, then encrypt the information of recording with the private key and sends it to the Keys Server for authentification in a session. The Keys Server deciphers information by using the public key which it has in its database and checks the data of checksum and recording for this client. In case of success a protected channel is then established between the client part and server by using a protocol such as SSL.

In FIG. 91, the stages of the process correspond to the numbers indicated:
1. The Extension of Information Manipulation Tool obtains the contents of the current version starting from the Server of corresponding Contents
2. The Extension of Information Manipulation Tool requires from the Personalization Client the personalization which must be applied to the resource, by transmitting the content of the resource (which will have to be personalized/deciphered) and the credentials of the user
3. If objects are encrypted, the Personalization Client requires the keys with the Keys Server
4. The Keys Server checks the credentials of the user by contacting the Authentication Server
5. In the case of successful authentication the Keys Server transmits the keys to the Personalization Client
6. In the case of successful authentication the Personalization Client requires of the Collaboration server personalizations which must be applied to the resource
7. The Personalization Client asks for the necessary objects (given at stage 6) their Servers of respective Contents 8. The Personalization Client applies personalizations then, by deciphering the encrypted contents. The result is transmitted to the Extension of Information Manipulation Tool which has the result.

If in the Content server, the contents of a resource such as a document are generated dynamically from a query (or a set of queries) to a relational database (or to another type of organization of data), the method described here is implemented so that the user can handle and collaborate at the level of the resource which is presented to her and the resulting modifications are reflected into the database (in a transparent way).

The difficulty lies in the identification of such objects by the client. If it is a relational database, we consider each row of the given database and each field (each column of the table in question) as presented in FIG. 92. For each row, the identifier of the "object" (within the meaning of present description) in question could for example be the primary key. In the same way the identifier of object for the fields could be the composition of the primary key and the name of the column of the table in question.94

[94] The identification of objects in a relational database is known in state of the art.

An additional component (plug-in) is then necessary at the level of the content server to inject, by means of "invisible" tags in the presentation (such as <A> in HTML), the information of the identification of the object corresponding to the data of the database. Thus any request to the content server (intended in fine for the database) is addressed to this component which handles the request so that the result in return contains in addition the identifier of object of each data returned by the database.

Thus one can identify the objects. When for example an object 'O' of a database is re-used in a plurality of resources (from which the content is dynamically generated), when one of these resources R1 is derived as R2 and the object 'O' modified, the Extension of the Information Manipulation Tool in question will inform the collaboration server of this derivation and the modification of 'O'. When one of the resources among said plurality of resources will be revised by means of a Information Manipulation Tool, its Extension will require the Collaboration server the replacements or enrichments to be carried out. The collaboration server will then return to it the identifier of the modification (if it is always the most elaborate) of 'O' in R2. The Extension will then obtain this modified version of 'O' starting from the Content server hosting R2.

Replacements/Enrichments as Proposals for an Acceptance

The owner of a resource can accept or refuse the replacement objects and the alternative objects presented in this resource.

If an object (replacement or alternative) is refused, all the other objects of the branch in which this object is are implicitly also refused.

We will now present a user interface implementing this. The information manipulation tool illustrated here (as an example) is a Web browser equipped with an extension to assemble replacement and alternative objects in the Web pages. The same principles can be implemented on any other information manipulation tool and to handle other types of resources.

Figures 92, 93, 94:
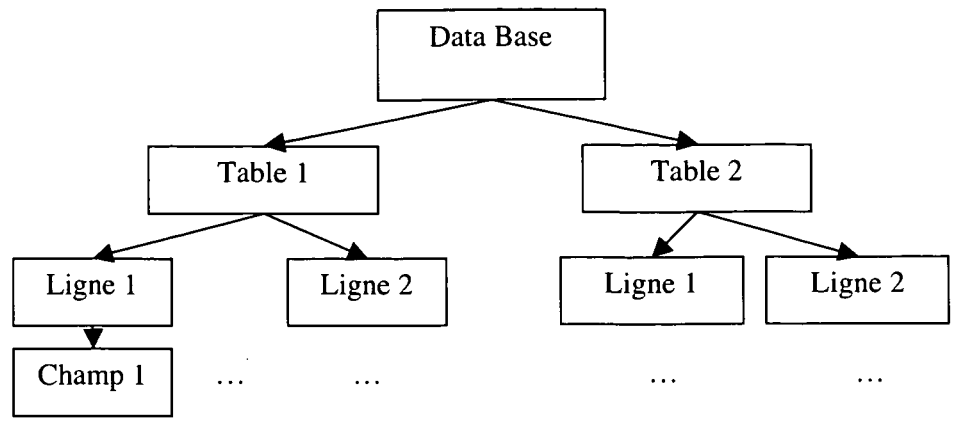

FIG. 93 introduces the Web browser schematically equipped with a toolbar (which represents the extension in question). The user can thus enter a URL "www.site.org/page" and click on "Send" to make displayed the Web page corresponding to this URL, within the framework of a SCR "E1" (which she can select in a drop-down list).95

[95] Alternatively, the button "send" is not necessary if sending is done in a traditional way by using the Web navigator and so in order not to view the page through a SCR one can for example select "not collaboratives resources" in the drop-down list.

FIG. 94 presents the Web page, within the framework of the SCR, with replacement or alternative objects (schematically represented by rectangles), as well as a button "modify" in the toolbar.

Figure 95:
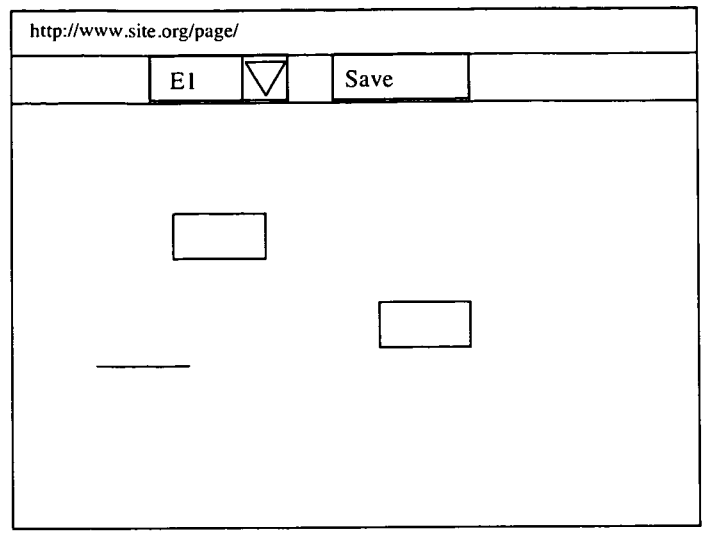

FIG. 95 introduces the browser schematically after the user clicked on the button "modify". This button is now replaced by a button "record". When the user clicks on it, if she is the owner of the page in question, the system gives her the choice to record the modifications either in the same file, or as a new page derived in a different file to indicate; if the user is not the owner of the page in question, it must necessarily record it as a new derived page.96

Figure 96:
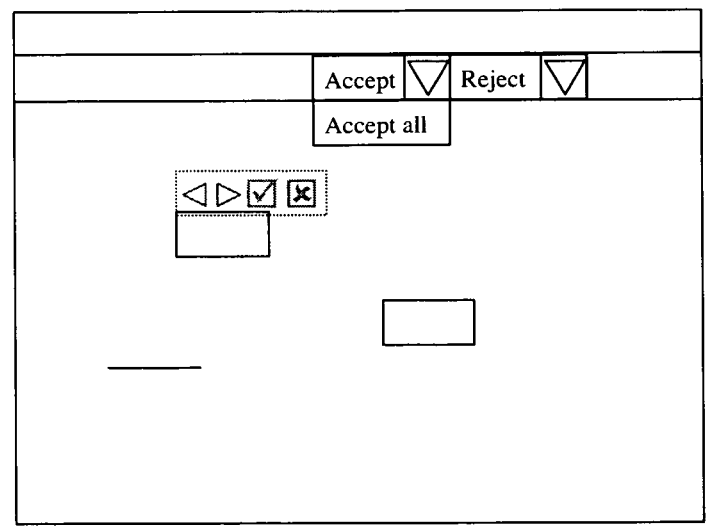

[96] When she records as a new derived page, she becomes owner of the latter of course FIG. 96 presents schematically that the user has the possibility of accepting or refusing the replacement and alternative objects. The user can accept/refuse such an object while moving the mouse cursor above it and

- by selecting it while clicking in "Accept" or "Reject" in the toolbar
- or by clicking on one of the symbols " ☑ " or " ☒ " presented (posted only when the pointer of the mouse is positioned on the object in question). It should be noted that the arrows (triangles) directed towards the left and the right-hand side are used to make respectively present the alternative object preceding and following (to be started with the original objects, then replacement objects). The latter are presented resource by resource (i.e the objects coming from the same resource are presented together). It should be noted that when an alternative object is modified, it can be regarded as "frozen", the other options not being then more accessible via these arrows (but an operation "undo" allowing to return in a previous state)
- or by selecting "Accept" or "Reject" in the contextual menu which appears when it presses the right button of the mouse.

Alternatively (and advantageously), the acceptance of an alternative object can be automatically got when the user records a derived resource in which the object in question was replaced by said alternative object; and the refusal of an replacement object can be automatically got when it is replaced by the original object (for example by using the arrow directed towards the left mentioned in the previous paragraph).

The user interface makes it possible moreover to highlight the objects (see reifications) and the grains, or to create new ones.

Modes of Use of the SCR

The modes of use of the SCR relate to their activation or not (to propagate the updates towards downstream through the transclusions as well as the other contributions).

The user interface makes it possible to the users to initially select SCR's by default, then for each access to a resource to specify the respective modes of the SCR (however these modes persist by default from one access to another).

One offers to the user a screen as follows comprising two parts:

First Part:

☐☒ (check box able to take one among two values: notched or not)—

Notched meaning "By default, the updates are fully propagated (starting from the upstream and towards the downstream)"

Not notched meaning "By default, the updates are received upstream but not propagated towards downstream" (secret mode)

Second Part:

For each SCR mentioned by the user:

☒ ☒ (check box being able to take one among two values: notch or cross)—

Notch: whole collaboration in this SCR

Cross: no communication in this SCR

One now will present the use of these modes by means of scenarios.

FIG. 97 presents a resource R2 which derives from R1 in the SCR E1 and which transcludes (by the transclusion T2) an object c of the resource S1 in the SCR E2 and E3.

In the FIG. 98 the resource R2 is opened by the user in a "secret" mode for the SCR E3, then T2:d is modified.

In the FIG. 99 the resource R2 is open in the SCR E2 and T2:d is refused.

Thus the use of modes is useful to collaborate selectively[97]. One will see an alternative further (in the section presenting the multi-versions objects).

[97]The use of SCR in various modes is useful at the time of contributions of modification of results of persistent requests for a database (like already described, a persistent request can be seen as a transclusion). When the user adds an element in the results of a request, the selection criteria which appear in the persistent request in question are used to back-propagate in the database the properties associated with the data. This is carried out exclusively in the SCR concerned.

Recommendation of Resources and SCR

We saw up to now that the user can access a resource "through" an SCR. A question which she can raise is of knowing, among the SCR that she has the right to use, which one to choose.

Another question of the user can be to know which ones are the most recent and/or relevant resources for her that other users saw in the SCR that she is using.

The two questions above can be combined: the user can ask to the Collaboration server to provide her at the same time relevant (and/or recent) resources and SCR's among those which she has the right to use.

Finally the users can also want to be discovered among them (for example to meet or to exchange information) starting from the resources/SCR which they respectively will visit or handle (see also on this subject the approach of rating the users, described with in the section "Method of sorting of alternative objects per notation (rating)").

Insofar as the Collaboration server knows which user accesses which resource in which SCR (these triplets being memorized), it can simply apply methods of collaborative filtering to obtain the answers to the four types of questions above, in particular by carrying out countings to determine the proximity of the users in terms of many couples 'resources/SCR' which they visited/used jointly and to exchange between close (likeminded) users their respective experiences.

The proximity of the users among them (in terms of couples 'resources/SCR' that they visited/used jointly) can of course also be useful in complement of the above-mentioned approach of rating, to sort the alternative objects according to the proximity of their authors compared to the user.

One will see further one alternative method based on the implementation from conduits of propagation of relevance scores.

Advantages

We can now present advantages resulting from the described methods. We will also describe some new associated methods.

Advantages for the Processes of Publication

The SCR represents an effective means of collaboration to write/compose a work with several contributors. It is enough for that that all the contributors share[98] the same SCR so that each contributor can work out the resources produced by the others.

[98](are users of)

To publish, the owners of the resources accept or select (among the alternative objects) the contributions which they wish to see publishing (and they are unaware of or refuse the others). Thus the other contributions are not seen by users other than those who are members of the same SCR.

Not only new pages can thus be published, but even the pages created outside the SCR can be derived and republished, subject to the legal considerations described further.

Collective Drafting of a Future Publication

Figure 100:
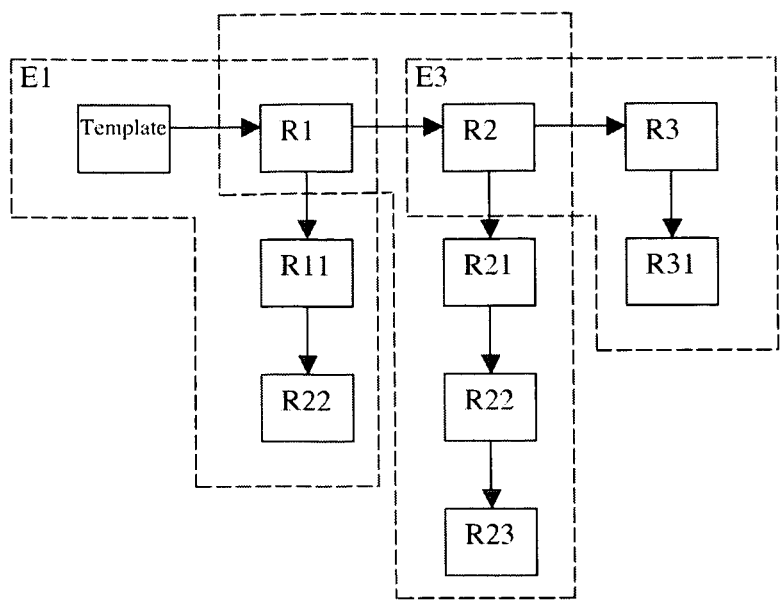

An interesting application is the preparation of a future publication. Its principle is illustrated on FIG. 100. The rectangles (R1, R11, etc) represent resources; the arrows represent derivations; the areas in the shape of "L" to back, framed by discontinued lines, represent SCR (E1, E2 and E3).

Here it is about the structure of the organization for the preparation of the publication[99] of a monthly review, whose layout grid is the resource "Template". For example, this review must be published the first time in April (resource R1), then in May (resource R2), then again in June (resource R3), etc

[99](i.e. of the structure of the "workflow" of publication)

The collaborators of the publication of April are members of the SCR E1; those of the publication of May are members of E2; and those of June of E3.

This set of collaborators (respectively members of E1, E2 and E3) can be disjoint or not, and this set of collaborators work in parallel to prepare the publications say 6 months in advance.

The publication of April (R1) is derived from the resource "Template", so as to re-use this model. The collaborators charged to produce the contents of R2 (May) take and reuse the presentation of the publication of April. Those in charge of producing the publication of R3 (June) take and reuse the presentation of the contents of R2.

The advantage of this approach is double:

(by the properties of the transclusion) every update made upstream reflects itself at downstream; thus for example if the Template model is improved, all the publications benefit from it since they are at downstream, and reciprocally any proposal for a development submitted (by downstream) by the collaborators of a publication will be seen be collaborators of the later publication (who form another branch downstream) only if it is accepted. Indeed, the collaborators of a publication R do not see the contributions of the collaborators of the R−1 publication before they are accepted, since they are not members of the same SCR.

Of course all kinds of other organizations of derivations can be considered, to offer various advantages according to the desired applications.

Advantages to Broadcast Advertising Content

One now will describe how a publisher, let's call her "the newspaper", can advertise on the Internet by using the methods described here.

The newspaper creates a new SCR (the newspaper can also use a preexistent SCR). In its site, a clickable link makes it possible to download an extension (plug-in) to the common information manipulation tools such as the common browser Internet Explorer or Firefox. After downloading the browser extension is automatically activated. If the extension is already installed, the SCR is directly activated without needing downloading nor installation. All this is carried out only by one simple click of the user.

An advertising content (object) is included in each resource (Web page) and a constraint of non-modifiability is associated to it (see further the sections "the Web in read-write" and "Associating constraints to objects"). Thus each time a page of the site is derived by a user and that this page is republished in turn, the visitors of this derived page see said advertising object which, because of constraint of non-modifiability, cannot be removed or modified by using the information manipulation tools provided with the extension (plug-in) in question.

In the current cases where advertisements are placed in <IFRAME> the traditional methods of counting can continue to function. In any event, of the Counters such as those already mentioned could be implemented to count the number of times that a new page is derived by including the advertising object, the number of times that it is transcluded by other means, or the number of times where the advertising object is simply seen in a page. This makes it possible the newspaper to make profitable these publications while making pay their advertisers according to these Counters.

In addition, the supplier of the service rendered by the collaboration server (to manage the SCR which include the advertising objects in question) is remunerated by the newspaper, or its customer advertiser or the agency inserting publicities, according to the results given by these same Counters.

Moreover, another process consists so that the information manipulation tool filters the contents of the not-modifiable objects (as ads) if the value of the counter of transclusions[100] of this object exceeds a certain threshold (threshold which obviously can be a function of the payment already carried out or envisaged to carry out with the supplier of the service rendered by the collaboration server).

[100](and/or of derivation of resources containing)

Advantages for the "Wikis"

The "wikis" (cf www.wikipedia.com) are sites whose visitors can modify the pages as they wish. The wikis are particularly well adapted to exchange ideas and to articulate them and develop them jointly. They are typically used to cooperate on collective projects, to encourage the contributions and to accelerate the information flow.

However, in the wikis, the "significant" parts (prone to debate) of the contents are in general modified and re-modified alternatively by the "users of each camp" until possibly a consensus (on what this information must comprise) emerges . . . . It is thus difficult to put information "not neutrals" in the wikis. Although the wikis have the advantage of encouraging to respect the opinions of others, the search of neutrality inherent in the wikis appears too restrictive and sometimes tends to impoverish information.

We propose here a new kind of wiki which, contrary to the present generation of the wikis, not only allows but even encourages the contribution of not-neutrals information (insertion of contents coming from divergent points of view, different opinions, etc).

Various mechanisms (trees of derivation, transclusion, etc) described up to now make it possible to present the updates like replacement objects (OR) and information not-neutrals like alternative objects (OA).[101]

[101](while avoiding the redundancies in the information storage)

The Web in Read-Write

The modifications made by each Net surfer in any Web page are visible by each other Net surfer who visits it within the framework of the same SCR. However, to respect the "copyright", it would be normal that only the modifications authorized by the owners of the Web pages can be republished via the collaboration servers. However, as mentioned above, one can expect that the owners of Web pages have interest with (and thus want) authorizing the modifications of their pages insofar as they increase their audience thus and they can force the pages so that certain parts (for example advertisements that they contain) cannot be modified. Insofar as they do it, the current Web which is in read-only will be transformed into a Web in read-write.

Another essential difference with the current wikis is that here the resources of the same SCR are not inevitably in the same site. Moreover current wikis comprise only Web pages, whereas here one aims at collaboration on all kinds of accessible resources on a network.

In short, the Web which today is in reading alone can become in read-write. Moreover one can add to this new Web the resources other than the Web pages which are in the SCR.

Reverse Links

An added link, by a user of a SCR, in a resource derived from a starting resource (such as a Web page), can lead a user (the same one or another) of the same SCR to visit the resource pointed by this added link.

Moreover we introduce here the method of automatically adding, on a resource derived of the aforASEid pointed resource, a link ("reverse link") which can bring towards said starting resource a user of the same SCR visiting said pointed resource.

The set of the reverse links can for example be automatically presented to the user in a (sub)window, adjacent with the (sub)window presenting the content of the visited resource.

Meta-Data

The fact that technically any accessible resource, for example any Web page, can be republished, encourages to set up rules to help the user, at least on the legal level. Essentially the idea is that the information manipulation tool automates or facilitates the emission of a request to ask for the authorization of (re)publishing contents, then manages the process of publication while waiting for the answer to such a request.

Thus, the activation of automated means for requesting authorization can be triggered as soon as a resource is derived[102] for being published, and the publication will start automatically at the latest when the authorization arrives.

[102]See also the section "Conditions associated to a transclusion".

While waiting for an authorization to publish, a mechanism making it possible to publish only quotations (restricted extracts) within reasonable limits (legally) allowed could be implemented.

For such a method of requesting authorization to be implemented, it is necessary that the owner of the contents of origin, or a decision authority (which can decide in her place), can be contacted. One proposes thus that the resources include or associate meta-data of contact of a decision authority.

Other meta-data can be associated with an object for selectively controlling its modification and/or its accessibility by third parties within derived resources. In particular, the meta-data of disclosure constraints can specify that (as already evoked) the given objects can be reproduced (with modification authorized or not) provided that specified sub-parts are included without modification.

The resource containing—or to which meta-data are associated—can be structured in the form of a tree structure of objects, so that in association with at least certain nodes of the tree structure, a meta-data of disclosure constraint is memorized, which then also applies to the children nodes.

Circumventing Censorship

At the time of the access to a resource, if the user expressly did not specify at least a SCR (and/or a collaboration server) for this access, the information manipulation tool sends a request to the collaboration server which is configured by default, to obtain the identifiers of the replacement objects and the alternative objects.

To answer such a request, each collaboration server is ready to seek other collaboration servers which can provide the required identifiers, and to return these identifiers[103] to the information manipulation tool.

[103]The collaboration server is able to return the identifiers of replacement objects and alternative objects, as well as their identifiers of respective SCR, so that the identifiers of replacement objects and alternative objects can be used selectively, i.e. only if the SCR which provide them are convenient for the user or if she is member)

The information manipulation tool is thus ready to obtain the necessary identifiers starting from any collaboration server, this last being used as intermediary if it cannot answer itself. It is thus not useful to block, in particular with the aim of censoring, the access to[104] certain collaboration servers since others will be able to relay them.

[104](the IP addresses of)

Figure 101:
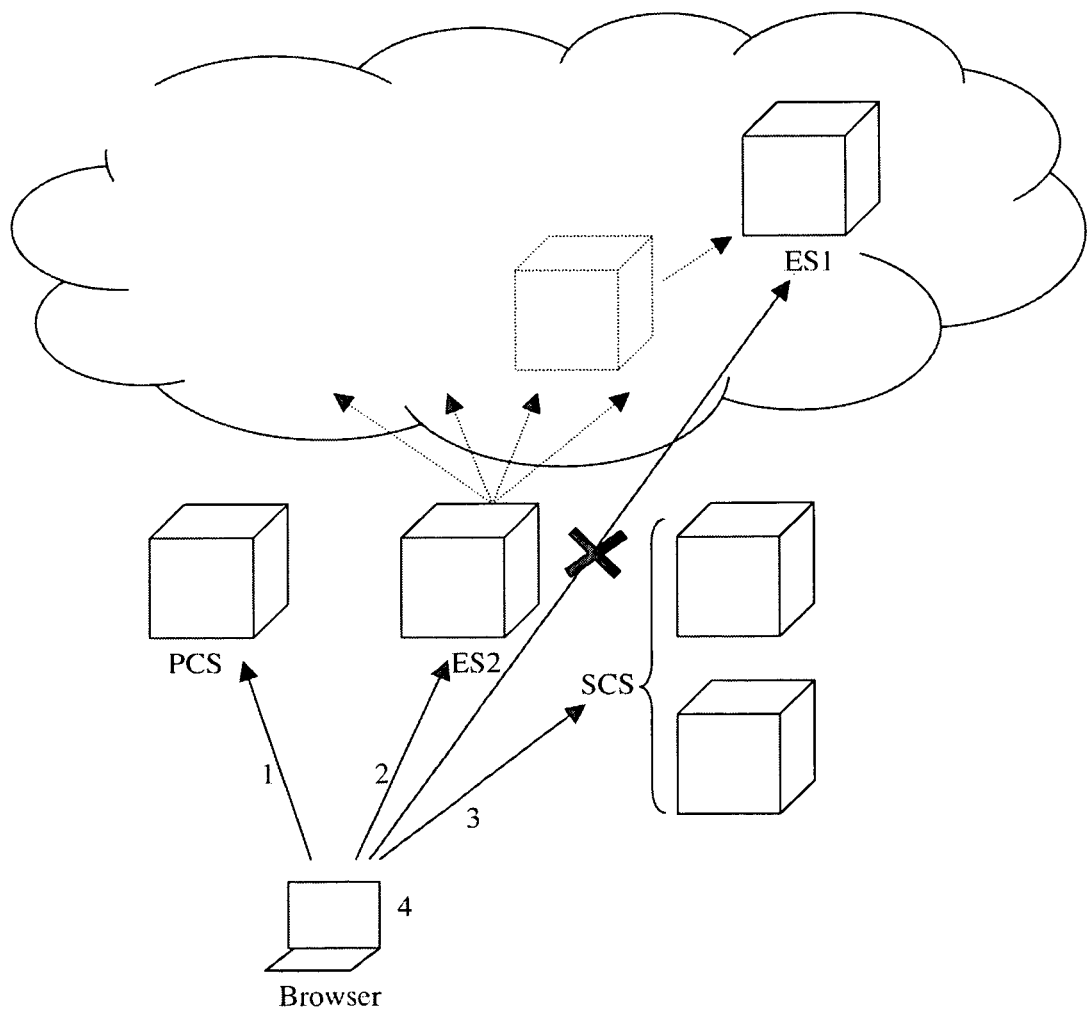

FIG. 101 illustrates this process: instead of receiving the identifiers of the replacement objects and alternative objects starting from a collaboration server ES1, because connection with ES1 is cut (what is represented by large X in FIG. 101), the information manipulation tool obtains them starting from a collaboration server ES2 with which connection is possible. Indeed, when it receives the request of the information manipulation tool, ES2 questions the collaboration servers which it knows, those relay in turn the request to the servers that they know themselves, and so on, in a traditional known peer-to-peer process. Thus ES2 ends up accessing ES1 which provides the identifiers of the replacement objects and the alternative objects for the accessed resource in question.

In addition, it is not useful to either block the access to sites of contents (PCS or SCS) insofar as not only information which they provide is reproduced in the "cache" of the derived pages from them, but further the collaboration servers are ready to provide the nearest derived page accessible from a necessary page.

Extensions to the Current Protocols of Syndication

Interoperability

We will now present two protocols (PSE and ASE) which are extensions to the existing protocols of "sharing" (or syndication), such as RSS. These protocols have in theory the following characteristics:

The contents are published in the form of channels (or "feed")

A channel includes several "items" (data elements)

Each item has a unique identifier

Servers can subscribe to channels published by other servers

Servers ("re-publishers") can agregate several channels and republish them

Some of these protocols (such as "RSS+SSE" specified by Microsoft) also allow that:

Re-publishers can modify some items (i.e. these servers make it possible their users to modify the items of which they are not the original authors)

the results of these modifications are propagated to the subscriber (servers) and are synchronized in a decentralized way.

The protocols PSE and ASE that we now introduce thus aim to obtain a network of servers which share contents while subscribing to channels published by other servers. In a heterogeneous environment, the servers use different protocols. For example some use RSS 1, other RSS 2.0 with extension SSE (RSS+SSE), others can use other extensions, etc. the protocols described here are in fact extensions to all existing and future protocols having the characteristic stated above; they were conceived to function like additional layers on them.

We expresses the existing protocols of sharing by means of an abstract syntax[105], as follows:

[105]The tags and the attributes (in XML) presented are "abstract" in the sense that they correspond to the various tags/attributes of the existing protocols. Actually they will be the tags and attributes of the existing protocols which will be used and not those.

The tag <channel> for the channels which a server publishes;

The tag <item> (in the tag <channel>) for each item in the channel published—it has the attribute 'id' which gives it an identifier;

The tag <content> (in the tag <item>) for the contents—for example this tag corresponds as well to the tags <title> and <description> of RSS 2.0;[106]

[106]As it is here about abstract syntax, actually there will not be this tag <content> but the similar tags <title> and/or <decription>, etc or tags, according to the original protocol in question.

Each existing protocol which has an equivalent representation (i.e. equivalent tags and attributes) can interoperate with PSE and ASE[107]. Every other tag other than those equivalent to those above will be not removed but ignored (i.e. will not be interpreted) by protocol PSE.

[107]In the continuation by "PSE" we intend "PSE and ASE" except manifest contrary sense.

The implementation of PSE typically will include the implementation of the most common existing protocols such as RSS 2.0, RSS 2.0 with SE, RSS 1.0 etc so that their respective tags (and attributes) are interpreted in their respective original protocols. When the implementation of PSE does not recognize a tag it is unaware of it but retains it in the channel so as not to lose information for the other servers which take part in the network.

The implementation of the protocol PSE will initially include a specifications of protocol(s) of the source (or a protocol chosen by the user by default if the server is the source itself) and then adds PSE elements (like siblings or children of "item" elements) and carries out the associated treatments. PSE elements are declared in a distinct name space, and it is provided that they will be simply ignored by the other servers which would not recognize them (i.e. which does not treat the elements belonging to that the name). In general, a copy of the elements of the source is also preserved so that the subscribed servers which do not understand PSE can nevertheless interpret the protocol of the source and thus interoperate with PSE. As already mentioned, protocol PSE carries out the treatments the source protocol(s)[108] so that the server seems (with respect to the subscribed servers which would understand only the source protocol) a server of the source protocol.

[108]Here source protocol means either the protocol of the source of republished item, or the protocol chosen by the user for the original items.

Figure 102:
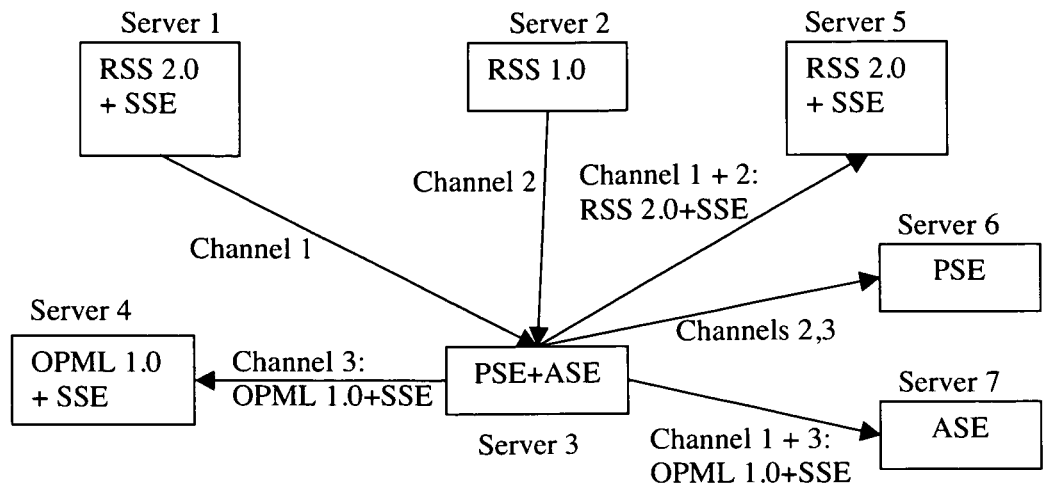

FIG. 102 presents various content publishing servers in various protocols. The server which implements PSE can interoperate with these various protocols and add PSE extension to the respective channels. For example it takes 'Chanel 1' of "Server 1" which uses RSS 2.0 with extension SSE, adds PSE layer in 'Chanel 1' and republishes it. It publishes also 'Chanel 3' in format OPML 1.0+SSE (the format can be selected by the user which creates the channel) to which subscribes "Server 4" which recognizes this protocol.

This figure illustrates also the fact that in protocol PSE, the source protocol is retained so that those which understand the source protocol can subscribe to the republished channel. For example 'Chanel 1' is republished by "Server 3" by using the same protocol as the source, namely RSS 2.0 with SSE, so that "Server 5" which understands RSS 2.0 with SSE can subscribe to 'Chanel 1'. As for "Server 7" it uses the protocol ASE and can subscribe to all the channels published by "Server 3" but by being unaware of the elements in PSE.

Of course, the aggregation of different channels is only possible for compatible protocols. For example RSS 1.0 (or 0.92) can be aggregate with RSS 2.0 to give a valid channel RSS 2.0 but this is unfortunately not possible in the other direction. A server implementing PSE makes it possible to incorporate such compatible protocols. This is illustrated in FIG. 102 where "Server 3" incorporates 'Chanel 1' and 'Chanel 2' like a channel RSS 2.0+SSE. Other servers like "Server 5" can then subscribe to see items both of 'Chanel 1' and of 'Chanel 2'.

PSE

The PSE extension to the sharing protocols allows the user to transclude from a source an item or a part (of the contents) of an item. The user can mark a part[109] of item as being an object; this object can then be transcluded into another channel or into the same channel. The characteristics described up to now for transclusions remain valid. Thus, the modifications of object, in the result of the transclusion, are preserved during synchronization with the source; and the closer sources have priority for the updates.

[109](which causes to make it acquire an identifier; it is about the process of reification already described)

XML Specification

We just need one tag which is defined in the namespace "pse:". It is the following one:
Element <pse: part> in <item> or <channel>

This element can be in the element <item> or the element <channel> at the same level as <item>. When a part of an item is reified[110], this element <pse: part> appears in the <item> element to encapsulate the created object. When an element <item> is transcluded in another channel on the same level that an <item> element then it is inserted in the element <channel>. It should be noted that the position of this element counts.

[110](to be considered as an object)

Attributes:
Tid: This is a necessary attribute which gives the identifier of the object according to the PSE protocol.
Src-tid: This is an optional attribute which gives the Tid of the modified source nearest. During synchronizations, the mechanism of update of this attribute is the following: the attribute src-tid is compared with (if necessary) the attribute src-tid of the source element in order to take its value if it is closer. If there is no attribute src-tid, that means that the source does not itself depend on another source.
Changetype: This is an optional attribute which is added when the object is modified locally. It can take its value among the following ones: CREATED, MODIFIED, DELETED.

PSE Scenarios

The scenarios which follow cover various cases of use of PSE.

Item Transcluded in a Channel

Figure 103:
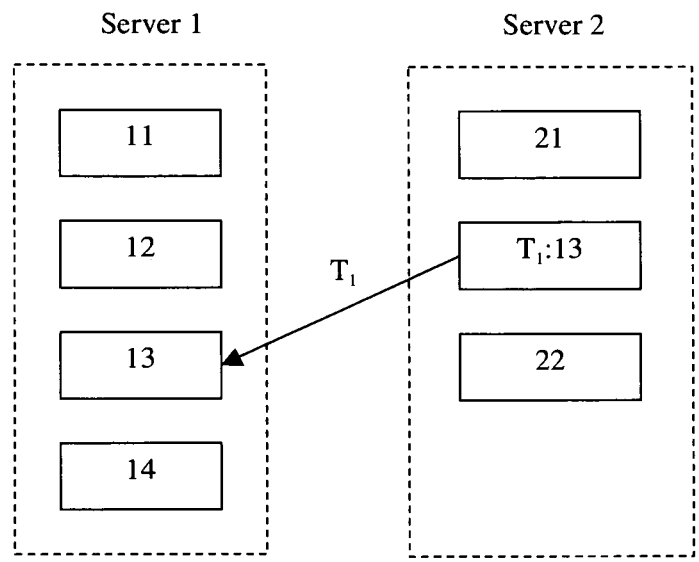

FIG. 103 presents two RSS flows (channels), Server 1 and Server 2, and presents the fact that an item of Server 1 is transcluded to be placed between two existing items of Server 2.

Abstract XML Representation

As already specified, the new element <pse: part> has the attributes tid, src-tid and changetype. The tid is the identifier of the object in question which, in this scenario, is the result of the transclusion. The 'src-tid' is the identifier of the modified nearest source. Only one among the attributes src-tid and changetype will be present because when the object is modified locally there is no more source.

Server 1 (the source):

```
<item id=11>
    <content>
    ...
    </content>
</item>
<item id=12>
    <content>
    ...
    </content>
</item>
<item id=13>
    <content>
    ...
    </content>
</item>
<item id=14>
    <content>
    ...
    </content>
</item>
```

It should be noted that there can be other elements (such as <sx: sync>) in <item> (not mentioned with an aim of concision) which is ignored in protocol PSE itself but retained for the use of the protocol of origin.[111]

[111]Server PSE includes not only the implementation of PSE but also the implementations of the other protocols that it understands (such as for example RSS 2.0 and SSE). Thus, although these elements are ignored by protocol PSE, they are taken into account by the implementation of their respective original protocol in the PSE Server itself.

In result of the transclusion, Server 2 includes the item the '13' transcluded as well as an element <pse: tid="T1:13" src-tid="13"/> (initially without content).

Server 2:

```
<item id=21>
    <content>
    ...
    </content>
</item>
<pse: tid= "T1:13" src-tid= "13"/>
<item id=13>
    <content>
    ...
    </content>
</item>
<item id=22>
    <content>
    ...
    </content>
</item>
```

'13' is Modified in Server 1

When Server 2 is synchronized with Server 1, only the item '13' in Server 2 is updated with the new content of its source[112] and, as long as contents of the element 'T1:13' were not modified by the user (locally), the element pse:part implicitly reflects the contents of item the '13'.

[112](by using the protocol of origin)

'T1:13' are Modified in Server 2

When 'T1:13' in Server 2 is (locally) modified[113], its content is explicitly added in <pse: part>, and the modification is carried out in item the '13' located in Server 2 for the use of another protocol. Any later local modification will be made in 'T1:13' and in '13'. The attribute 'changetype="modified"' is added and the attribute 'src-tid' is removed:

[113]Advantageously, the implementation of the process includes means to determine semi-automatically (or simply by asking it the user) if the modification in question is dependent on the context or not. The fact of preserving the item '13' or not will be then related. Here "dependent on the context" means primarily that the modification cites at least a part of another item of the same channel.

Server 2:

```
<item id=21>
    <content>
    ...
    </content>
</item>
<item id=13>
    <content>
    ...                ← content modified
    </content>
</item>
<pse: tid= "T1:13" changetype= "modified" >
    ...         ← content modified
</pse: part>
<item id=22>
    <content>
    ...
    </content>
</item>
```

The item '13' will continue to be synchronized with its source (by the original protocol), whereas the element 'T1:13' will not receive any more updates of the source since it is modified locally.

Item Transcluded within an Other Item

Figure 104:
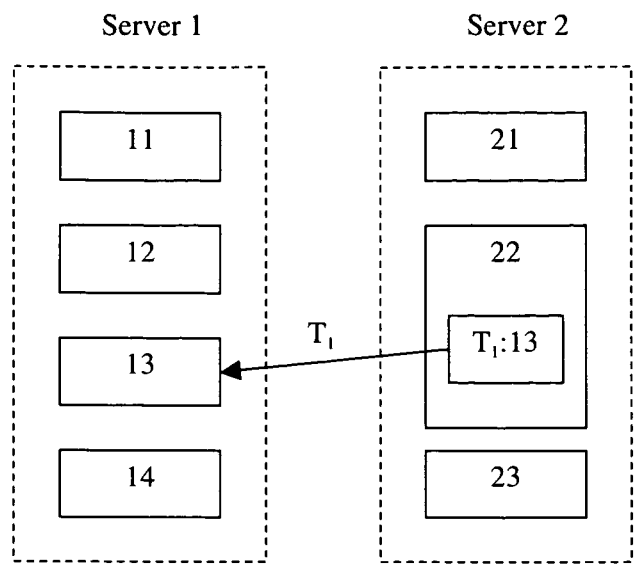

FIG. 104 presents a transclusion whose result is placed within the contents of another item.

Abstract XML Representation

The element pse:part is now placed within the content of the item '22' (to represent the result of the transclusion at the precise place where this result is placed). As in the preceding example, the copy of the contents of item in the source '13' is added in Server 2.

Server 1:

```
<item id=11>
    <content>
    ...
    </content>
</item>
<item id=12>
    <content>
    ...
    </content>
</item>
<item id=13>
    <content>
    ...
    </content>
```

-continued

```
    </item>
<item id=14>
    <content>
    ...
    </content>
</item>
```

Server 2:

```
<item id=21>
    <content>
    ...
    </content>
</item>
<item id=22>
    <content>
    ...
    <pse: tid= "T1:13" src-tid= "13"/>
    ...
    </content>
</item>
<item id=13>
    <content>
    ...
    </content>
</item>
<item id=23>
    <content>
    ...
    </content>
</item>
```

'13' is Modified in Server 1

Similarly at the preceding example, when Server 2 is synchronized with Server 1, the item '13' in Server 2 is updated with the new content of its source and the element pse:part ('T1:13') refer to it.

'T1:13' is Modified in Server 2

When 'T1:13' in Server 2 is modified locally, the modified content is put in the element pse:part, and the modification is carried out in the element item (for the use of another protocol). Any later local modification will be made in 'T1:13' and in '13'. An attribute 'changetype="modified"' is added and the attribute 'src-tid' is removed in the element pse:part:

Server 2:

```
<item id=21>
    <content>
    ...
    </content>
</item>
<item id=22>
    <content>
    ...
    <pse: tid="T1:13" changetype= "modified" >
        ...          ←contained modified
    </pse: part>
    ...
    </content>
</item>
<item id=13>
    <content>
    ...                    ←contained modified
    </content>
</item>
<item id=23>
    <content>
```

```
        ...
     </content>
  </item>
```

Part of Item Transcluded within an Other Item

Figure 105:
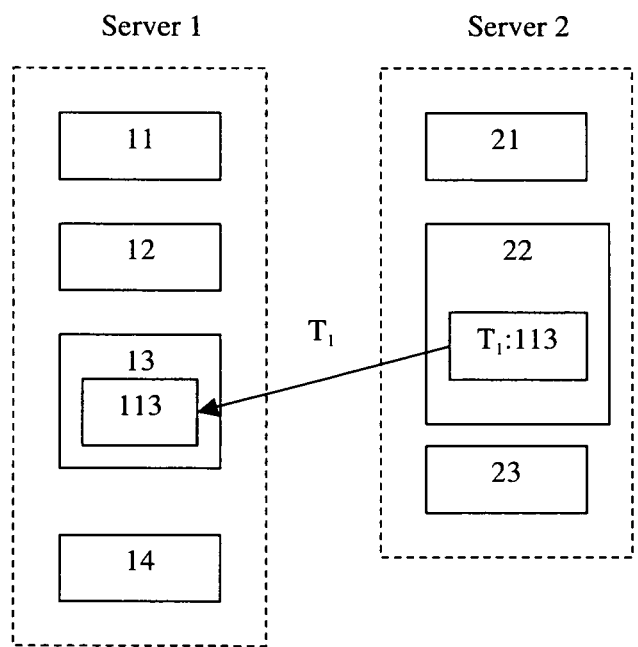

FIG. 105 presents the case of the transclusion of only a part of the content of an item, this part ('113') now being the source object to be transcluded within the content of another item ('22').

Abstract XML Representation

The only difference compared to the previous example is that the part in question in the source must be reified. One uses for that the same tag pse:part which is used here to delimit the reified part and whose attribute tid provides the identifier of the object that results from this reification.

Server 1:

```
  <item id=11>
     <content>
        ...
     </content>
  </item>
  <item id=12>
     <content>
        ...
     </content>
  </item>
  <item id=13>
     <content>
        ...
        <pse:part tid= "113" >
           ...
        </pse: part>
        ...
     </content>
  </item>
  <item id=14>
     <content>
        ...
     </content>
  </item>
```

Here the element pse:part does not have an attribute 'src-tid' since its contents do not depend on another source.

Obviously, what was described up to now is also valid for the transclusions in a same channel or between different channels of the same server.

Internal and Implicit Transclusions

Figure 106:
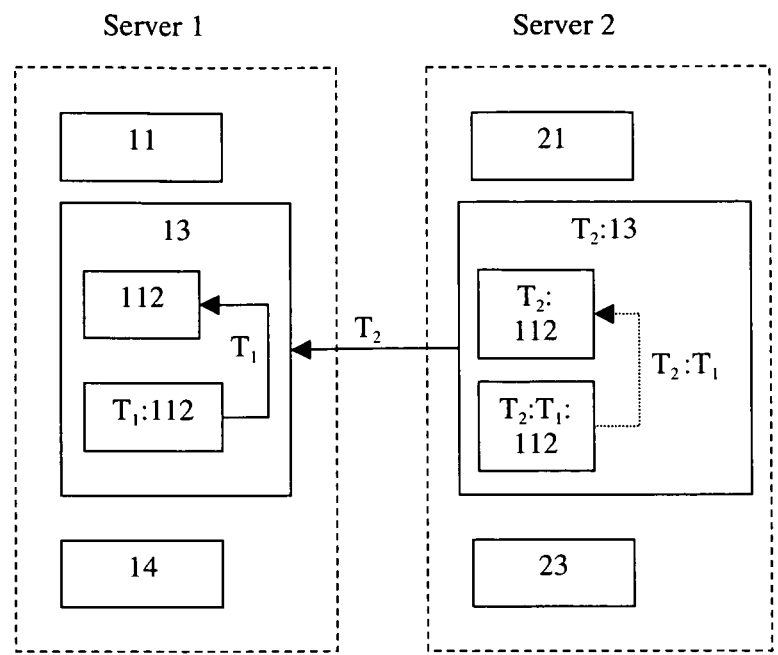

FIG. 106 presents the case of an internal transclusion in Server 1 which gives rise to an implicit transclusion in Server 2.

Server 1:

```
  <item id=11>
     <content>
        ...
     </content>
  </item>
  <item id=13>
     <content>
        ...
        <pse: tid= "112" >
           ...
        </pse: part>
        ...
        <pse: tid= tid= "T1:112" src-tid= "112" >
           ...
        </pse: part>
```

```
        ...
     </content>
  </item>
  <item id=14>
     <content>
        ...
     </content>
  </item>
```

Server 2:

```
  <item id=21>
     <content>
        ...
     </content>
  </item>
  <item id=13>
     <content>
        ...
        <pse: tid= "T2:112" src-tid= "112" >
           ...
        </pse:part>
        ...
        <pse: tid= "T2:T1:112" src-tid= "112" >
           ...
        </pse:part>
        ...
     </content>
  </item>
  <pse: tid= "T2:13" src-tid= "13"/>
  <item id=23>
     <content>
        ...
     </content>
  </item>
```

'112' is Modified in Server 1

When Server 1 is synchronized with itself (what must normally be started directly), 'T1:112' is updated with the contents of 112, its modified source nearest (given by the attribute 'src-tid="112"'). Also, when Server 2 is synchronized with Server 1, the contents of 'T2:112' and 'T2:T1:112' in Server 2 are updated with the new contents of item the '112' of Server 1, their modified nearest source being also given by the attribute 'src-tid="112"'[114].

[114]The mechanisms to determine the closest sources were already described, in particular in (and before) the section "Algorithms in Push".

'T1:112' is Modified in Server 1

When 'T1:112' in Server 1 is modified, an attribute 'changetype="modified"' is added to the element pse:part and the attribute 'src-tid' is removed in this element. When Server 2 is synchronized with Server 1, contents of 'T2: T1:112' in Server 2, as long as it was not modified locally, is updated with the new contents of item 'T1:112' of Server 1, its modified nearest source being now 'T1:112'.

'T2:112' is Modified in Server 2

As in the previous examples, when 'T2:112' in Server 2 is modified, the modified content is put both in the element pse:part 'T2:13' and in the element item '13'. An attribute 'changetype="modified"' is added in the element pse: 'T2: 112' and the attribute 'src-tid' is removed.

When Server 2 is synchronized with itself[115], contents of 'T2: T1:112' is updated with the source 'T2:112' since its distance is now shorter than that of 'T1:112'.

[115](which must normally be triggered by this modification)

ASE

We will now present an extension ("ASE") to the sharing protocols which makes it possible to the user to see concurrent (alternative) contributions from multiple RSS flows to which she subscribed or from RSS flows which are in the "chain" of subscriptions in which she is. One thus will apply, with the existing sharing protocols, the same idea of encouraging different points of view (and not systematically to replace each contribution when a more recent[116] one appears).

[116]Protocol RSS+SSE takes yet other factors in consideration, but always in this logic of systematic replacement.

The objectives (in addition to those of PSE[117]) are:

[117](in particular with the objective to keep the local changes (here called "Original") which is in fact the objective of PSE)

To access the contributions (alternative objects) corresponding to the different points of view (branches), via the channels to which one is subscribed (and which are thus at upstream);

Optionally to present even the contributions which come from downstream (contrary to the existing protocols), and this even if there are no reciprocal[118] subscriptions or cycles in the chains of subscription. For that, one will use a mechanism of notification (by which the modifications made for the downstream items are communicated upstream). Of course, these notifications are not necessary in the case of reciprocal subscriptions.

[118]There are reciprocal subscriptions when the source subscribes to the flow which subscribed to it.

The notifications are only made with the immediate sources, which themselves propagate with their own sources and so on. One thus does not need to send the notifications to all the possible sources[119].

[119])(see also further the contribution from the Collaboration server)

XML Specification

In the namespace "ASE:" the XML tags include the following ones[120]:

[120]We will not recall here the mechanisms of replacement and enrichment of objects. See in particular the sections Method of creation of the most elaborate objects and Method of determining the replacement object and the alternative objects as well as the following ones.

Element <ase: contributions> in <channel>

This tag is placed at the more high level, i.e. on the same level that the tag item. It is present for each item which (or if a part of the item in question) has contributions.

Attributes:
ID: the identifier of item whose contributions are included;
Branch: the identifier of the active branch of the item;
SeqID: sequence number of an item in a chain of subscriptions.

Element <ase: contribution> in <ase: contributions>

Attributes:
Kind: This attribute takes one of the following values: "Original", "Replacement" (i.e. the most elaborate object of its branch) or "Alternative" (coming from another branch);
Branch: Identifier of the branch of the contribution in question;
SeqID: Number of sequence of the contribution in question;

Element <ase: changes> in <ase: contributions>

This element contains the list of the most recent changes of item. It makes it possible to determine the most elaborate object in a branch when the current most elaborate object moves to another branch.

Element <ase: change> in <ase: changes>

This element contains the information of the change of item in question.

Attributes:
Branch: the identifier of the branch of modified item;
SeqID: the number of sequence of the branch of modified item.

Element <ase: movebranch> in <ase: contributions>

This tag makes it possible to propagate the information of acceptance/refusal of a contribution by a source.

Attributes:
Branch: the identifier of the new branch of the source.

Example

Figure 107:
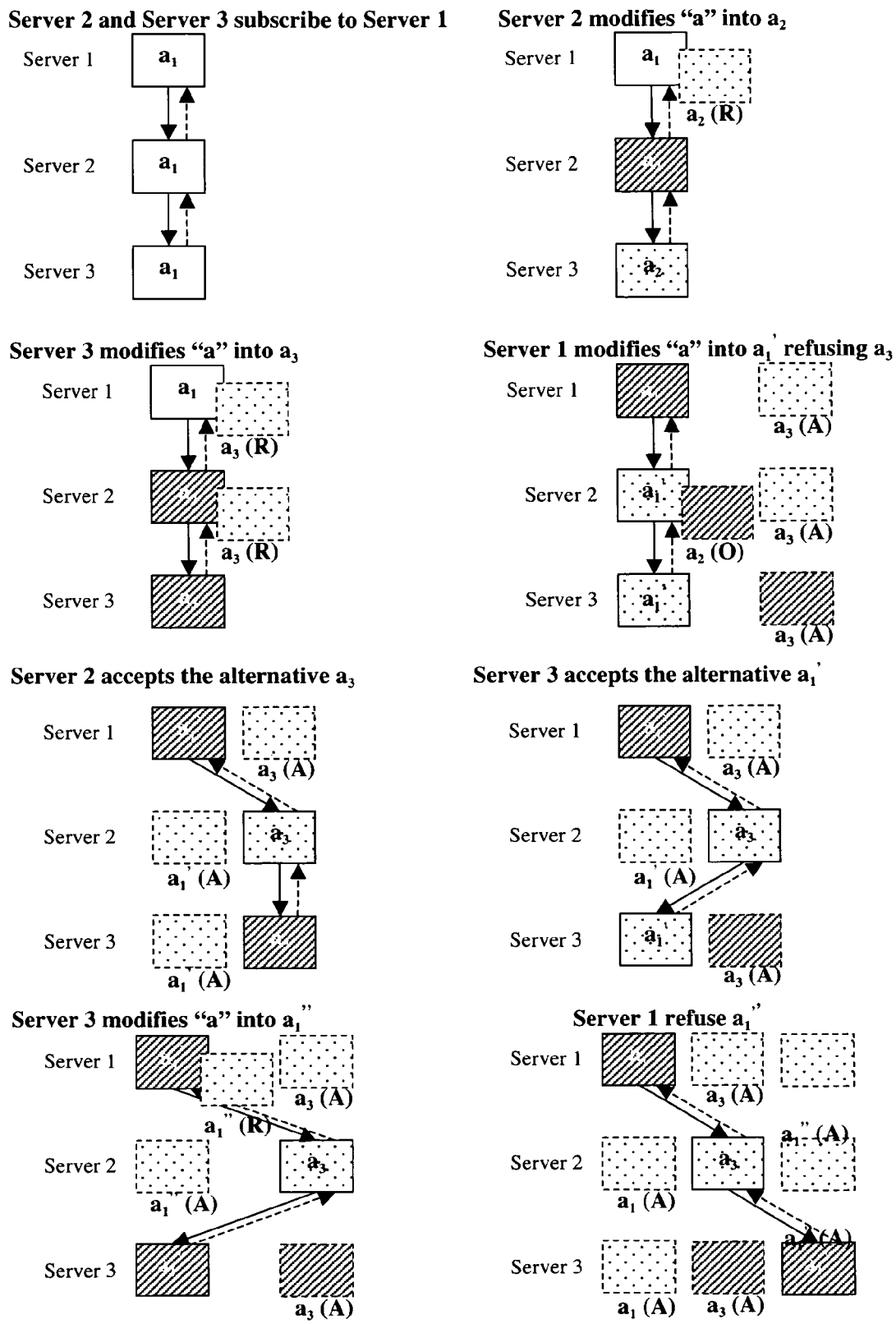

The behavior of the ASE protocol is illustrated in FIG. 107, in which:

"(R)" Replacement means, "(A)" means Alternative and "(O)" means Original content;

A hatched box represents an object modified locally; a box covered of points represents an object modified following a change at upstream; a white box (not covered) represents an unmodified object;

A full arrow represents the communication of an object by upstream; a discontinued arrow represents the notification of a change to upstream.

This figure illustrates the formation of the branches[121] of an object "a" (the branches are presented vertically) by presenting the following stages:

[121]The branches are the continuations of derivations of the objects which constitute the same alternative version, as described in front detail in this document.

Server 2 subscribes to Server 1 and Server 3 subscribes to Server 2
Server 2 modifies "a" in a2
Server 3 modifies "a" in a3
Server 1 modifies "a" in a1' thus refusing a3
Server 2 accepts the alternative a3
Server 3 accepts the alternative a1'
Server 3 modifies "a" in a1"
Server 1 refuses a1".

These examples are in conformity with the methods already described before in this document, except for the fact that, in order to support compatibility with the existing protocols, the first branch presented to the user is the one which contains the objects such as would have presented the existing protocols.

Transclusions and Contributions Upstream (PSE with ASE)

In general in existing protocols, an item, even if it has been modified locally, when it is synchronized with a source which itself was updated, is updated compared to this source. Thus, like already described, in the protocol PSE only the element pse:part keeps the local modification (which has to be kept within the framework of the process of transclusion) and not the element item (considering that one does not want to lose his conformity with the existing protocols).

However, in the protocol ASE, the original contents are also memorized in a tag <ase: contribution> having the attribute Kind=original attribute. This thus represents a redundancy. But, if the assumption is made that the servers which understand PSE understand also the protocol ASE, one can avoid this redundancy by keeping the modified contents only in the tags of the protocol ASE. It should be noted that in this approach, a server which understands only the protocol ASE (and not PSE) sees any server PSE as if it were purely a server ASE.

Figure 108:
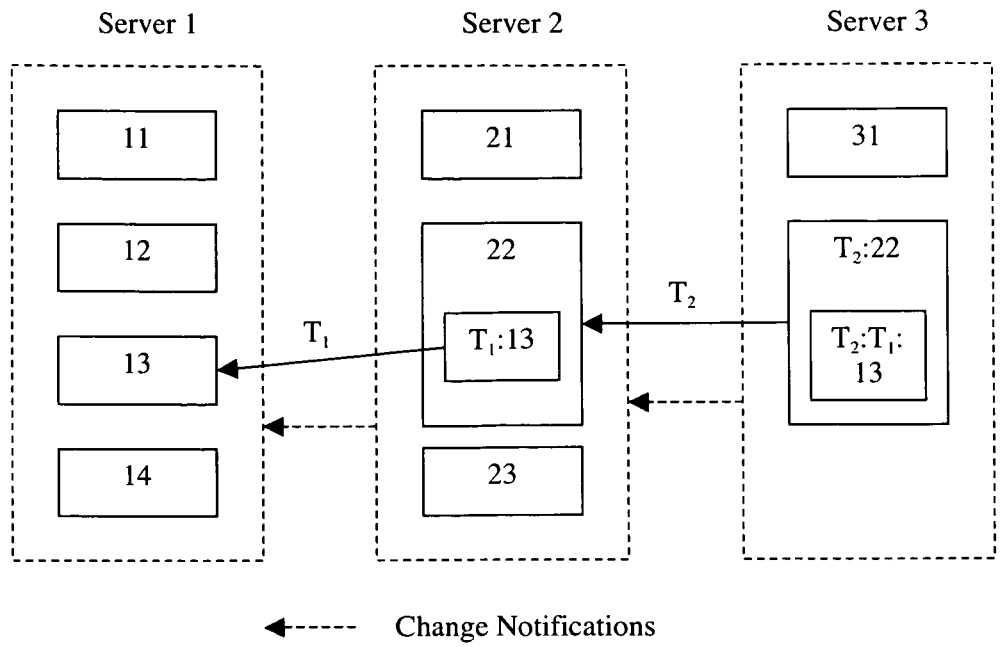

One now will illustrate the joint operation of these protocols on the basis of example of FIG. 108 where one item '13' of a flow Server 1 is transcluded within one item '22' which is in a flow Server 2, this item '22' being itself transcluded in Server 3. The arrows in discontinuous lines represent the process of upstream notification according to the protocol ASE.

Example

Abstract XML Representation

Server 1:

```
<item id=11>
    <content>
        ...
    </content>
</item>
<item id=12>
    <content>
        ...
    </content>
</item>
<item id=13>
    <content>
        ...
    </content>
</item>
<item id=14>
    <content>
        ...
    </content>
</item>
```

Server 2:

```
<item id=21>
    <content>
        ...
    </content>
</item>
<item id=22>
    <content>
        ...
        <pse: tid= "T1:13" src-tid= "13" >
            ...
        </pse: part>
        ...
    </content>
</item>
<item id=13>
    <content>
        ...
    </content>
</item>
<item id=23>
    <content>
        ...
    </content>
</item>
```

Server 3:

```
<item id=31>
    <content>
        ...
    </content>
</item>
<pse: tid= "T2:22" src-tid= "22"/>
<item id=22>
    <content>
        ...
        <pse: tid= "T2: T1:13" src-tid= "13" >
            ...
        </pse: part>
```

```
        ...
    </content>
</item>
```

'T1:13' are Modified

This change is notified upstream in Server 1 so that Server 1 includes the contribution in question which is in fact a replacement:

Server 1:

```
<item id=11>
    <content>
        ...
    </content>
</item>
<item id=12>
    <content>
        ...
    </content>
</item>
<item id=13>
    <content>
        ...
    </content>
</item>
<ase: contributions id=13 branch=0 seqid=0>
    <ase: contribution kind=" Replacement" branch=0 seqid=1>
        <ase: source url=" Server 2" id=T1: 13/>
    </ase: contribution>
</ase: contributions>
<item id=14>
    <content>
        ...
    </content>
</item>
```

'T2: T1:13' are Modified

This change which is in Server 3 is notified upstream initially in Server 2, then starting from Server 2 towards Server 1, so that each one includes the contribution in question:

Server 1:

```
<item id=11>
    <content>
        ...
    </content>
</item>
<item id=12>
    <content>
        ...
    </content>
</item>
<item id=13>
    <content>
        ...
    </content>
</item>
<ase: contributions id=13 branch=0 seqid=0>
    <ase: contribution kind=" Replacement" branch=0 seqid=2>
        <ase: source url=" Server 3" id=T2: Tl: 13/>
    </ase: contribution>
</ase: contributions>
<item id=14>
    <content>
        ...
    </content>
</item>
```

Server 2:

```
<item id=21>
    <content>
        ...
    </content>
</item>
<item id=22>
    <content>
        ...
        <pse:part tid= "T1:13" changetype=" modified" >
            ...
        </pse: part>
        ...
    </content>
</item>
<item id=13>
    <content>
        ...
    </content>
</item>
<ase: contributions id= "T1:13" branch=0 seqid=1>
    <ase: contribution kind=" Replacement" branch=0 seqid=2>
        <ase: source url=" Server 3" id=T2: T1: 13/>
    </ase: contribution>
</ase: contributions>
<item id=23>
    <content>
        ...
    </content>
</item>
```

Server 3:

```
<item id=31>
    <content>
        ...
    </content>
</item>
<pse: tid= "T2:22" src-tid= "22"/>
<item id=22>
    <content>
        ...
        <pse:part tid= "T2:T1:13" changetype=" modified" >
            ...
        </pse: part>
        ...
    </content>
</item>
```

It is thus a question of gradually propagating the manipulations of branch during synchronizations between flows, on the basis of following principles:

A contribution will have the attribute kind "Replacement" if it is in the active branch, or "Alternative" if it is not.

The object having the attribute kind "Replacement" is implicitly refused when another branch is modified by the user. Itself and all the objects which derive from it will then be moved into another branch.

If for an object an alternative (which is thus in another branch that the active branch) is accepted, this object and the objects which derive from it and which were in the branch which was active, are moved in the branch of the accepted alternative, except for the object from which the accepted branch had been created as well as the objects which derive from it.

Collaboration Server for PSE/ASE

Advantageously, the various alternatives of the Collaboration server described before in this document can improve the performances of the PSE (and ASE) servers. The idea is to gradually avoid the propagations of the changes (during synchronizations between completely decentralized servers) and to use the collaboration servers at least partly as intermediate exchanges which can exploit the effective synchronization algorithms described. In particular, the points to be considered are the following:

1. If a server incorporates items starting from several sources located in different servers, then it must be synchronized with each one of them;
2. If several channels are subscribed to only one source, then each one must obtain the contents of this source;
3. If into a chain of subscriptions one of the servers falls, the following servers will not receive the updates any more neither of this server nor of those which are at upstream;
4. Lastly, at the time of the search of the nearest source when there are several sources, it is necessary to avoid querying all the sources.

Respectively, the answers brought by the approach of intermediation via one (or several) collaboration server(s) are the following:

1. The collaboration server can subscribe to the various sources and notify the server in question. If in addition these sources use also the collaboration server, then they will notify it directly their possible updates and this will avoid that the Collaboration server polls the sources.
2. The collaboration server obtains the contents from the source in question (here also by polling or reception of notifications) and to notify the updates;
3. The subscribers do not depend any more on the resistance of "each link in the chain" (i.e. "of the weakest link of the chain). Indeed, in the case the most unfavourable only the server which falls will stop providing (except of course if a collaboration server falls itself but one can imagine that it is equipped with means necessary to ensure its reliability);
4. The collaboration server keeps a trace of all the changes and while following the transclusions it propagates only the changes coming from the closest sources (see the section "Algorithm in push").

In short, collaboration server placed in a network of syndication, serve the purpose of saving bandwidth and to make the network more reliable when nodes of this network constitute "weak links".

Figure 109:
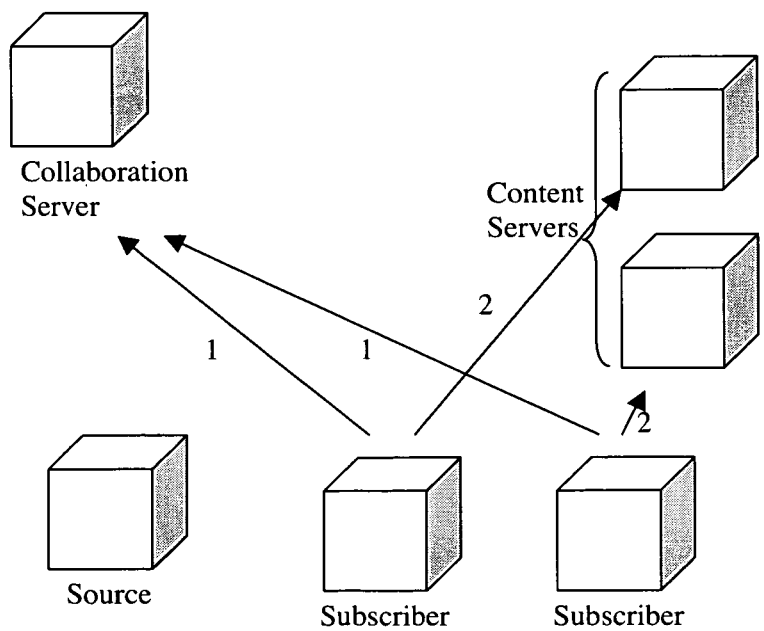
Figure 110:
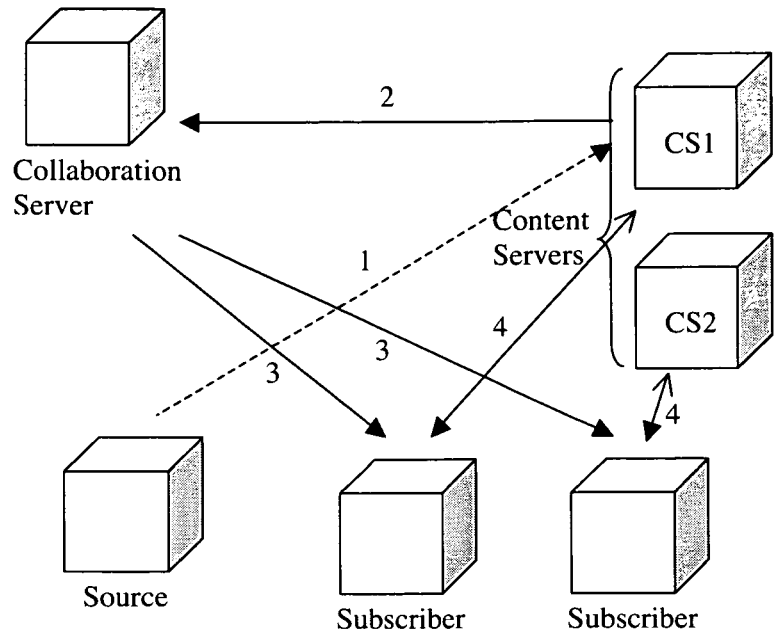

In FIGS. 109 and 110, we include the approach (adopted in all this description) according to which the collaboration server do not have the contents but only their identifiers.

FIG. 109 presents the stage consisting in taking into account a change in a source.

Its sub-steps are the following:

1. The information of the change (without the contents) is communicated to the collaboration server
2. The subscribers communicate the contents to the content servers FIG. 110 presents the stage consisting in updating the subscribers.

This stage includes the sub-steps are the following ones:

1. The content server CS1 questions the source regularly
2. CS1 informs the collaboration server of the changes (if any)
3. The updates/replacements/alternatives are communicated to the subscribers (by notifications)
4. The subscribers obtain the contents of the updates/replacements/alternatives from the content servers; in principle the alternatives are obtained on request[122].

[122] In the protocol ASE, the server contains the URL of the flow to which it is subscribed with the identifier of the object in question, so as to be able to recover the alternatives on request of the user.

Transclusion with Transformations

The transclusion described up to now can be schematized by a flow of information as follows. First of all information comes from the source of the transclusion. Then this information is modified or reorganized as described by the differences of the transclusion. Finally the structure obtained is returned to the user.

Figure 111:
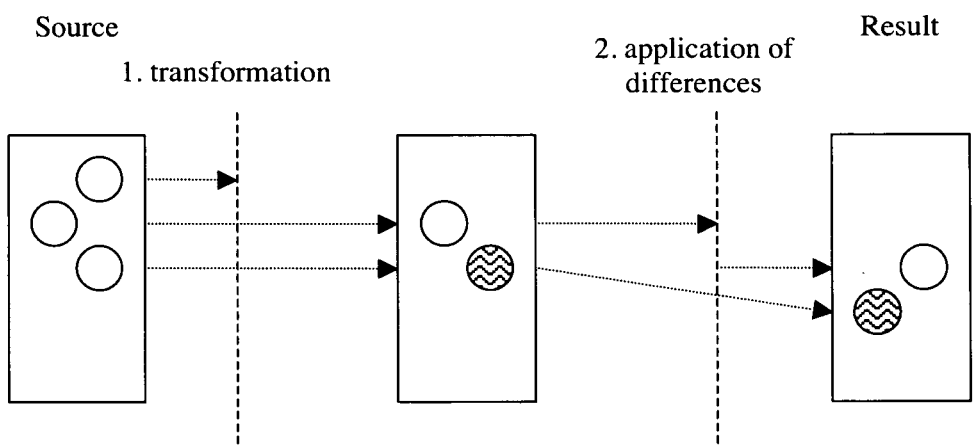

The extension described in this section proposes to add a[123] transformation to this flow of information. A transformation is a function (for example a filter on the objects) which is attached to the transclusion. This transformation is carried out on the objects of the source before the application of the differences of the transclusion. FIG. 111 illustrates this transfer of information.

[123]When no transformation is associated to the transclusion, it will be said that it is the identity transformation which is associated there.

The objects of the source are, in a first stage and before being able to be subjected to an application of the differences, immediately subjected to a transformation: in FIG. 111 by transformation an object was removed and another saw its contents modified. The second box shows the source such as it is seen by the algorithm of application of the differences (in "pull" or "push" like already described). These are the pre-treated objects which in a second phase are moved, removed or modified as indicated by the differences which, in the example presented in FIG. 111, consist of a suppression, a creation and a movement.

Implementation

Whatever the implementation chosen for the system ("push" or "pull"), the principle of the method to apply here is the same: a transformation is applied each time the system needs the contents of an object within the framework of a transclusion. For example for the method "push", when an attribute (like the contents) of a modified object is sent towards the result of the transclusion, it is immediately subjected to the transformations, before being integrated into the result (it can however be advantageous first of all to check if actually it will be used, in order to avoid the application of the transformation for an object which will not be visible in the result). In the same way, for the method "pull", when an object is downloaded in order to be integrated into the result, it will have to be subjected to the transformation.

In other words, the algorithm of transclusion must function as if the source of the object were the result of the transformation. For example if a transformation removes an object then the transclusion must function as if this object did not exist with the source. Another example, if the transformation then carries out a sorting on the objects of the source the transclusion functions as if the objects were already sorted within the source.

The transformation is always the same one on the children and the parents, for the same transclusion. However, we can envisage two functions of transformation instead of one and to apply them alternatively: one at the time of the creation of a transclusion, the other with each update (the latter could require to know the previous state of the source object).

Lastly, the nature of the transformation applied by a transclusion can be stored in the same way as other information (attributes) of the objects ("inner-text", position, etc) in association with the transclusion results[124]. This makes it possible to consider it in a way similar to the other attributes with respect to Rule 8 "to determine the nearest source when there are several candidate sources as well as Rule 9 which is exposed further.

[124]The transformation of a transclusion is treated like an attribute of the root object of the result (i.e of the single object belonging to the result of the transclusion, and containing all the other objects also forming part of the result of this transclusion).

Internal Flow of Information in the Case of Transclusions

Figure 112:
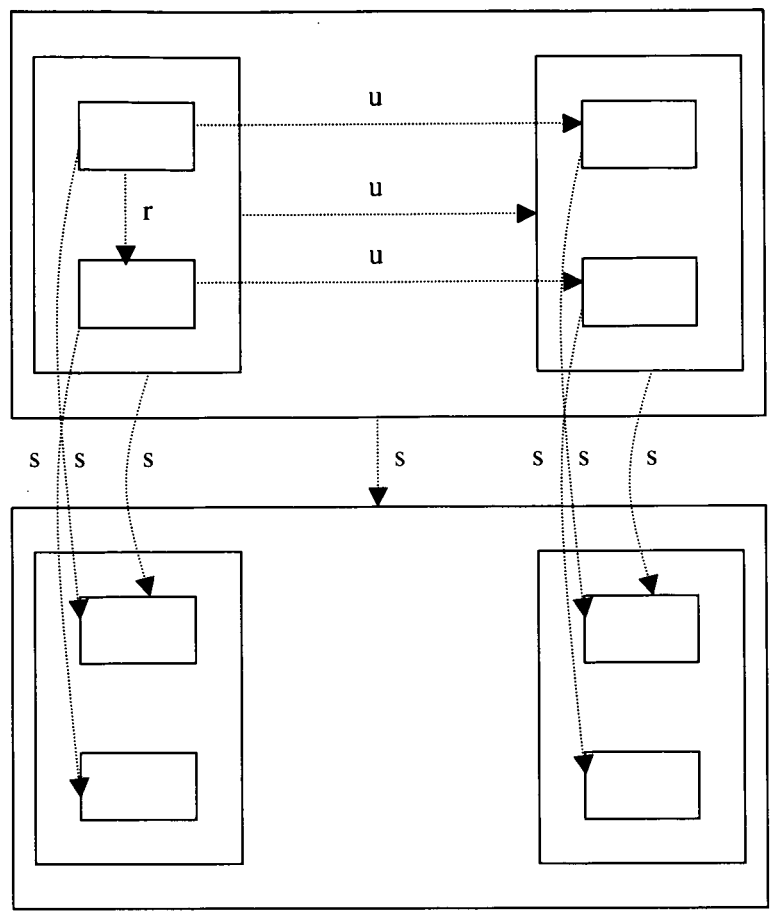

Here we describe in which order the transformations are applied. As shown in the FIG. 112, we would like that the most interior transclusions are followed first (and most external ones the last).

In this figure on the top left there is an object containing an internal transclusion (r), then a transclusion (u) of this object is carried out, placing the result on the right. Then the whole is transcluded (s) again, placing the result in the bottom. The arrows indicate the directions of flow of information, with a letter representing the transformation carried out.

The intuition is that the function "u", of the transclusion carried out from left to right, is applied to all the objects of the source of the transclusion, even if the latter are internal results of transclusions. In the source of the transclusion "u", the transformation "r" is carried out before the transformation "u" which is more external (and this transformation "r" is thus not carried out on the object which is at the top on the right). In addition one sees in this figure that no implicit transclusion being in the lower half of the figure (in the result of s) is followed. One thus will have to conceive rules which, in the top half of the figure, to connect the top left object to the bottom right object, will follow the transclusions through the left lower corner. And if the whole figure is considered, to connect the top left object to the bottom right object, the rules will have to follow through the top right object rather than the bottom left object.

One already described the Rule 8 which makes it possible to find the source which is the nearest to the currently considered object, among a set of candidates sources.

The Rule 9 which follows makes it possible to determine which are the candidate sources of a considered object. The various attributes of an object (content, position[125], transformation of transclusion, etc) are obtained independently, according to this rule, and it could be, for example, that an object obtains its position from one object, and its content from another.

[125](unless the approach of "Slots" already described is adopted, according to which a change of position is seen like a modification of the contents of the parent)

Let us note first of all that, for a (currently) considered object, each candidate source must be a source (upstream) of the considered object, and thus it must correspond to it through a transclusion[126] or a chain of transclusions[127]. This can be seen as an additional criterion which is added to each criterion given below.

[126](of the object or an ancestor)
[127](the latter will apply for rule 9.1 and will be taken into account within the framework of rule 9.4

We use the term "transclusion providing its transformation locally" with the following meaning: a transclusion provides its transformation locally if it was explicitly created or if its transformation was modified.

Rule 9

Is a candidate source for an attribute of a considered object:
1. any source of the considered object, whose attribute in question was modified;
2. any source—or object contained in a source—of a transclusion providing its transformation locally and whose result is—respectively includes[128]—the considered object;

[128]An object A includes an object B if A is the parent or an ancestor of B 3. any result (excluding the considered object)—or object contained in a result which does not include the considered object—of a transclusion providing its transformation locally;

4. any result—or object contained in a result which does not include the considered object—of a transclusion whose source is a candidate source for the considered object (this rule is thus recursive[129]).

[129] It has as effect that the candidates sources are always distant of only one relation of transclusion.

One of the sources which are candidate for the content or the position being selected as the closest by rule 8, if the transclusion which brings it does not provide its transformation locally (this is the case of implicit transclusions) it is then necessary to find also the source for the transformation to apply to it. It will be the one which is the nearest candidate source, determined using the same rules (9 and 8).

Taking into account (or not taking into account) an attribute depends on the type of the transformation.

Examples of Transformations

Introductory Examples: Replacement and Duplicates

Figure 113:
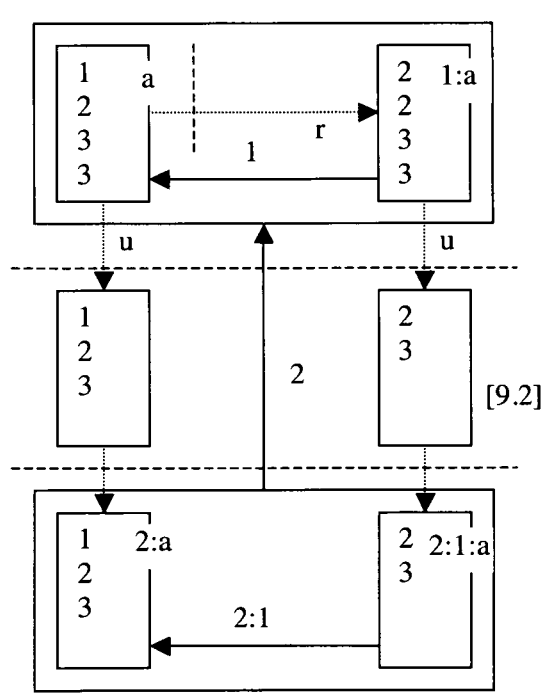

The example illustrated on FIG. 113 uses two different functions: "r" which replaces all 1 by 2, and "u" which removes all the duplicates in the content of the objects (but not between the objects).

The rectangle top represents an object containing a transclusion interns whose transformation is "R". This object is the source of a second transclusion whose result is all in bottom. The transformation associated with this second transclusion is the function "u".

In FIGS. 113 and 114, the discontinued lines indicate the places where a transformation is applied; the arrows in dotted lines indicate flows of information and the full arrows indicate the transclusions; the contents of the rectangles at the bottom of the figures indicate what is shown to the user; the rule used to determine the candidate source which was selected is indicated in brackets.

In the example of FIG. 113, no local modification was carried out in a result of a transclusion, and the source used for each visible object in the figure is the object a at the top left corner.

For the object 2:1:a the flow of information passes by 1:a and not by 2:a. Indeed 1:a is a candidate source (according to rule 9.2) and this is not the case of 2:a (rule 9.3 does not apply because 2:a is in the result of a transclusion which although it provides its transformation locally, this result includes the considered object 2:1:a). Thus in the figure there is no arrow on the basis of 2:a, which is thus never subjected to the function of transformation.

With Local Modifications

In the FIG. 113b is a local modification is done in object 2:a. It is seen that now, according to rule 9.1 (a modified source is a candidate source) as well as the rule 8 (2:a is closer than 1:a), information for the object 2:1:a comes directly from 2:a which is initially subjected to the function "r" before being propagated in 2:1:a. And the function "u" is not used any more from object 1:a to object 2:1:a.

Filters of Selection Compared to a Criterion

As another example of function which can be used with a transclusion, we can carry out a filtering on the objects, letting pass only those which answer a certain criterion.

The filter being carried out on the objects of the source, it remains possible for the user to add any object in the result of the transclusion, even if it does not answer the criterion of the filter. (However if the object is accepted at upstream it would pass by again on other side of the filter and would become thus invisible for the user).

Replacement of Transformations

Transformations can be modified, even transformed by transformations of transclusions.

FIGS. 114 to 118 show what occurs when transformations are modified. Here too, the dotted arrows indicate the transfers of information and are annotated with the function applied on the way. The rectangles represent objects and underlined information indicates local modifications (not underlined values being obtained in an implicit way). The objects are named by the values which they are supposed to provide (for example for FIG. 114 the bottom right object is called k (g (f (1)))). Between brackets is indicated the rule applied to select the candidate source.

First of all, FIG. 114 shows the values obtained when no modification is carried out in a result of transclusion. One sees in the figure that the nearest candidate source to the considered object "k (g (f (1)))" is "g (f (1))". Indeed, "g (f (1))" is a source for the object considered and it is so for the transclusion which provides its transformation (k) locally, therefore rule 9.2 applies, whereas objects "k (g (1))" and "k (f (1))", which are also sources, are not transclusion sources providing a transformation locally (thus rule 9.2 does not apply), and are not either a result of a transclusion which provides its transformation locally this result excluding the object "k (g (f (1)))" considered (thus rule 9.3 does not apply either).130.sup.130 Lastly, according to the rule 8, g (f (1)) is closer than the other candidates sources The use of rule 8 being in general obvious, we will not mention it systematically

Figure 115:
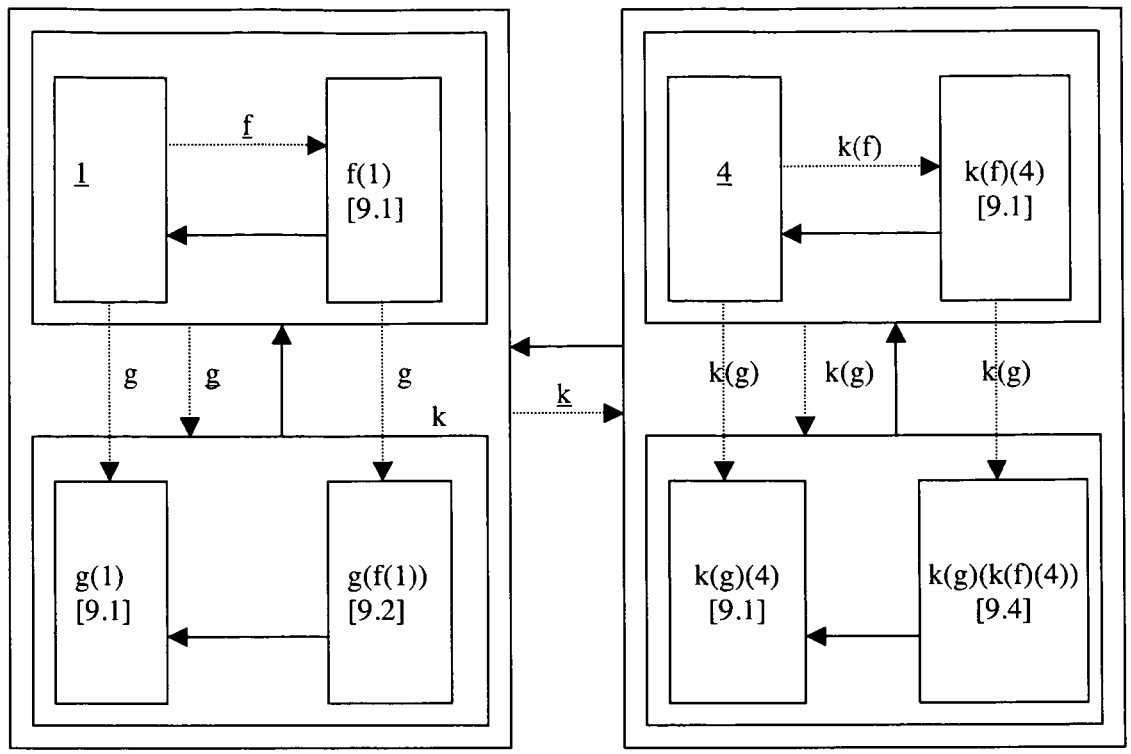

[130] Lastly, according to the rule 8, g (f(1)) is closer than the other candidates sources The use of rule 8 being in general obvious, we will not mention it systematically In FIG. 115 $k(1)$ has been replaced by value 4. We will now describe the application of rules 8 and 9 after this replacement.[131]

[131] One can implement/adapt the method as follows:

In the preceding figure, f is an attribute of the object f (1); k is an attribute of the objects k (1), k (f (1)), k (g (1)) and k (g (f (1))); g is an attribute of the objects g (1) and g (f (1))

To replace k (1) by 4 means that the attribute k is removed and content modified into 4. Then, for k (f (1)) the nearest source for the content is now 4; the nearest source for k is 4 where it is removed; the nearest source for f is still f (1); thus k (f (1)) becomes f (4);

for k (g (1)) the nearest source for the content is 4; the nearest source for g is still g (1); the nearest source for k is 4 where it is removed; thus k (g (1)) becomes g (4);

for k (g (f (1))) the nearest source for the content is 4; the nearest source for k is 4 where it is removed; the nearest source for g is still g (f (1)); the nearest source for f is still g (f (1)) whose source is f (1) thus the nearest source is f (1); thus k (g (f (1))) becomes g (f (4))

By rules 9.1 and 8, 4 is nearest candidate source for "k (f) (4)" and "k (g) (4)". (k (f) is the transformation f transformed by k[132]: k (g) is the transformation g transformed by k.) As for the bottom right object k (g) (k (f) (4)), rule 9.4 enables it to take k (f) (4) as candidate source which is closer than g (f (1)). It should be noted that k (g) (4) it is not candidate source since it is in the result of the transclusion "k (g)" which includes k (g) (k (f) (4)), and so rule 9.4 cannot apply.

[132] That depends on the nature of the transformation k. It should be noted that this is rare: in general, the transformations do not transform transformations but contents and/or positions . . . . When k does not transform for g, it will be said that k (in k (f) or k (g)) is the identity function. Same reasoning for the other attributes . . . .

Figure 116:
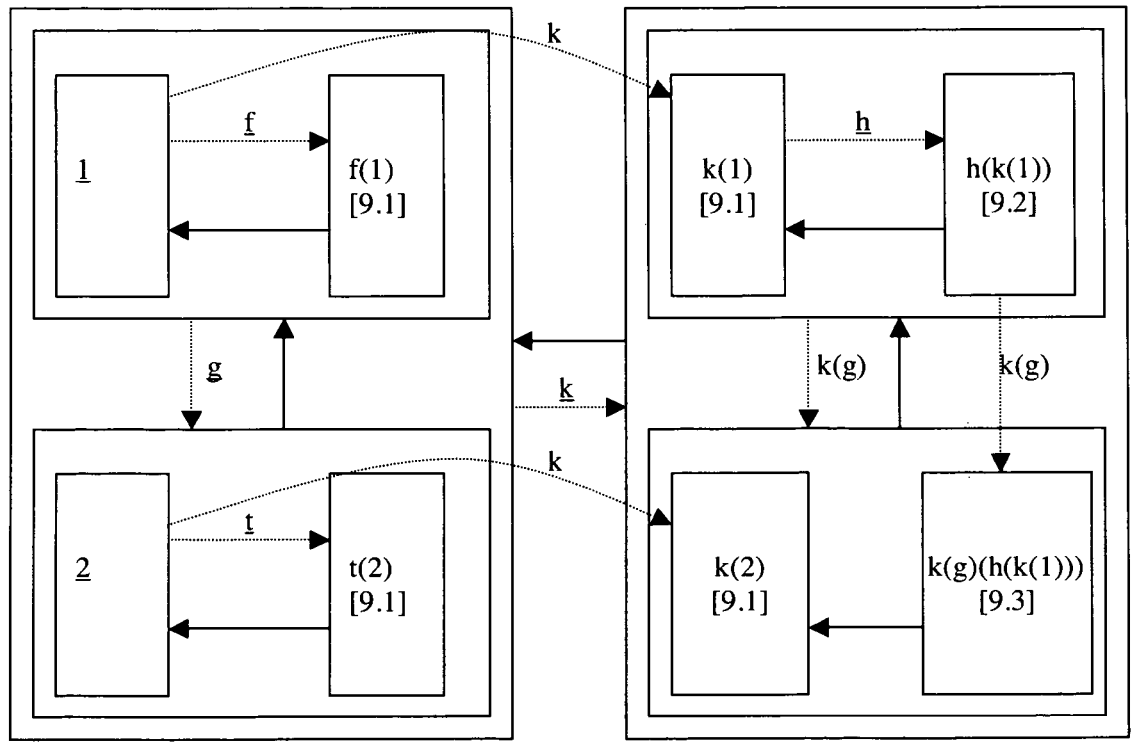

In FIG. 116, three modifications were carried out on FIG. 114: g (1) was replaced by value 2, the transformation k (f) was replaced by h at top right and at bottom left the implicit transformation was replaced by t.

As at top right the transformation was modified into h, for the considered object h (k (1)), the source k (1) of the transclusion h is regarded as nearest[133] candidate source by rules 9.2 and 8.

[133]Thus h (k (1)) takes its source in 1 via k and h (and not via f and k)

For the considered object k (g) (h (k (1))), h (k (1)) and t (2)[134] are candidates sources according to rule 9.3, but h (k (1)) is closest (according to rule 8).[135]

[134]For the source k (2) no rule applies since 1) this object is not modified, 2) is not source of a transclusion which provides its transformation locally, 3) is not contained in a result which does not include the object noted k (g) (h (k (1))) in the figure . . .

[135]Thus, k (g) (h (k (1))) takes its source in 1 via k, h and g (and not in 2 via t and k)

Figure 117:
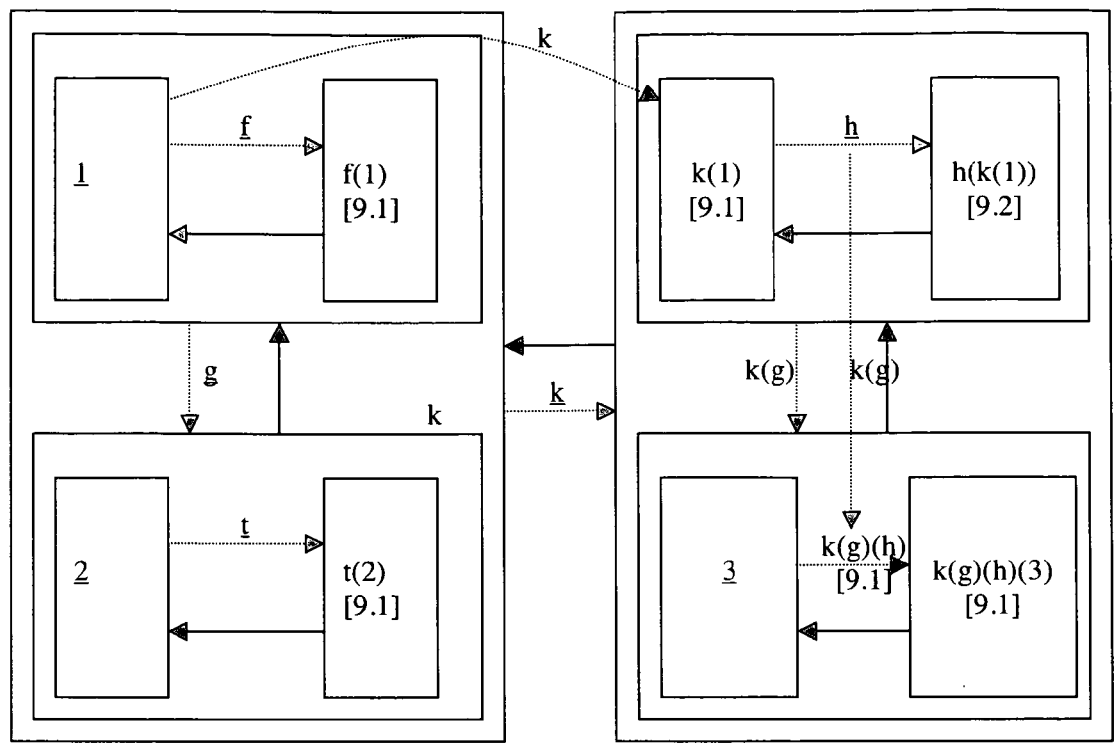

FIG. 117 is the same example, with just an additional modification: k (2) having been replaced by value 3.

The bottom right object is interesting by the fact that the nearest candidate source is "3" for the contents (rules 9.1 and 8) and then[136] the nearest candidate source is "h" for the transformation which itself is transformed by k (g), therefore the transformation to be applied is k (g) (h)[137]. So here the transformation to be carried out and the value on which to carry out this transformation come from two different places.[138]

[136]As the transclusion starting from this source "3" does not provide its transformation locally, one must determine which one to take

[137](where, like already explained, k (g) can be related here to transformation of transformation or the function identity)

Figure 118:
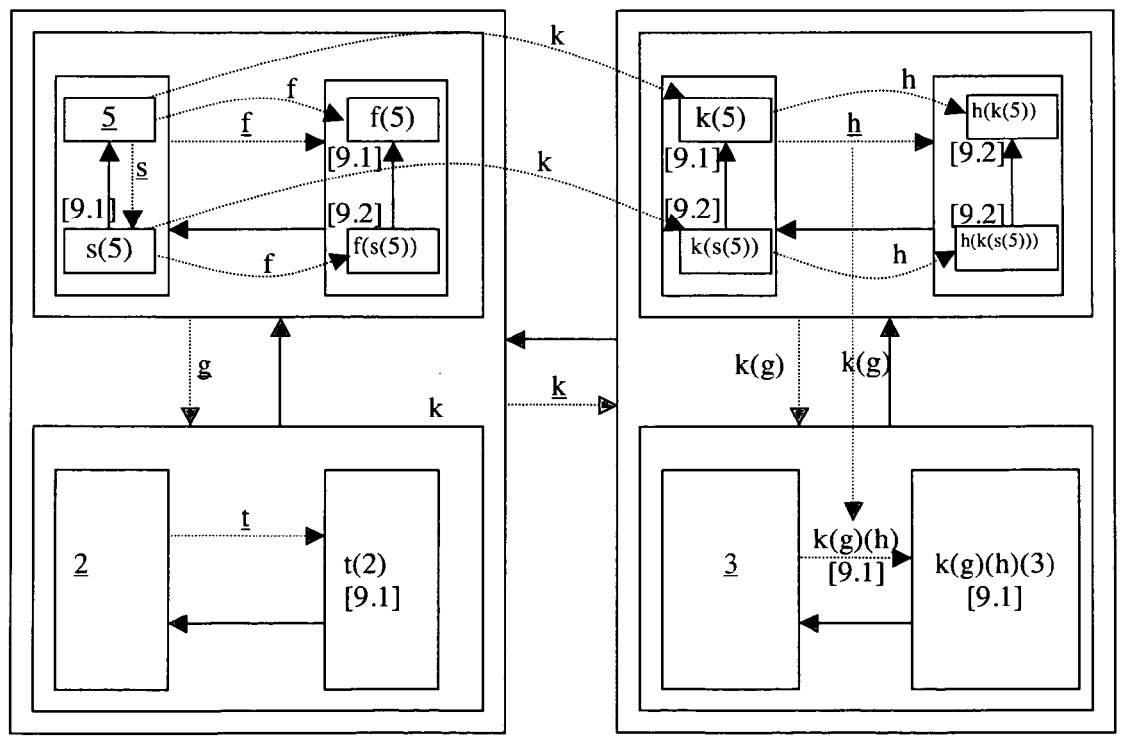
Figure 119:
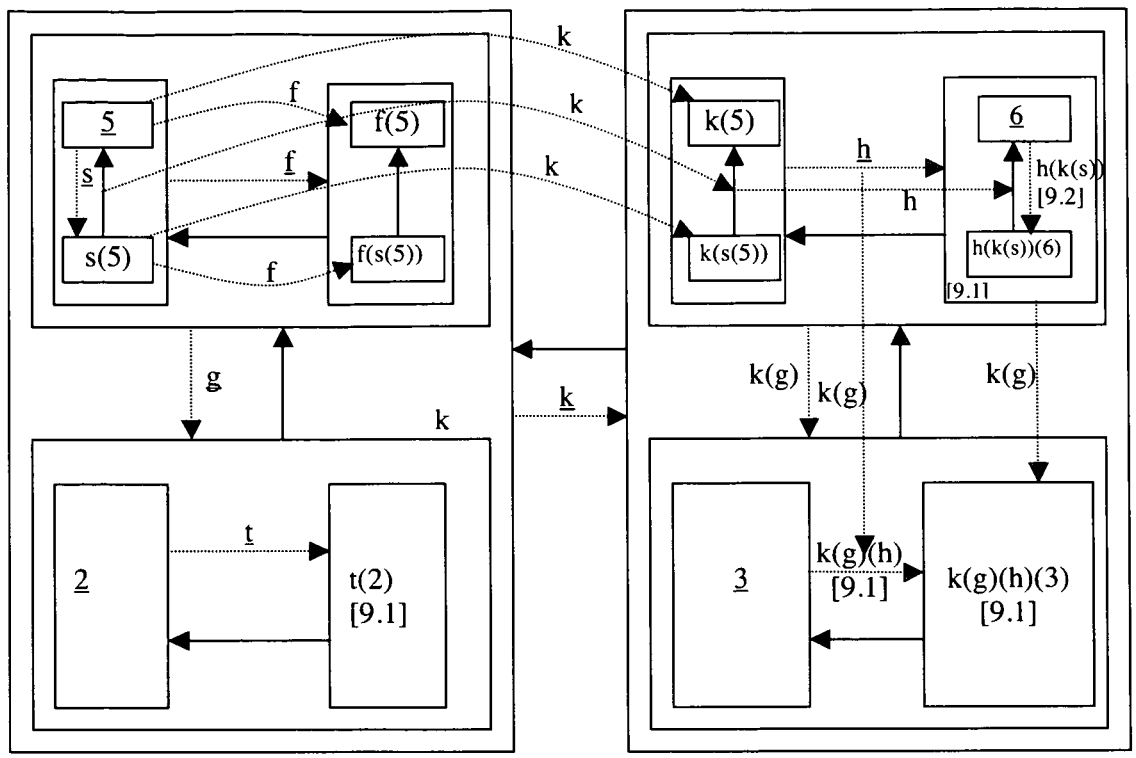

[138]FIG. 117 as well as FIGS. 118 and 119 show that the transformation h is individually transformed into a transformation k (g) (h) However, like already evoked, h can be implemented in the form of an attribute of the result of the transclusion with which this transformation is associated FIGS. 118 and 119 further illustrate the use of these same rules in the case of transformations of transformations. Reusing the previous example, source 1 is now replaced by two su-objects, "5" and "s (5)", the second being the result of the transclusion of the first, to which the transformation s is associated. We assume here that one adopts the approach of the slots and thus that the two new sub-objects are not propagated towards the object which contains 2.

In FIG. 119, the contents of the top right object are replaced by value 6. The object named "h (k (s))(6)" is now the result of a transformation which is itself the result of the transformation by h of the transformation by k of the transformation s.[139]

[139]Again let us recall that each transformation will not necessarily transform the transformation which is at upstream, it can be transforming only contents and/or position (or be the function identity ie nothing to transform), but here we describe the most general case Principles of Integration to a Spreadsheet Such as Microsoft Excel Here how the system of transclusions can be integrated into Excel[140]:

[140]By Excel one understands any spreadsheet, here Excel (Microsoft Excel) is a registered trademark of Microsoft An extension of Excel will offer to the user a function of creation and management of transclusion. Here this extension will be sometimes called "the system" or "the interface".

To carry out a transclusion, the user selects a set of cells (forming a "rectangle"[141]) to drag-and-drop, and at the moment of drop selects the option "transclude here" offered by the interface[142].

[141]One can easily implement the same functionalities for a set of cells which do not form a rectangle, see the approach presented below.

[142]In the applications there are in general (in particular when one uses the right button of the mouse) the options "To move here", "To copy here", "To create a bond here" One proposes to add the option "Transclure here"

When this operation is carried out, the system creates an object for the rectangle of cells, whose children objects are the cells of the rectangle. If some of these cells had already been grouped in an object, it is this object (instead of the cells it groups) which becomes child of the new object[143].

[143]Insofar as an object cannot have more that one parent, it is necessary to refuse to carry out a transclusion which would have as a consequence an overlapping of objects, i.e. if the source or the result of a transclusion intersects the source or the result of a possibly different transclusion, without one not being contained in the other. Alternatively, one can consider that the objects having several parents are treated as if they were different objects (with different identifiers).

One will now present an implementation to associate transformations with the transclusions and to manage them.[144]

[144]The implementation in Excel of the functionality of transclusion "without transformation" can be as follows: during the creation of the transclusion and each time a cell of the source changes, the result is updated automatically by carrying out the function copy and paste of Excel, copying the cells of the source to the cells of the result It should be noted that the cells containing a formula are not treated differently than others, because the function copy and paste can already treat them correctly, shifting the references if necessary The transformations are described here in the form of "Excel formulas" with a parameter.[145]

[145]One can also have as transclusions formulas with several parameters, the approach is then to regard a virtual object, which includes all the cells represented by these parameters, as being the source of the transclusion But the same cell could then have several virtual parents One already evoked the approach consisting in treating the objects having several parents (by treating them as if they were different objects all while making them behave in fine in the same object)

To treat them correctly the system must be able to analyze Excel formulas and to locate the dependencies. It is said that 'a' depends on 'b' if the formula defining 'a' contains a reference to 'b'.

Figure 120:
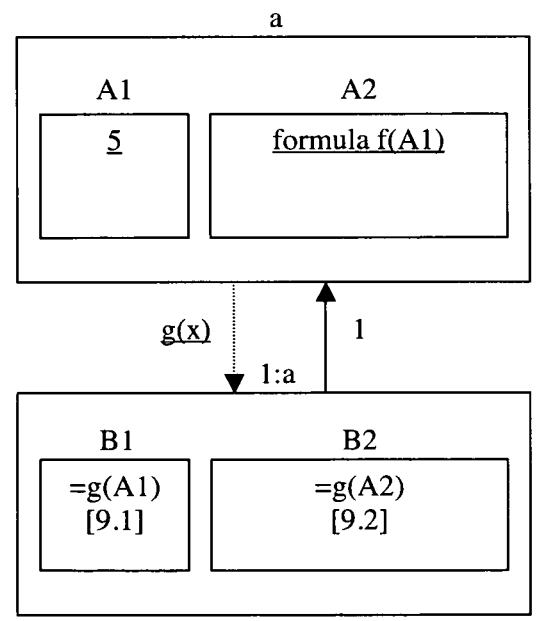

The approach is the following:

Let us suppose (as shown in the FIG. 120) that the user made a transclusion '1' of an object 'a' (the result being object 1:a) with a function g(x) as transformation. Let us say that the object 'a' contains a cell 2.

In this example, while following the rule 9.2 (as the transclusion 1 provides its transformation g(x) locally), the formula which is in the corresponding cell B2 will be initially =g(A2).

Let us suppose that the A2 cell is defined by a formula f which depends on a A1 cell which is also in the source of the transclusion (f can possibly depend on other cells also).

Figure 121:
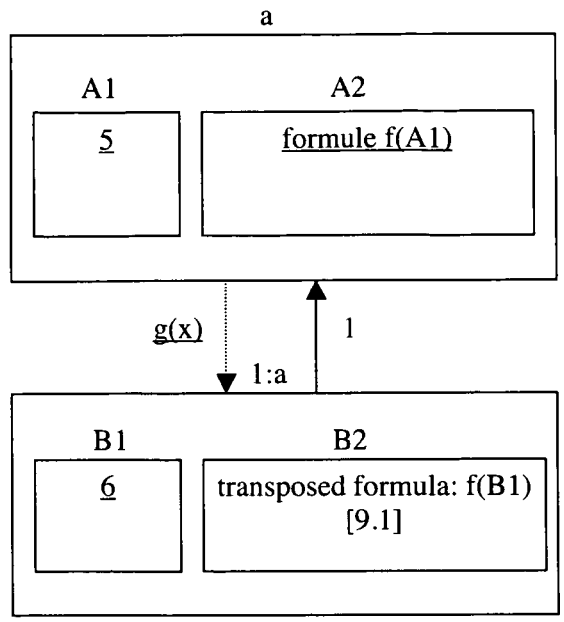

Let us suppose now that the B1 cell which corresponds to A1 with respect to transclusion 1, is modified by the user, as shown in the FIG. 121. By rules 9.1 and 8, for the considered object B2, the system must then change the value registered in B2 to refer now to B1 (since B1 has just become a candidate source according to rule 9.1 and that according to rule 8 it is closer than A2 or A1). With this intention, the system simply will reproduce the formula "=f (A1)" of A2 by shifting the references which it contains (this amounts carrying out programmatically copy and paste A2 in B2, thus instead of =f(A1) which is the formula defining A2, to define the cell B2 Excel will put =f(B1)). We say that the new formula which defines B2 is the formula f(A1) transposed.

Thus the image of a formula through a transclusion is seen like an implicit transclusion. When a source of such an implicit transclusion is modified for the first time, the system modifies the result of this implicit transclusion automatically so that it reflects the formula and that Excel can execute this formula on the source in question (pursuant to rules 9.1 and 8). Advantageously we let Excel do the transformation associated with this implicit transclusion.

However, in the result of the transclusion, the system must supervise the cells in question (i.e. sources of the implicit transclusion) and carry out a change of formula when a change of the applied rule (Rules 9.1 to 9.4) requires it. In particular if the user cancels his modification of B1, the previous formula for B2 must be put back.

To illustrate this process in a more concrete way, here is another example. Let us suppose that a cell A3 contains the value =A2+2, and that a transclusion of A2 and A3 is carried out, making correspond A3 to B3. If the transformation (x+1)*C8 is associated with this transclusion, x being the source parameter, the transclusion puts =(A3+1) *C8 in the result cell B3, and =(A2+1) *C8 at the position B2. If then the user replaces the value of B2, for example to write 10, the definition of B3 is automatically changed to become =B2+2.

Thus, the system is conceived so that the case of a cell referring to another cell behaves the same way that if this reference is created using a transclusion, although there are some treatment differences:

When the user puts in a cell a formula containing a reference to another, the system (i.e. the extension that we mentioned above) does not intervene (and lets Excel do as if there were no extension). However, as described above, the case of a transclusion whose source contains a cell comprising a reference to another cell of the source is especially treated (by analyzing the references in the formulas) in order to reproduce the behavior of the internal transclusions.

When the user transcludes several cells at the same time, it needs to indicate the transformation to be carried out only once. For example when it changes this transformation all the cells result are updated.

A conceptual difference is that a formula can contain references to several cells, as opposed to a transclusion which has only one source.[146]

[146]As already known as, the case of transclusion whose formula contains references to several sources can be taken into account by the system by comparing these sources to descendants of a single virtual source Thus the method of propagation of manipulations along the transclusions in Excel is as follows:

Rule 10:
1. Consider an object '1:a', which is the image of an object 'a' by a transclusion '1', {b} is the set of the references which are in the formula giving the value of the object 'a'[147]. For considered object 1:a ("considered" in the meaning of rule 9), see all the {b}, and their correspondents 1:{b} (when they exist), as sources. Apply Rule 9 to determine among these sources which ones are candidates sources.

[147]{b} is an empty set if a is defined by a constant

2. Since (according to Rule 8) for any b in {b}, 1:b will be inevitably closer than a and than b, if any 1:b of 1:{b} is a candidate source, then the set 1:{b} is regarded as candidate source. The formula to be indicated in 1:a is then the transposition of a, containing the references to 1:{b}. In the contrary case, it is f(a) which must be placed in 1:a, f( ) being the transformation associated with transclusion 1.

It should be noted that in the case of cells of {b} not being in the source of the transclusion, it can be preferable not to transpose their references, regarding them as absolute. This would thus reproduce the behavior of transclusions independently of Excel.

The examples of FIGS. 122 to 126 show the application of the rules seen up to now. They illustrate how the transclusions, internal or not, and the references in formulas interact. The values or formulas indicated in the cells are those which are visible by the user, the effective calculation of the formulas being left to Excel. The values provided by the user are underlined, the others being obtained implicitly by the system.

Figure 122:
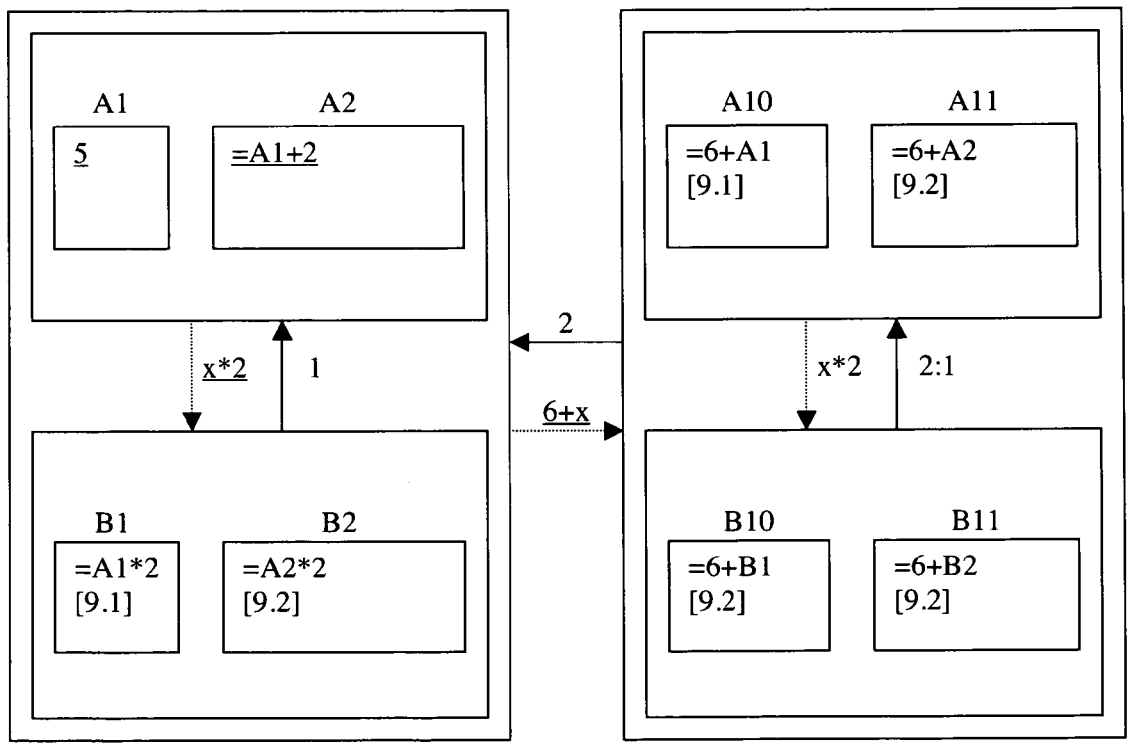

FIG. 122 shows the state of the cells in the absence of modification in the results of transclusion. All the cells in a result of transclusion contain a reference to the cell corresponding to the source, to which the transformation associated with the transclusion is applied. The part of the rule 9 which justifies the formula in each cell is indicated in brackets.

Here now what occurs if the user carries out two modifications, respectively in B1 and A11.

As A2 contains a reference to A1 (without however being a transclusion) and that the cell corresponding to A1 (B1) is modified in the result of transclusion 1, according to rule 10, B2 (which initially contained the value=A2*2) now contains the transposition of A2.

A10 not having been modified locally, B10 always obtains its contents from B1 (nearest modified source, rule 9.1), transformed by 6+x.

The nearest candidate source to B11 is A11. The formula of B11 is thus obtained by applying the transformation x*2 to A11 (instead of the transformation 6+B2).

Figure 123:
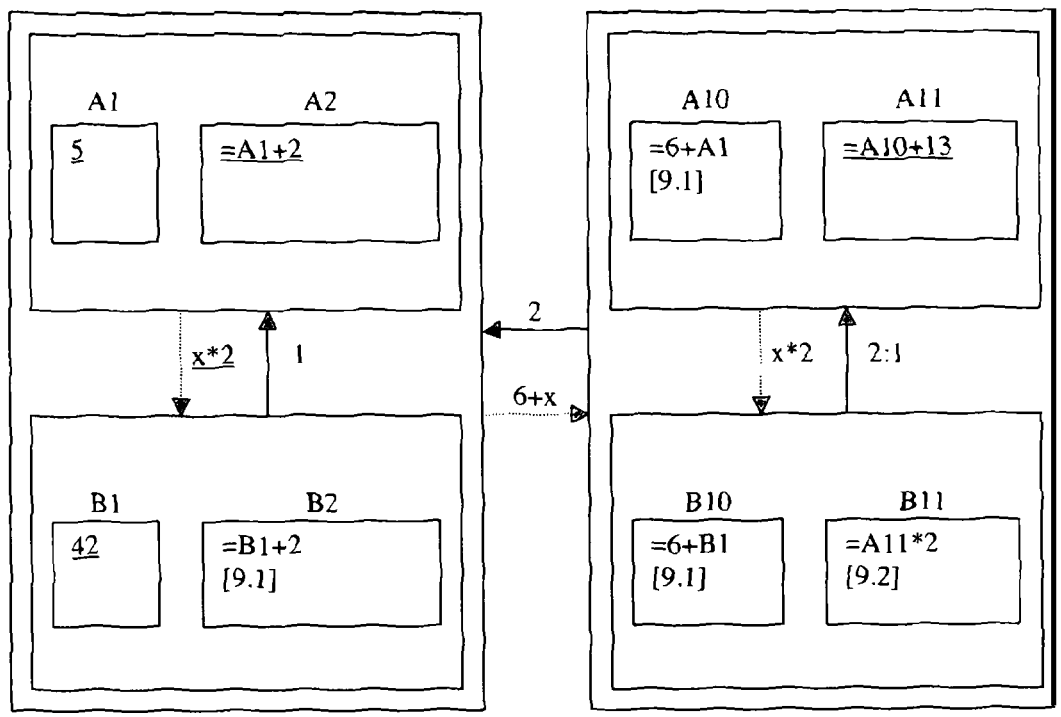
Figure 124:
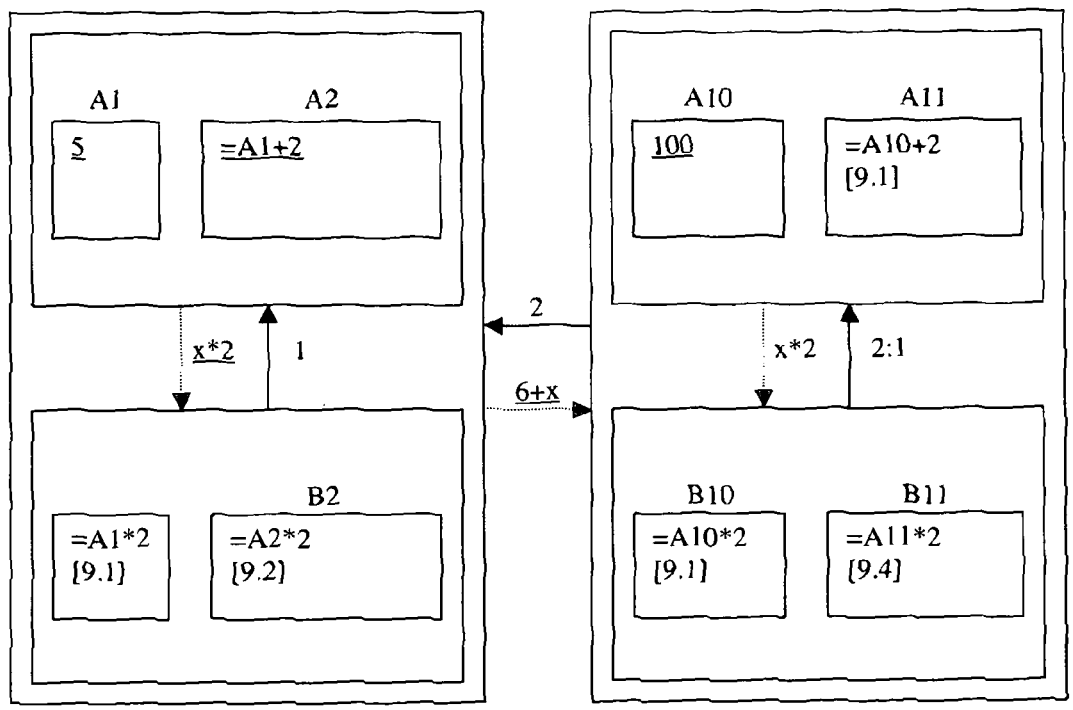

Lastly, in FIG. 123, one includes the initial example (presented in the penultimate figure) and one supposes that instead of 6+A1, A10 contains constant 100.

Consequently, according to rule 10, as the source (A2) of A11 depends on A1 and that the correspondent (A10) of A1 is now modified, A11 now receives =A10+2, which is the transposition of A2 (instead of 6+A2).

The modified source nearest to B10 is now A10. The formula of B10 is thus obtained by applying the transformation x*2 to A10. In the same way, the candidate source nearest to B11 is now A11 (by rule 9.4).

It is thus seen that the references by formulas behave like internal transclusions.

Multi-Versions Objects

The technology of the transformations associated with the transclusions can be used to manage versions of objects transformed depending on the users.

Let us recall that a SCR is seen like a user group (independent of the corresponding concept in the operating system). This concept is used by the system to decide which objects to make available to which users.[148]

[148]This access control can be placed above or after the control carried out by the operating system A resource is always viewed within the framework of at least one SCR (which can be selected in read-only[149]).

[149]For a SCR to which the user has the right of access in writing, the SCR can be open in read only (in order to receive the contributions of the other users of the SCR in question but not contribute oneself in this SCR) The interface makes it possible to switch easily from the read only mode to the read-write mode.

For writing data one specifies in which SCRs these data will be visible (in read-write).

Preferably, there exists by default a particular SCR, named E0 or "SCR by default", to which everyone has access at least in read access, which is used to produce data without restrictions.

The multi-versions objects are objects that are presented in a different way according to the SCR used to obtain them.

They are defined by a basic object and, for each SCR, by a transformation to be applied to this basic object to obtain the version corresponding to the considered SCR (one can also transform versions which themselves was obtained by transformation on a basic object to obtain other versions).[150] The SCR for which no version is specified do not have access to this object.

[150]As described further, the multi-version object has children each corresponding to a different SCR, connected to each other by transclusions carrying of the transformations The child corresponding to the current SCR is automatically selected instead of the multi-version object When a version of a multi-versions object (or one of its descendants in the structure of the resource) is used as source of transclusion, it is a transclusion of the multi-versions object which is carried out.[151]

Figure 125:
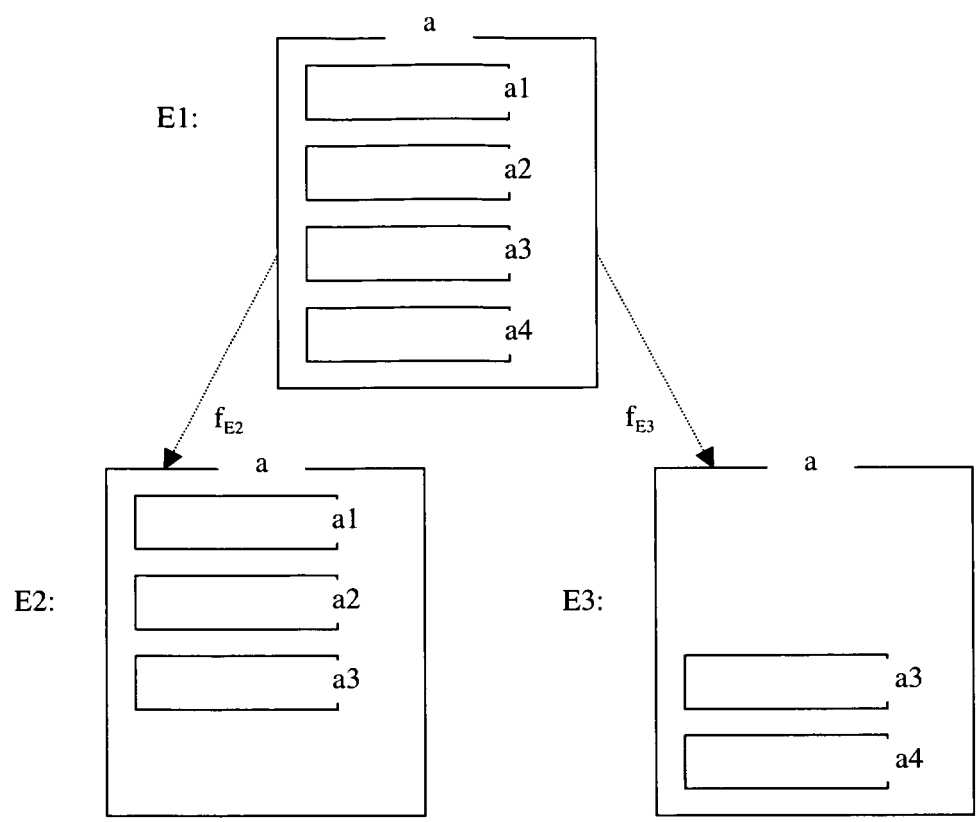

[151]In other words, when a transclusion of a descendant of a version is carried out, the real source of the transclusion is the set of the multi-version object, and the transclusion is provided with a transformation carrying out a selection of the object into question Example of Multi-Versions Object The document "a" presented in FIG. 125 contains a list of articles on varied subjects.

Three SCR are considered: E1, E2 and E3.

By accessing the document by the SCR E1 one sees the whole content of it, whereas while accessing by E2 or E3 only a subset (filtered by the transformations fE2 and fE3 for example according to the subject of the articles) is displayed.

Modifications carried out via E1 are propagated with the two other versions (insofar as the filters let them pass). A modification carried out with one of the two other SCR is visible only with the SCR in question[152].

[152](but can be contributed to the upstream, i.e. in E1)

Let us suppose that a user views the document by the SCR E2, chooses two articles a2 and a3, and transclude them in a new document n.

Let us suppose that during the creation of the latter she asks that it should be visible for everyone (and not restricted to the SCR E2). So she selects E0 in writing.

Figure 126:
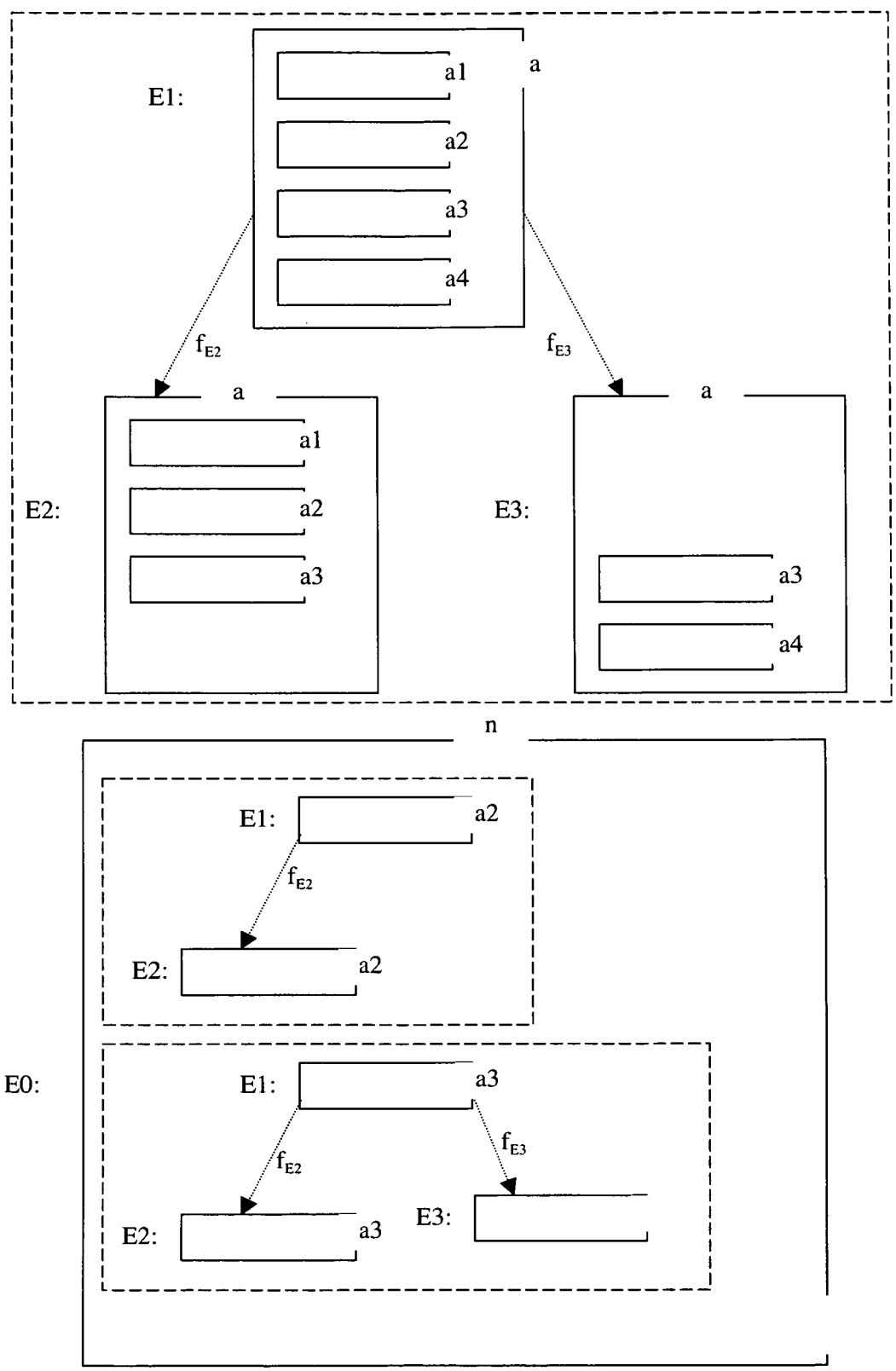

The structure then obtained is shown in FIG. 126. The dotted lines are the transformations leading to the different versions, the discontinued frames delimit the multi-versions objects and for each version the concerned SCR is indicated on the left.

User Interface

The interface makes it possible to the user to open (to select) a certain number of SCR (among those she has access) in read-only or also in write access according to the rights of the user. The SCR are ordered by the configured preference order (for the user) and the user can modify this order.

For a SCR to which the user has write access right, the SCR can be open in read only (in order to receive the contributions of the other users of the SCR in question but not to contribute oneself in this SCR). The interface makes it possible to shift easily of the reading mode to the read-write mode.

During the display of a multi-version object to the user, the versions for which the SCR is open are accessible via the interface, and the first in the preference order is displayed by default.

If none the SCR for which there exists a version is opened, nothing is displayed, as if the object did not exist.

The system provide to the user two means to change the displayed versions. First of all, to change the preference order in the list of the open SCRs affects the automatic selections immediately. In addition, individually for each multi-version object present on the screen the user has the means to change the displayed version, for example using tabs, or using a displayed button when the cursor passes on the object or when it is selected.

FIG. 127 shows how the user interface by default becomes when the user views document "n" of the preceding example, by having the SCR E10, E3, E2, E1, E0 selected as opened, in this preference order.

As there are versions of a2 only in E2 and E1, and E2 is preferred to E1, it is the version of E2 which is displayed, whereas it is the version of E3 which is displayed for the article a3 since there is one in E3 and this SCR is preferred over E2 and E1. Of course the tabs (allowing the user for each multi-versions object to select the version for a given SCR) are displayed only in enabled mode (i.e. the tabs mode can be enabled/disabled by the user).

When the user manually selects a tab of a multi-versions object, the system remembers this selection and restores it the next time the user displays the resource.[153]

[153]The configuration of the selected versions (for a resource) can be recorded (in a server)

One now will describe the user interface for the SCR selected in write access.

Regarding the creation of objects, either a creation "ex nihilo" or a result of transclusion, the interface can be placed in two modes, manual selection of SCR or automatic selection.

In automatic mode, the added objects are placed in the same SCR as their parent.

In manual mode, the user chooses, among the SCR opened in read-only, a SCR in write access which by default will receive the new objects. If the user chose the SCR E1 for the new objects and creates an object in the E1 version of an object, the new object is simply added directly. If (as in FIG. 128) the SCR of the container (it is E2 in the figure) is different from the selected SCR E1, a new multi-version object is created automatically, containing initially only one version for E1.

To create a multi-version object, the user starts by creating the base version[154] of this object[155], then after having selected it, requests to create a new version of it[156]. She can then choose for which SCR it is necessary to create the new version (the user interface must however prevent her from creating two versions of the same object for the same SCR).

[154]If the base version is created in a SCR different than that of the parent, it will be created directly as multi-versions object

[155](or chooses an existing object which is not multi-version)

[156]For example by the contextual menu If the object is already multi-version, this tool can be presented to the level of the tabs, in the form of a button "to add a tab"

The interface also offers a tool for transfer (copy, movement, transclusion, etc) between versions of a multi-version object. So as in FIG. 128*b* is, the E1 version of the object a contains an object b (and a is the first ancestor of b being multi-version), the user selects b then activates (for example via a contextual menu) the transfer function which she wishes to use. The system then enables her to choose in the list of the versions of a, presented like a list of SCR, which is used as destination of the operation. If there existed already a corresponding object[157], the system displays the two objects and proposes to replace the already existing object.

[157]Several criteria can be used to establish this correspondence. As explained further, the various versions being obtained by transclusion, to examine the identifiers of the objects is sufficient. One can moreover treat the case where this object already had been transcluded or copied explicitly, by checking if there exists already a transclusion or copy of b in the selected version.

Figure 129:
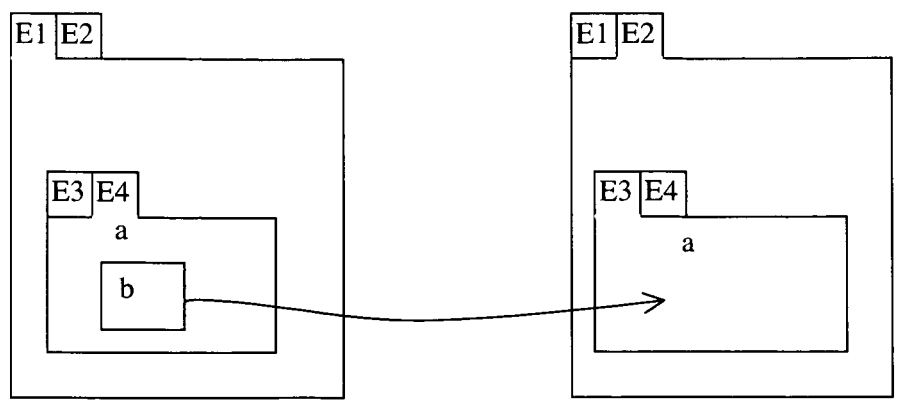

It should be noted that it is possible to open several "windows" simultaneously (what is schematized in FIG. 129), which is for example useful if the user wishes simultaneously to see several versions of the same object and to carry out more complex transfer operations between descendants of these two versions, for example to carry out transfers between two points separated by more than one multi-versions object.

Implementation Using Transclusions

We propose to use the method of transclusion to implement the multi-versions objects.

As already mentioned, the different versions of an object are obtained from the basic object using transformations. To obtain this result it is thus enough that all the versions are transclusions of this basic object, and that the desired transformations are associated with the transclusions. That gives us the structure presented in FIG. 130.

The identifier a* is given to the multi-versions object. Now, when the user asks to see the object a*, one among a, 2:a and 3:a is spontaneously shown to him, according to the SCR used. This replacement is carried out recursively, if the posted version itself contains other multi-versions objects.

Here now we describe how the above example works.

The left part of FIG. 131 contains the structure of a* already seen above.

When the user carries out a transclusion of any of these objects, the system carries out actually a transclusion of a*. The following diagram shows the transclusion (10) of 2:a2 (i.e. of a2 seen through the SCR E2) and the transclusion (11) of 2:a3.

It is seen that the multi-versions objects of the results of the transclusions are transclusions of a* itself. The function associated with these transclusion is s(x), where x is the identifier of the object transcluded by the user, which means that in each version it is only necessary to keep this object x and its various versions (with their descendants).

The multi-versions object result of transclusion 10 does not contain a version for E3 because 3:a2 had been filtered by fE3.

If the user had carried out for example copies[158] rather than transclusions, the structure represented on the right would have been rebuilt completely rather than to be implicitly described using relations of transclusion.

[158](or movements)

Overlapping Multi-Versions Objects

It can happen that it is necessary to place a multi-versions object in a particular version of a multi-versions object. For example in the scenario above, if the user having built page n decides to place a personal annotation inside 10:2:a2, if she wishes to be the only one to be able to read it, it is necessary that it is in a SCR other than E2.

Let us suppose that E10 is the own SCR of this user, the annotation must be visible only in this SCR. With this intention, the user creates a multi-version object with only one version for the SCR E10, containing her annotation.

Figure 132:
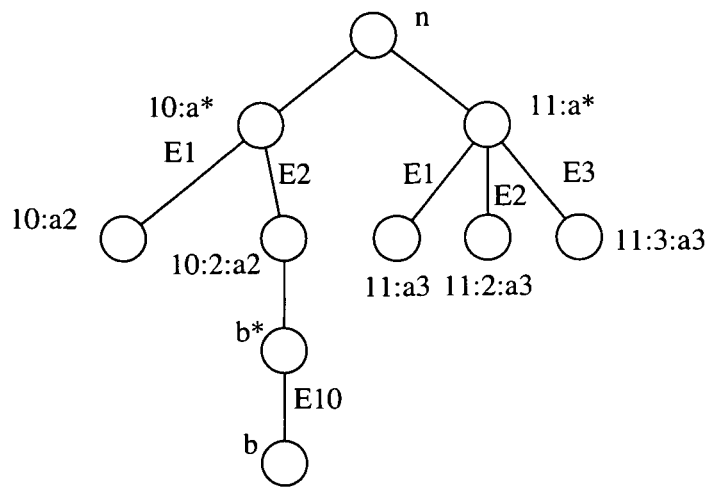

Represented in the form of tree, document n would then have a structure as in FIG. 132.

Approaches of Implementation of the Access Control

To be sufficiently general we consider that the structure of the transclusions is stored separately than their contents, the first being stored in collaboration servers and the second in content servers[159] (like already described).

[159]Of course, they can also function like only one server or even be implemented on the computer of the user Normally, each one of these servers control the accesses and thus the user is identified[160] before being able to read or modify any of these data. For each user the list of the SCR to which she belongs, along with the access level (read-only or write), is stored in a server intended for this purpose.

[160]An Authentication Server could be used here to avoid the user having to authenticate itself separately for each server When users exchange resources, an approach consists that they exchange actually references to the resources, thus making it possible that several users collaborate on the same resource, seeing only some of the versions to which they have access.

Another method consists in encrypting the objects with keys corresponding to the SCR authorized to see them. The user has a copy of the private key for the SCR to which she belongs. When a user wants to read the resource she deciphers the concerned parts using the appropriate key, and when she wants to modify it she signs its modifications using the same key.

Advantageously, the encryption method makes it possible to the user to have all the data locally, even those to which she does not have access, and to exchange or copy the data by the traditional means.

Keys for SCR in Reading and Writing

Figure 133:
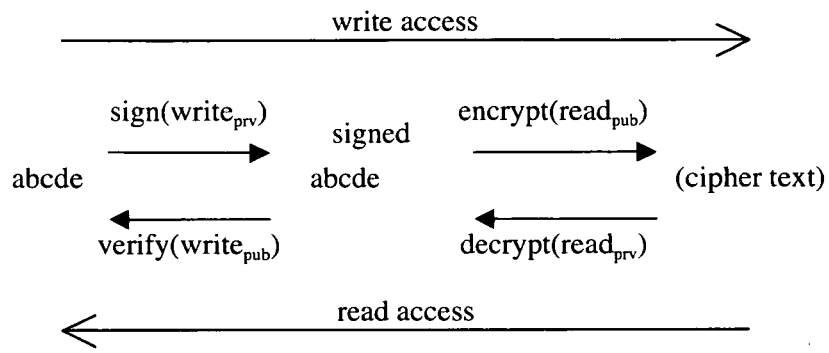

If one wishes to distinguish at this level the access rights in read-only and write one can use different pairs of keys for these two types of access. Thus a part of a resource encrypted for a certain SCR is encrypted with its "read" key and is signed with its "Write" key. Thus, a user having the private key for reading readprv+readpub and only the public key for writing writepub can read it and can check that the author of the resource had the private key for writing but will not be able to modify it. The following diagram illustrates the transformations carried out to access in reading or writing to the encrypted document. See FIG. 133.

Encrypting/Deciphering Server

A disadvantage of the method based on coding is that it is difficult to withdraw a user of a SCR, because the system cannot force the user to delete his key. It can thus be necessary to change the key of the SCR, but the versions previously encrypted will then have to be translated for the new key.

Another problem is that the risk of information disclosure is greater, because if a user reveals the key of a SCR to another person the latter will be able to decipher the resources without the system realizing it. For example if the U1 user belongs to the SCRs E1 and E2 and that the U2 user belongs only to E1, if U1 gives the key of E2 to U2, U2 will be able, while being authenticated normally as U2, to access the parts of a document encrypted for E2, which should have been inaccessible to him, and the server will see nothing there since U2 was authenticated as a user having access to E1 and that it can thus reach this document. Whereas by preserving all on the server the only means for U2 of obtaining data of E2 would have been to use the identity of U1.

One can thus consider an intermediate method, combining the advantages of the two approaches:

The users do not have the private keys of the SCR, which are rather placed in a encrypting/deciphering server (which can be combined with the Authentication Server). This server stores the private keys of all the SCR and, for each user, the list of the SCR to which she belongs (with the levels of access).

A user can then (once authenticated) submit to the deciphering server any encrypted object, and the server returns the versions to which the user has access. The same server can also offer the reverse operation and digitally sign the modifications made to the object, for the authorized users.

The users can thus always store the resources locally and exchange them by the traditional means (thus remaining independent of the content servers and the collaboration servers).

Then the problem of revocation of the keys does not arise anymore, since as soon as a user is withdrawn from a SCR[161] the deciphering server ceases accepting the deciphering requests for this SCR.[162]

[161](for a given access level)
[162](of course the user will be able to have preserved versions of old resources, but will not be able to reach the resources produced after the revocation)

If this method is adopted, only one pair of key by SCR is enough, as well for the rights in reading as the rights in writing, as the server of deciphering checks the rights of access before carrying out any operation.

However, this method offers the disadvantages related to the exchanges of resources between the client and the encrypting/deciphering server.

Storage of Keys in Association with the Contents

The process of encrypting/deciphering at the level of the client (i.e. of the user's computer) offers the advantages of:

the decentralization of the treatments (to avoid the bottleneck at the level of the server), not to have to use a remote server for the encryption/deciphering of resources (and to save band-width)

and especially to be able to communicate, to third party users, encrypted resources comprising all the existing versions, including those to which the user (who communicates) does not have herself the access right[163] but which would be accessible by the third party user (or yet another user further in the communication chain).

[163](in read only or read-write)

But such a process can present the disadvantage already evoked of the risk of disclosure of keys to third parties who do not have access right and to allow them not-authorized accesses in a persistent way.

One can limit the impact of such disclosures by limiting the scope of the keys[164], and at the extreme by having a specific key for each update (of each version) of contents. With this intention an intermediate server is used with which the user communicates keys[165] (rather than the contents). We will now describe this approach.

[164]One can renew the keys to limit the impact of the disclosures: (1) to renew the keys each time one withdraws from a user the access right (or following a decision of an administrator which judges that a key have been disclosed); (2) to renew the keys periodically, for example once by day; (3) to renew the keys automatically with each creation or update of contents (which can be a resource, part of resource, or a simple object) for the SCR in question. It is the approach (3) that we will now describe in detail. The approach (1) can be seen like an optimization of the approach (3).

[165]More precisely the user communicates to the server keys "associations" ("key-contents-SCR") between in particular keys and identifiers of contents that the keys make it possible to decipher: the Keys Server knows which version of contents can be deciphered by which key and gives this information to who has access right.

When the user[166] encrypts a content to record it, it associates with this content the respective pairs of keys of the versions of the multi-versions objects (per SCR[167]) which it generated, and this association is stored in a Keys Server[168].

[166]As already mentioned, "the user" means "(the extension of) the information manipulation tool that the user uses on the client computer"

[167]Preferably, the contents in question are partitioned in various parts (each part being homogeneous from the point of view of the access rights) With each part a keys pair is associated These keys are stored in a Keys Server or with the contents, in the content server. When a user downloads contents she receives the complete contents, with the subset of the keys corresponding to her rights

[168]The content server can itself play the role of Keys Server, in this case one does not need a separate Keys Server. The advantage is whereas the keys are stored directly with the contents. The disadvantage is that one must trust the content servers . . . .

When a user requests[169] to access that content (after being authenticated herself), the keys corresponding to its rights are transmitted to her by the Keys Server, simultaneously with the (encrypted) contents that are provided to him. The user can thus decipher the versions of the contents to which it has right. (The implementation architecture can make utilize other intermediate servers as described further in the section presenting total architecture).

[169]The keys are requested from the Keys Server (by indicating the identifier of the desired contents as well as the SCR used) in parallel with the request of the contents itself to a content server (or by opening the contents locally in the computer)

Advantageously, the user can transmit the encrypted contents, with (all keys or part of) the keys which it received from the Keys Server, to another user by the traditional means (for example by email), without utilizing a content server. The other user can then request from the keys server the additional keys which she wishes and to which it has right and if necessary to have then access to versions of multi-versions objects to which the first user did not have herself access.

Encrypting the Multi-Versions Objects

When a resource contains parts having different access rights, here how the encrypted resource is structured.

We call "connex part of a resource" a set of objects such that for any pair of objects of the set, the objects are connected one to the other by a path composed of parent-child relations which are entirely contained in the set.

If all the objects of a connex part are in the same SCR, we speak about homogeneous part (from the point of view of the rights). One speaks about maximum homogeneous part if the said homogeneous part is not contained in a larger homogeneous part.

Consider the set of the maximum homogeneous parts. With each is associated its location in the resource, typically in the form of the identifier of the parent of the root of this part (if it exists) and of the predecessor of the root (if it exists).

From now on, by part we mean maximum homogeneous part.

Each part is encrypted and signed with keys for the corresponding SCR, and the encrypted data are then placed in sequence, to form the encrypted resource.

Figure 134:
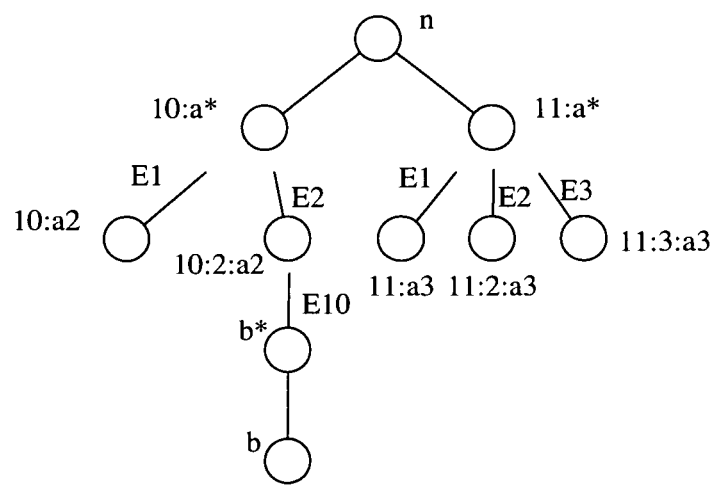

The example of FIG. 134 reuses the content of FIG. 132. The lines are discontinued at the location of change of SCR. It is supposed here that the two multi-versions objects are in the same SCR as the root of the resource, whereas the multi-version object having been used to add an annotation (in E10) is in the same SCR as its unique version. The reason could be that the owner of resource "n" created the object multi-version a* in the SCR E0, in order to be sure that it is accessible to everyone, then added there versions for the SCR E1, E2 and E3. On the other hand when the user added the annotation b, not having write access in the SCR E2 (or having disabled it), both the multi-versions object b* and the annotation itself are in the same SCR (and thus in the same maximum homogeneous part).

Figure 135:
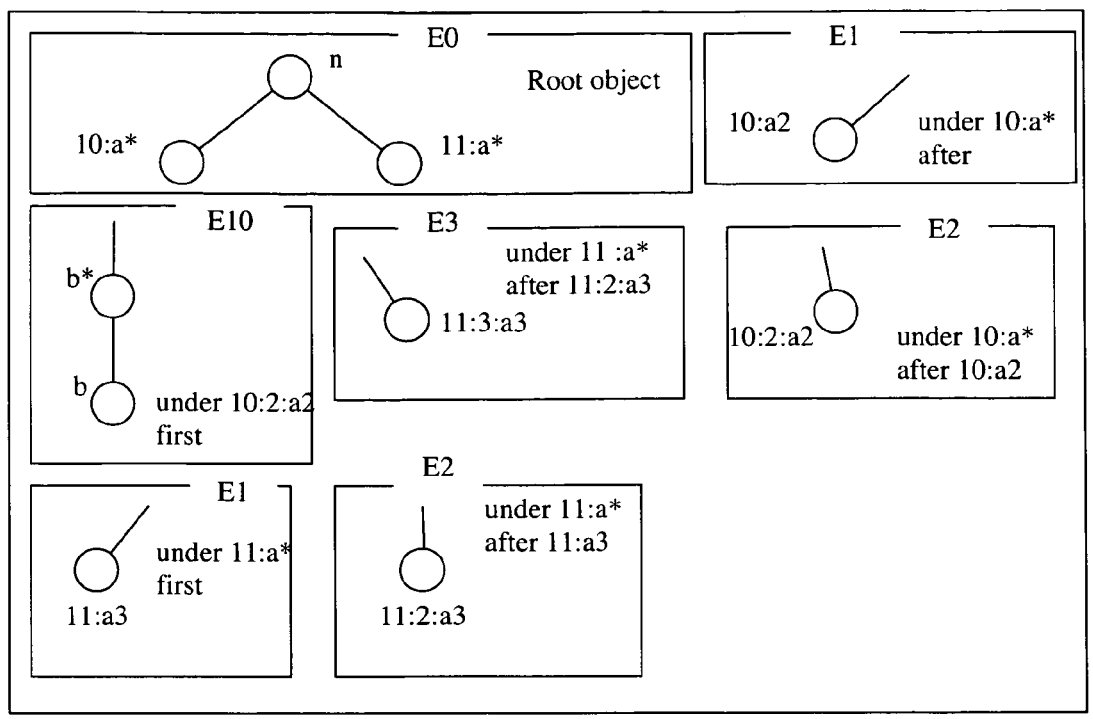

The encrypted structure of the resource will be thus that of FIG. 135.

Each part (represented by a rectangle with the name of SCR as label) is encrypted and signed with a pair of keys corresponding to this SCR.

In order to allow users to copy multi-versions objects of a resource to another without risking conflicts of identifiers one can partition the resource in several "identifier spaces".

Each part is in exactly one space of identifiers, and the references[170] to other objects, when they do not specify space of identifiers, do not cross the limits of them. It is possible to cross these limits (the following example will indicate how) by explicitly naming another space of identifier of the resource.

[170]One uses in particular the references to indicate the source of a transclusion, like indicating the parent and the predecessor of the root of a part, as will be explained further.

This makes it possible for a user to copy a multi-versions object in another resource, even if the user has write access neither to the parent in the target resource, nor to the versions of this multi-versions object (see FIG. 136). The user simply creates a new space of identifiers in the target resource, copies all the versions desired in this space, then adds to it (always in the same space of identifiers) a new multi-versions object of the same identifier as in the source. To place this new multi-versions object in the structure of the target resource, it indicates the name of the space of identifiers containing the parent, in addition to its identifier.

In the example of FIG. 136, the user wishes to copy the versions E1 and E2 of the multi-versions object 2*, from the resource at left-hand side, under the object 3 of the resource at right-hand side. A new space of identifiers IS2 is thus created in the target resource (and the existing space is called IS1), the two parts containing 3 and 11:3 are copied there without it being necessary to change[171] them, and a new part is placed in this space, being used as connector between these versions and the object 3 of space IS1.

[171]They thus do not need to be deciphered.

This part thus contains a unique object (multi-versions), which specifies as parent object 3 of space of identifiers IS1. The column symbol indicates that it is first of all necessary to leave the space of identifiers IS2 before being able to enter into the space IS1 (in the manner of a hierarchy of folders).

If the parts to be copied cover several spaces of identifiers, it is necessary, in the target resource, to use spaces of imbricated identifiers, i.e. to create a new space of identifier not containing any part but containing same spaces as those used by the parts on the side of the source (see FIG. 137).

Possibilities of Transfer

Here various possible operations within the framework of the mechanisms described above.

To add objects (created or transcluded, multi-versions or not) in a resource (even in a part which is not accessible in write access, but in read-only).

To copy a multi-versions object of a resource into another resource (or in the same one)

To copy one or more versions of a multi-versions object either in a resource, or in a new multi-versions object, or in an existing multi-versions object.

To remove one or more versions of a multi-versions object.

One can consider two alternatives for the structure of an encrypted resource, depending on if the parts indicate their position (i.e parent and predecessor) in clear (i.e only in a signed way) or if this position is encrypted.

The first alternative allows, during the handling (copy, movement or suppression) of versions, to act on versions nonaccessible in write access (because the position indicates in which multi-version object these parts are). In particular this alternative allows, at the time of the copy of a multi-versions object, that all the versions are copied, and not only those with read access (here the advantage is that a user having access in reading to the other versions can see them in the target resource).

With the second alternative if one does not have read access to parts (such as annotations), one cannot know at which place they are in the resource. This alternative is thus interesting in the case of annotations placed by a user.

It is possible to have in the same resource, and even in a multi-versions object, objects adopting the first approach and others adopting the second.

However it is not possible (for a user not having write access) to carry out these manipulations in a granularity finer than that of the parts (for example to copy only one object of a version of a multi-versions object), because that would imply to modify the contents of a part, which is not possible even after the operation of copy.

It should be noted that the operation of transclusion of a multi-versions object or one of its descendants is not concerned with these considerations, by the fact that the result object is built in an implicit way, and contains the reference to the source of the transclusion (contrary to the copy which does not keep this reference, and which does not follow the modifications to the source). Consequently, whatever the alternative used the transclusion will behave in the same way, because a user who can reach an object even in the second alternative will know his position with the source of the transclusion and will be able to deduce from it (by applying the algorithm of transclusion) the position in the result.

Example

Figure 138:
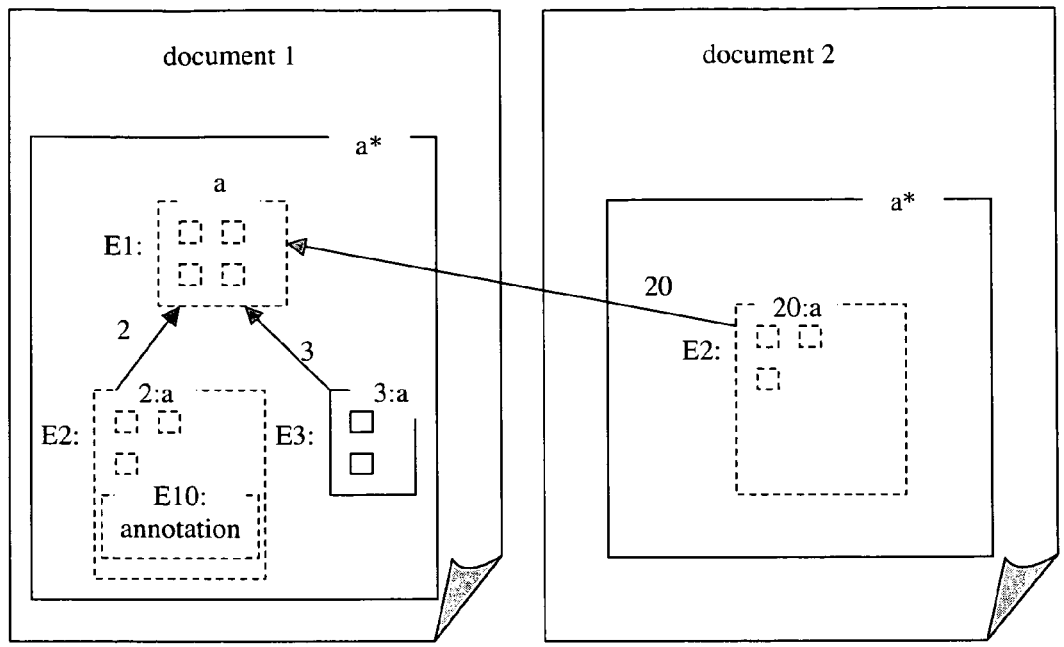

FIG. 138 shows the result of a copy operation of a version of a multi-versions object. It is seen that it was necessary to keep the source of the transclusion. The figures in discontinuous lines indicate the parts corresponding to SCR to which the user does not have read access.

This operation is possible although the user has access in read-only to the version for E3 (with the first alternative, i.e. the position being public).

Then, the annotation which was present in the original disappeared, this occurs if it is supposed that this annotation used the second alternative, i.e. its position is encrypted.

Figure 139:
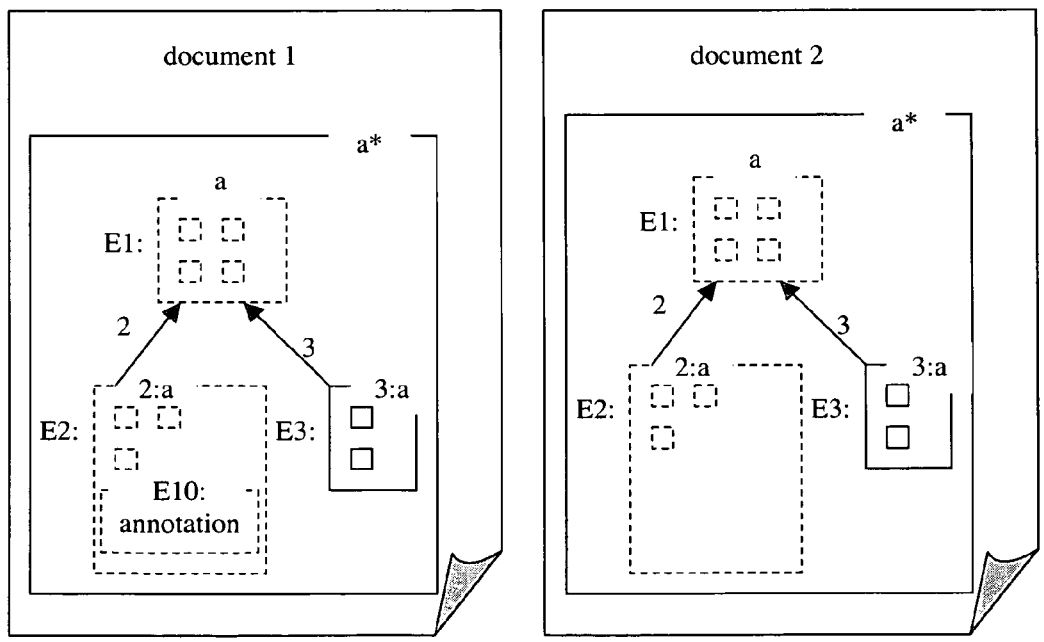

The example of FIG. 139 shows the result of the same operation, where the user asked to copy the whole of the multi-versions object rather than only a version. One sees that the structure was reproduced identically in the target resource, including the parts which the user cannot read (here still it is supposed that these parts use the first alternative).

Thus to note that in this case the source of the transclusion is transferred to the corresponding part (that being in the SCR E1) in the resource of right-hand side.

Here, for the same reason as in the preceding example, the annotation disappeared, by supposing as previously that its position is quantified.

Replacement Objects in the Multi-Versions Objects

We will now describe how to exploit the concept already described (see the section Propagation of the contributions in the branches) of replacement objects (and alternative objects) within the framework of multi-versions objects.

When a user wishes to contribute in a resource, she can create a multi-versions object (or, if necessary, add a version to an already existing multi-versions object), in the same SCR as the parent, or in the same SCR as a version already existing, but associated with its identity as a user.

Figure 140:
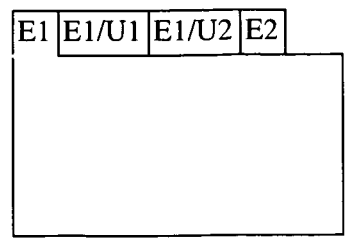

From the point of view of the user interface, as shown in the FIG. 140, that means that, in the presence of contributions, instead of multi-versions objects having a set of versions indicated by a set of SCR, they will have in addition their versions labelled by SCR/utilisateur pairs. One can thus have a mixed situation where there exists for a SCR collective versions (E1), as well as individual versions of contributions (E1/U1; E1/U2) for the same SCR.

This association can be done by allotting to each user a pair keys, and while making sign by each user the versions of multi-versions objects which she produces.

The modifications made in her contributed version will be thus propagated in the form of replacement objects in the other versions of the same object and the same SCR created by other users. Several users can thus work together on a resource, and separate in various branches in the event of refusal (thus forming several work groups for the same object, in the same multi-versions object).

As already known, the various versions are managed in the form of transclusions contained in the multi-versions object, which makes it possible the replacement objects to circulate between objects corresponding to the same source created and being in the various versions of a multi-versions object. When a user adds a version (labelled SCR/user) it can choose from which to work, and in the structure of the multi-versions object the version added by the user is a transclusion of the selected initial version.

Figure 141:
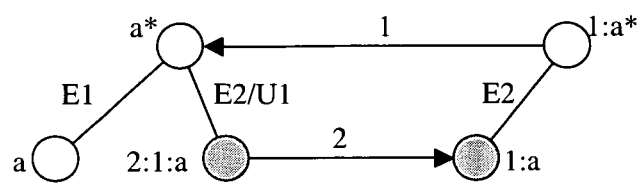

FIG. 141 shows the structure of the objects if a modification made in a result of transclusion (1:a) which was presented as replacement object to its (A) source was refused by the latter, resulting then in an alternative object (2:1:a) in the same SCR as that of its contributor and labelled with its user identity (E2/U1). The alternative object (2:1:a) is a result of transclusion starting from the refused contribution, so that if the latter evolves, the alternative object which results can there be synchronized.

Management of Temporal Versions of Objects

Alternatively, one can implement for the objects a (traditional) mechanism of temporal management of the versions, the successive contributions on the same object being then seen like his temporal versions. If a contributor of a preceding temporal version of an object refuses the current temporal version (most elaborate) of an object, it makes it pass in a version[172] labelled of a pair made up of the same SCR and the user who contributed the refused version.

[172](in the meaning of versions of a multi-versions object)

The replacement objects can thus circulate along the transclusions like already described in particular with the section "Propagation of the contributions in the branches".

If the information manipulation tool is provided with a functionality of management of versions, let us take for example the case of Wikipedia, one can implement the following method:

When the contributor of a previous version of a page of Wikipedia visits the current version of a page, the system presents to him, in the form of replacement objects, the modifications which took place on this page compared to the last version that she had contributed herself.

The user can then refuse certain replacement objects, which are then put in other branches, i.e. they form of other versions of multi-versions objects.

Advantageously, such a method can be implemented by a simple extension of the Web browser (and of course one must also envisage a collaboration server), this independently of the server of Wikipedia. In this case, only the contributions of the members of SCR are presented like replacement objects, and become alternative objects when they are refused. The server of Wikipedia itself (which provides the temporal versions of the pages of Wikipedia) can play the part of content server. The users who are not members of SCR (or which do not have the extension of the Web browser) continue to use Wikipedia like before.

Overall Implementation Architecture

Figure 142:
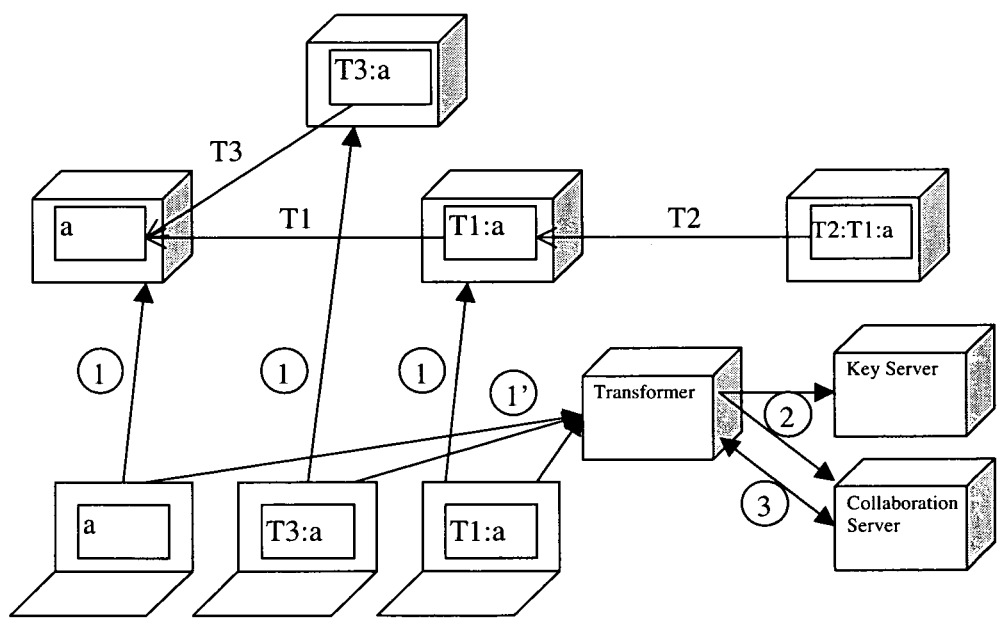
Figure 143:
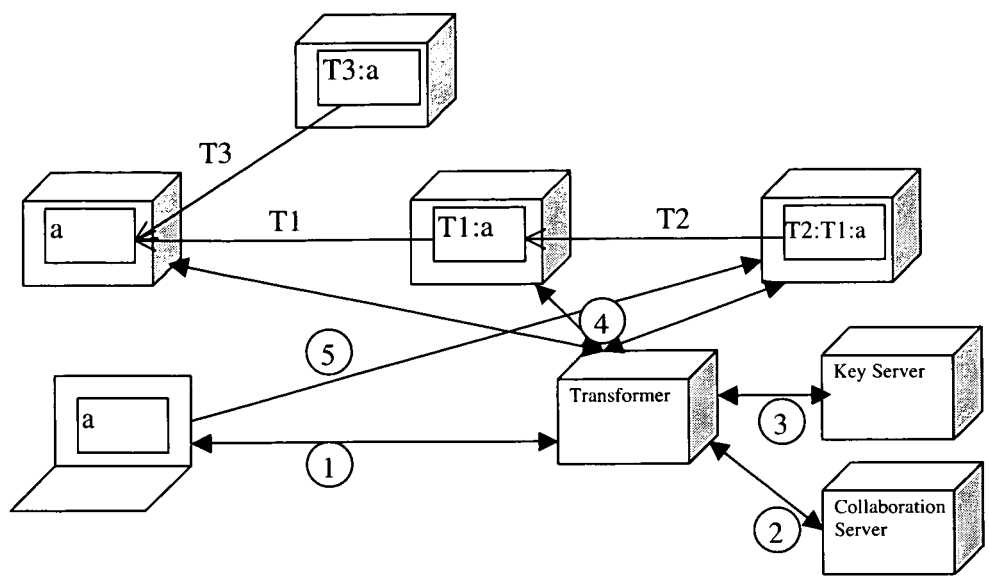

FIGS. 142 and 143 present an architecture including the Keys Server describes above as well as a server which implements the transformations associated with the transclusions as described previously.

First of all FIG. 142 illustrates the method of update of contents by users.

In the example presented in this figure, a content 'a', which is in a first content server, is transcluded by a transclusion T1 to give the result T1:a which is stored in a second content server, which is in turn transcluded by the transclusion T2 to give T2:T1:a in a third content server. 'a' is in addition transcluded by transclusion T3 to generate result T3:a.

It should be noted that the results of transclusions which are presented here as being stored in servers of different contents, can as well be in the same content server[173] and can be versions of the same multi-versions object, that would not change of anything the principles presented here. One thus describes here an architecture of implementation including the case of the multi-versions objects.

[173](or even on the client computer of the user)

Note also that all these contents being in the content servers are encrypted as described with the preceding section.

The marked arrows (1) indicate the accesses of the users to modify respectively a, T3:a and T1:a.

The process includes a stage, represented by the arrows (1'), consisting in communicating to the transformation server the modifications, as well as the keys generated following these modifications (and which made it possible to encrypt the modified contents in question).

Then, in (2), the transformation server communicates identifiers of the modified contents to the collaboration server, and to the keys server the associations key-identifier of modified contents.

To prevent that the collaboration server propagates transclusions which actually will not take place[174], in (3), the collaboration server communicates to the transformation server the identifiers of the new potential results of transclusions[175] and the transformation server returns a filtered set of results to it.

[174]This can be seen as an optimization because these transclusions would be in any case filtered during the supply of results in the process of consultation of contents.

[175]By using the "algorithm in push"

FIG. 143 presents the method of consuting contents.

In (1), the user[176] obtains the content T2:T1:a from the transformation server.

[176] (i.e. the extension of the information manipulation tool)

In (2), the transformation server obtains from the collaboration server the addresses of the contents which provide updates to be carried out on T2:T1:a[177], which are the contents a, T1:a and T3:a which were modified (as illustrated in FIG. 142).

[177]These updates include the modifications at upstream and the contributions (replacement and alternative objects) which can also come from downstream In (3) the server of transformation obtains the keys of these contents from the Keys Server.

In (4), the transformation server applies the transformations to the modified sources obtained from the respective content servers.

In (5), the user records the contents T2:T1:a updated and transformed, in the content server.

One can implement several methods to record modified contents. First of all the modifications can be recorded in a structure containing only the modified contents and of the references to the sources. Then, and this becomes advantageous when the quantity of modifications exceeds a certain threshold, one can record all the current version of the contents in question.

In (4), if only modifications of T2:T1:a are recorded, the transformations server obtains all the contents of the source 'a' from the first content server (as well as the modifications from the other sources). On the other hand, if the current version of T2:T1:a had been entirely recorded, instead of all the contents of a, only the modifications not yet taken into account of a are obtained first content server.

Moreover, if the current version of T2:T1:a had been entirely recorded, alternatively to (1), the user can obtain from the third content server the last current version of the content T2:T1:a and the corresponding keys from the Keys Server, and independently to then obtain from the transformations server the updates to apply on it.

Measuring the Contributions

Calculation of the Credit from which a User Profits

Measuring how much a given user contributes to a SCR, and how much its contributions are appreciated or on the contrary refused by the other users.

Thus to each user a credit is allotted, initially this credit is neutral. Various actions of the users will modify this credit.

User's Credit

The credit of a user is increased when she contributes.

When a user changes branch (that is to say because of a refusal of replacement object or by explicit change), the last contributor of each part constituting previously displayed the object sees his own credit decreasing, and the last contributor of each part constituting the selected object sees his credit increasing. Moreover one change of branch due to a refusal must cause a variation of user's credit more than a manual change of branch (because this last operation does not necessarily mean that the unselected contents are of bad quality).

In order to obtain more precise results these changes of credit will be weighted by the width of the concerned contents (thus a small contribution influences less the credit of its author).

Moreover, a larger weight will be given to the actions of the users having a higher (global) credit.

It should however be prevented that there exist methods for a user to increase his own credit arbitrarily (alone or thanks to complices). In particular, if the simple fact of contributing contents made it possible a user to increase his own credit, users could simply produce a great quantity of meaningless data and thus increase their credit. Here approaches of solution:

If the contributed contents are refused by many users, the penalty is larger than the credit obtained by its creation.

The credit gained at the time of the creation of contents depends on an estimate of the number of users who will see it (in order to prevent that a user obtains credit by producing contents that nobody will read). A means of estimating this value is the number of users for which the branch containing this object is selected. One can also take into account the transclusions having this object or his parent as source in order to count the users who will see an image of these new contents in a result of transclusion.

Lastly, (again as a function of the number of users who can access these contents) one fixes a maximum limit at the credit which can be obtained by addition of contents. Beyond this limit, to contribute new contents does not have an effect on the credit of the author.

Credit of Approval

The users contributing contents in a field followed per few other users should not be too penalized, because it is the field which is unpopular and not specifically the contributions of these users. The method described below shows how users can increase the credit of the users whom they approve.

For each pair of users the "approval" of the first for the second is maintained. To prevent that this has an exaggerated effect we also limits the quantity of credit which a user can create for another, by limiting this factor between 0 and 1/n, where n gives an order of magnitude of the active number of users to see a resource.

When a user shows his interest for a contribution (by making a transclusion, or by selecting the corresponding branch, or simply by visiting the resource containing the concerned object), the approval of the visitor for the author of the contribution increases.

In order to control the approvals, we can for example regularly decrease them, with the result that when a user ceases showing his interest for the contributions of another user, her approval for the other user will gradually decrease.

That is to say thus x being the credit of a user, and a1, a2, a3, etc approvals on behalf of users having x1, x2, x3, etc as credit. x1<x2<x3<etc is supposed. To calculate the effective credit of the user one proceeds as follows.

The initial credit is K=x.
The following operation for i=1, i=2, etc is carried out
If K<x then K is replaced by K+(xi−K)*ai.
Thus, if the credit of the visitor is higher than the credit of the author of the contribution, the credit of latter is increased (while avoiding of course carrying out this increase more than once for a same visitor and contribution).

Application of the Method of Conduits of Propagation of Scores of Relevance

One can adapt the process of the conduits of propagation of scores of relevance as described in WO05045698A2 to a structure of transclusions as follows.

The basic idea is that the score of an object is related to what is present (visible, audible, . . . ) in this object (and if possible within the meaning of these contents). One thus will place conduits (all of the same size) along the transclusions, propagating the score since an object of the source in direction of his image in the result of the transclusion. In the presence of internal transclusions, the conduits are placed according to flows of information, i.e. for a result of transclusion a conduit is placed only from the nearest candidate source.

When the source and the result of a transclusion are not in the same branch, the size of the conduit is reduced, for example is fixed at half of the size of a conduit not changing a branch, in order to reflect the fact that the replacement objects do not change a branch.

In order to suitably treat the changes carried out in a result of transclusion, one also places conduits propagating the score of all the objects in direction of their parents. This will cause that the parents will have a score taking account of the average score of their children. Thus, if in a result of transclusion objects are added, modified or removed, the score of the result of transclusion will be affected consequently.

Three applications are the following ones:

When an object receives many alternative contributions, the system can thus sort them by relevance (and to keep only the first ones), by calculating the proximity of each contribution with the container[178], based on the credit of the contributors.

[178](possibly by taking of account the navigation context of the user)

Secondly, the system can selectively place contents (such as advertisements) in an object, according to their relevance with respect to the containing object (also based on the credit of the contributor).

Thirdly, one can also use the process describes in WO-03 057648 to select annotations put on close resources. It should be noted that in this last application, one can profit from the structure of the "positions" of the maximum homogeneous parts (described above) to place information there allowing to determine how to present in a resource the annotations which appear in a close resource.

Preliminary definitions . . . 9
Object, Resource . . . 10
SCR, collaboration server . . . 10
User . . . 11
Description . . . 12
Introduction . . . 12
Illustration of the principle of the method . . . 12
Versions of a collaborative resource, branches . . . 12
Viewing the alternative versions of a collaborative resource . . . 14
Derivation . . . 15
Categorization of the versions of collaborative resources . . . 15
Structural modifications, slots . . . 16
Managing the inconsistencies . . . 17
Merging branches . . . 18
Case of the single collaborative resource . . . 19
Transclusions . . . 19
Implementation . . . 19
Architecture . . . 19
Data Structures . . . 20
Constraints . . . 21
Algorithms . . . 21

Construction of the structure to present for a version of the collaborative resource . . . 22
Change of active branch . . . 22
Reaction to a modification . . . 22
Treatment of a creation of object . . . 23
Treatment of a refusal . . . 23
Management of the concurrent operations . . . 24
Restrictions of propagation . . . 24
Protection in reading . . . 25
Protection in writing . . . 25
One-way propagation . . . 25
Alternative: Versions of resources as Transclusions . . . 25
Illustration of the principle of the method . . . 26
Method of creation of the most elaborate objects . . . 26
Creation of derived resource . . . 27
The modifications are proposed upstream . . . 27
Example . . . 28
Initial situation of the example . . . 28
Determining the replacement object and the alternative objects . . . 29
Ignorance or acceptance (FIG. 26) . . . 30
Refusal (FIG. 27 à 32) . . . 30
Multiple derivations of the same resource (FIGS. 33 to 44) . . . 31
Alternative to Rule 3 (FIG. 45) . . . 32
Replacement/Enrichment of Grains (FIGS. 46 to 49) . . . 32
Slots (FIG. 50) . . . 35
Method of sorting of alternative objects by rating . . . 36
Method of sorting alternative objects by contextual relevance . . . 36
Method of replacement by Co-identification . . . 39
Method of transclusion . . . 38
Identifier . . . 38
Transclusion . . . 39
Implicit Transclusion, internal transclusion . . . 41
Equivalence of identifiers . . . 41
Calculation of the sources of an object . . . 42
Origin of information . . . 42
Distance de sources . . . 42
First method . . . 42
Calculation of the proximity of an object . . . 43
Second method . . . 43
Method of transclusion in "pull" . . . 43
Calculation of an object—local algorithm . . . 44
Calculation of a structure of objects—global algorithm . . . 44
Method of transclusion in "push" . . . 45
Mixed structures . . . 47
Centralized or in cascade architecture . . . 48
Propagation of the contributions in the branches . . . 49
An alternative method . . . 49
Behavior of the grains in the presence of transclusions . . . 53
Counters of activity . . . 51
Container objects, Merge-transclusion, automatic Placement . . . 52
Conditions associated with the transclusions . . . 54
Personalization architecture . . . 55
Replacements/Enrichments as proposals for acceptance . . . 57
Modes of use of the SCR . . . 58
Recommendation of Resources and of SCR . . . 59
Advantages . . . 59
Advantages for the processes of publication . . . 59
Collective drafting of a future publication . . . 60
Advantages for broadcasting advertisement content . . . 60
Advantages for the "wikis" . . . 61
The Web in read-write . . . 61
Reverse Links . . . 62
Meta-data of diffusion constraints . . . 62
Advantage in circumventing censorship . . . 63
Extensions to the current protocols of syndication . . . 63
Interoperability . . . 63
PSE . . . 65
XML Specification . . . 65
Element <pse: part> in <item> or <channel> . . . 65
PSE Scenarios . . . 65
Item transcluded in a channel . . . 65
Abstract XML representation . . . 66
Item transcluded into an other item . . . 67
Abstract XML representation . . . 68
Part of item transcluded within an other item . . . 69
Abstract XML representation . . . 69
Internal and implicit transclusions . . . 70
ASE . . . 71
XML Specification . . . 72
Example . . . 73
Upstreams Transclusions and Contributions (PSE with ASE) . . . 73
Example . . . 74
Abstract XML representation . . . 74
Collaboration server for PSE/ASE . . . 77
Transclusion with transformations . . . 78
Examples of transformations . . . 81
Introductory examples: replacement and anti-duplicates . . . 81
With local modifications . . . 81
Filters of selection according to a criterion . . . 81
Replacement of transformations . . . 81
Principles of integration to a spreadsheet such as Microsoft Excel . . . 83
Multi-version objects . . . 86
Example of multi-version objects . . . 86
User interface . . . 87
Implementation using transclusions . . . 87
Embedded multi-versions objects . . . 89
Approaches of implementation of the access control . . . 89
Keys for SCR in reading and writing . . . 90
Ciphering/deciphering server . . . 90
Ciphering of multi-version objects . . . 92
Possibilities of transfer . . . 93
Example . . . 94
Replacement objects in the multi-version objects . . . 94
Management of temporal versions of objects . . . 95
Overall implementation architecture . . . 95
Measuring the contributions . . . 97
Calculation of the credit of a user . . . 97
Own credit . . . 97
Credit of approval . . . 97
Application of the method of conduits of propagation of scores of relevance . . . 98

The invention claimed is:

1. A method for managing variable content resources in a data processing environment, each resource comprising a tree structure of a set of objects, and at least one or more of these objects being presented in a resource as forming an object transcluded individually or as a part of a larger object transcluded from a source object, via one or more intermediate transcluded objects, so that a modification made to the source object can be propagated up to said transcluded object, wherein:

the data processing environment is configured for storing transclusion information based on object identifiers, information from which source objects can be presented in transcluded objects, and of further storing transclusion types including standard transclusion and implicit transclusion, such implicit transclusion being a transclusion between descendant objects of a transcluded larger object, where said descendant objects were transcluded from one another in the source larger object, the method comprises the step consisting, when modifying an object, in generating or updating, for each object transcluded from said object, an identifier of the source object to be taken into account for this transcluded object, depending on information of distance between the modified object and said transcluded object, wherein said information of distance is based on the number of transclusions between the modified object and the transcluded object and of the types of these transclusions.

2. A method for managing variable content resources in a data-processing environment, each resource comprising a tree structure of a set of objects, and at least one or more of these objects being presented in a resource as forming an object transcluded individually or as a part of a larger object transcluded from a source object, via one or more intermediate transcluded objects, so that a modification made to the source object can be propagated up to said transcluded object, wherein:

the data-processing environment is configured for storing transclusion information based on object identifiers, information from which source objects can be presented in transcluded objects, and of further storing transclusion types including standard transclusion and implicit transclusion, such implicit transclusion being a transclusion between descendant objects of a transcluded larger object, where said descendant objects were transcluded from one another in the source larger object, the method comprises the step consisting, when presenting a transcluded object, in determining a source object identifier to be taken into account for this transcluded object, depending on information of distance between said transcluded object and each of the modified objects which can be source objects for said transcluded object, wherein said information of distance is based on the number of transclusions between the modified object and the transcluded object and of the types of these transclusions.

3. A method according to claim 1 or 2, wherein said modifications can relate to different attributes various of said objects, and the step of generating or updating a source object is carried out separately for each attribute, whereby an object can have different source objects depending on the considered attribute.

4. A method according to claim 3, wherein the different attributes comprise at least two attributes among content attributes, meta-data attributes, position attributes and transformation attributes.

5. A method for managing variable content resources in a data-processing environment, each resource comprising a set of objects and at least some of these objects being presented in a resource as forming an object transcluded individually or as a part of a larger transcluded object from a source object, possibly via one or more intermediate transcluded objects, so that a modification made to the source object can propagate up to said transcluded object, the method comprising, depending on the frequency of the modifications brought to the objects and of the presentations of objects, the implementation either of the method according to claim 1, or of the method according to claim 2.

6. A method according to claim 5, wherein the method according to claim 2 is automatically implemented when the environment of the source object is not capable of generating said source object identifier.

7. A method according to claim 6, wherein the selection of the implemented method is carried out transclusion by transclusion.

8. A method according to claim 5, wherein the selection of the implemented method is carried out transclusion by transclusion.

9. A method according to claim 1 or 2, implemented in centralized server means for providing the source object identifiers.

10. A method according to claim 1 or 2, implemented in cascade processing means capable of providing the source object identifiers by server-to-server parsing depending on the transclusions.

11. A method according to claim 1 or 2, wherein at least certain transclusions are associated with object transformation information, the pieces of information each designating a predetermined transformation function to be applied to the object as an initial step of the transclusion.

12. A method according to claim 11, wherein a transformation is applied to object attributes including contents attributes, position attributes, meta-data attributes and transformation attributes relating to transclusions internal to the objects.

13. A method for making accessible to various user groups (SCR) within a data-processing environment a resource containing a plurality of objects which can be modified by the users to obtain different versions of said objects, wherein each object may exist in different versions corresponding to different user groups and as descendants of multi-version object including them, and comprising, when an object is accessed by a user, the presentation to the user of the versions of the object corresponding to the groups to which said user belongs, each object version being obtained by transformation from another version of said object, said method being implemented using a management method according to claim 11, wherein specific predetermined transformations allow to obtain each of the object versions.

14. A method according to claim 13, further comprising:
for at least certain objects, assigning to the various versions of said objects different ciphering/deciphering keys,
providing versions of said objects ciphered with the respective keys,
when the resource is accessed by a user, carrying out the deciphering of the ciphered object versions belonging to the resource by means of the respective deciphering keys,
when the resource is modified by a user, generating a new version of the object, to which a new key is assigned.

15. Method according to claim 14, further comprising a step of selectively providing the keys for deciphering the objects to the users depending on authorization information for said users.

16. Method according to claim 15, wherein the authorizations are managed user group by user group, with two users of the same group having the same rights.

17. Method according to claim 14, wherein the versions of an object are made of successive updates of said object in client stations of the data-processing environment, and wherein the step of generating a new key when a new version of the object is generated is carried out in the client station, wherein a subsequent step of transmission of the new key to a key server is provided.

18. Method according to claim 14, wherein the versions of an object are made of versions with different contents of said object, simultaneously coexisting and reserved for different user groups, and wherein a communication of such an object by a user of a first group to a user of a second group comprises:
- providing to the user of the second group, by any appropriate channel, of a multi-version object containing the contents of the object reserved for the second group, in a ciphered state, and
- independently providing to the user of the second group, from a key server, a deciphering key allowing to decipher said contents of the object reserved for the second group.

19. Method according to claim 18, further comprising a step consisting in separating the multi-versions object in parts which are homogeneous from the standpoint of access rights, each part containing positioning information allowing its replacement in the structure, whereby manipulations can be handling can be made on the multi-version object even in the absence of access rights for the entirety of its versions.

20. A method according to claim 13, wherein an action of transclusion by a user of an object belonging to a multi-version object causes a transclusion of the whole of the multi-version object.

21. A method according to claim 13, wherein each object is may also exist within one same user group in different versions corresponding to different users, wherein these versions are also presented when the object is accessed by the users of said group.

22. A method according to claim 21, further comprising the implementation of means of relevance score calculation for the different versions corresponding to the different groups and/or to the different users to selectively present the most relevant versions.

23. A method according to claim 1 or 2, wherein the resources are spreadsheets and the objects are cells or groups of cells of the sheet.

24. A method according to claim 23, wherein formulas associated with the cells on a transcluded cell group are regarded as transclusions internal to the group.

25. A method according to claim 24, wherein the obtention of an internal transclusion in a transcluded cell group comprises applying to the spreadsheet program copy/paste instructions from a given internal transclusion of the source cell group.

26. A method according to claim 1 or 2 wherein:
- at least certain source objects have properties;
- at least certain transcluded objects in the tree structure that are containers for other objects have constraints,
- and further comprising the step consisting of, when transcluding objects, in presenting source objects having properties in container objects having constraints as a function of the adequacy of the properties of the objects with the constraints of the container objects.

27. A method according to claim 26, further comprising the step consisting of, when a property of a source object is modified, in checking the adequacy of the modified property with the constraints of the transcluded container objects, and displacing if necessary the corresponding transcluded object.

28. A method according to claim 26, further comprising the step consisting, when a constraint of a transcluded container object is modified, in checking the adequacy of the properties of the objects presented in this transcluded container object with the modified constraint thereof, and displacing if necessary the considered object.

29. A method according to claim 1 or 2, wherein the resources are tagged data flows to which are accessed according to a syndication protocol, and the objects of said resources are data elements of said resources or parts of said data elements.

30. A method according to claim 1, wherein said generating or updating step, during the modification of an object, identifies this object as its own source, with a null distance.

31. A method according to claim 1 or 2, wherein said distance information comprises a sum of individual distance values for these transclusions, wherein implicit transclusions have shorter distance values than standard transclusions.

* * * * *